US012643975B2

(12) United States Patent
Sessler et al.

(10) Patent No.: US 12,643,975 B2
(45) Date of Patent: Jun. 2, 2026

(54) LITHIUM SELECTIVE ORGANOGELS

(71) Applicant: BOARD OF REGENTS, THE UNIVERSITY OF TEXAS SYSTEM, Austin, TX (US)

(72) Inventors: Jonathan L. Sessler, Austin, TX (US); Zachariah Page, Austin, TX (US); Hu Wang, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 867 days.

(21) Appl. No.: 17/816,270

(22) Filed: Jul. 29, 2022

(65) Prior Publication Data

US 2023/0072446 A1 Mar. 9, 2023

Related U.S. Application Data

(60) Provisional application No. 63/228,091, filed on Jul. 31, 2021.

(51) Int. Cl.

*C08G 63/06* (2006.01)
*C08G 4/00* (2006.01)
*C08G 67/00* (2006.01)

(52) U.S. Cl.

CPC ............... *C08G 4/00* (2013.01); *C08G 63/06* (2013.01); *C08G 67/00* (2013.01)

(58) Field of Classification Search

CPC .......... C08G 4/00; C08G 63/06; C08G 67/00; C22B 26/10; C22B 26/12; C07D 498/22; Y02P 10/20

See application file for complete search history.

(56) References Cited

U.S. PATENT DOCUMENTS

2002/0026047 A1 2/2002 Gale et al.
2010/0129308 A1 5/2010 Sessler et al.

FOREIGN PATENT DOCUMENTS

WO WO2019/226863 * 11/2019
WO WO 2019/226863 A1 11/2019

OTHER PUBLICATIONS

Chi (X. Chi, et al., Controlling Structure Beyond the Initial Coordination Sphere: Complexation-Induced Reversed Micelle Formation in Calix[4]pyrrole-Containing Diblock Copolymers, J. Am. Chem. Soc. 2018, 140, 13219-13222).*

Armand, Michel, and J-M. Tarascon. "Building better batteries." *Nature* 451.7179 (2008): 652-657.

Brooks, Kent. "Lithium minerals." *Geology Today* 36.5 (2020): 192-197.

Buranaprasertsuk, Pongchart, Yupa Tangsakol, and Warinthorn Chavasiri. "Epoxidation of alkenes catalyzed by cobalt (II) calix [4] pyrrole." *Catalysis communications* 8.3 (2007): 310-314.

Cafeo, Grazia, et al. "Drug delivery with a calixpyrrole-trans-Pt (II) complex." *Journal of the American Chemical Society* 135.7 (2013): 2544-2551.

Choubey, Pankaj K., et al. "Advance review on the exploitation of the prominent energy-storage element: Lithium. Part I: From mineral and brine resources." *Minerals Engineering* 89 (2016): 119-137.

Custelcean, Radu, et al. "Calix [4] pyrrole: An Old yet New Ion-Pair Receptor." *Angewandte Chemie* 117.17 (2005): 2593-2598.

Goodenough, John B., and Kyu-Sung Park. "The Li-ion rechargeable battery: a perspective." *Journal of the American Chemical Society* 135.4 (2013): 1167-1176.

Grosjean, Camille, et al. "Assessment of world lithium resources and consequences of their geographic distribution on the expected development of the electric vehicle industry." *Renewable and Sustainable Energy Reviews* 16.3 (2012): 1735-1744.

He, Qing, et al. "Hemispherand-strapped calix [4] pyrrole: an ion-pair receptor for the recognition and extraction of lithium nitrite." *Journal of the American Chemical Society* 138.31 (2016): 9779-9782.

He, Qing, et al. "Selective solid-liquid and liquid-liquid extraction of lithium chloride using strapped calix [4] pyrroles." *Angewandte Chemie International Edition* 57.37 (2018): 11924-11928.

Hong, Kyeong-Im, et al. "Strapped calix [4] pyrrole as a lithium salts selective receptor through separated ion-pair binding." Chemical Communications 56.72 (2020): 10541-10544.

Ji, Xiaofan, et al. "Soft materials constructed using calix [4] pyrrole-and "texas-sized" box-based anion receptors." *Accounts of Chemical Research* 52.7 (2019): 1915-1927.

Karrech, A., et al. "A review on methods for liberating lithium from pegmatities." *Minerals Engineering* 145 (2020): 106085.

Kavanagh, Laurence, et al. "Global lithium sources—industrial use and future in the electric vehicle industry: a review." *Resources* 7.3 (2018): 57.

Kim, Sook-Hee, et al. "Strapped calix [4] pyrroles bearing a 1, 3-indanedione at a β-pyrrolic position: chemodosimeters for the cyanide anion." *Organic letters* 11.16 (2009): 3626-3629.

Kim, Sung Kuk, and Jonathan L. Sessler. "Calix [4] pyrrole-based ion pair receptors." *Accounts of chemical research* 47.8 (2014): 2525-2536.

Kim, Sung Kuk, et al. "Bipyrrole-strapped calix [4] pyrroles: strong anion receptors that extract the sulfate anion." *Journal of the American Chemical Society* 136.42 (2014): 15079-15085.

Kim, Sung Kuk, et al. "KF and CsF recognition and extraction by a calix [4] crown-5 strapped calix [4] pyrrole multitopic receptor." *Journal of the American Chemical Society* 134.51 (2012): 20837-20843.

(Continued)

*Primary Examiner* — Kumar R Bhushan
(74) *Attorney, Agent, or Firm* — pH IP Law

(57) ABSTRACT

The present disclosure relates to strapped calixpyrrole compounds, polymer monomers and polymers comprising strapped calixpyrrole substructures, and compositions thereof. Also provided herein are methods of use of said strapped calixpyrrole compounds, polymer monomers, and polymers, such as for the selective extraction of specific salts.

14 Claims, 52 Drawing Sheets

(56) References Cited

OTHER PUBLICATIONS

Kim, Youngjin, et al. "Geometrical implication of ion transporters employing an ellipsoidal hollow structure in pseudo-solid electrolytes." *Nanoscale* 7.6 (2015): 2729-2734.
Ko, Sung-Kyun, et al. "Synthetic ion transporters can induce apoptosis by facilitating chloride anion transport into cells." *Nature chemistry* 6.10 (2014): 885-892.
Krause, F. C., et al. "Performance of commercial Li-ion cells for future NASA missions and aerospace applications." *Journal of The Electrochemical Society* 168.4 (2021): 040504.
Lee, Chang-Hee, et al. "Cis-and trans-strapped calix [4] pyrroles bearing phthalamide linkers: synthesis and anion-binding properties." *The Journal of Organic Chemistry* 70.6 (2005): 2067-2074.
Mahoney, Joseph M., Alicia M. Beatty, and Bradley D. Smith. "Selective solid—liquid extraction of lithium halide salts using a ditopic macrobicyclic receptor." *Inorganic chemistry* 43.24 (2004): 7617-7621.
Miyaji, Hidekazu, et al. "Coumarin-strapped calix [4] pyrrole: a fluorogenic anion receptor modulated by cation and anion binding." *Journal of the American Chemical Society* 127.36 (2005): 12510-12512.
Miyaji, Hidekazu, Wataru Sato, and Jonathan L. Sessler. "Naked-eye detection of anions in dichloromethane: colorimetric anion sensors based on calix [4] pyrrole." *Angewandte Chemie International Edition* 39.10 (2000): 1777-1780.
Nishiyabu, Ryuhei, et al. "Synthesis, structure, anion binding, and sensing by calix [4] pyrrole isomers." *Journal of the American Chemical Society* 128.35 (2006): 11496-11504.
Park, In-Won, et al. "Oligoether-Strapped Calix [4] pyrrole: An Ion-Pair Receptor Displaying Cation-Dependent Chloride Anion Transport." *Chemistry—A European Journal* 18.9 (2012): 2514-2523.
PCT International Search Report and Written Opinion issued in International Patent Application No. PCT/US2022/074325, mailed Oct. 12, 2022.
Peng, Sangshan, et al. "Strapped calix [4] pyrroles: from syntheses to applications." *Chemical Society Reviews* 49.3 (2020): 865-907.
Shi, Dong, et al. "Lithium extraction from low-grade salt lake brine with ultrahigh Mg/Li ratio using TBP-kerosene-FeCl3 system." *Separation and Purification Technology* 211 (2019): 303-309.
Thiampanya, Preecha, Nongnuj Muangsin, and Buncha Pulpoka. "Azocalix [4] arene strapped calix [4] pyrrole: a confirmable fluoride sensor." *Organic letters* 14.16 (2012): 4050-4053.
Wang, H. et al., "Selective Separation of Lithium Chloride by Organogels Containing Strapped Calix[4]pyrroles," *Journal of American Chemical Society*, 143 (2021): 20403-20410.
Wang, Zhen, et al. "A novel liquid lithium jet-cooled finger-type divertor target concept for fusion power plant application." *Nuclear Fusion* 61.4 (2021): 046040.
Xu, Ping, et al. "Materials for lithium recovery from salt lake brine." *Journal of Materials Science* 56 (2021): 16-63.
Yang, Yue, et al. "Achieving ultra-strong Magnesium-lithium alloys by low-strain rotary swaging." *Materials Research Letters* 9.6 (2021): 255-262.

* cited by examiner

Datablock licl_calix - ellipsoid plot

LITHIUM SELECTIVE ORGANOGELS

The present application claims the benefit of priority to United States Provisional Application No. 63/228,091, filed on July 31, 2021, the entire contents of which are hereby incorporated by reference.

This invention was made with government support under Grant no. CHE1925708 awarded by the National Science Foundation. The government has certain rights in the invention.

BACKGROUND OF THE INVENTION

1. Field of the Invention

The present disclosure relates generally to the fields of chemistry, metal extraction, and macrocycles. The present disclosure relates to strapped calixpyrrole compounds and methods for selective extraction of salts such as lithium salts.

2. Description of Related Art

Lithium and its compounds play critical roles in high-energy batteries, the aerospace industry, nuclear fusion power generation and the preparation of ultra-light and high-strength alloys. Not surprisingly, therefore, lithium occupies an increasingly important position in the global economy (Armand and Tarascon, 2008; Krause et al., 2021; Goodenough and Park, 2013; Wang et al., 2021; Yange et al., 2021; Grosjean et al., 2012; Kavanagh et al., 2018). The rapid development of the new energy industry, in particular, has led to a sharp increase in the market demand for lithium, which makes the development and recovery of lithium resources particularly important. Currently, lithium is obtained primarily from minerals and brines, as well as to a much lesser extent the recycling of lithium-containing waste (Brooks, 2020; Xu et al., 2021; Shi et al., 2019). In these sources, lithium typically coexists with various metal salts (such as those of sodium, potassium, magnesium, and calcium). The similarity between the associated salts (e.g., NaCl vs LiCl) makes the selective extraction of lithium a challenge. Moreover, apart from sodium and potassium, other metal salts, such as those of magnesium and calcium, are present in many lithium sources. Methods that have been explored in the context of isolating lithium from minerals include the so-called sulfuric acid, lime sintering, chlorination roasting, and soda ash pressure cooking methods, among others (Karrech et al., 2020). Lithium is typically isolated from brine by means of precipitation, solvent extraction, or adsorption (Choubey et al., 2016). Acidification-precipitation processes are often used for the recycling of lithium-containing wastes. However, all these approaches suffer from limitations. For instance, large amounts of water are used to isolate lithium (as the carbonate salt), which adds stress to the surrounding ecosystem. Therefore, new methods for isolating and purifying lithium are needed.

SUMMARY OF THE INVENTION

In some aspects, the present disclosure provides a calixpyrrole, wherein the calixpyrrole may be further coupled to a monomer that is capable of undergoing polymerization or a polymer.

In some aspects, the present disclosure provides compounds of the formula:

(IA)

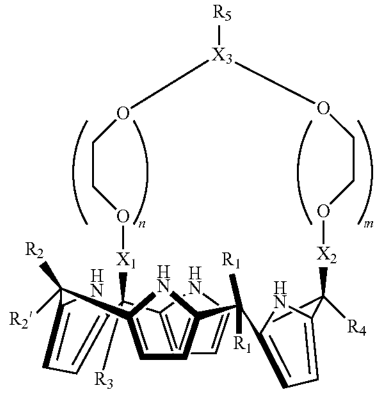

or (IB)

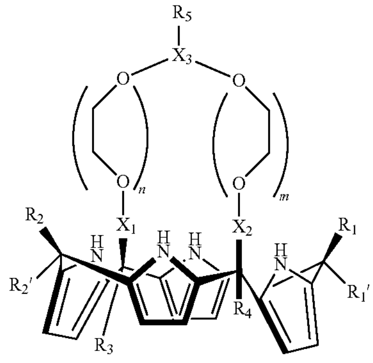

wherein:

$R_1$, $R_1$', $R_2$, $R_2$', $R_3$, and $R_4$ are each independently hydrogen, alkyl$_{(C\leq6)}$, or substituted alkyl$_{(C\leq6)}$;

m and n are each independently 2, 3, 4, or 5;

$X_1$, $X_2$, and $X_3$ are each independently arenediyl$_{(C\leq12)}$ or substituted arenediyl$_{(C\leq12)}$;

$R_5$ is hydroxy or —C(O)$R_6$, wherein:

$R_6$ is amino, hydroxy, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, substituted dialkylamino$_{(C\leq8)}$, amido$_{(C\leq8)}$, substituted amido$_{(C\leq8)}$;

or a salt thereof.

In some embodiments, the compounds are further defined as:

(IIA)

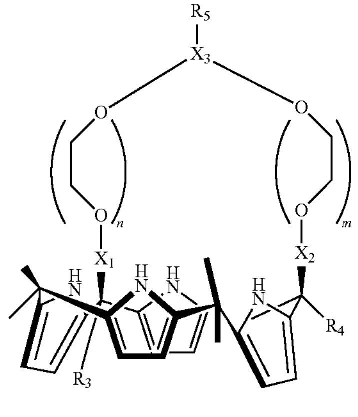

or

-continued (IIB)

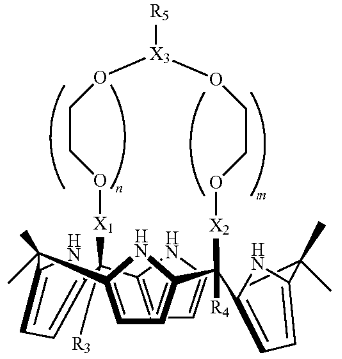

wherein:

$R_3$ and $R_4$ are each independently hydrogen, alkyl$_{(C\leq6)}$, or substituted alkyl$_{(C\leq6)}$;

m and n are each independently 2, 3, 4, or 5;

$X_1$, $X_2$, and $X_3$ are each independently arenediyl$_{(C\leq12)}$ or substituted arenediyl$_{(C\leq12)}$;

$R_5$ is hydroxy or —C(O)$R_6$, wherein:

$R_6$ is amino, hydroxy, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, substituted dialkylamino$_{(C\leq8)}$, amido$_{(C\leq8)}$, substituted amido$_{(C\leq8)}$;

or a salt thereof.

In some embodiments, the compounds are further defined as:

(IIIA)

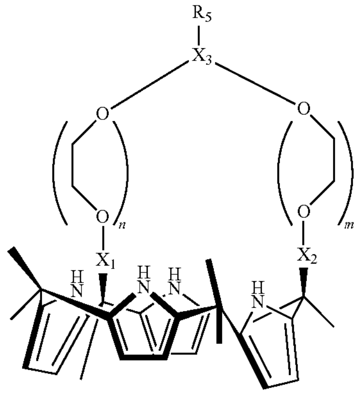

or (IIIB)

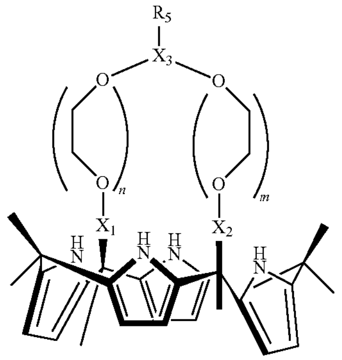

wherein:

m and n are each independently 2, 3, 4, or 5;

$X_1$, $X_2$, and $X_3$ are each independently arenediyl$_{(C\leq12)}$ or substituted arenediyl$_{(C\leq12)}$;

$R_5$ is hydroxy or —C(O)$R_6$, wherein:

$R_6$ is amino, hydroxy, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, substituted dialkylamino$_{(C\leq8)}$, amido$_{(C\leq8)}$, substituted amido$_{(C\leq8)}$;

or a salt thereof.

In some embodiments, $R_1$ is alkyl$_{(C\leq6)}$ or substituted alkyl$_{(C\leq6)}$. In some embodiments, $R_1$ is alkyl$_{(C\leq6)}$ such as methyl. In some embodiments, $R_1$' is alkyl$_{(C\leq6)}$ or substituted alkyl$_{(C\leq6)}$. In some embodiments, $R_1$' is alkyl$_{(C\leq6)}$ such as methyl. In some embodiments, $R_2$ is alkyl$_{(C\leq6)}$ or substituted alkyl$_{(C\leq6)}$. In some embodiments, $R_2$ is alkyl$_{(C\leq6)}$ such as methyl. In some embodiments, $R_2$' is alkyl$_{(C\leq6)}$ or substituted alkyl$_{(C\leq6)}$. In some embodiments, $R_2$' is alkyl$_{(C\leq6)}$ such as methyl. In some embodiments, $R_3$ is alkyl$_{(C\leq6)}$ or substituted alkyl$_{(C\leq6)}$. In some embodiments, $R_3$ is alkyl$_{(C\leq6)}$ such as methyl. In some embodiments, $R_4$ is alkyl$_{(C\leq6)}$ or substituted alkyl$_{(C\leq6)}$. In some embodiments, $R_4$ is alkyl$_{(C\leq6)}$ such as methyl.

In some embodiments, m is 2, 3, or 4 such as 3. In some embodiments, n is 2, 3, or 4 such as n is 3. In some embodiments, $X_1$ is arenediyl$_{(C\leq12)}$ such as benzenediyl. In some embodiments, $X_2$ is arenediyl$_{(C\leq12)}$ such as benzenediyl. In some embodiments, $X_3$ is arenediyl$_{(C\leq12)}$ such as benzenediyl.

In some embodiments, $R_5$ is —C(O)$R_6$, wherein: $R_6$ is amino, hydroxy, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, substituted dialkylamino$_{(C\leq8)}$, amido$_{(C\leq8)}$, substituted amido$_{(C\leq8)}$. In some embodiments, $R_6$ is hydroxy, alkoxy$_{(C\leq8)}$, or substituted alkoxy$_{(C\leq8)}$. In some embodiments, $R_6$ is hydroxy.

In some embodiments, the compounds are further defined as:

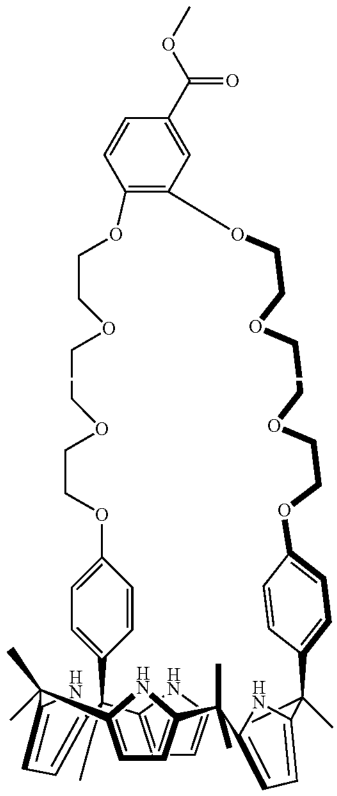

or

-continued

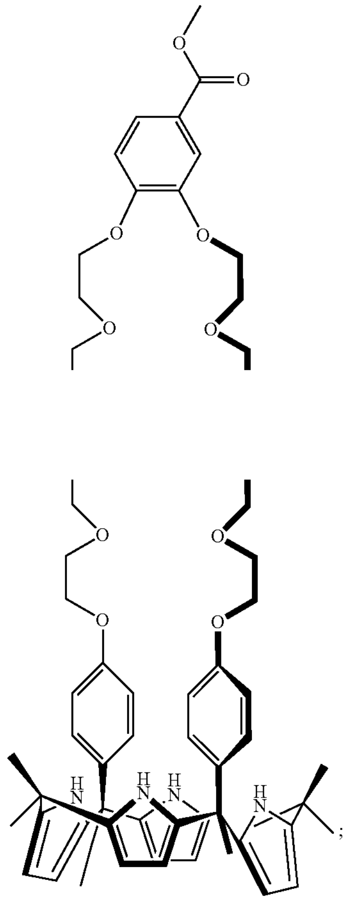

or a salt thereof.

In still yet another aspect, the present disclosure provides polymer monomers of the formula:

(IVA)

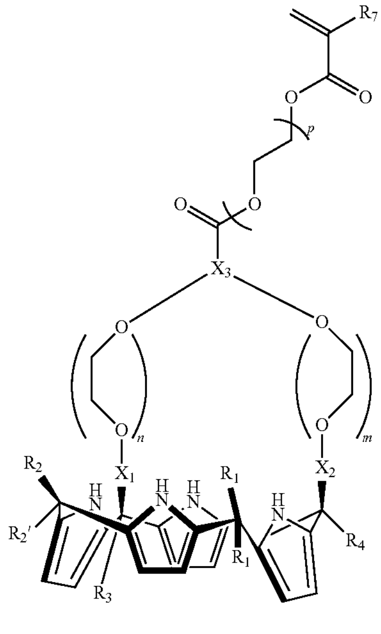

or

-continued (IVB)

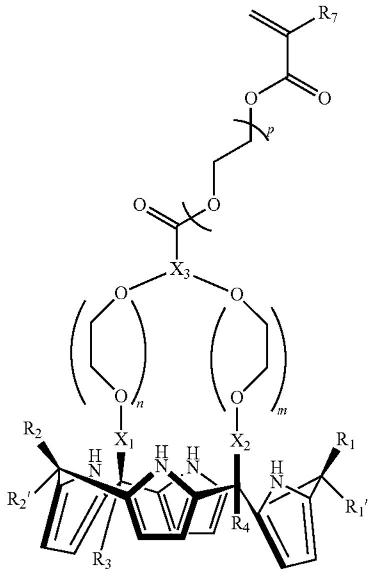

wherein:

$R_1$, $R_1'$, $R_2$, $R_2'$, $R_3$, and $R_4$ are each independently hydrogen, $alkyl_{(C\leq6)}$, or substituted $alkyl_{(C\leq6)}$;

m and n are each independently 2, 3, 4, or 5;

p is 1, 2, or 3;

$X_1$, $X_2$, and $X_3$ are each independently $arenediyl_{(C\leq12)}$ or substituted $arenediyl_{(C\leq12)}$;

$R_5$ is hydroxy or —C(O)$R_6$, wherein:

$R_6$ is amino, hydroxy, $alkoxy_{(C\leq8)}$, substituted $alkoxy_{(C\leq8)}$, $alkylamino_{(C\leq8)}$, substituted $alkylamino_{(C\leq8)}$, $dialkylamino_{(C\leq8)}$, substituted $dialkylamino_{(C\leq8)}$, $amido_{(C\leq8)}$, substituted $amido_{(C\leq8)}$; and $R_7$ is hydrogen, $alkyl_{(C\leq6)}$, or substituted $alkyl_{(C\leq6)}$;

or a salt thereof.

In some embodiments the polymer monomers are further defined as:

(VA)

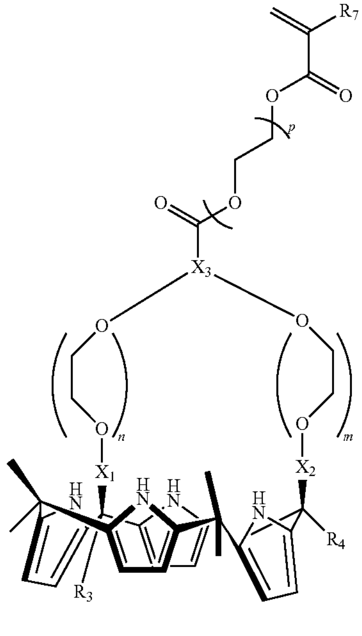

or

-continued (VB)

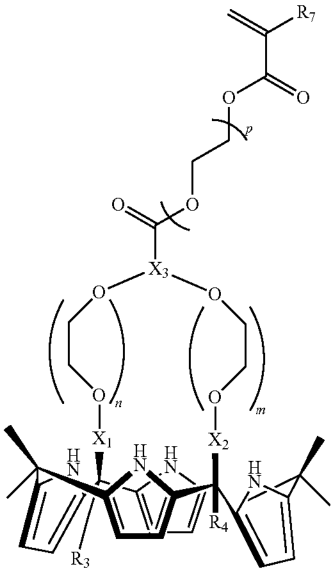

wherein:

$R_3$ and $R_4$ are each independently hydrogen, $alkyl_{(C\leq6)}$, or substituted $alkyl_{(C\leq6)}$;

m and n are each independently 2, 3, 4, or 5;

p is 1, 2, or 3;

$X_1$, $X_2$, and $X_3$ are each independently $arenediyl_{(C\leq12)}$ or substituted $arenediyl_{(C\leq12)}$;

$R_5$ is hydroxy or —C(O)$R_6$, wherein:

$R_6$ is amino, hydroxy, $alkoxy_{(C\leq8)}$, substituted $alkoxy_{(C\leq8)}$, $alkylamino_{(C\leq8)}$, substituted $alkylamino_{(C\leq8)}$, $dialkylamino_{(C\leq8)}$, substituted $dialkylamino_{(C\leq8)}$, $amido_{(C\leq8)}$, substituted $amido_{(C\leq8)}$; and $R_7$ is hydrogen, $alkyl_{(C\leq6)}$, or substituted $alkyl_{(C\leq6)}$;

or a salt thereof.

In some embodiments, the polymer monomers are further defined as:

(VIA)

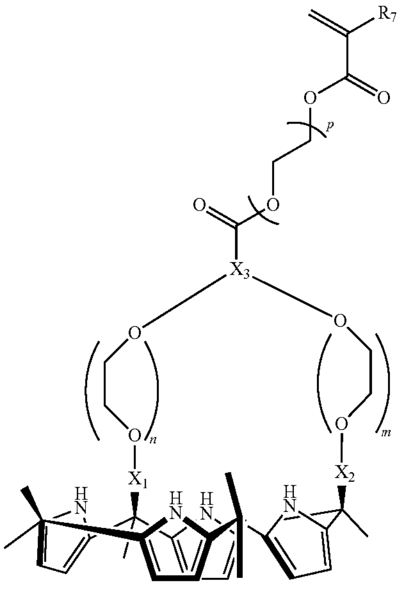

or

-continued (VIB)

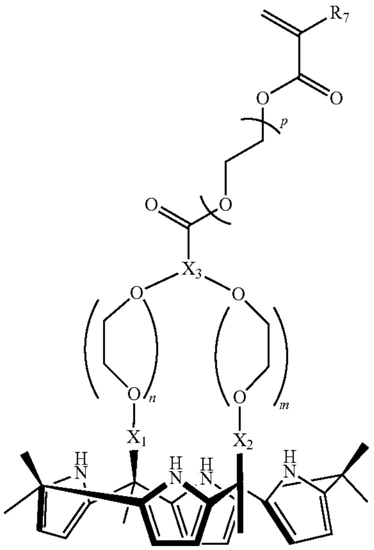

wherein:

m and n are each independently 2, 3, 4, or 5;

p is 1, 2, or 3;

$X_1$, $X_2$, and $X_3$ are each independently $arenediyl_{(C\leq12)}$ or substituted $arenediyl_{(C\leq12)}$;

$R_5$ is hydroxy or —C(O)$R_6$, wherein:

$R_6$ is amino, hydroxy, $alkoxy_{(C\leq8)}$, substituted $alkoxy_{(C\leq8)}$, $alkylamino_{(C\leq8)}$, substituted $alkylamino_{(C\leq8)}$, $dialkylamino_{(C\leq8)}$, substituted $dialkylamino_{(C\leq8)}$, $amido_{(C\leq8)}$, substituted $amido_{(C\leq8)}$; and $R_7$ is hydrogen, $alkyl_{(C\leq6)}$, or substituted $alkyl_{(C\leq6)}$;

or a salt thereof.

In some embodiments, $R_1$ is $alkyl_{(C\leq6)}$ or substituted $alkyl_{(C\leq6)}$. In some embodiments, $R_1$ is $alkyl_{(C\leq6)}$ such as methyl. In some embodiments, $R_1'$ is $alkyl_{(C\leq6)}$ or substituted $alkyl_{(C\leq6)}$. In some embodiments, $R_1'$ is $alkyl_{(C\leq6)}$ such as methyl. In some embodiments, $R_2$ is $alkyl_{(C\leq6)}$ or substituted $alkyl_{(C\leq6)}$. In some embodiments, $R_2$ is $alkyl_{(C\leq6)}$ such as methyl. In some embodiments, $R_2'$ is $alkyl_{(C\leq6)}$ or substituted $alkyl_{(C\leq6)}$. In some embodiments, $R_2'$ is $alkyl_{(C\leq6)}$ such as methyl. In some embodiments, $R_3$ is $alkyl_{(C\leq6)}$ or substituted $alkyl_{(C\leq6)}$. In some embodiments, $R_3$ is $alkyl_{(C\leq6)}$ such as methyl. In some embodiments, $R_4$ is $alkyl_{(C\leq6)}$ or substituted $alkyl_{(C\leq6)}$. In some embodiments, $R_4$ is $alkyl_{(C\leq6)}$ such as methyl.

In some embodiments, m is 2, 3, or 4 such as 3. In some embodiments, n is 2, 3, or 4 such as n is 3. In some embodiments, $X_1$ is $arenediyl_{(C\leq12)}$ such as benzenediyl. In some embodiments, $X_2$ is $arenediyl_{(C\leq12)}$ such as benzenediyl. In some embodiments, $X_3$ is $arenediyl_{(C\leq12)}$ such as benzenediyl.

In some embodiments, p is 1 or 2 such as p is 1. In some embodiments, $R_7$ is $alkyl_{(C\leq6)}$ or substituted $alkyl_{(C\leq6)}$. In some embodiments, $R_7$ is $alkyl_{(C\leq6)}$ such as methyl.

In some embodiments, the polymer monomers are further defined as:

or
;
or a salt thereof.

In still yet another aspect, the present disclosure provides polymers comprising a subunit of the formula:

(VIIA)

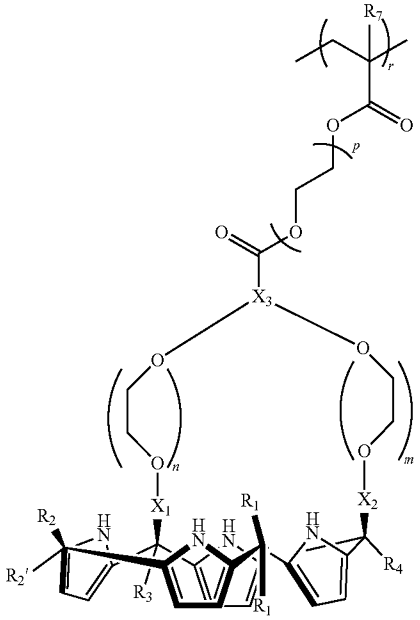

or (VIIB)

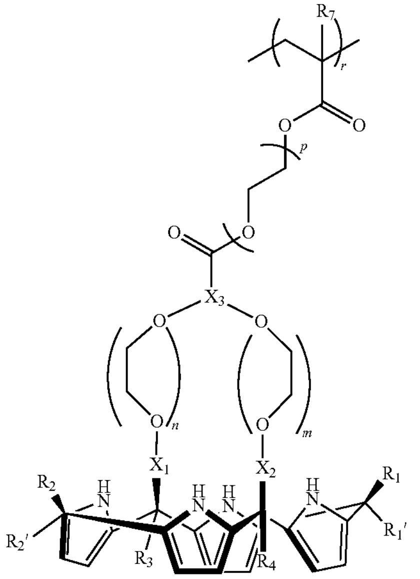

wherein:

$R_1$, $R_1'$, $R_2$, $R_2'$, $R_3$, and $R_4$ are each independently hydrogen, alkyl$_{(C\leq 6)}$, or substituted alkyl$_{(C\leq 6)}$;

m and n are each independently 2, 3, 4, or 5;

p is 1, 2, or 3;

r is 1-50;

$X_1$, $X_2$, and $X_3$ are each independently arenediyl$_{(C\leq 12)}$ or substituted arenediyl$_{(C\leq 12)}$;

$R_5$ is hydroxy or —C(O)$R_6$, wherein:

$R_6$ is amino, hydroxy, alkoxy$_{(C\leq 8)}$, substituted alkoxy$_{(C\leq 8)}$, alkylamino$_{(C\leq 8)}$, substituted alkylamino$_{(C\leq 8)}$, dialkylamino$_{(C\leq 8)}$, substituted dialkylamino$_{(C\leq 8)}$, amido$_{(C\leq 8)}$, substituted amido$_{(C\leq 8)}$;

$R_7$ is hydrogen, alkyl$_{(C\leq 6)}$, or substituted alkyl$_{(C\leq 6)}$;

or a salt thereof.

In some embodiments, the subunit is further defined as:

(VIIIA)

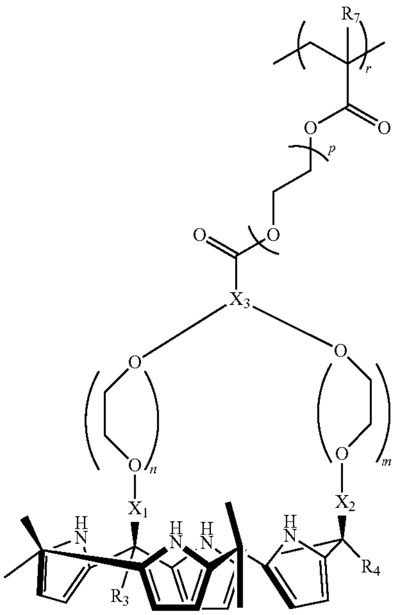

or (VIIIB)

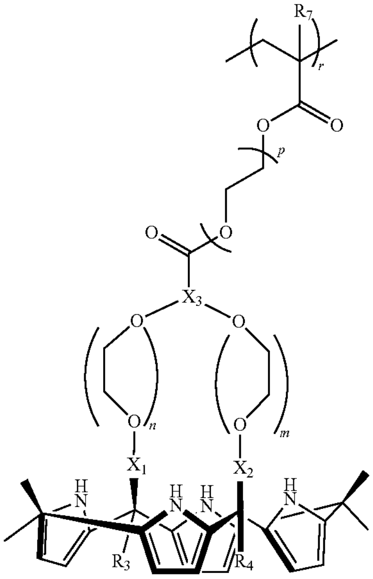

wherein:

$R_3$ and $R_4$ are each independently hydrogen, alkyl$_{(C\leq6)}$, or substituted alkyl$_{(C\leq6)}$;

m and n are each independently 2, 3, 4, or 5;

p is 1, 2, or 3;

r is 1-50;

$X_1$, $X_2$, and $X_3$ are each independently arenediyl$_{(C\leq12)}$ or substituted arenediyl$_{(C\leq12)}$;

$R_5$ is hydroxy or —C(O)$R_6$, wherein:

$R_6$ is amino, hydroxy, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, substituted dialkylamino$_{(C\leq8)}$, amido$_{(C\leq8)}$, substituted amido$_{(C\leq8)}$;

$R_7$ is hydrogen, alkyl$_{(C\leq6)}$, or substituted alkyl$_{(C\leq6)}$;

or a salt thereof.

In some embodiments, the subunit is further defined as:

(IXA)

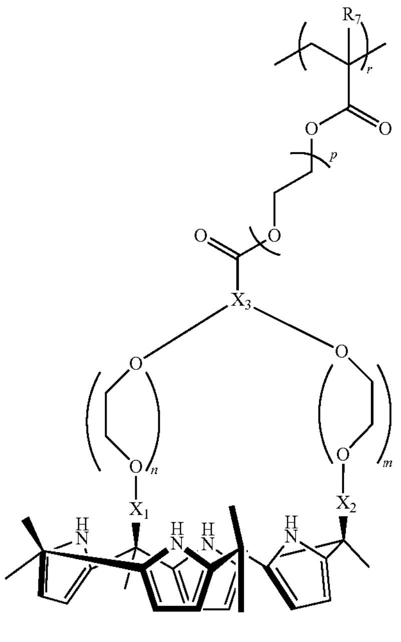

or

-continued (IXB)

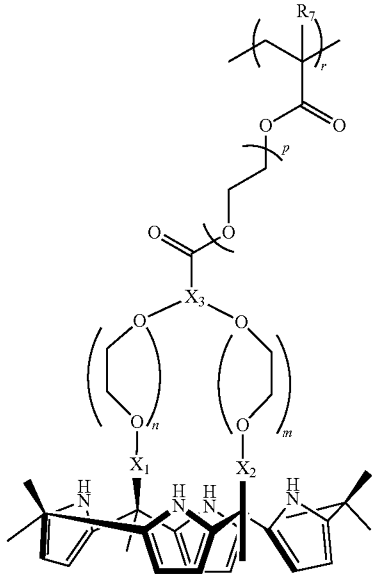

wherein:

m and n are each independently 2, 3, 4, or 5;

p is 1, 2, or 3;

r is 1-50;

$X_1$, $X_2$, and $X_3$ are each independently arenediyl$_{(C\leq12)}$ or substituted arenediyl$_{(C\leq12)}$;

$R_5$ is hydroxy or —C(O)$R_6$, wherein:

$R_6$ is amino, hydroxy, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, substituted dialkylamino$_{(C\leq8)}$, amido$_{(C\leq8)}$, substituted amido$_{(C\leq8)}$;

$R_7$ is hydrogen, alkyl$_{(C\leq6)}$, or substituted alkyl$_{(C\leq6)}$;

or a salt thereof.

In some embodiments, $R_1$ is alkyl$_{(C\leq6)}$ or substituted alkyl$_{(C\leq6)}$. In some embodiments, $R_1$ is alkyl$_{(C\leq6)}$ such as methyl. In some embodiments, $R_1$' is alkyl$_{(C\leq6)}$ or substituted alkyl$_{(C\leq6)}$. In some embodiments, $R_1$' is alkyl$_{(C\leq6)}$ such as methyl. In some embodiments, $R_2$ is alkyl$_{(C\leq6)}$ or substituted alkyl$_{(C\leq6)}$. In some embodiments, $R_2$ is alkyl$_{(C\leq6)}$ such as methyl. In some embodiments, $R_2$' is alkyl$_{(C\leq6)}$ or substituted alkyl$_{(C\leq6)}$. In some embodiments, $R_2$' is alkyl$_{(C\leq6)}$ such as methyl. In some embodiments, $R_3$ is alkyl$_{(C\leq6)}$ or substituted alkyl$_{(C\leq6)}$. In some embodiments, $R_3$ is alkyl$_{(C\leq6)}$ such as methyl. In some embodiments, $R_4$ is alkyl$_{(C\leq6)}$ or substituted alkyl$_{(C\leq6)}$. In some embodiments, $R_4$ is alkyl$_{(C\leq6)}$ such as methyl.

In some embodiments, m is 2, 3, or 4 such as 3. In some embodiments, n is 2, 3, or 4 such as n is 3. In some embodiments, $X_1$ is arenediyl$_{(C\leq12)}$ such as benzenediyl. In some embodiments, $X_2$ is arenediyl$_{(C\leq12)}$ such as benzenediyl. In some embodiments, $X_3$ is arenediyl$_{(C\leq12)}$ such as benzenediyl.

In some embodiments, p is 1 or 2 such as p is 1. In some embodiments, $R_7$ is alkyl$_{(C\leq6)}$ or substituted alkyl$_{(C\leq6)}$. In some embodiments, $R_7$ is alkyl$_{(C\leq6)}$ such as methyl.

In some embodiments, the subunit is further defined as:

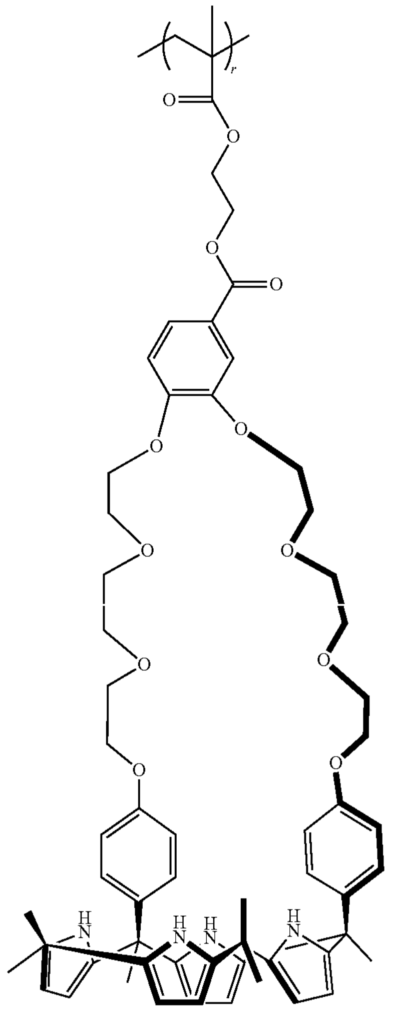

or

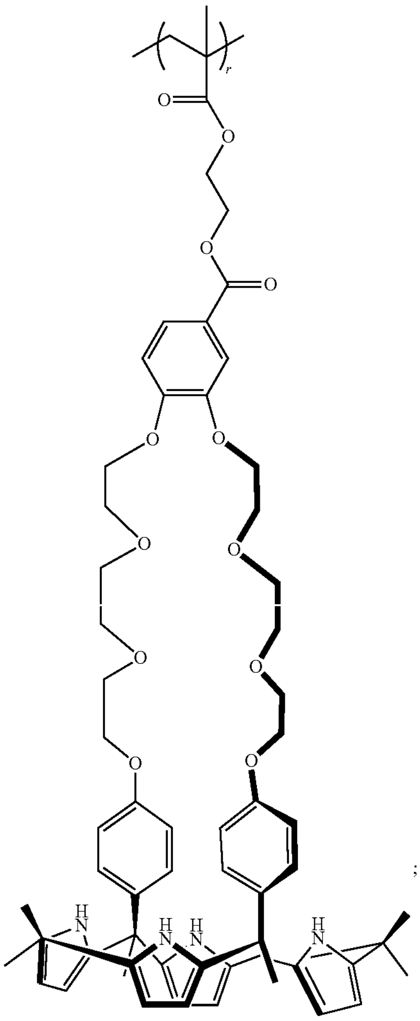

;

or a salt thereof.

In some embodiments, the polymer further comprises one or more monomers of the formula:

(X)

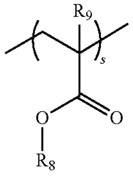

wherein:

s is 1-750;

$R_8$ and $R_9$ are each independently hydrogen, alkyl$_{(C\leq8)}$, or substituted alkyl$_{(C\leq8)}$.

In some embodiments, $R_8$ is alkyl$_{(C\leq8)}$ or substituted alkyl$_{(C\leq8)}$. In some embodiments, $R_8$ is alkyl$_{(C\leq8)}$ such as methyl. In some embodiments, $R_9$ is alkyl$_{(C\leq8)}$ or substituted alkyl$_{(C\leq8)}$. In some embodiments, $R_9$ is alkyl$_{(C\leq8)}$ such as methyl. In some embodiments, the polymer further comprises one or more crosslinking agents. In some embodiments, the crosslinking agent is further defined as:

(XI)

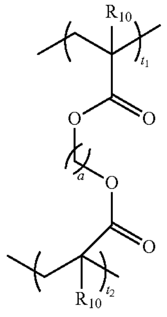

wherein:

$R_{10}$ and $R_{10}$' are each independently hydrogen, alkyl$_{(C\leq8)}$, or substituted alkyl$_{(C\leq8)}$;

a is 1, 2, 3, 4, 5, 6, 7, or 8; and $t_1$ and $t_2$ are 1-50.

In some embodiments, the polymer comprises from about 0.01% to about 2.5% cross linking. In some embodiments, the polymer comprises from about 0.05% to about 1.0% cross linking. In some embodiments, the polymer comprises from about 0.1% to about 0.5% cross linking.

In still another aspect, the present disclosure provides compositions comprising:

(A) a polymer, polymer monomer, or compound described herein; and (B) a salt.

In some embodiments, the salt is an alkali metal salt such as a lithium salt.

In another aspect, the present disclosure provides methods of separating a salt from a mixture comprising exposing the mixture to a compound, polymer monomer, or polymer described herein. In some embodiments, the mixture is a solution. In other embodiments, the mixture is in a solid form. In some embodiments, the salt is an alkali metal salt such as a lithium salt. In some embodiments, the mixture contains two or more alkali metal salts.

In still yet another aspect, the present disclosure provides methods of sequestering a salt from a mixture comprising exposing the mixture to a compound, polymer monomer, or polymer described herein.

In some embodiments, the mixture is a solution. In other embodiments, the mixture is in a solid form. In some embodiments, the salt is an alkali metal salt. In some embodiments, the salt is a lithium salt. In some embodiments, the mixture contains two or more alkali metal salts.

In yet another aspect, the present disclosure provides methods of extracting lithium from a mixture comprising contacting the mixture to a compound, polymer monomer, or polymer described herein. In some embodiments, the mixture comprises two or more alkali metal salts.

Other objects, features and advantages of the present disclosure will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description. Note that simply because a particular compound is ascribed to one particular generic formula doesn't mean that it cannot also belong to another generic formula.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

(FIG. 3A) Full $^1$H NMR spectra of H1 (bottom) and H1-LiCl complex (top); (FIG. 3B) partial $^1$H NMR spectra (3.6-7.0) of H1 (bottom) and H1-LiCl complex (top); (FIG. 3C) partial $^1$H NMR spectra (1.4-2.0) of H1 (bottom) and H1-LiCl complex (top); (FIG. 3D) Full $^1$H NMR spectra of H2 (bottom) and H2-LiCl complex (top); (FIG. 3E) partial $^1$H NMR spectra (3.6-7.0) of H2 (bottom) and H2-LiCl complex (top); (FIG. 3F) partial $^1$H NMR spectra (1.4-2.0) of H2 (bottom) and H2-LiCl complex (top).

Figure 33:
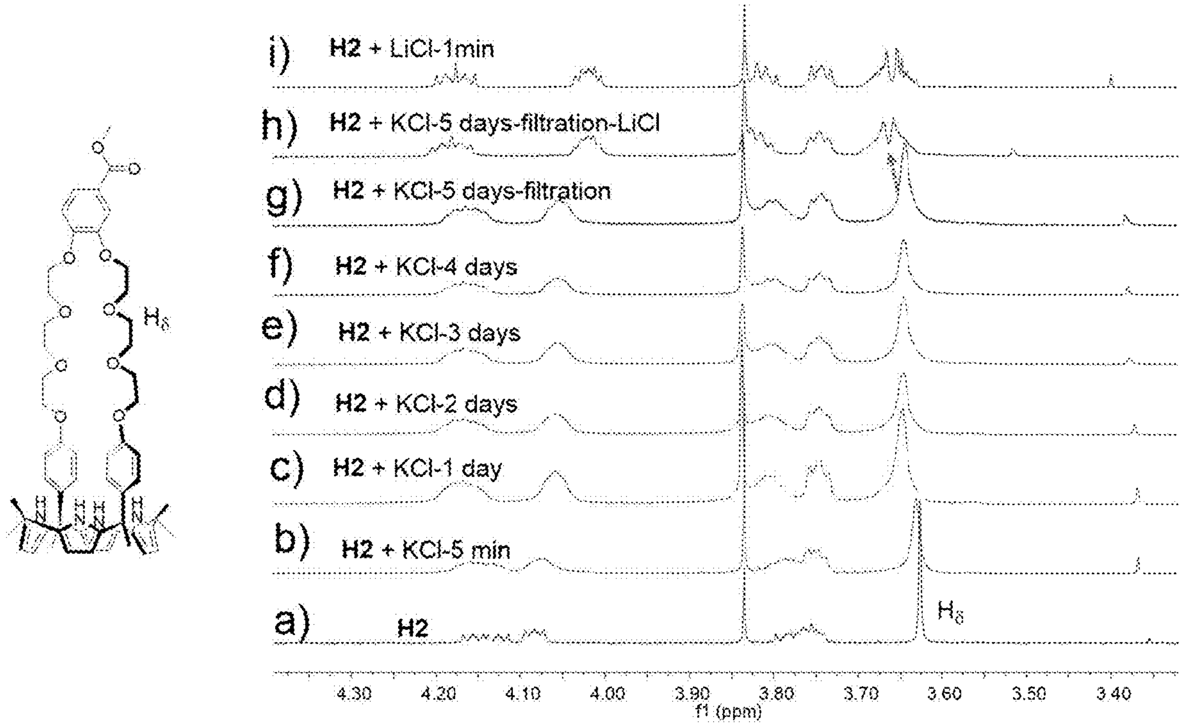

FIG. 33 shows partial $^1$H NMR spectra (3.5-4.3) (400 MHz, $CD_3CN$, 298 K) of a) 112; b) solution of H2 and KCl (5.00 mM, 1:1) after mixing for 1 min; c) solution of H2 and KCl (5.00 mM, 1:1) after mixing for 1 day; d) solution of H2 and KCl (5.00 mM, 1:1) after mixing for 2 days; e) solution of H2 and KCl (5.00 mM, 1:1) after mixing for 3 days; f) solution of H2 and KCl (5.00 mM, 1:1) after mixing for 4 days; g) filtered solution of H2 and KCl (5.00 mM, 1:1) after mixing for 5 days; h) g after adding 1 equivalent of LiCl (5.00 mM); i) solution of H2 and LiCl (5.00 mM, 1:1) after mixing for 1 min.

Figure 34:
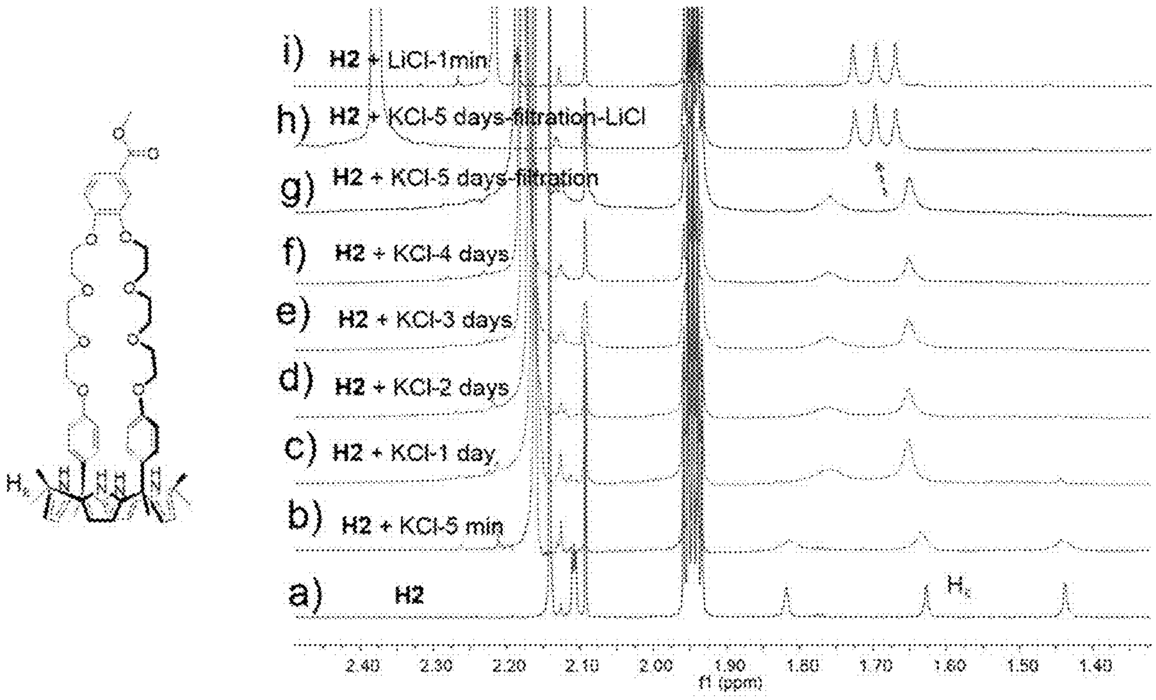

FIG. 34 shows partial $^1$H NMR spectra (1.0-2.5) (400 MHz, $CD_3CN$, 298 K) of a) 112; b) solution of H2 and KCl (5.00 mM, 1:1) after mixing for 1 min; c) solution of H2 and KCl (5.00 mM, 1:1) after mixing for 1 day; d) solution of H2 and KCl (5.00 mM, 1:1) after mixing for 2 days; e) solution of H2 and KCl (5.00 mM, 1:1) after mixing for 3 days; f) solution of H2 and KCl (5.00 mM, 1:1) after mixing for 4 days; g) filtered solution of H2 and KCl (5.00 mM, 1:1) after mixing for 5 days; h) g after adding 1 equivalent of LiCl (5.00 mM); i) solution of H2 and LiCl (5.00 mM, 1:1) after mixing for 1 min.

Figure 35:
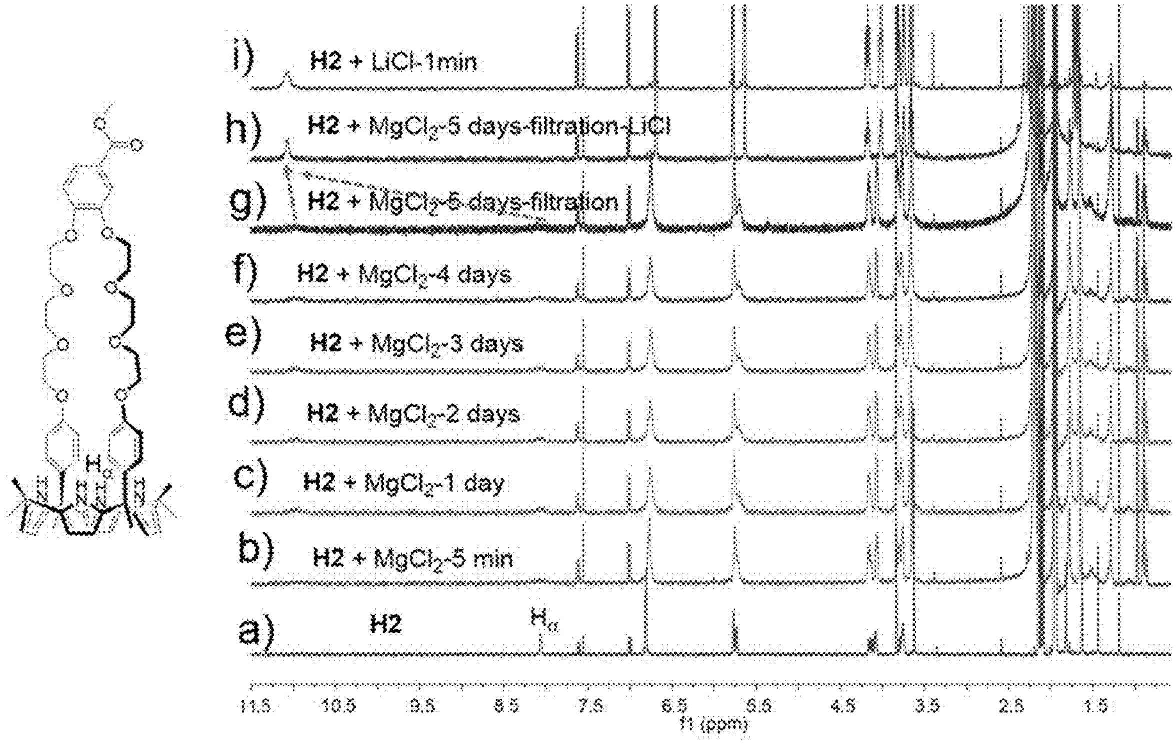

FIG. 35 shows competition between H2⊃LiCl and H2⊃$MgCl_2$. $^1$H NMR spectra (400 MHz, $CD_3CN$, 298 K) of a) 112; b) solution of H2 and $MgCl_2$ (5.00 mM, 1:1) after mixing for 1 min; c) solution of H2 and $MgCl_2$ (5.00 mM, 1:1) after mixing for 1 day; d) solution of H2 and $MgCl_2$ (5.00 mM, 1:1) after mixing for 2 days; e) solution of H2 and $MgCl_2$ (5.00 mM, 1:1) after mixing for 3 days; f) solution of H2 and $MgCl_2$ (5.00 mM, 1:1) after mixing for 4 days; g) filtered solution of H2 and $MgCl_2$ (5.00 mM, 1:1) after mixing for 5 days; h) g after adding 1 equivalent of LiCl (5.00 mM); i) solution of H2 and LiCl (5.00 mM, 1:1) after mixing for 1 min.

Figure 36:
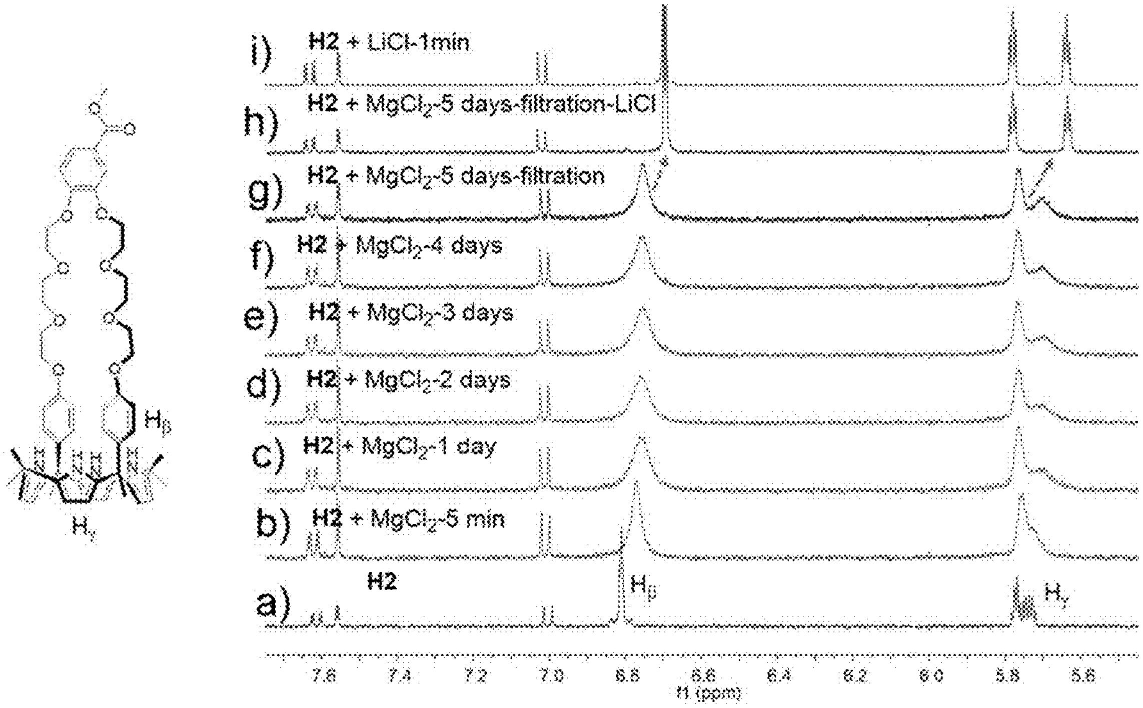

FIG. 36 shows partial $^1$H NMR spectra (5.3-7.7) (400 MHz, $CD_3CN$, 298 K) of a) 112; b) solution of H2 and $MgCl_2$ (5.00 mM, 1:1) after mixing for 1 min; c) solution of H2 and $MgCl_2$ (5.00 mM, 1:1) after mixing for 1 day; d) solution of H2 and $MgCl_2$ (5.00 mM, 1:1) after mixing for 2 days; e) solution of H2 and $MgCl_2$ (5.00 mM, 1:1) after mixing for 3 days; f) solution of H2 and $MgCl_2$ (5.00 mM, 1:1) after mixing for 4 days; g) filtered solution of H2 and $MgCl_2$ (5.00 mM, 1:1) after mixing for 5 days; h) g after adding 1 equivalent of LiCl (5.00 mM); i) solution of H2 and LiCl (5.00 mM, 1:1) after mixing for 1 min.

Figure 37:
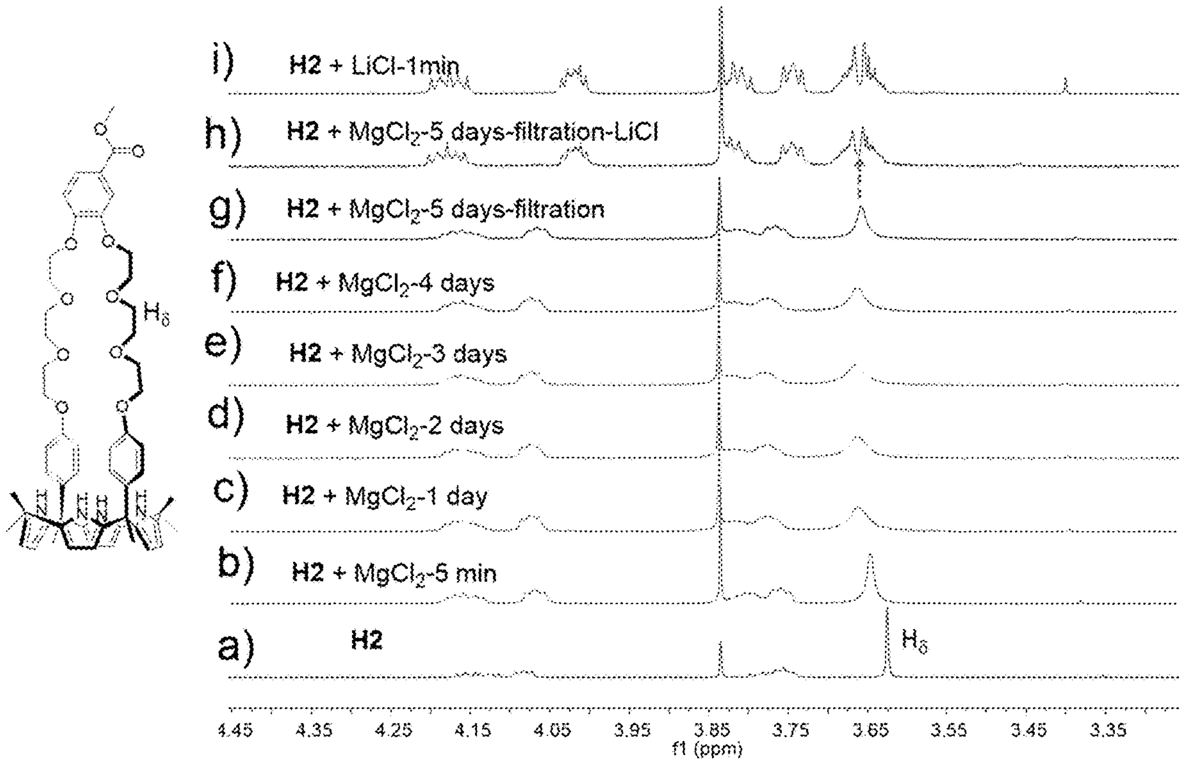

FIG. 37 shows partial $^1$H NMR spectra (3.5-4.3) (400 MHz, $CD_3CN$, 298 K) of a) 112; b) solution of H2 and $MgCl_2$ (5.00 mM, 1:1) after mixing for 1 min; c) solution of H2 and $MgCl_2$ (5.00 mM, 1:1) after mixing for 1 day; d) solution of H2 and $MgCl_2$ (5.00 mM, 1:1) after mixing for 2 days; e) solution of H2 and $MgCl_2$ (5.00 mM, 1:1) after mixing for 3 days; f) solution of H2 and $MgCl_2$ (5.00 mM, 1:1) after mixing for 4 days; g) filtered solution of H2 and $MgCl_2$ (5.00 mM, 1:1) after mixing for 5 days; h) g after adding 1 equivalent of LiCl (5.00 mM); i) solution of H2 and LiCl (5.00 mM, 1:1) after mixing for 1 min.

Figure 38:
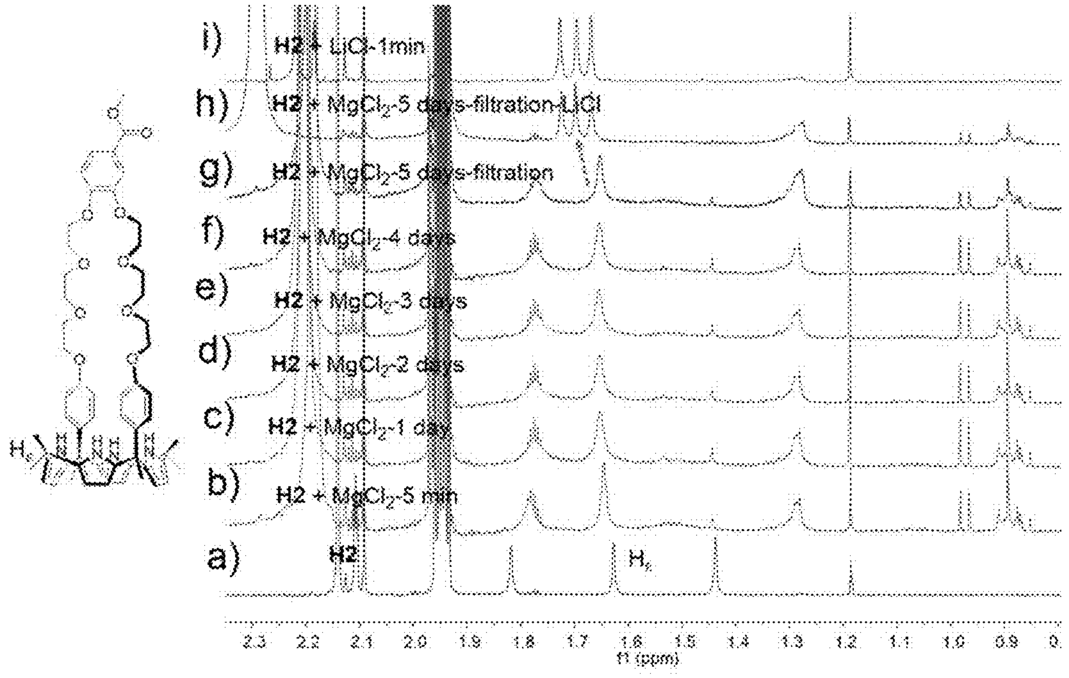

FIG. 38 shows partial $^1$H NMR spectra (1.0-2.5) (400 MHz, $CD_3CN$, 298 K) of a) 112; b) solution of H2 and $MgCl_2$ (5.00 mM, 1:1) after mixing for 1 min; c) solution of H2 and $MgCl_2$ (5.00 mM, 1:1) after mixing for 1 day; d) solution of H2 and $MgCl_2$ (5.00 mM, 1:1) after mixing for 2 days; e) solution of H2 and $MgCl_2$ (5.00 mM, 1:1) after mixing for 3 days; f) solution of H2 and $MgCl_2$ (5.00 mM, 1:1) after mixing for 4 days; g) filtered solution of H2 and $MgCl_2$ (5.00 mM, 1:1) after mixing for 5 days; h) g after adding 1 equivalent of LiCl (5.00 mM); i) solution of H2 and LiCl (5.00 mM, 1:1) after mixing for 1 min.

Figure 39:
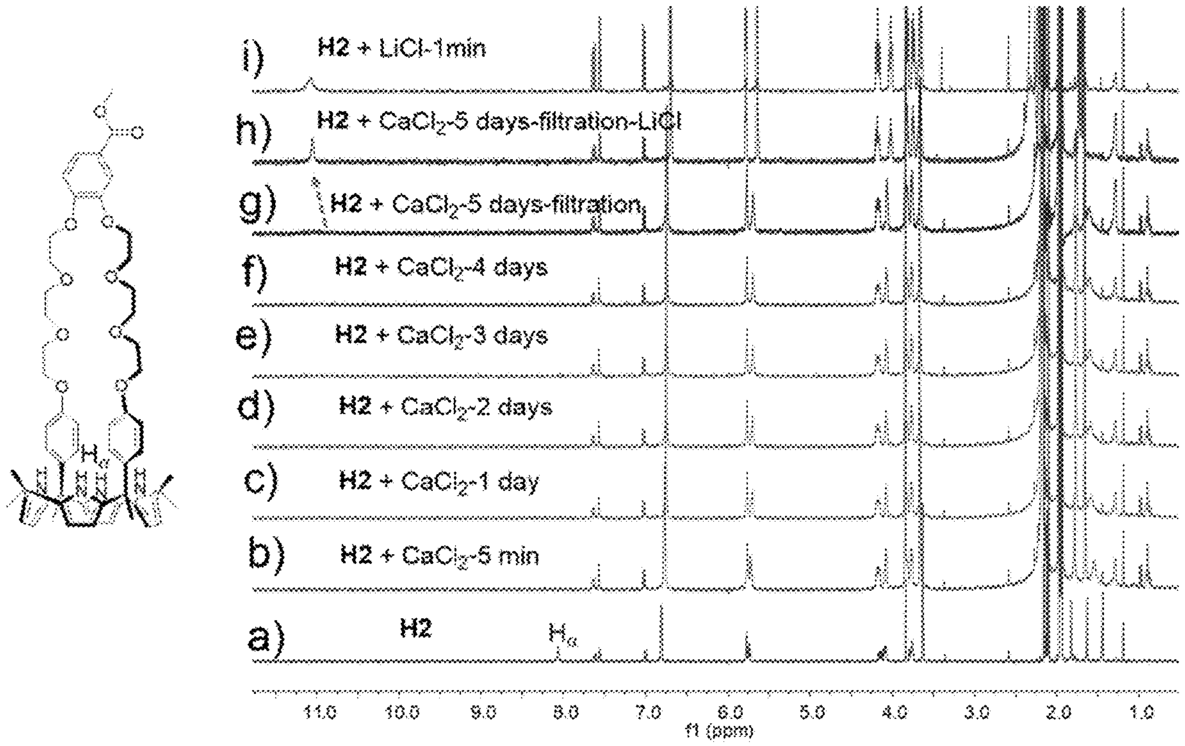

FIG. 39 shows $^1$H NMR spectra (400 MHz, $CD_3CN$, 298 K) of a) 112; b) solution of H2 and $CaCl_2$) (5.00 mM, 1:1) after mixing for 1 min; c) solution of H2 and $CaCl_2$) (5.00 mM, 1:1) after mixing for 1 day; d) solution of H2 and $CaCl_2$) (5.00 mM, 1:1) after mixing for 2 days; e) solution of H2 and $CaCl_2$) (5.00 mM, 1:1) after mixing for 3 days; f) solution of H2 and $CaCl_2$) (5.00 mM, 1:1) after mixing for 4 days; g) filtered solution of H2 and $CaCl_2$) (5.00 mM, 1:1) after mixing for 5 days; h) g after adding 1 equivalent of LiCl (5.00 mM); i) solution of H2 and LiCl (5.00 mM, 1:1) after mixing for 1 min.

Figure 40:
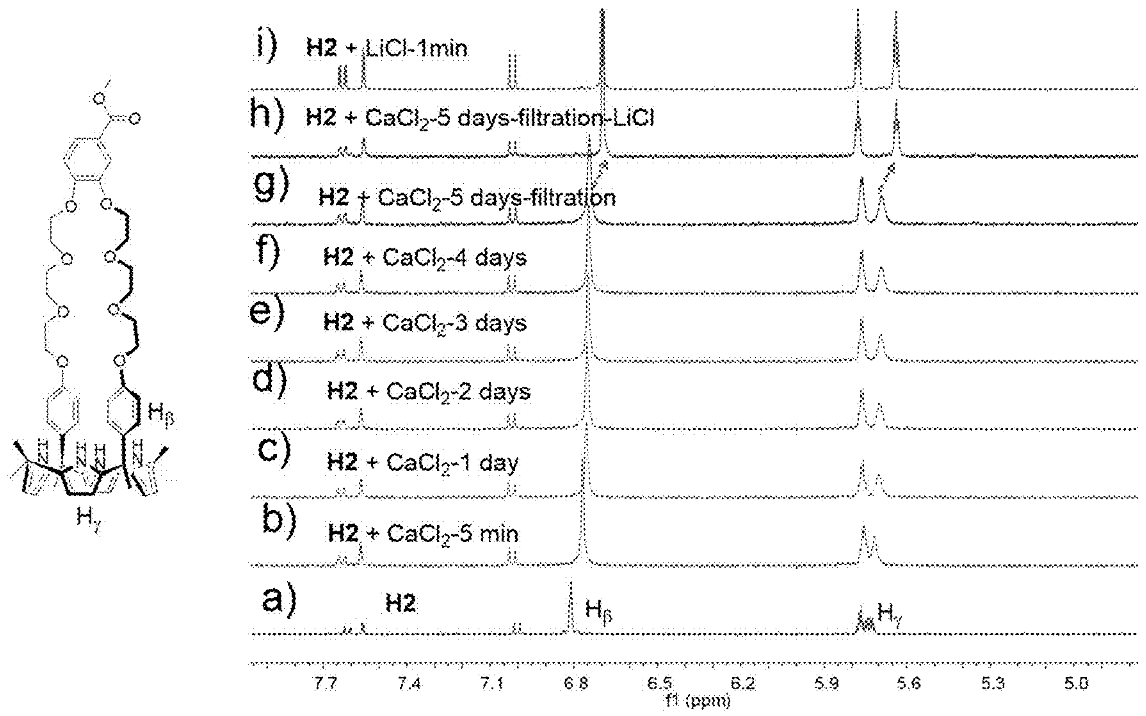

FIG. 40 shows partial $^1$H NMR spectra (5.3-7.7) (400 MHz, $CD_3CN$, 298 K) of a) 112; b) solution of H2 and $CaCl_2$) (5.00 mM, 1:1) after mixing for 1 min; c) solution of H2 and $CaCl_2$) (5.00 mM, 1:1) after mixing for 1 day; d) solution of H2 and $CaCl_2$) (5.00 mM, 1:1) after mixing for 2 days; e) solution of H2 and $CaCl_2$) (5.00 mM, 1:1) after mixing for 3 days; f) solution of H2 and $CaCl_2$) (5.00 mM, 1:1) after mixing for 4 days; g) filtered solution of H2 and $CaCl_2$) (5.00 mM, 1:1) after mixing for 5 days; h) g after adding 1 equivalent of LiCl (5.00 mM); i) solution of H2 and LiCl (5.00 mM, 1:1) after mixing for 1 min.

Figure 41:
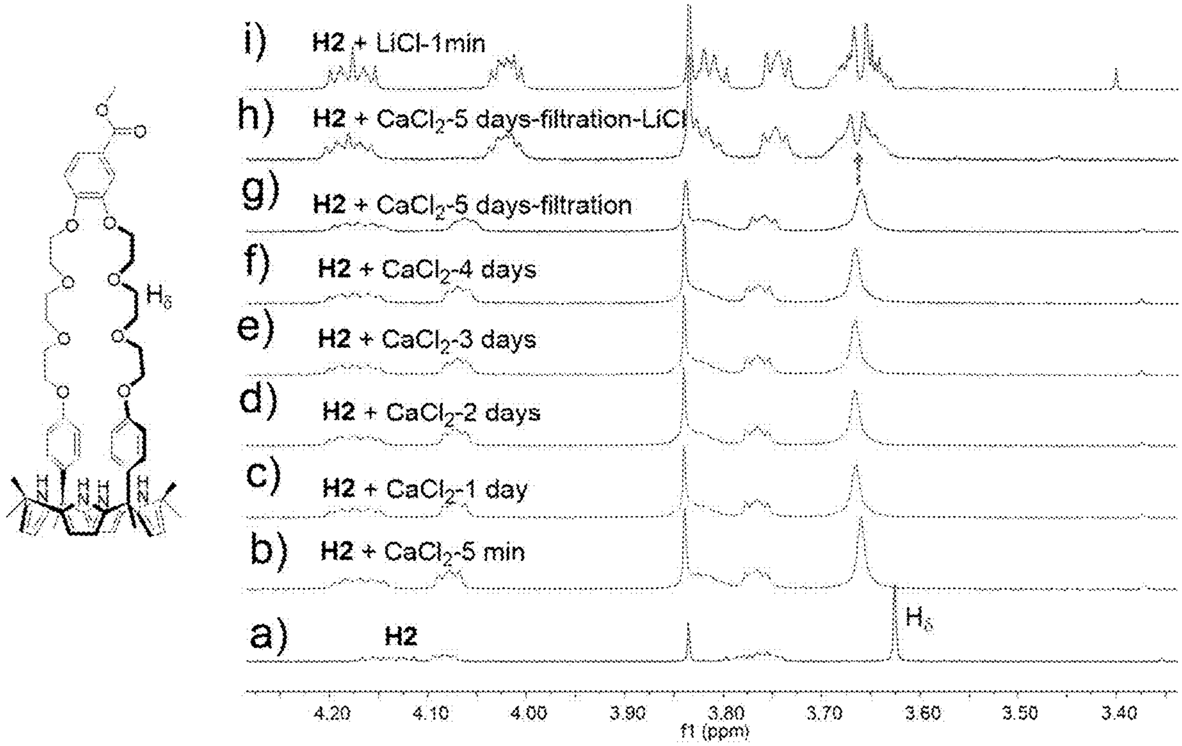

FIG. 41 shows partial $^1$H NMR spectra (3.5-4.3) (400 MHz, $CD_3CN$, 298 K) of a) 112; b) solution of H2 and $CaCl_2$) (5.00 mM, 1:1) after mixing for 1 min; c) solution of H2 and $CaCl_2$) (5.00 mM, 1:1) after mixing for 1 day; d) solution of H2 and $CaCl_2$) (5.00 mM, 1:1) after mixing for 2 days; e) solution of H2 and $CaCl_2$) (5.00 mM, 1:1) after mixing for 3 days; f) solution of H2 and $CaCl_2$) (5.00 mM, 1:1) after mixing for 4 days; g) filtered solution of H2 and $CaCl_2$) (5.00 mM, 1:1) after mixing for 5 days; h) g after adding 1 equivalent of LiCl (5.00 mM); i) solution of H2 and LiCl (5.00 mM, 1:1) after mixing for 1 min.

Figure 42:
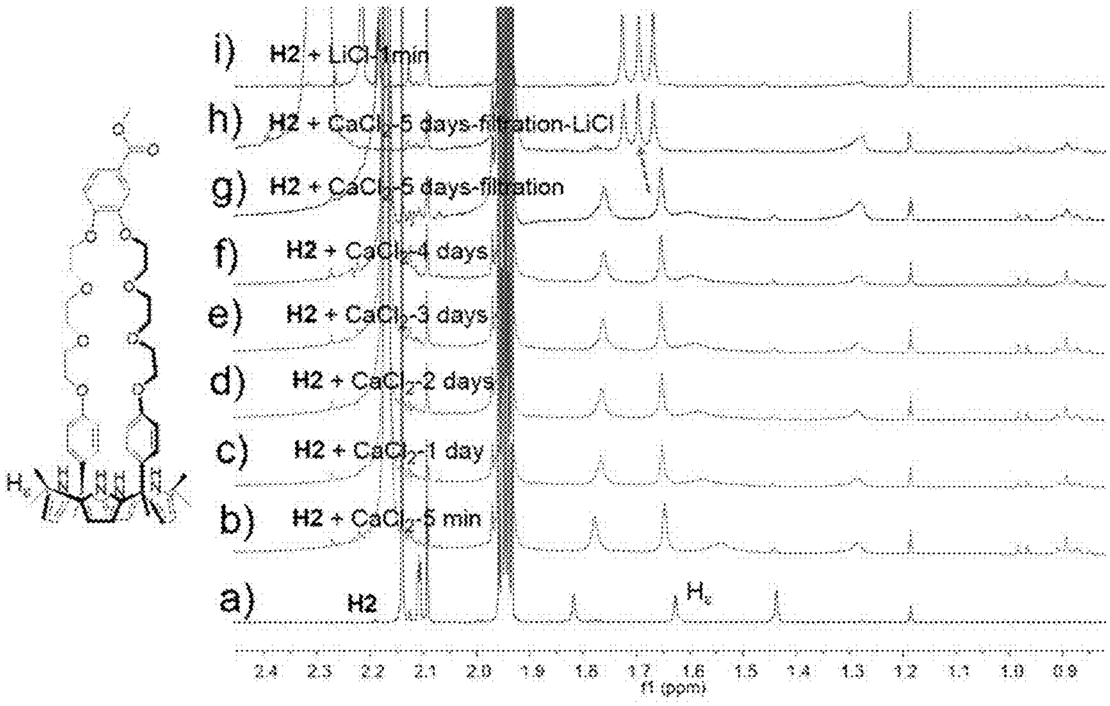

FIG. 42 shows partial $^1$H NMR spectra (1.0-2.5) (400 MHz, $CD_3CN$, 298 K) of a) 112; b) solution of H2 and $CaCl_2$) (5.00 mM, 1:1) after mixing for 1 min; c) solution of H2 and $CaCl_2$) (5.00 mM, 1:1) after mixing for 1 day; d) solution of H2 and $CaCl_2$) (5.00 mM, 1:1) after mixing for 2 days; e) solution of H2 and $CaCl_2$) (5.00 mM, 1:1) after mixing for 3 days; f) solution of H2 and $CaCl_2$) (5.00 mM, 1:1) after mixing for 4 days; g) filtered solution of H2 and $CaCl_2$) (5.00 mM, 1:1) after mixing for 5 days; h) g after adding 1 equivalent of LiCl (5.00 mM); i) solution of H2 and LiCl (5.00 mM, 1:1) after mixing for 1 min.

Figure 43:
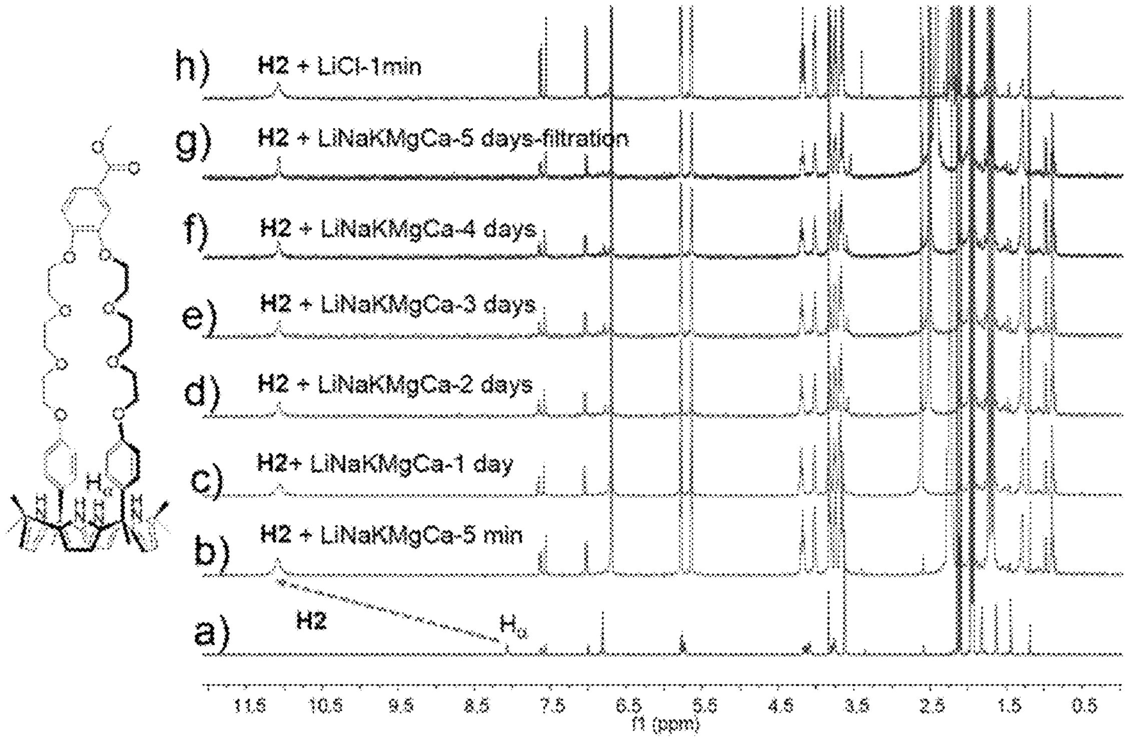

FIG. 43 shows complexation between H2 and mixture of LiCl, NaCl, KCl, $MgCl_2$ and $CaCl_2$). $^1$H NMR spectra (400 MHz, $CD_3CN$, 298 K) of a) 112; b) solution of H2 and five salts (LiCl, NaCl, KCl, $MgCl_2$ and $CaCl_2$)) (5.00 mM, 1:1:1:1:1:1) after mixing for 1 min; c) solution of H2 and five salts (LiCl, NaCl, KCl, $MgCl_2$ and $CaCl_2$)) (5.00 mM, 1:1:1:1:1:1) after mixing for 1 day; d) solution of H2 and five salts (LiCl, NaCl, KCl, $MgCl_2$ and $CaCl_2$)) (5.00 mM, 1:1:1:1:1:1) after mixing for 2 days; e) solution of H2 and five salts (LiCl, NaCl, KCl, $MgCl_2$ and $CaCl_2$)) (5.00 mM, 1:1:1:1:1:1) after mixing for 3 days; f) solution of H2 and five salts (LiCl, NaCl, KCl, $MgCl_2$ and $CaCl_2$)) (5.00 mM, 1:1:1:1:1:1) after mixing for 4 days; g) filtered solution of H2 and five salts (LiCl, NaCl, KCl, $MgCl_2$ and $CaCl_2$)) (5.00 mM, 1:1:1:1:1:1) after mixing for 5 days; h) solution of H2 and LiCl (5.00 mM, 1:1) after mixing for 1 min.

Figure 44:
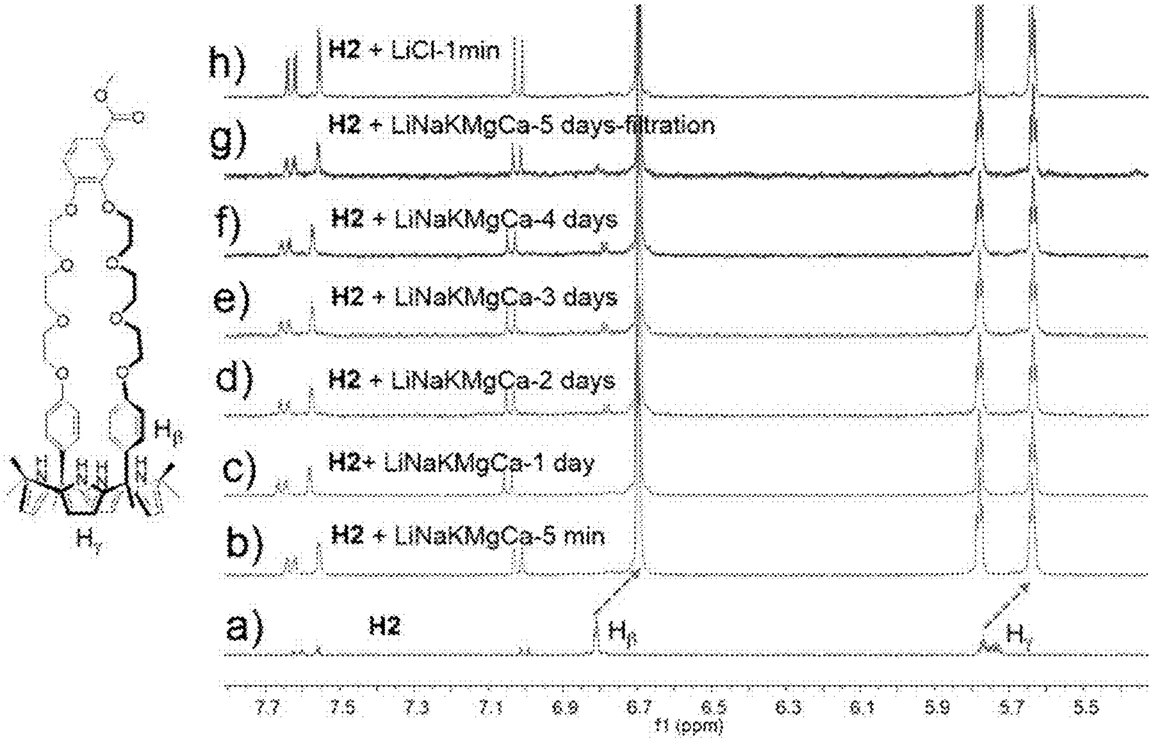

FIG. 44 shows partial $^1$H NMR spectra (5.3-7.7) (400 MHz, $CD_3CN$, 298 K) of a) 112; b) solution of H2 and five salts (LiCl, NaCl, KCl, $MgCl_2$ and $CaCl_2$)) (5.00 mM, 1:1:1:1:1:1) after mixing for 1 min; c) solution of H2 and five salts (LiCl, NaCl, KCl, $MgCl_2$ and $CaCl_2$)) (5.00 mM, 1:1:1:1:1:1) after mixing for 1 day; d) solution of H2 and five salts (LiCl, NaCl, KCl, $MgCl_2$ and $CaCl_2$)) (5.00 mM, 1:1:1:1:1:1) after mixing for 2 days; e) solution of H2 and five salts (LiCl, NaCl, KCl, $MgCl_2$ and $CaCl_2$)) (5.00 mM, 1:1:1:1:1:1) after mixing for 3 days; f) solution of H2 and five salts (LiCl, NaCl, KCl, $MgCl_2$ and $CaCl_2$)) (5.00 mM, 1:1:1:1:1:1) after mixing for 4 days; g) filtered solution of H2 and five salts (LiCl, NaCl, KCl, $MgCl_2$ and $CaCl_2$)) (5.00 mM, 1:1:1:1:1:1) after mixing for 5 days; h) solution of H2 and LiCl (5.00 mM, 1:1) after mixing for 1 min.

Figure 45:
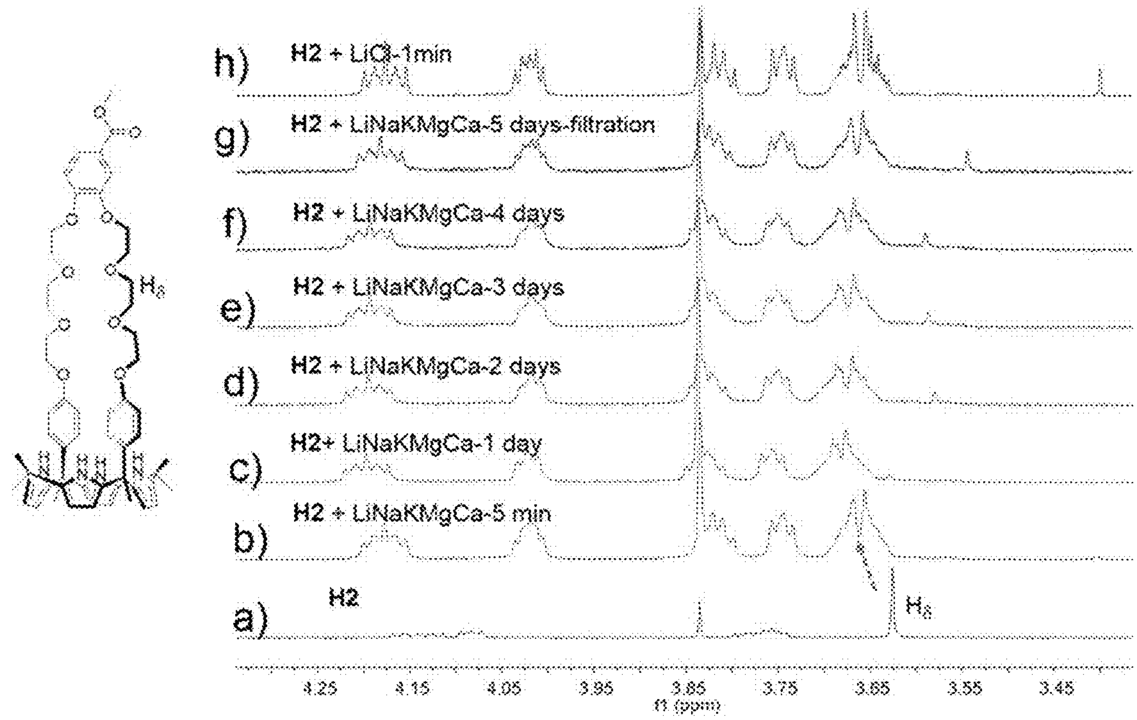

FIG. 45 shows partial $^1$H NMR spectra (3.5-4.3) (400 MHz, $CD_3CN$, 298 K) of a) 112; b) solution of H2 and five salts (LiCl, NaCl, KCl, $MgCl_2$ and $CaCl_2$)) (5.00 mM, 1:1:1:1:1:1) after mixing for 1 min; c) solution of H2 and five salts (LiCl, NaCl, KCl, $MgCl_2$ and $CaCl_2$)) (5.00 mM, 1:1:1:1:1:1) after mixing for 1 day; d) solution of H2 and five salts (LiCl, NaCl, KCl, $MgCl_2$ and $CaCl_2$)) (5.00 mM, 1:1:1:1:1:1) after mixing for 2 days; e) solution of H2 and five salts (LiCl, NaCl, KCl, $MgCl_2$ and $CaCl_2$)) (5.00 mM, 1:1:1:1:1:1) after mixing for 3 days; f) solution of H2 and five salts (LiCl, NaCl, KCl, $MgCl_2$ and $CaCl_2$)) (5.00 mM, 1:1:1:1:1:1) after mixing for 4 days; g) filtered solution of H2 and five salts (LiCl, NaCl, KCl, $MgCl_2$ and $CaCl_2$)) (5.00 mM, 1:1:1:1:1:1) after mixing for 5 days; h) solution of H2 and LiCl (5.00 mM, 1:1) after mixing for 1 min.

Figure 46:
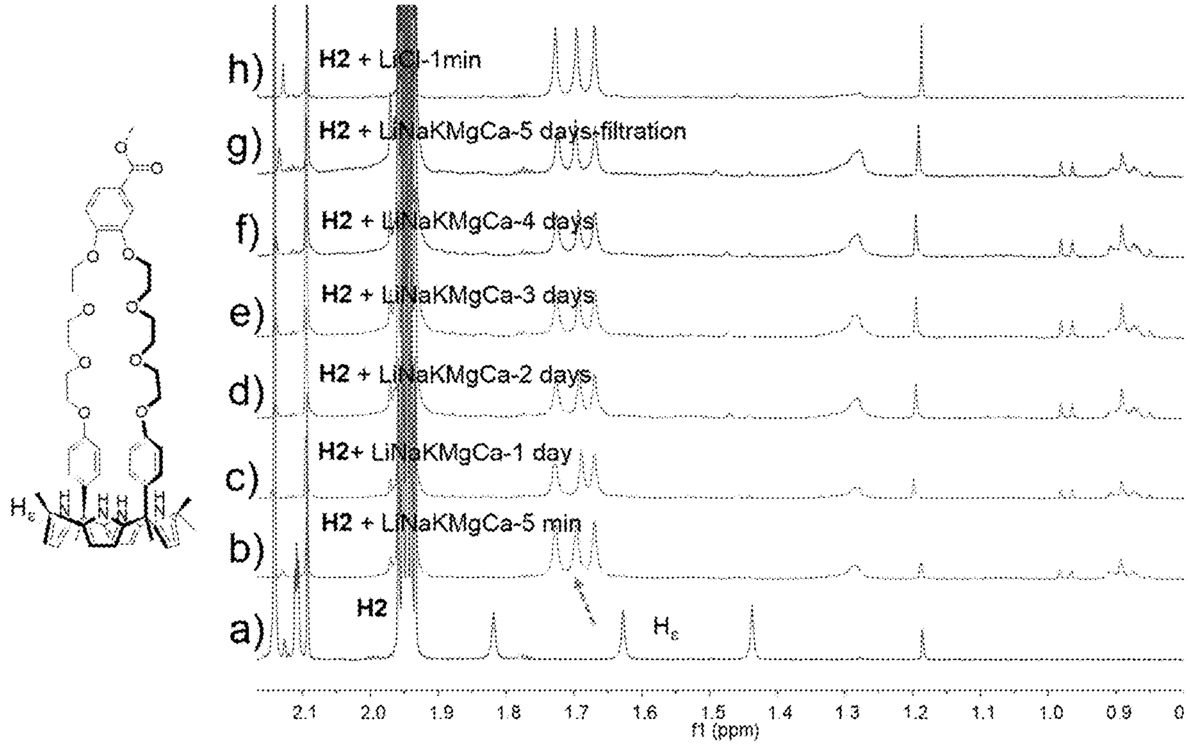

FIG. 46 shows partial $^1$H NMR spectra (1.0-2.5) (400 MHz, $CD_3CN$, 298 K) of a) 112; b) solution of H2 and five salts (LiCl, NaCl, KCl, $MgCl_2$ and $CaCl_2$)) (5.00 mM, 1:1:1:1:1:1) after mixing for 1 min; c) solution of H2 and five salts (LiCl, NaCl, KCl, $MgCl_2$ and $CaCl_2$)) (5.00 mM, 1:1:1:1:1:1) after mixing for 1 day; d) solution of H2 and five salts (LiCl, NaCl, KCl, $MgCl_2$ and $CaCl_2$)) (5.00 mM, 1:1:1:1:1:1) after mixing for 2 days; e) solution of H2 and five salts (LiCl, NaCl, KCl, $MgCl_2$ and $CaCl_2$)) (5.00 mM, 1:1:1:1:1:1) after mixing for 3 days; f) solution of H2 and five salts (LiCl, NaCl, KCl, $MgCl_2$ and $CaCl_2$)) (5.00 mM, 1:1:1:1:1:1) after mixing for 4 days; g) filtered solution of H2 and five salts (LiCl, NaCl, KCl, $MgCl_2$ and $CaCl_2$)) (5.00 mM, 1:1:1:1:1:1) after mixing for 5 days; h) solution of H2 and LiCl (5.00 mM, 1:1) after mixing for 1 min.

Figure 47:
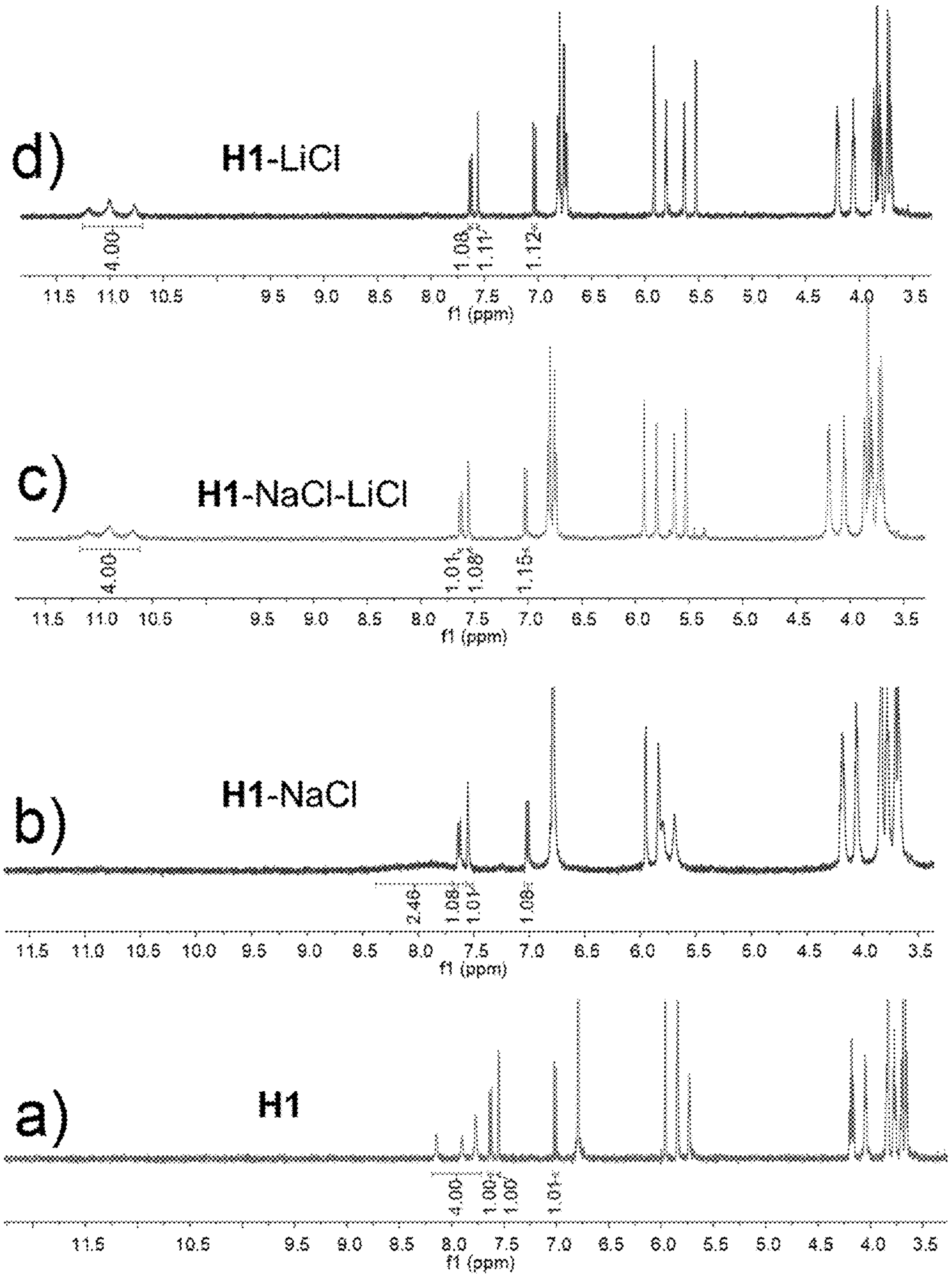

FIG. 47 shows selectivity analysis for H1-NaCl—LiCl. $^1$H NMR spectra (400 MHz, $CD_3CN$, 298 K) of a) H1; b) filtered solution of H1 and NaCl (5.00 mM, 1:1) after mixing for 5 days; c) g after adding 1 equivalent of LiCl (5.00 mM); d) solution of H1 and LiCl (5.00 mM, 1:1) after mixing for 1 min.

Figure 48:
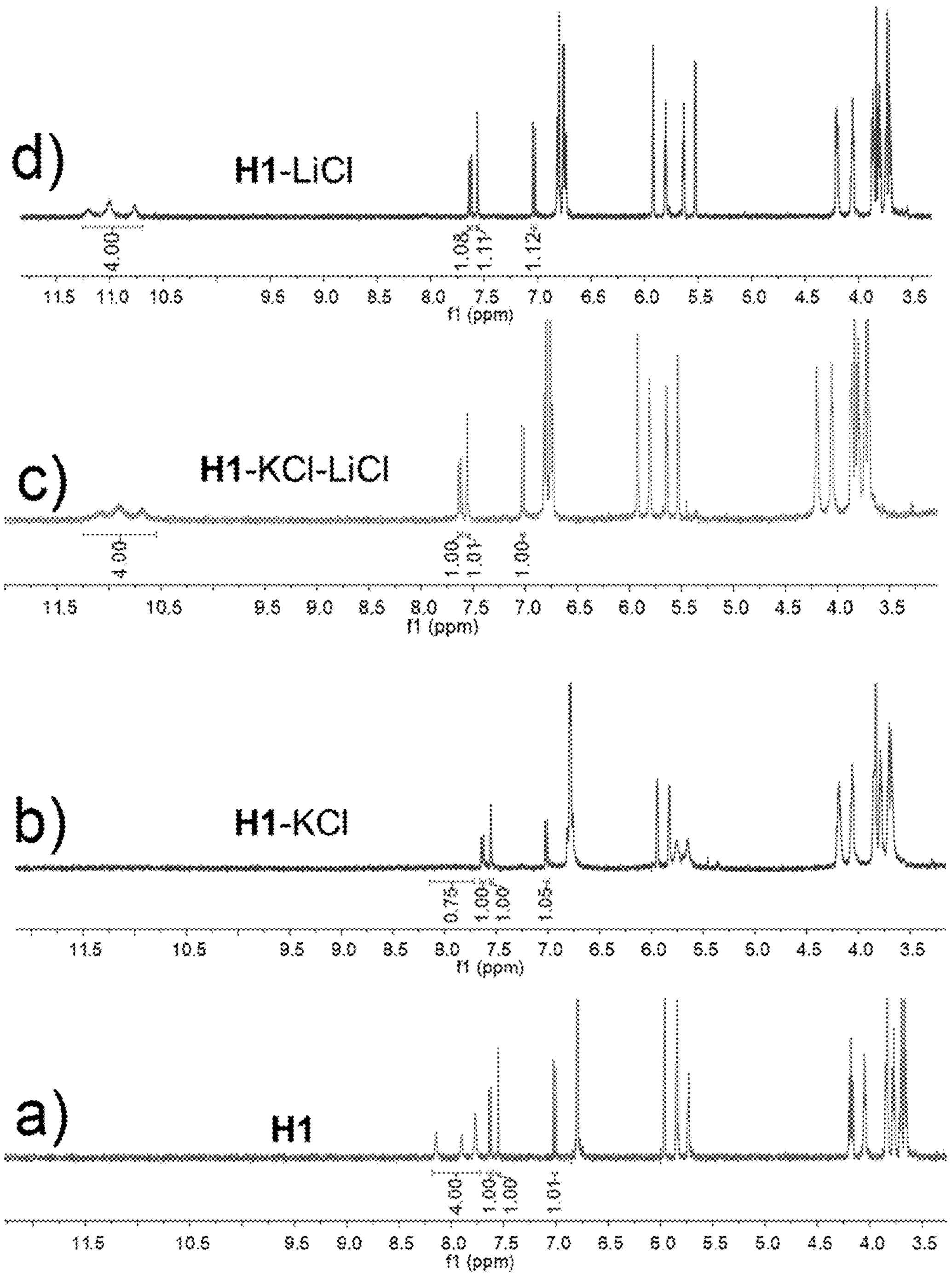

FIG. 48 shows selectivity analysis for H1-KCl—LiCl. $^1$H NMR spectra (400 MHz, $CD_3CN$, 298 K) of a) H1; b) filtered solution of H1 and KCl (5.00 mM, 1:1) after mixing for 5 days; c) g after adding 1 equivalent of LiCl (5.00 mM); d) solution of H1 and LiCl (5.00 mM, 1:1) after mixing for 1 min.

Figure 49:
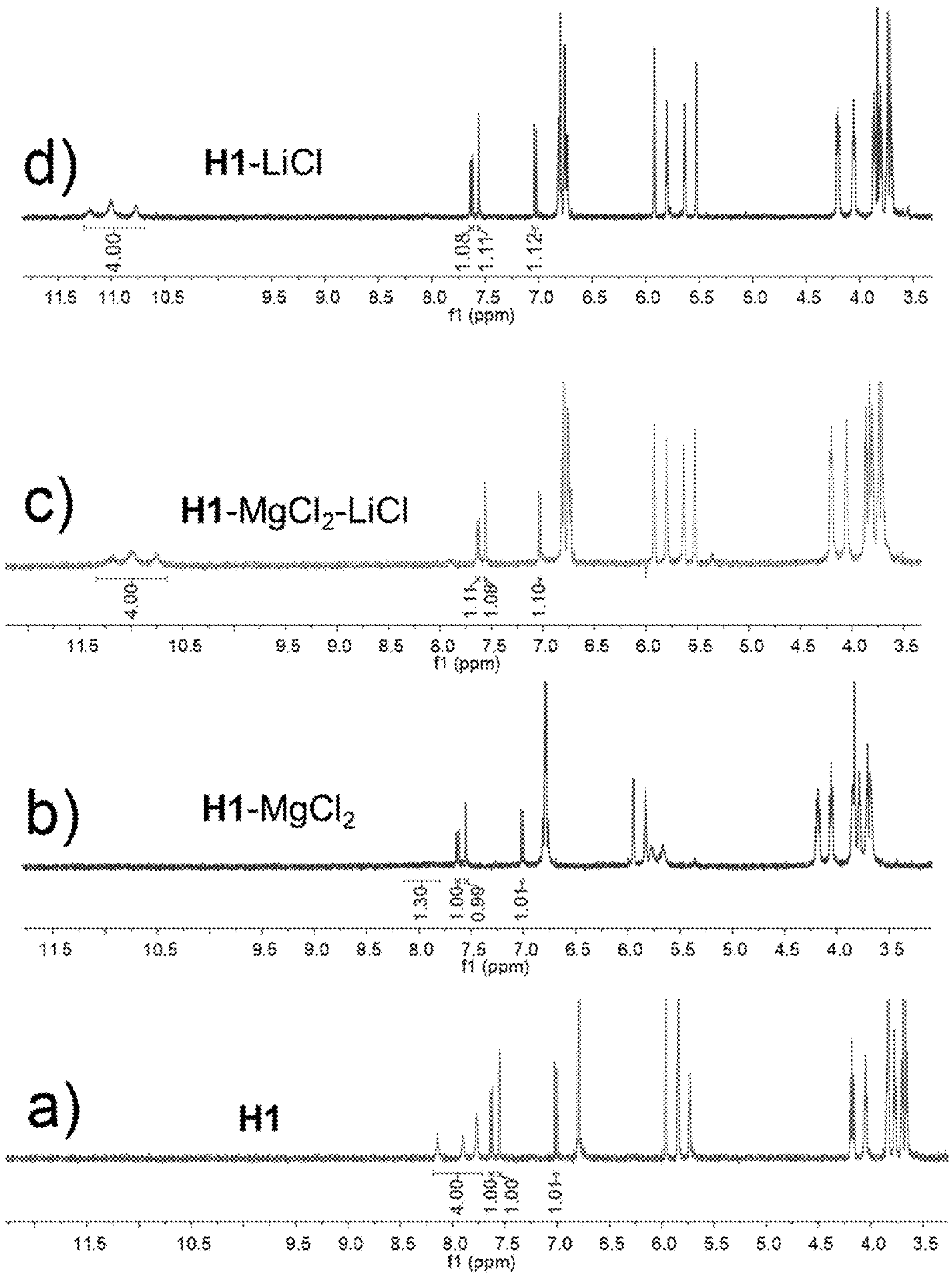

FIG. 49 shows selectivity analysis for H1-$MgCl_2$—LiCl. $^1$H NMR spectra (400 MHz, $CD_3CN$, 298 K) of a) H1; b) filtered solution of H1 and $MgCl_2$ (5.00 mM, 1:1) after mixing for 5 days; c) g after adding 1 equivalent of LiCl (5.00 mM); d) solution of H1 and LiCl (5.00 mM, 1:1) after mixing for 1 min.

Figure 50:
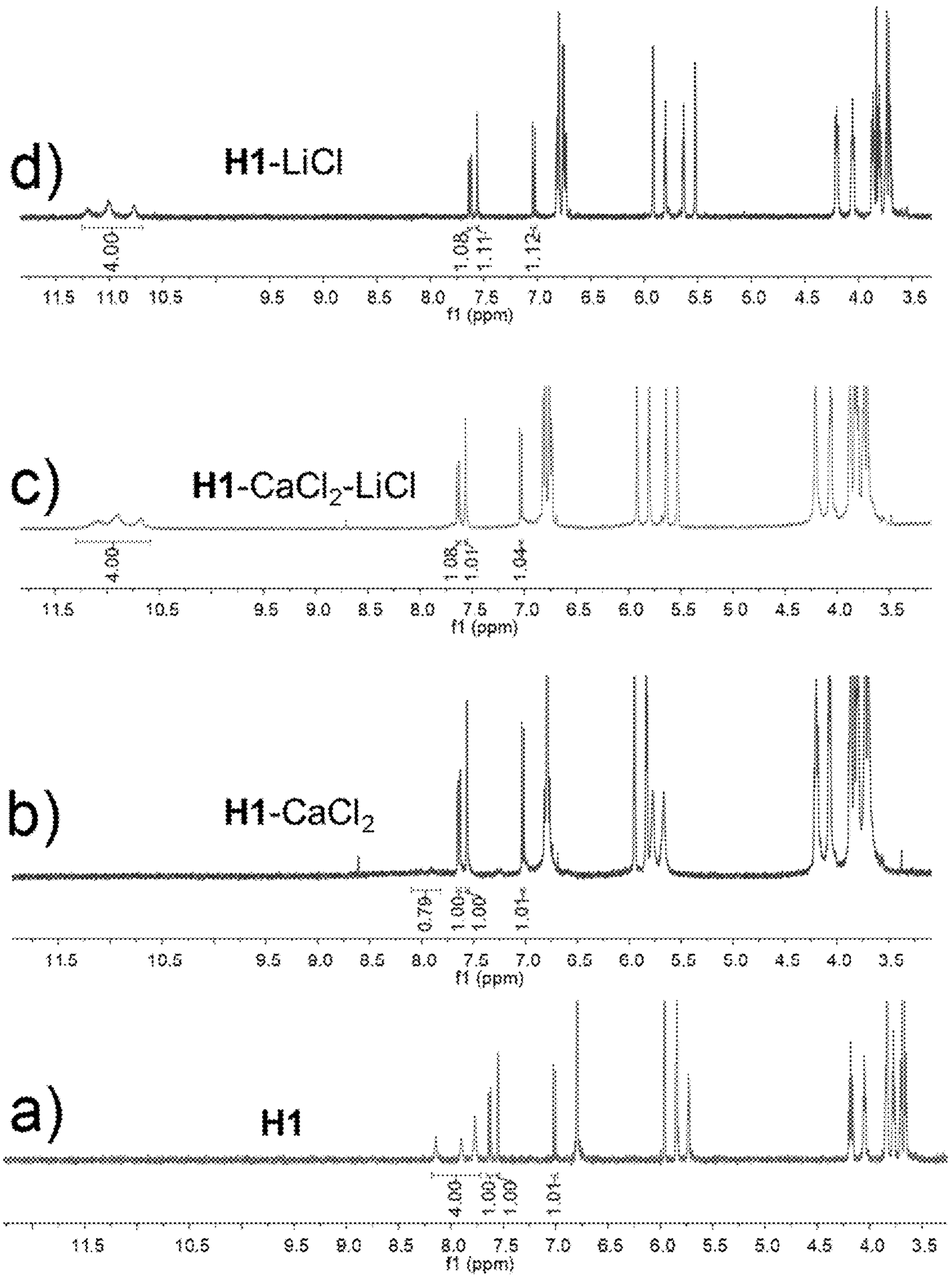

FIG. 50 shows selectivity analysis for H1-$CaCl_2$—LiCl. $^1$H NMR spectra (400 MHz, $CD_3CN$, 298 K) of a) H1; b) filtered solution of H1 and $CaCl_2$) (5.00 mM, 1:1) after mixing for 5 days; c) g after adding 1 equivalent of LiCl (5.00 mM); d) solution of H1 and LiCl (5.00 mM, 1:1) after mixing for 1 min.

Figure 51:
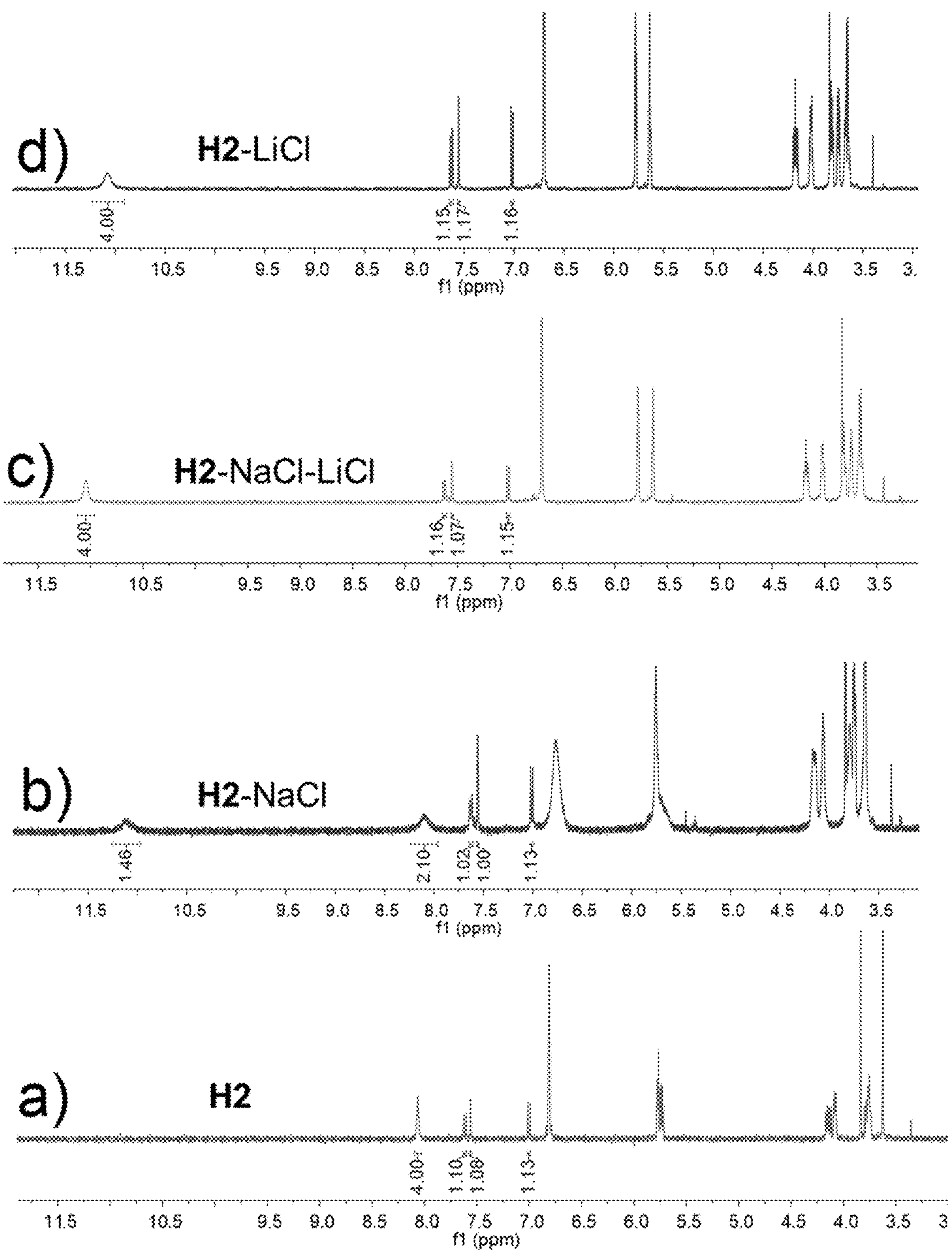

FIG. 51 shows selectivity analysis for H2-NaCl—LiCl. $^1$H NMR spectra (400 MHz, $CD_3CN$, 298 K) of a) 112; b) filtered solution of H2 and NaCl (5.00 mM, 1:1) after mixing for 5 days; c) g after adding 1 equivalent of LiCl (5.00 mM); d) solution of H2 and LiCl (5.00 mM, 1:1) after mixing for 1 min.

Figure 52:
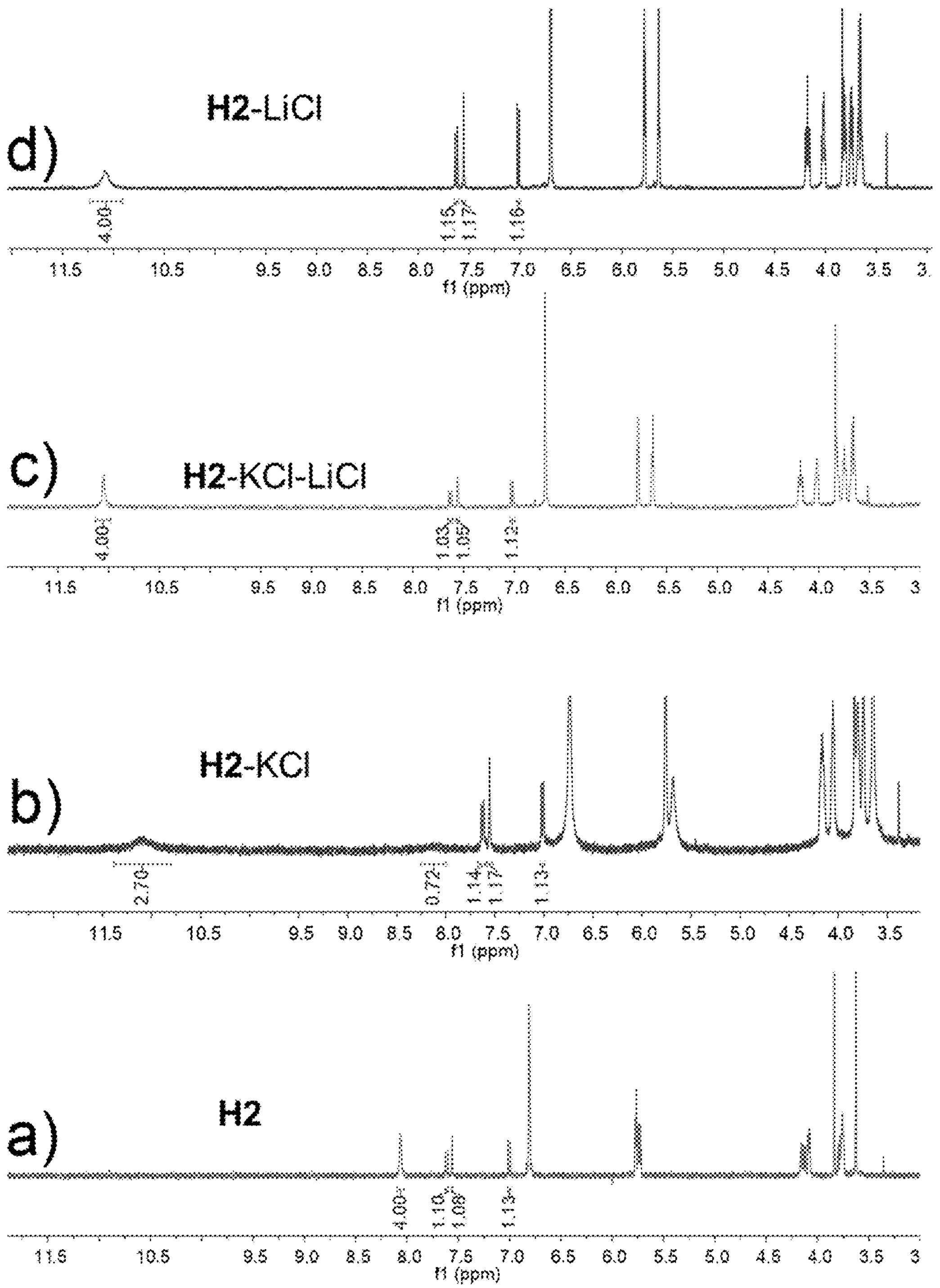

FIG. 52 shows selectivity analysis for H2-KCl—LiCl. $^1$H NMR spectra (400 MHz, $CD_3CN$, 298 K) of a) 112; b) filtered solution of H2 and KCl (5.00 mM, 1:1) after mixing for 5 days; c) g after adding 1 equivalent of LiCl (5.00 mM); d) solution of H2 and LiCl (5.00 mM, 1:1) after mixing for 1 min.

Figure 53:
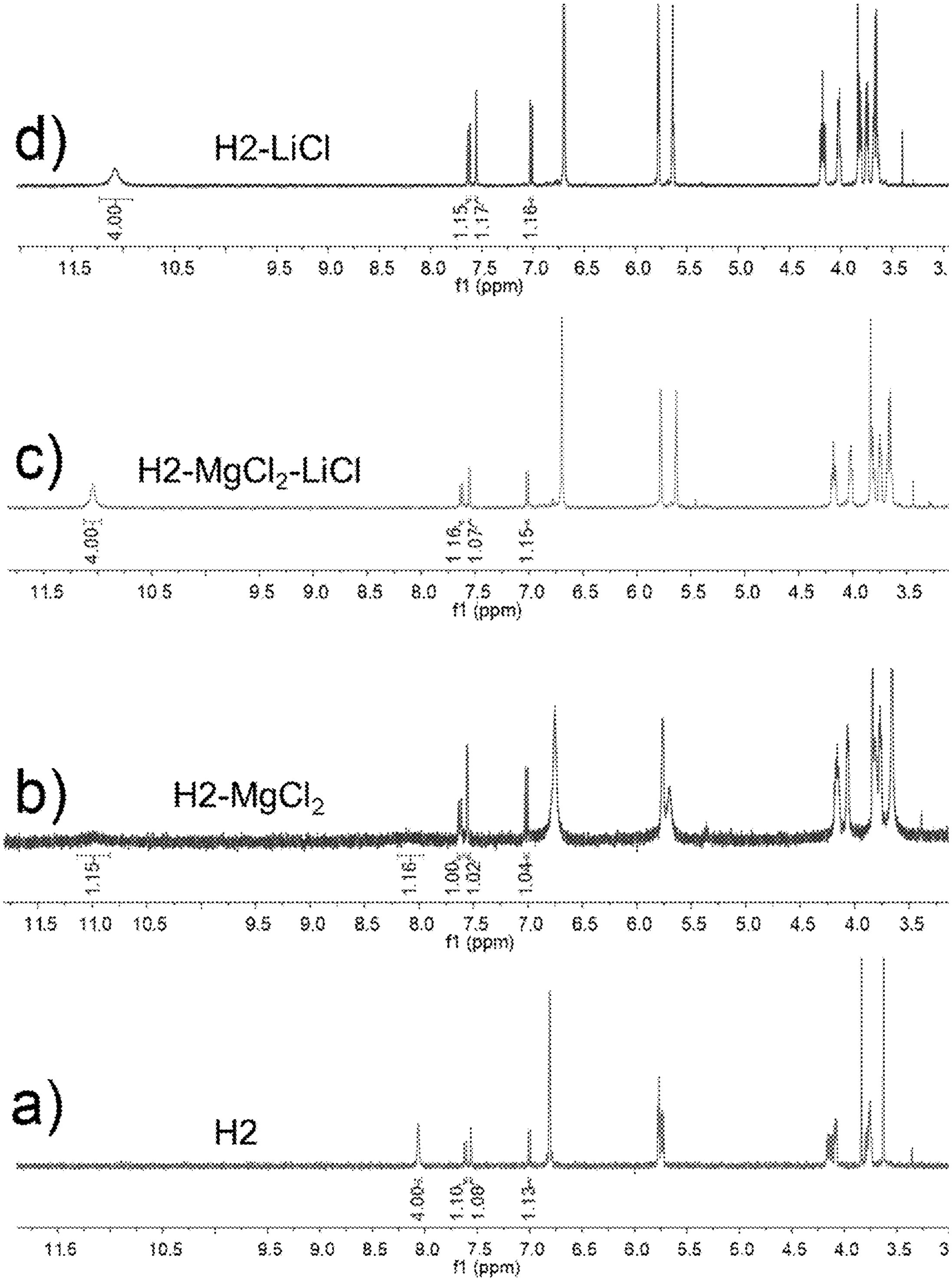

FIG. 53 shows selectivity analysis for H2-$MgCl_2$—LiCl. $^1$H NMR spectra (400 MHz, $CD_3CN$, 298 K) of a) 112; b) filtered solution of H2 and $MgCl_2$ (5.00 mM, 1:1) after mixing for 5 days; c) g after adding 1 equivalent of LiCl (5.00 mM); d) solution of H2 and LiCl (5.00 mM, 1:1) after mixing for 1 min.

Figure 54:
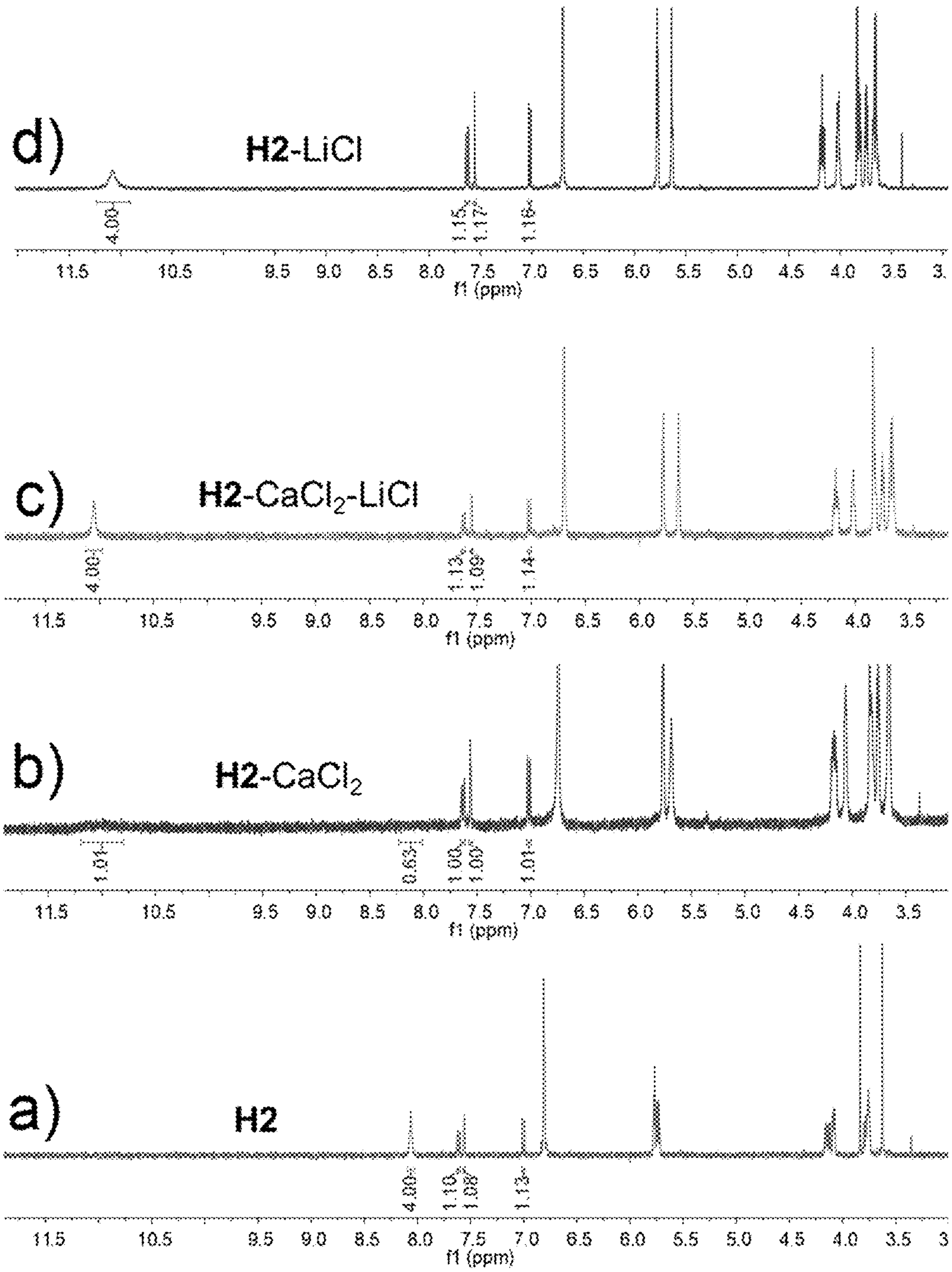

FIG. 54 shows selectivity analysis for H2-$CaCl_2$—LiCl. $^1$H NMR spectra (400 MHz, $CD_3CN$, 298 K) of a) 112; b) filtered solution of H2 and $CaCl_2$) (5.00 mM, 1:1) after mixing for 5 days; c) g after adding 1 equivalent of LiCl (5.00 mM); d) solution of H2 and LiCl (5.00 mM, 1:1) after mixing for 1 min.

Figure 55:
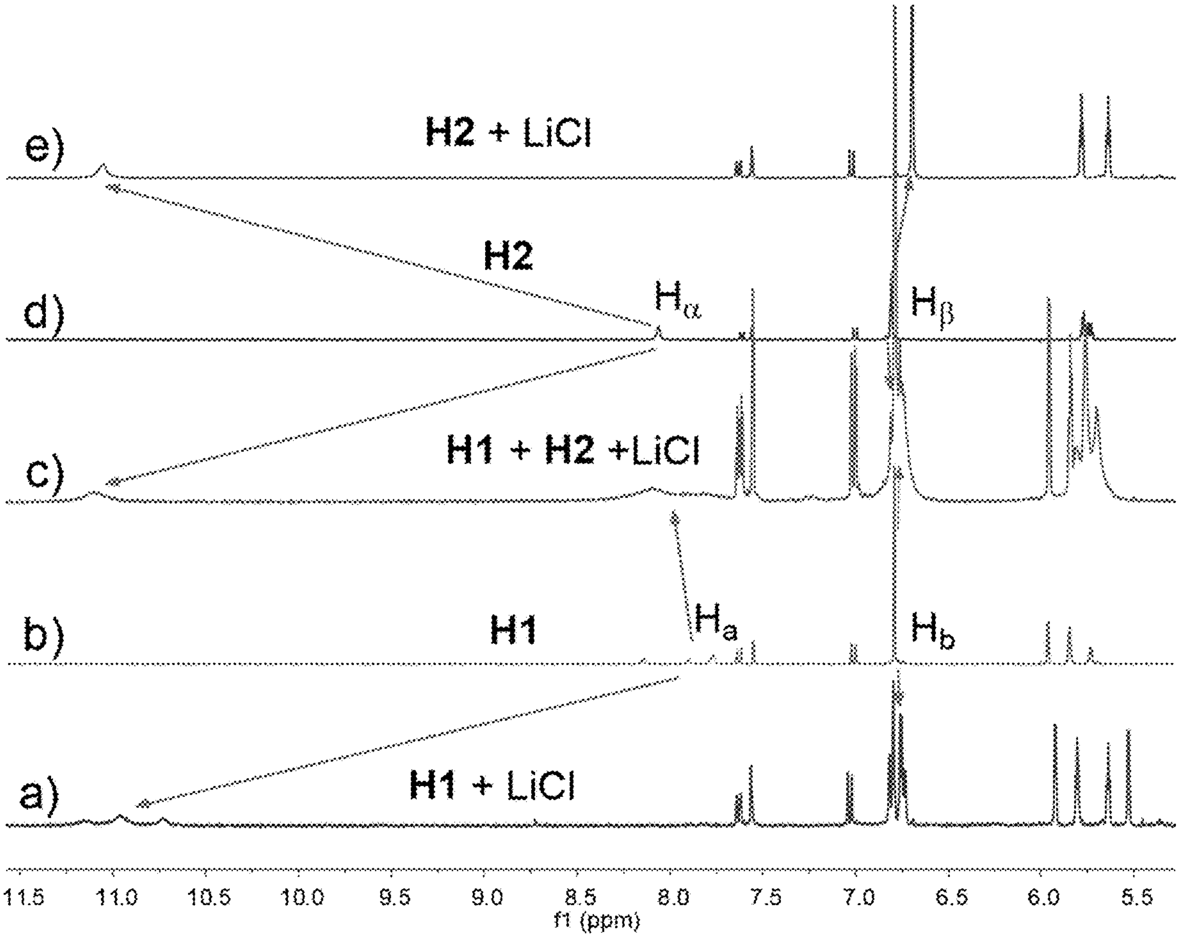
Figures 56A, 56B, 56C, 56D, 56E:
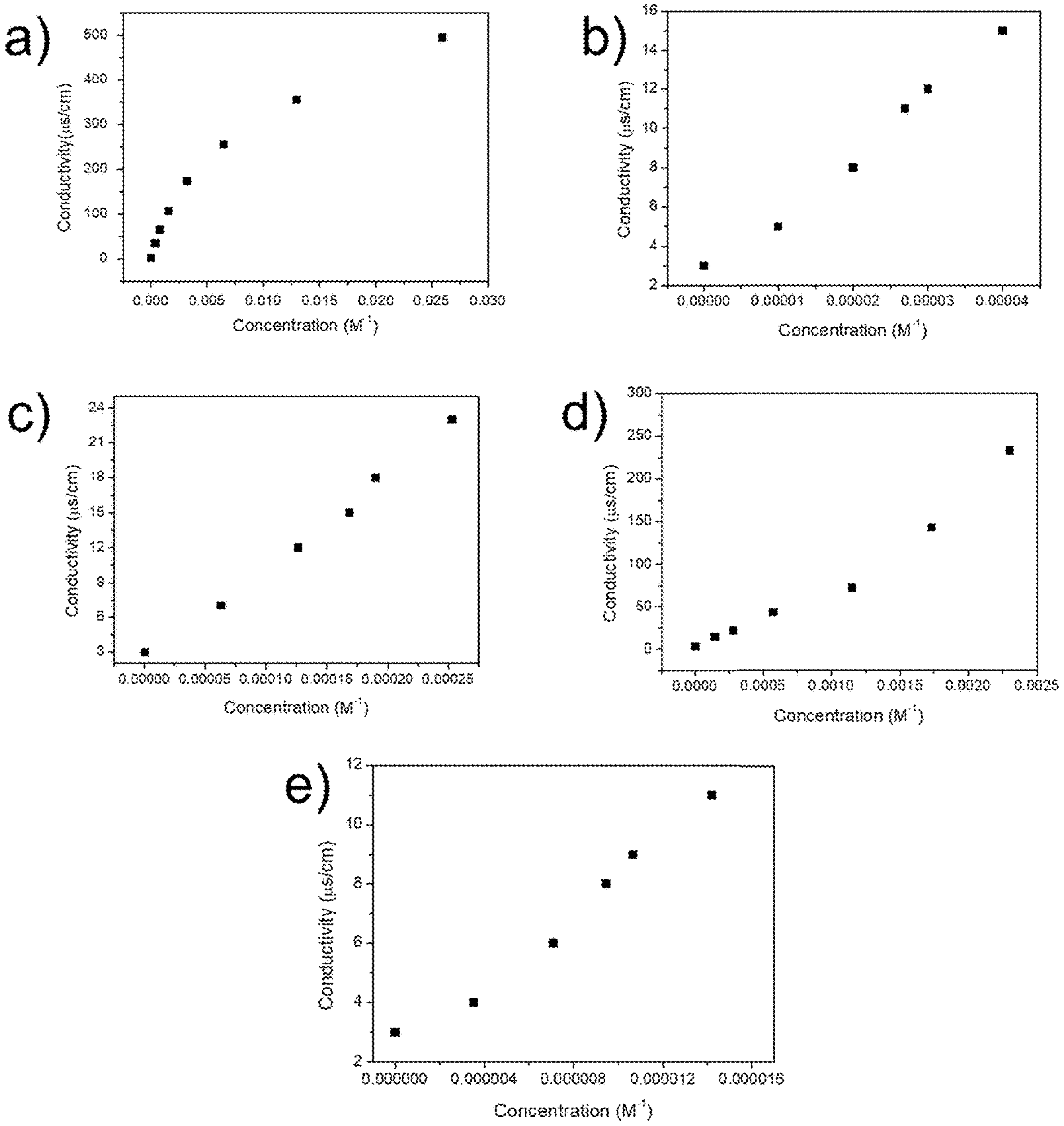

FIG. 55 shows competitive complexation of H1 and H2 to LiCl. $^1$H NMR spectra (400 MHz, $CD_3CN$, 298 K) of a) mixed solution of H1 and LiCl (5.00 mM, 1:1); b) H1 (5.00 mM); c) mixed solution of H1, H2 and LiCl (5.00 mM, 1:1:1); d) H2 (5.00 mM); e) mixed solution of H2 and LiCl (5.00 mM, 1:1).

FIGS. 56A-56E show conductivity of various metal salt solutions in acetonitrile versus the concentration: a) LiCl, b) NaCl, c) KCl, d) $MgCl_2$, d) $CaCl_2$).

Figures 57A, 57B, 57C, 57D, 57E, 57F:
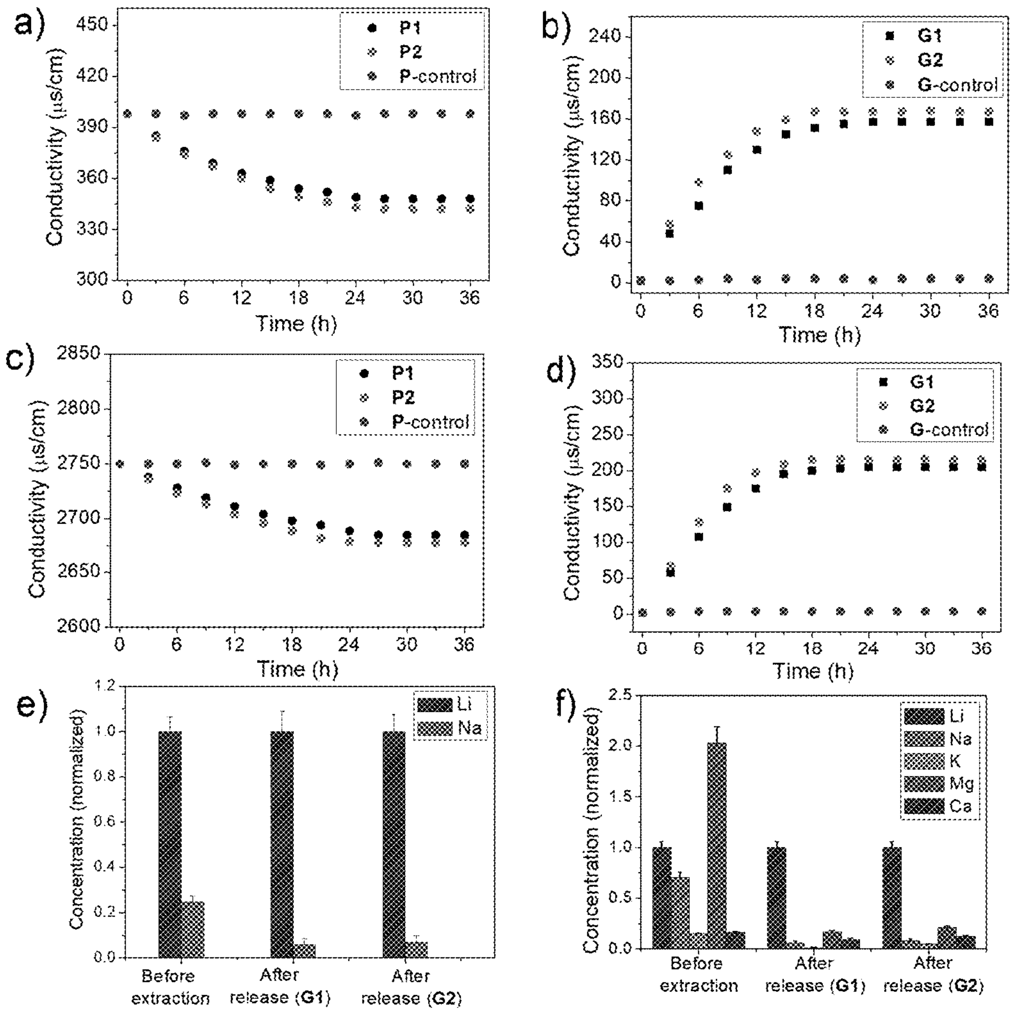

FIGS. 57A-57F show conductivities of saturated 10 ml acetonitrile solutions of LiCl and NaCl after contacting with P1, P2, and control P (330 mg in each case) for the indicated times (FIG. 57A); conductivities of methanol solutions used to treat G1, G2, and G after completion of the studies in FIG. 57A (FIG. 57B); conductivities of saturated acetonitrile solutions of the five test metal salts described herein (viz. LiCl, NaCl, KCl, $MgCl_2$, and $CaCl_2$)) after contacting with P1, P2, and P (330 mg) for the indicated times (FIG. 57C); and conductivities of methanol solutions used to treat G1, G2 and G-control after completion of the studies in FIG. 57C (FIG. 57D). Results of ICP-MS analyses: (FIG. 57E) Normalized concentrations of Li and Na in acetonitrile before contacting with either P1 or P2 and in methanol after the extraction and release experiments involving mixed saturated solutions of LiCl and NaCl; (FIG. 57F) normalized concentrations of Li, Na, K, Mg, and Ca in acetonitrile before and in methanol after the extraction and release experiments involving mixed saturated solutions containing LiCl, NaCl, KCl, $MgCl_2$, and $CaCl_2$).

Figure 58:
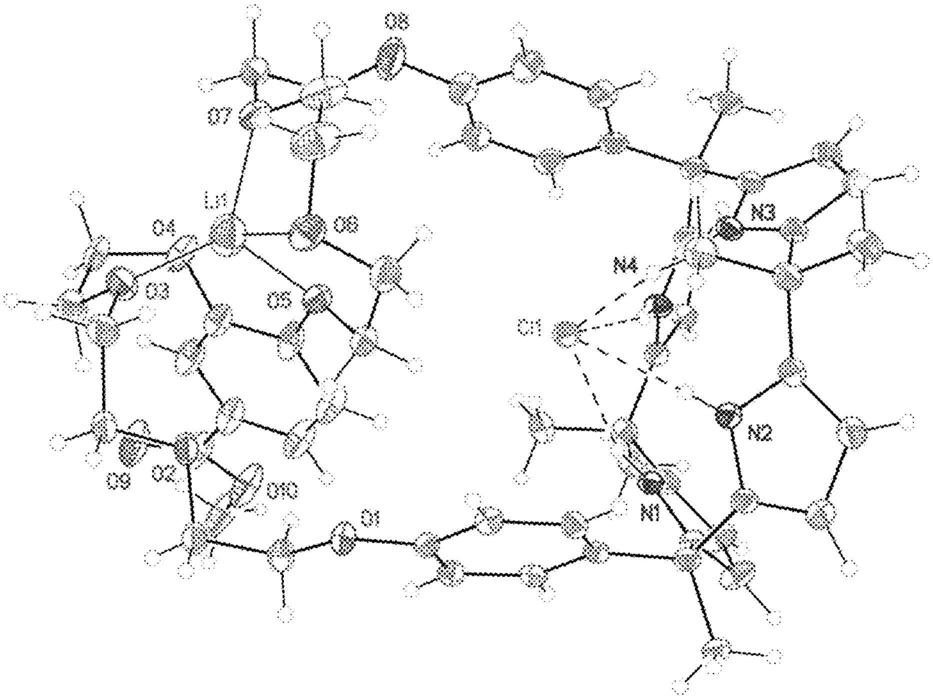

FIG. 58 shows view of the H2 LiCl complex showing the heteroatom labeling scheme. Displacement ellipsoids are scaled to the 30% probability level. Dashed lines are indicative of a H-bonding interaction. The lower occupancy atoms of the disordered portion of the complex were omitted.

Figure 59:
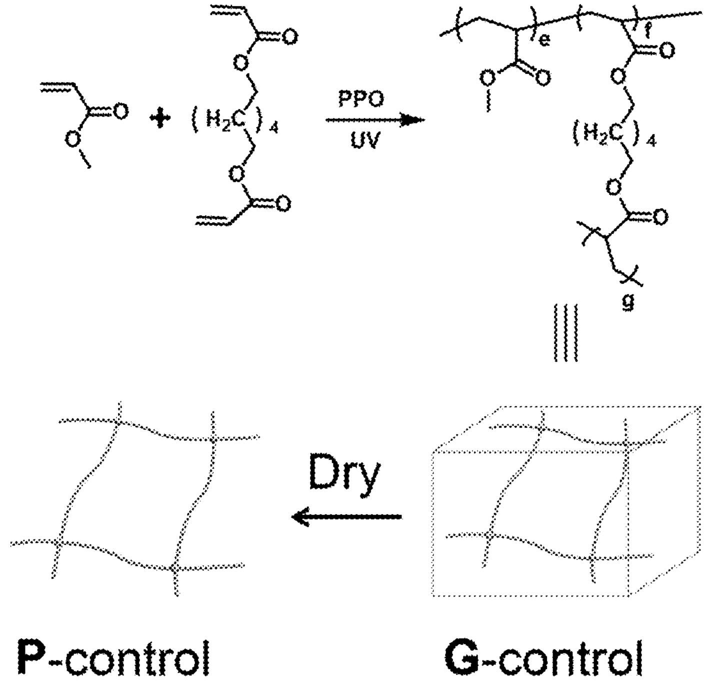

FIG. 59 shows preparation of G-control and P-control.

Figure 60:
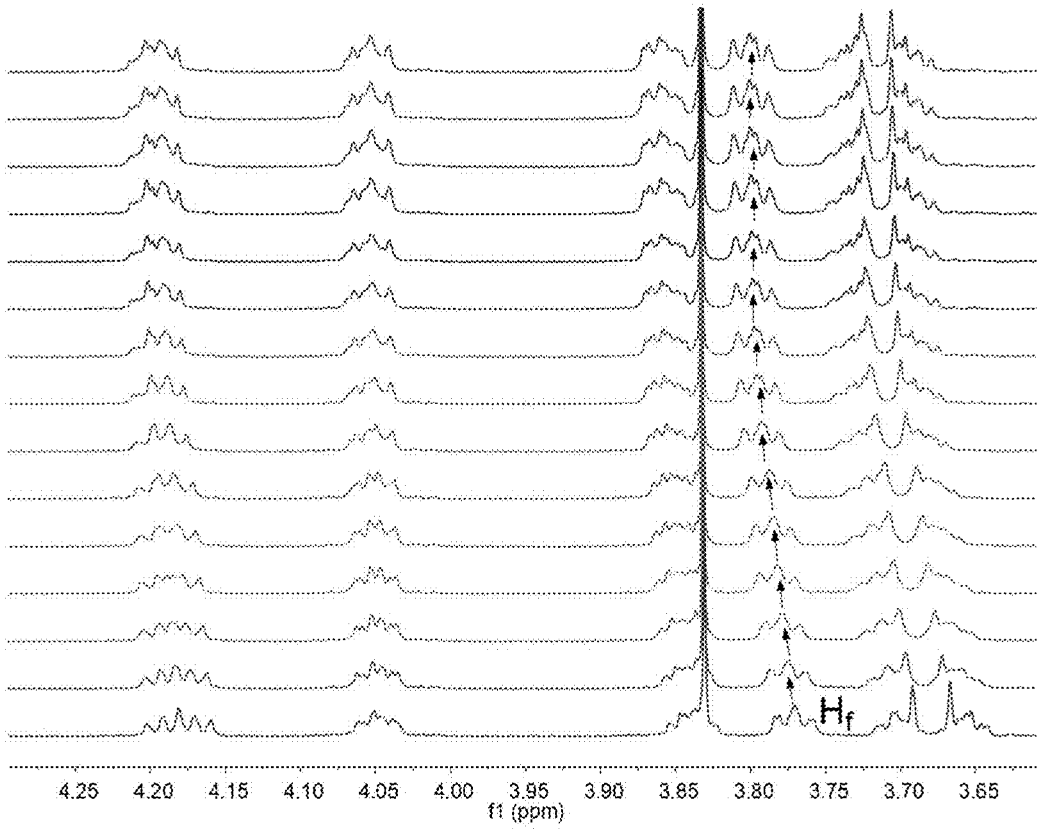

FIG. 60 shows $^1$H NMR spectra (400 MHz, $CD_3CN$, 298 K) of Host H1 recorded at a concentration of 5.00 mM in the presence of different concentrations of Guest LiCl: (a) 0.00 mM; (b) 1.18 mM; (c) 2.23 mM; (d) 3.18 mM; (e) 4.03 mM;

(f) 4.8 mM; (g) 6.94 mM; (h) 8.58 mM; (i) 9.87 mM; (j) 10.91 mM; (k) 11.77 mM; (1) 12.5 mM; (m) 13.65 mM; (n) 14.52 mM; (o) 15.2 mM.

Figure 61:
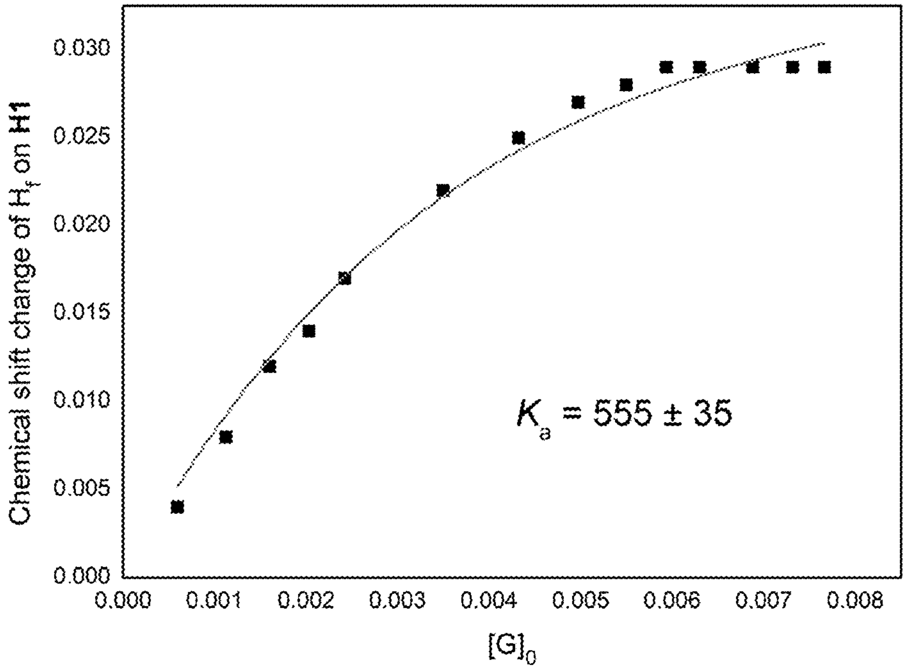

FIG. 61 shows changes in the chemical shift corresponding to $H_f$ on Host H1 as a function of added Guest LiCl. The solid line was obtained from a non-linear curve-fitting using Eq. S1.

Figure 62:
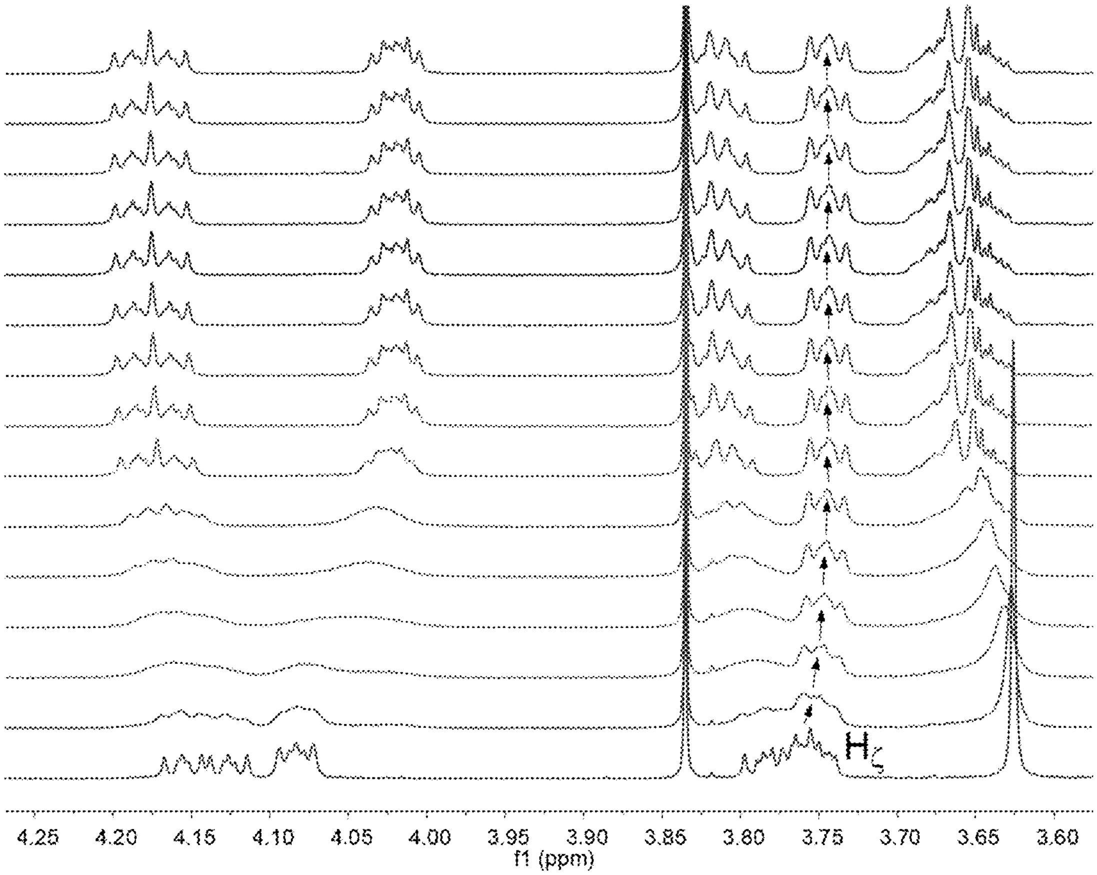

FIG. 62 shows $^1H$ NMR spectra (400 MHz, $CD_3CN$, 298 K) of Host H2 recorded at a concentration of 5.00 mM in the presence of different concentrations of Guest LiCl: (a) 0.00 mM; (b) 1.18 mM; (c) 2.23 mM; (d) 3.18 mM; (e) 4.03 mM; (f) 4.8 mM; (g) 6.94 mM; (h) 8.58 mM; (i) 9.87 mM; (j) 10.91 mM; (k) 11.77 mM; (1) 12.5 mM; (m) 13.65 mM; (n) 14.52 mM; (o) 15.2 mM.

Figure 63:
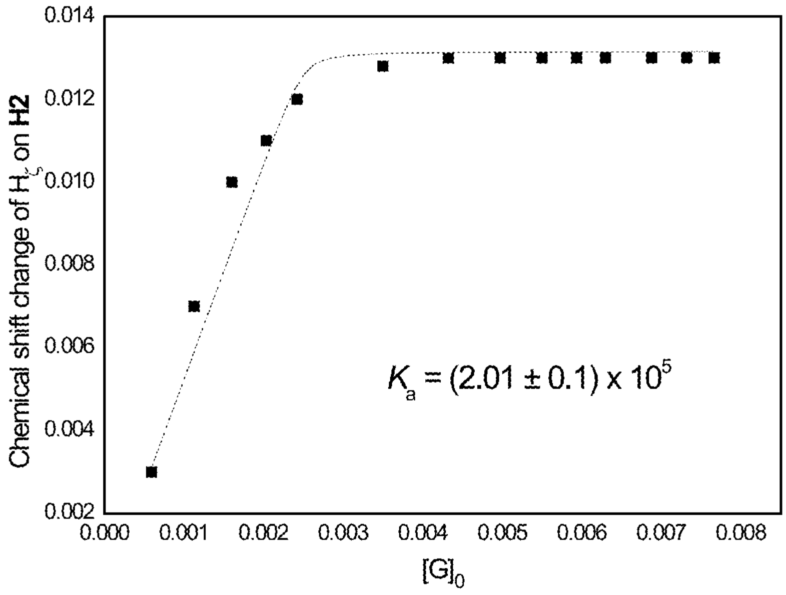

FIG. 63 shows changes in the chemical shift corresponding to Hg on Host H2 as a function of added Guest LiCl. The red solid line was obtained from a non-linear curve-fitting using Eq. S1.

Figure 64:
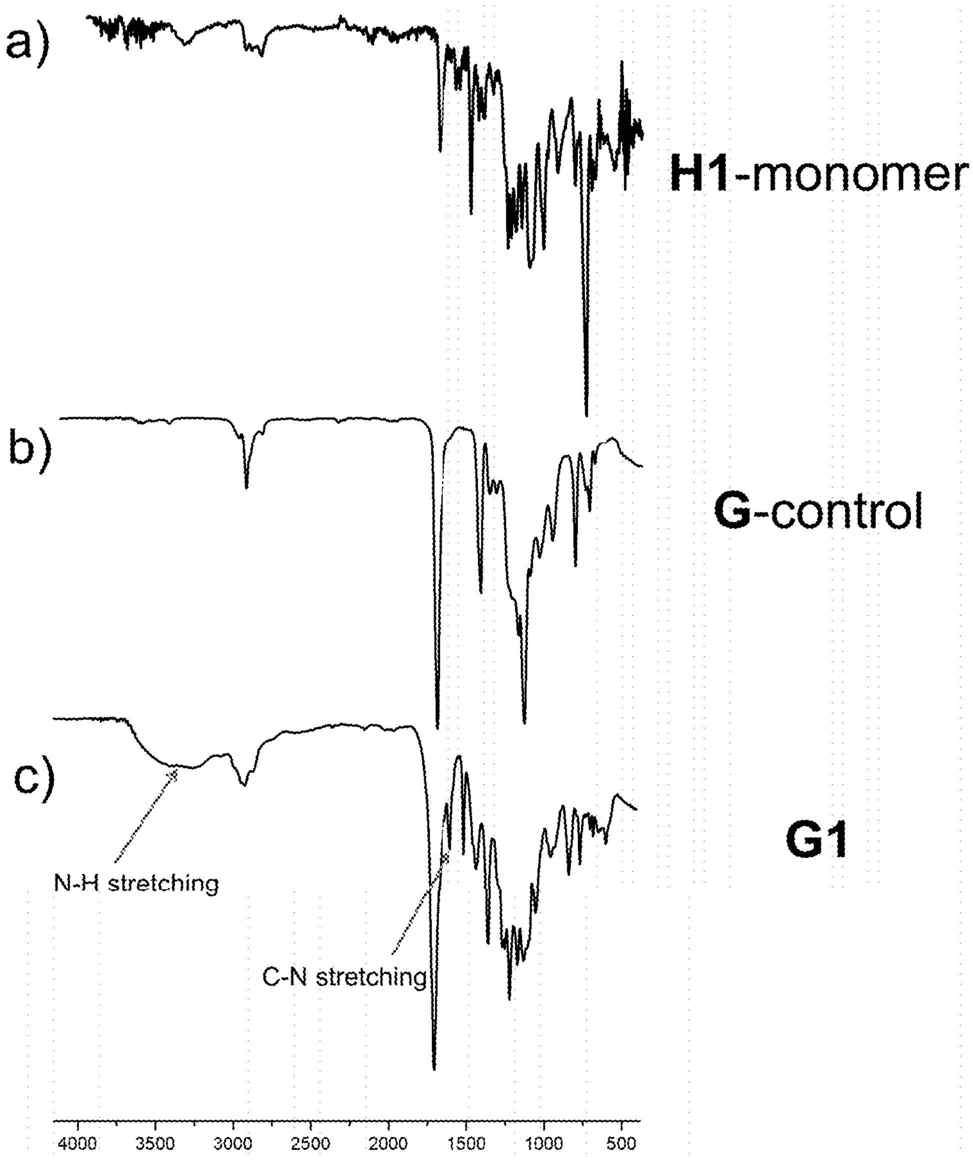

FIG. 64 shows IR spectra of a) H1-monomer, b) G-control and c) G1.

Figure 65:
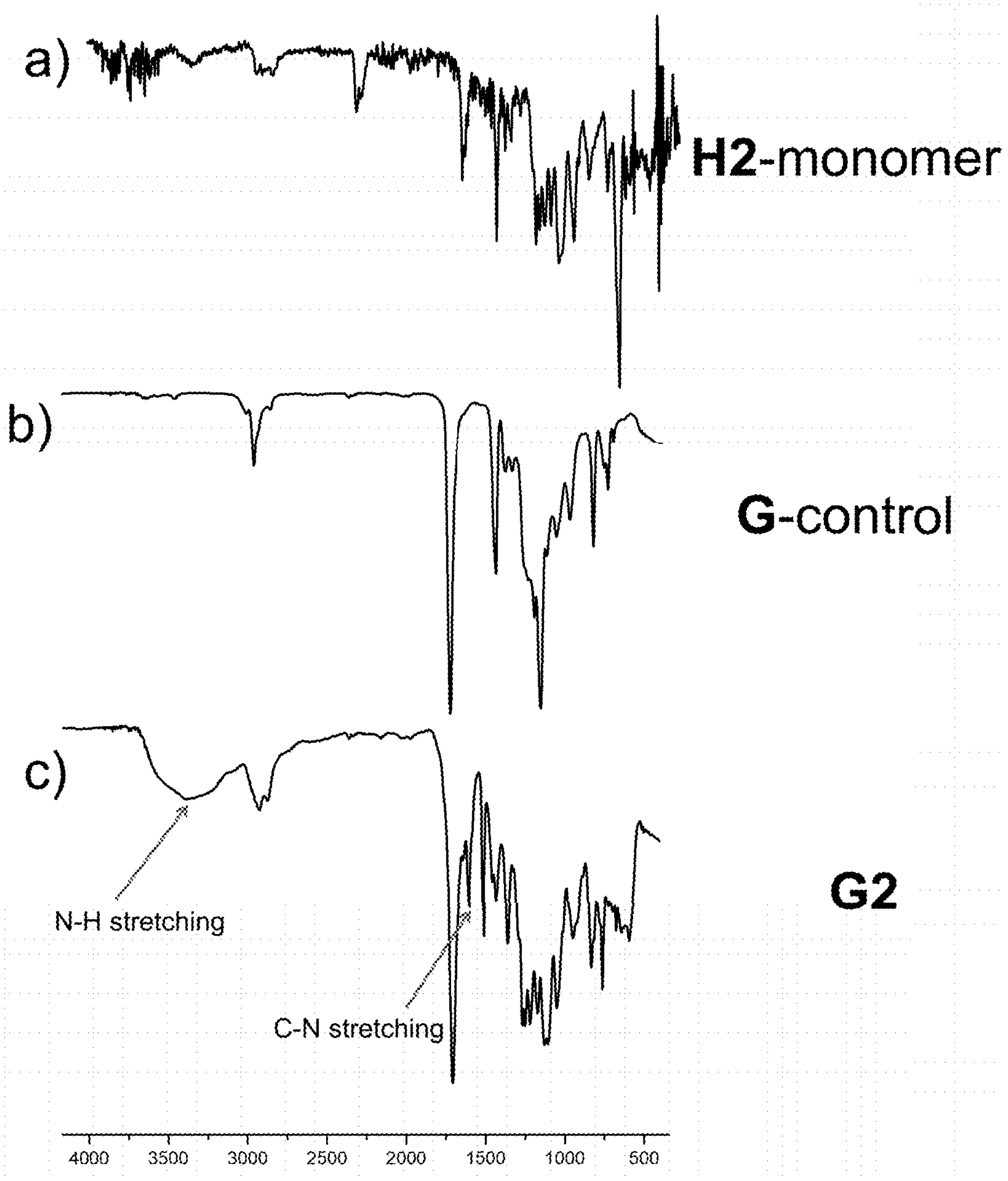

FIG. 65 shows IR spectra of a) H2-monomer, b) G-control and c) G2.

Figure 66:
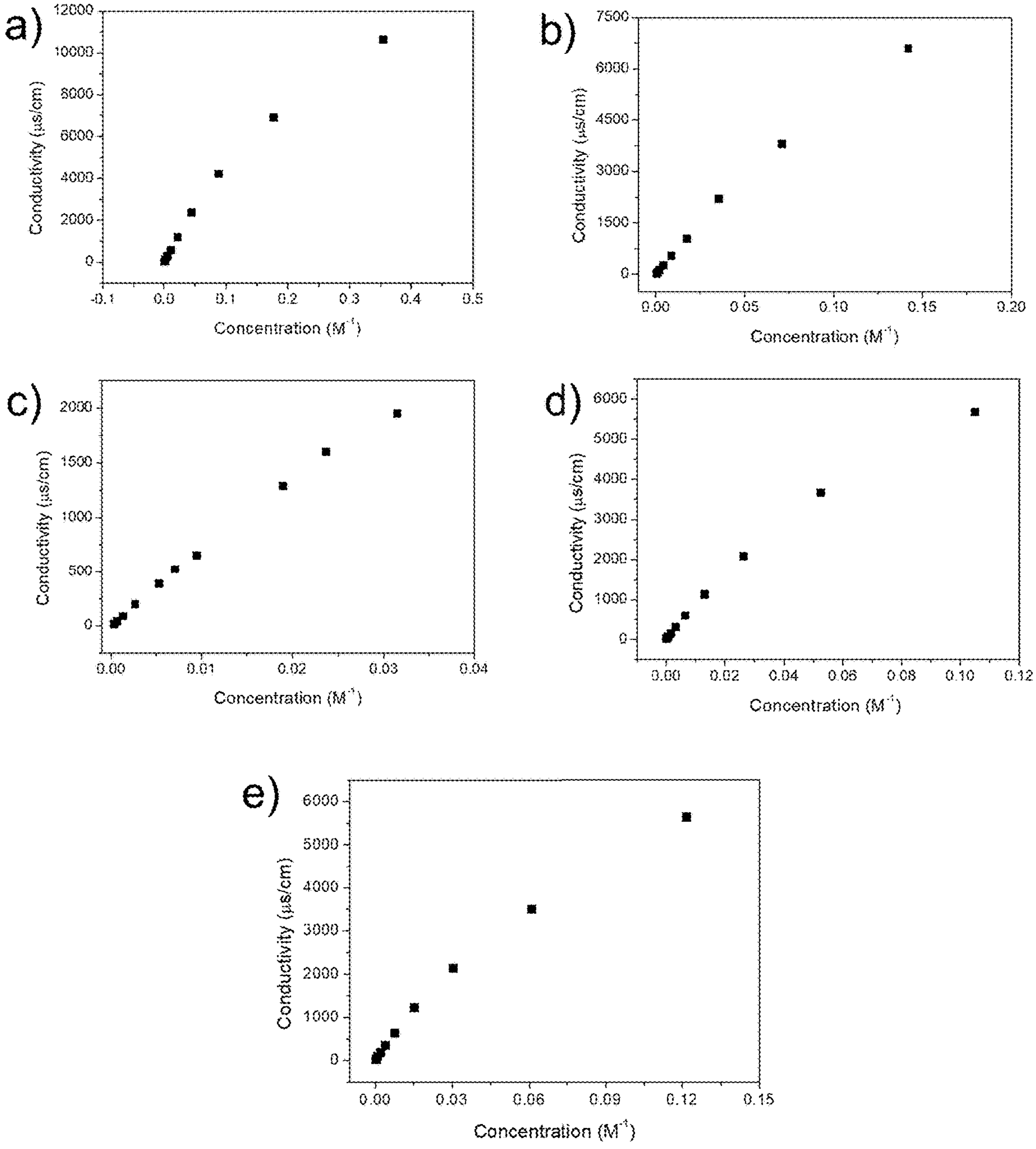

FIG. 66 shows conductivity of various metal salt solutions in methanol versus the concentration: a) LiCl, b) NaCl, c) KCl, d) $MgCl_2$, d) $CaCl_2$).

Figure 67:
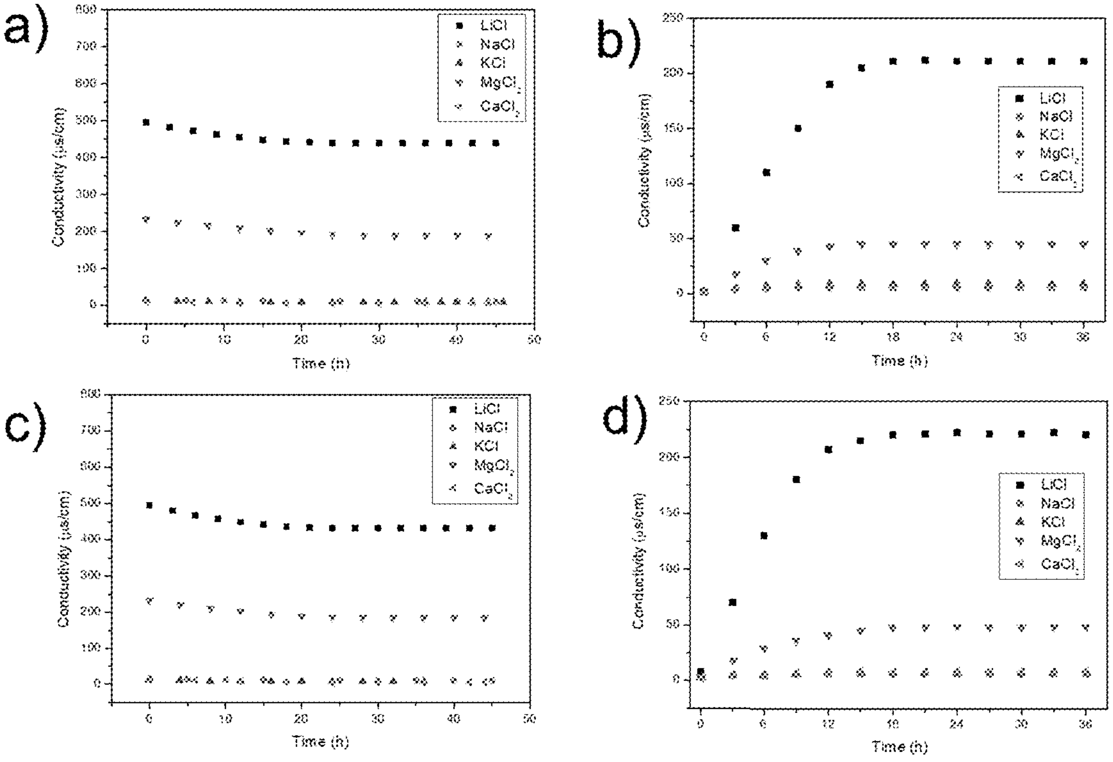

FIG. 67 shows conductivity change of the solution of each metal salt extracted in acetonitrile and released in methanol. a) The conductivity change of the saturated acetonitrile solution of each metal salt after adding P1; b) the conductivity change of methanol of after adding G1 that has adsorbed each metal salt; c) the conductivity change of the saturated acetonitrile solution of each metal salt after adding P2; b) the conductivity change of methanol of after adding G2 that has adsorbed each metal salt.

Figure 68:
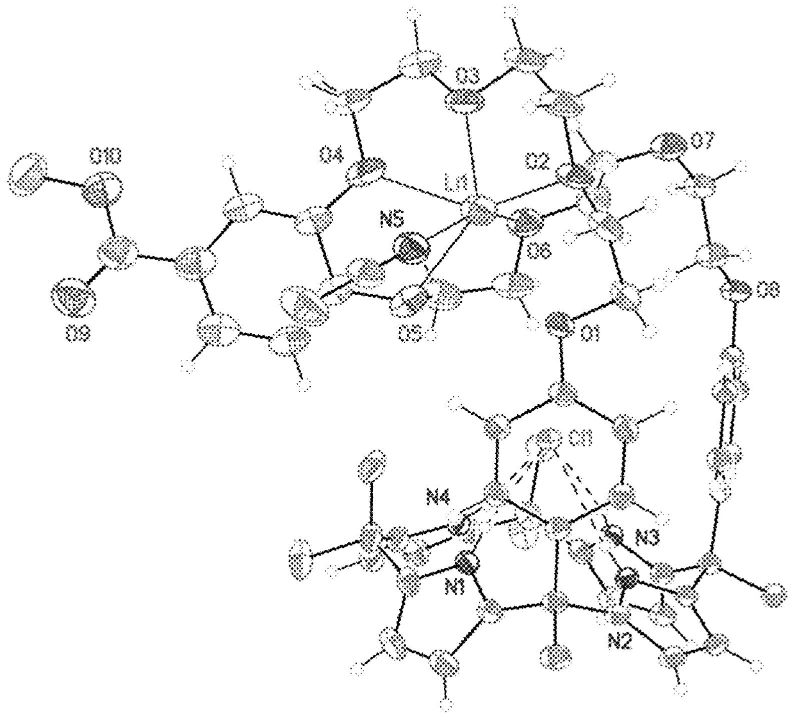

FIG. 68 shows view of the H1 LiCl complex showing the heteroatom labeling scheme. Displacement ellipsoids are scaled to the 50% probability level. Dashed lines are indicative of a H-bonding interaction. The methyl group H atoms were omitted for clarity. The lower occupancy atoms of the disordered groups were omitted.

Figure 69:
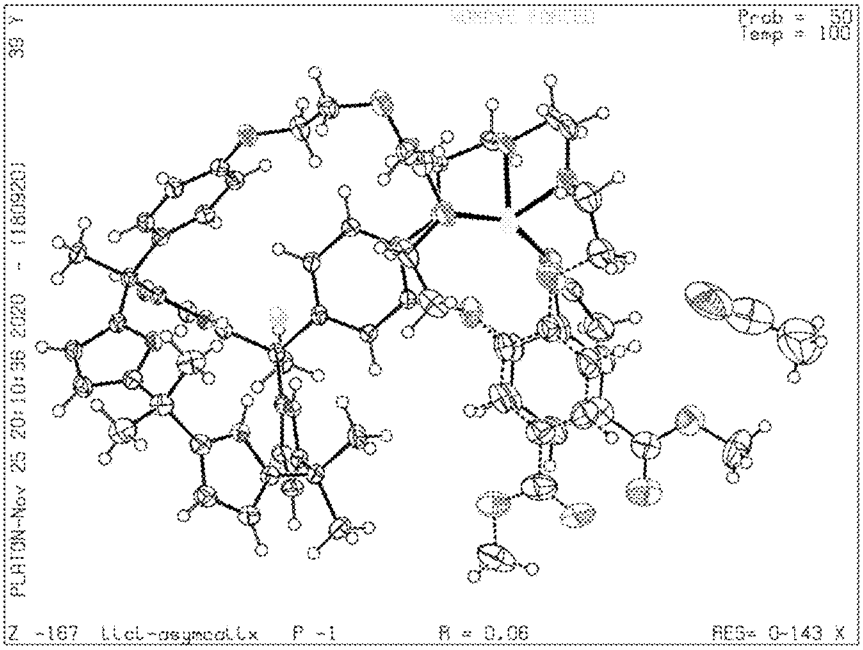

FIG. 69 shows view of the H1 LiCl complex showing the heteroatom labeling scheme. Displacement ellipsoids are scaled to the 50% probability level. Dashed lines are indicative of a H-bonding interaction. The methyl group H atoms were omitted for clarity. The lower occupancy atoms of the disordered groups were omitted.

Figure 70:
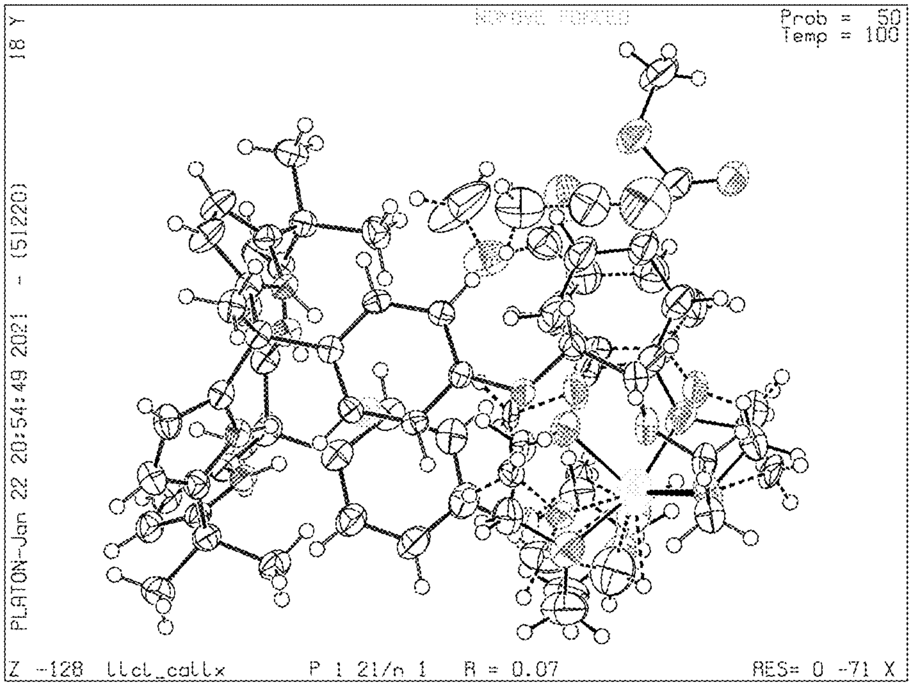

FIG. 70 shows view of the H1 LiCl complex showing the heteroatom labeling scheme. Displacement ellipsoids are scaled to the 50% probability level. Dashed lines are indicative of a H-bonding interaction. The methyl group H atoms were omitted for clarity. The lower occupancy atoms of the disordered groups were omitted.

FIG. 71 shows view

Figure 72:
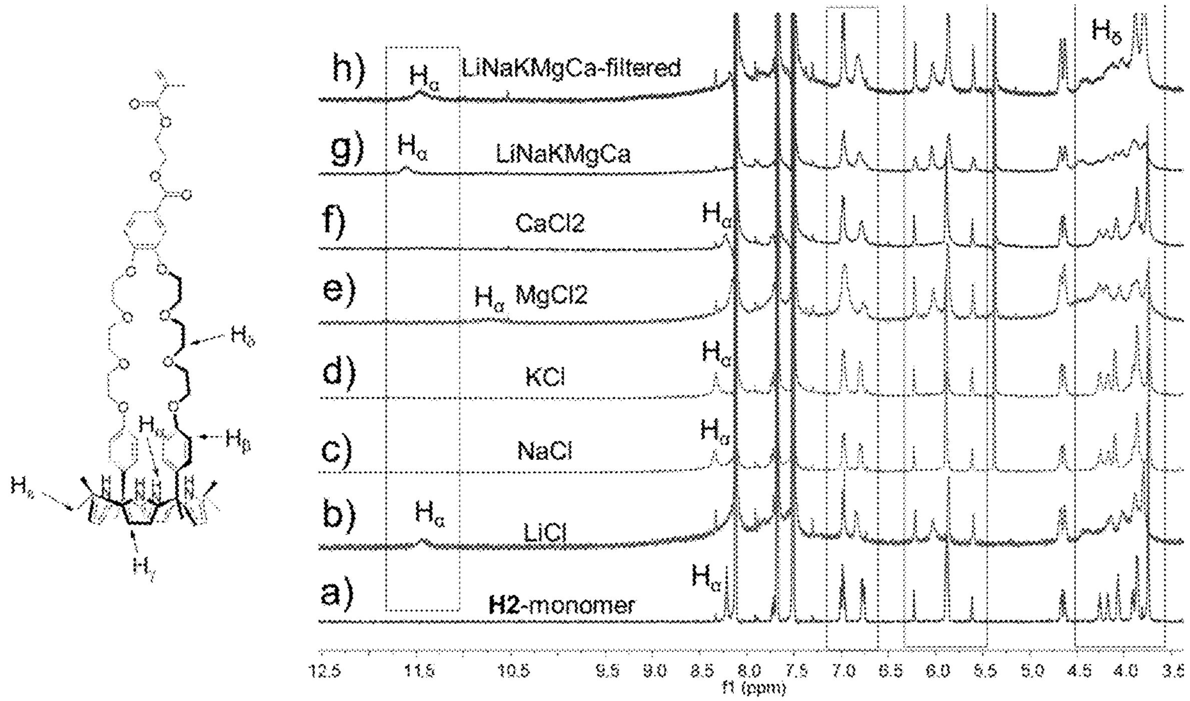

FIG. 72 shows $^1H$ NMR spectra (400 MHz, $CD_3CN$, 298 K)

Figures 73A, 73B:
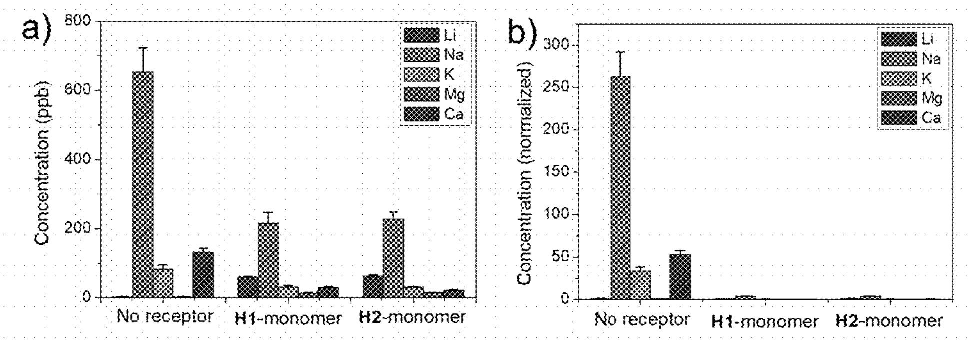

FIGS. 73A & 73B show the ICP-MS quantification studies in nitrobenzene: 0.1 ml of solutions of 2 mg H1-monomer or H2-monomer in nitrobenzene were layered over a mixture of excess solid five salts (LiCl, NaCl, KCl, $MgCl_2$, and $CaCl_2$)) for 48 h. Then, the solutions were passed through 450-nm filters. At this juncture, 0.05 ml aliquots of the resulting solutions were removed and placed into new vials. To these vials were added 0.1 mL of a 0.2 M sulfuric acid. The vials were then shaken for 4 min and allowed to stand overnight. Then, 5 μl samples of the aqueous phase were removed and diluted to 5 ml with 2% $HNO_3$ prior to analysis by ICP-MS. Control experiments were carried out in parallel using the solvent alone. All experiments were carried out in duplicate.

Figures 74A, 74B:
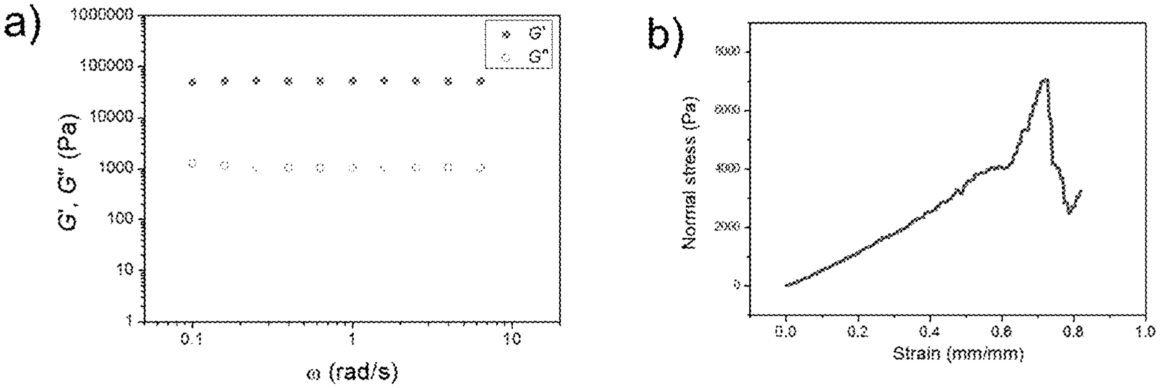

FIGS. 74A & 74B show (74A) Storage modulus (G') and loss modulus (G") of control gel G; (74B) Uniaxial compression behavior of control gel G.

Figures 75A, 75B:
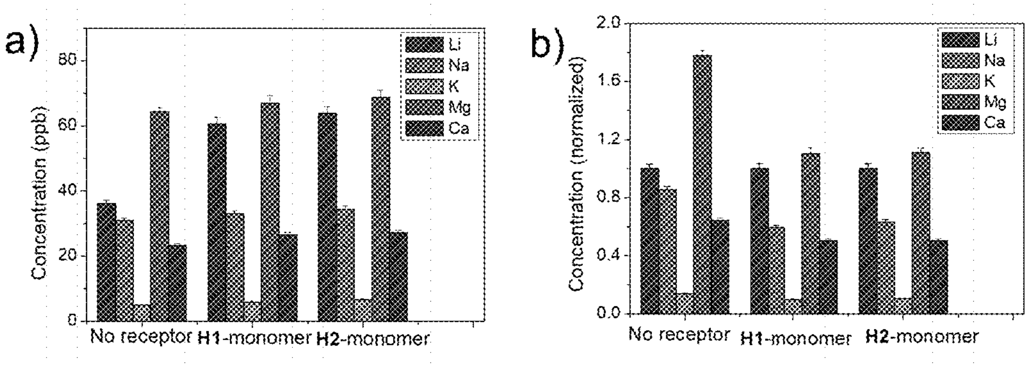
Figures 76A, 76B, 76C, 76D, 76E, 76F:
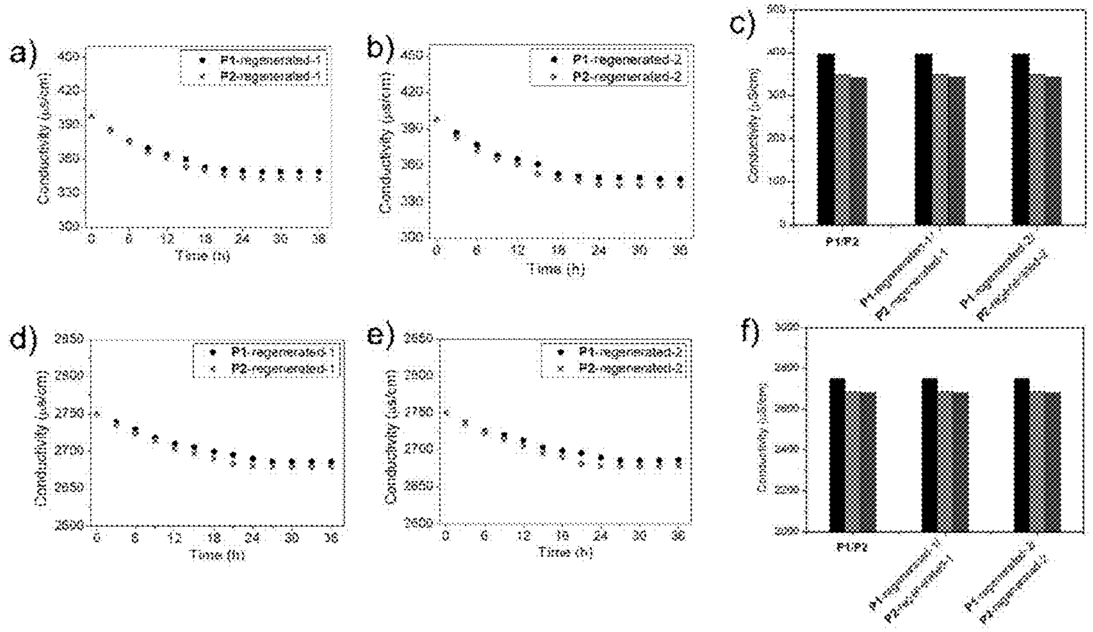

FIGS. 75A & 75B show the ICP-MS quantification studies in acetonitrile: 0.1 ml of solutions of 2 mg H1 or H2 in acetonitrile were layered over a mixture of excess solid five salts (LiCl, NaCl, KCl, $MgCl_2$, and $CaCl_2$)) for 48 h. Then, the solutions were passed through 450-nm filters. The solvent was removed under reduced pressure. Then 3 ml concentrated sulfuric acid was added into the vials to dissolve all the solids. Then, 5 μl solution were removed and diluted to 5 ml with 2% $HNO_3$ prior to analysis by ICP-MS. Control experiments were carried out in parallel using the solvent alone. All experiments were carried out in duplicate.

FIGS. 76A-76F show the time-dependent change in the conductivity of saturated solutions of LiCl and NaCl (with volume of 10 mL) exposed to a) P1-regenerated-1 and P2-regenerated-1; b) P1-regenerated-2 and P2-regenerated-2 for 36 h. Here, the terms P1-regenerated-1, P1-regenerated-2, P2-regenerated-1 and P2-regenerated-2 refer to systems that have been subject to one and two cycles of washing and regeneration, respectively. c) conductivity of saturated solutions of LiCl, NaCl, KCl, $MgCl_2$ and $CaCl_2$) before (blue bar), after (red bar) being treated with P1, P1-regenerated-1, and P1-regenerated-2 and after (red bar) being treated with P2, P2-regenerated-1, and P2-regenerated-2 respectively. To a first approximation all three polymer systems are equally effective. Time-dependent change in the conductivity of saturated solutions of LiCl, NaCl, KCl, $MgCl_2$ and $CaCl_2$) (with volume of 10 mL) exposed to d) P1-regenerated-1 and P2-regenerated-1; e) P1-regenerated-2 and P2-regenerated-2 for 36 h. Here, the terms P1-regenerated-1, P1-regenerated-2, P2-regenerated-1 and P2-regenerated-2 refer to systems that have been subject to one and two cycles of washing and regeneration, respectively. f) conductivity of saturated solutions of LiCl, NaCl, KCl, $MgCl_2$ and $CaCl_2$) before (blue bar), after (red bar) being treated with P1, P1-regenerated-1, and P1-regenerated-2 and after (red bar) being treated with P2, P2-regenerated-1, and P2-regenerated-2 respectively. To a first approximation all three polymer systems are equally effective.

Figure 77:
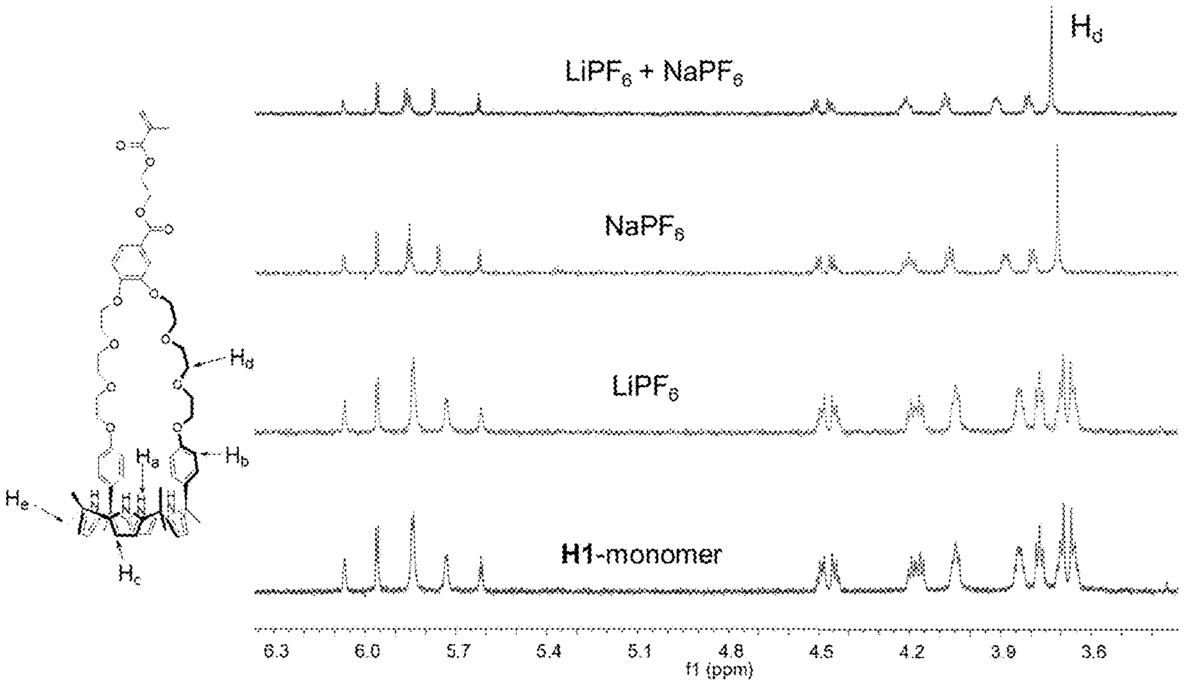

FIG. 77 shows changes in the chemical shift corresponding to $H_d$ on Host H1 as a function of added Guest $LiPF_6$ and/or $NaPF_6$.

Figures 78A, 78B:
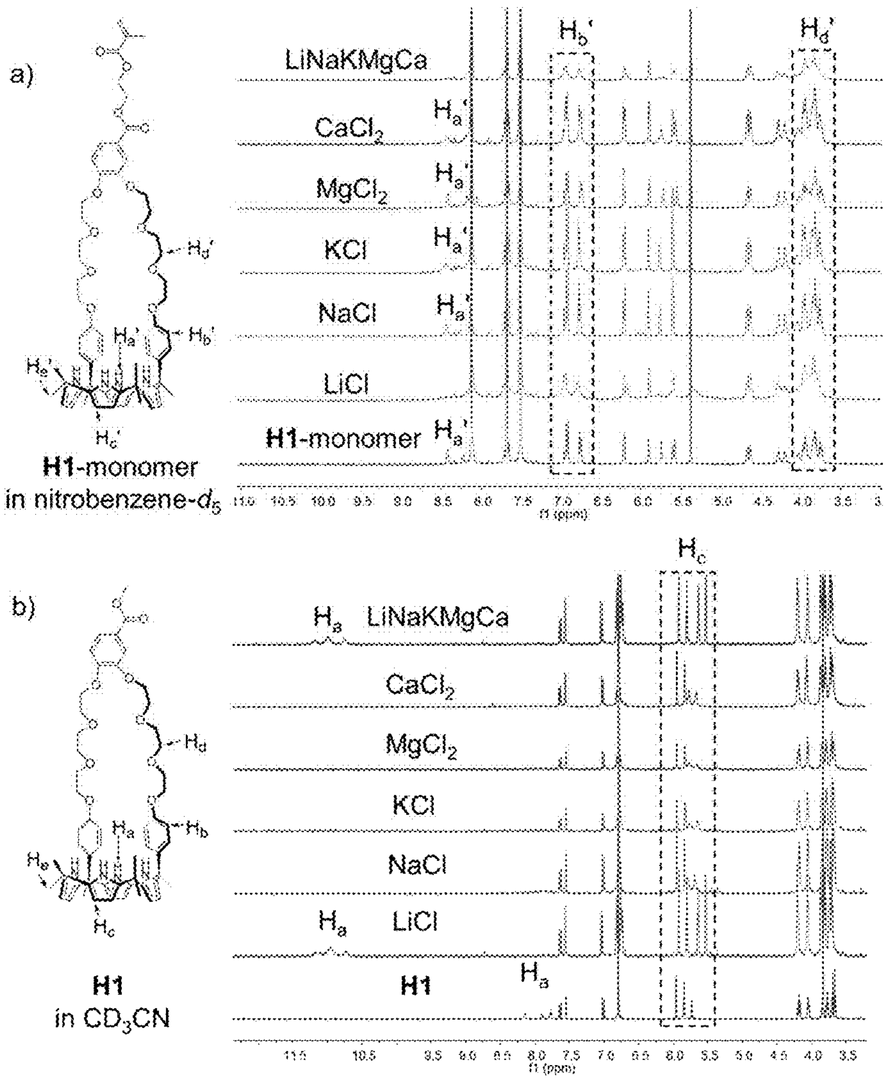

FIGS. 78A & 78B show a)$^1H$ NMR spectra (400 MHz, nitrobenzene-$d_5$, 298 K) of 5.00 mM solutions of H1-monomer made up in nitrobenzene-$d_5$ and contacted with excess solid LiCl, NaCl, KCl, $MgCl_2$, and $CaCl_2$) alone and in combination for one week; b)$^1H$ NMR spectra (400 MHz, $CD_3CN$, 298 K) of 5.00 mM solutions of H1 made up in $CD_3CN$ and contacted with solid LiCl, NaCl, KCl, $MgCl_2$, and $CaCl_2$) in excess alone and in combination for one week.

Figures 79A, 79B:
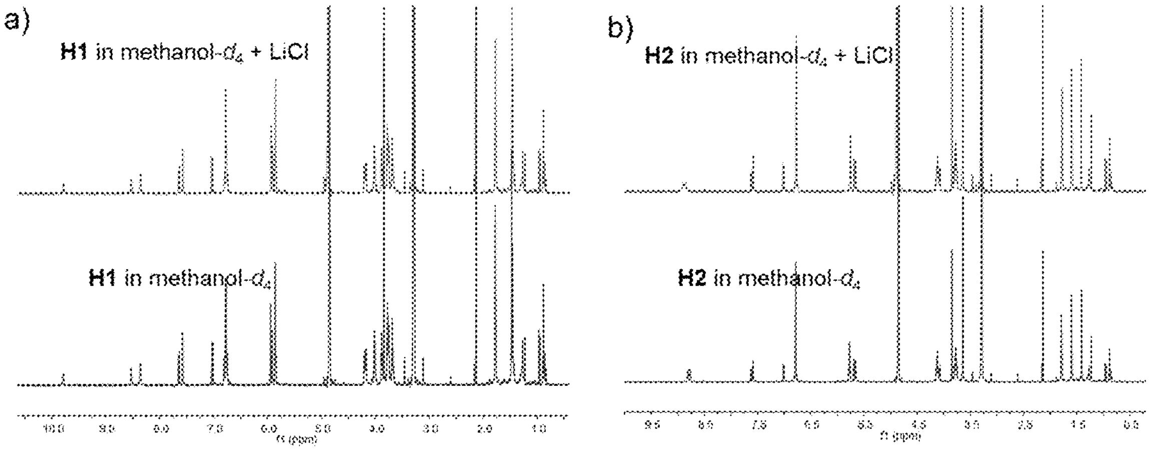

FIGS. 79A & 79B show a)$^1H$ NMR spectra (400 MHz, methanol-$d_4$, 298 K) of H1 before and after adding LiCl (5.00 mM, 1:1); b)$^1H$ NMR spectra (400 MHz, methanol-$d_4$, 298 K) of H2 before and after adding LiCl (5.00 mM, 1:1).

DESCRIPTION OF ILLUSTRATIVE EMBODIMENTS

The present disclosure provides strapped calixpyrrole compounds and compositions and methods of use thereof. One non-limiting example of the use of these compounds is in the selective extraction of LiCl. The present disclosure provides the synthesis and analysis of strapped calix[4]pyrrole-based ion pair receptors, such as H1 and H2, that allow LiCl to be captured selectively under solid-liquid extraction (SLE) conditions. The strapped calixpyrrole compounds may be further modified to be attached to one or more polymers to create a polymer-calixpyrrole composition.

A. Calixpyrroles of the Present Disclosure

The calixpyrroles of the present disclosure are shown, for example, above, in the summary section, the examples, and in the claims below. The compounds may be made using the synthetic methods outlined in the Examples section. These methods can be further modified and optimized using the principles and techniques of organic chemistry as applied by a person skilled in the art. Such principles and techniques are taught, for example, in Smith, *March's Advanced Organic Chemistry: Reactions, Mechanisms, and Structure*, (2013), which is incorporated by reference herein. In addition, the synthetic methods may be further modified and optimized for preparative, pilot- or large-scale production, either batch or continuous, using the principles and techniques of process chemistry as applied by a person skilled in the art. Such principles and techniques are taught, for example, in Anderson, *Practical Process Research & Development—A Guide for Organic Chemists* (2012), which is incorporated by reference herein.

Calixpyrroles of the present disclosure may contain one or more asymmetrically-substituted carbon, nitrogen, sulfur, or phosphorus atom and may be isolated in optically active or racemic form. Thus, all chiral, diastereomeric, racemic form, epimeric form, and all geometric isomeric forms of a chemical formula are intended, unless the specific stereochemistry or isomeric form is specifically indicated. Compounds may occur as racemates and racemic mixtures, single enantiomers, diastereomeric mixtures and individual diastereomers. In some embodiments, a single diastereomer is obtained. The chiral centers of the compounds of the present invention can have the S or the R configuration. In some embodiments, the present compounds may contain two or more atoms which have a defined stereochemical orientation.

Chemical formulas used to represent compounds of the present invention will typically only show one of possibly several different tautomers. For example, many types of ketone groups are known to exist in equilibrium with corresponding enol groups. Similarly, many types of imine groups exist in equilibrium with enamine groups. Regardless of which tautomer is depicted for a given compound, and regardless of which one is most prevalent, all tautomers of a given chemical formula are intended.

In addition, atoms making up the compounds of the present invention are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}C$ and $^{14}C$.

B. Definitions

When used in the context of a chemical group: "hydrogen" means —H; "hydroxy" means —OH; "oxo" means =O; "carbonyl" means —C(=O)—; "carboxy" means —C(=O)OH (also written as —COOH or —$CO_2$H); "halo" means independently —F, —Cl, —Br or —I; "amino" means —$NH_2$; "hydroxyamino" means —NHOH; "nitro" means —$NO_2$; imino means =NH; "cyano" means —CN; "isocyanyl" means —N=C=O; "azido" means —$N_3$; in a monovalent context "phosphate" means —OP(O)$(OH)_2$ or a deprotonated form thereof; in a divalent context "phosphate" means —OP(O)(OH)O— or a deprotonated form thereof; "mercapto" means —SH; and "thio" means =S; "thiocarbonyl" means —C(=S)—; "sulfonyl" means —S$(O)_2$—; and "sulfinyl" means —S(O)—.

In the context of chemical formulas, the symbol "—" means a single bond, "=" means a double bond, and "≡" means triple bond. The symbol "----" represents an optional bond, which if present is either single or double. The symbol "⚌" represents a single bond or a double bond. Thus, the formula

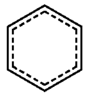

covers, for example,

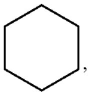, 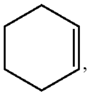, 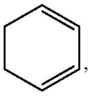, 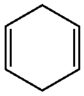 and 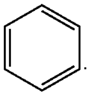.

And it is understood that no one such ring atom forms part of more than one double bond. Furthermore, it is noted that the covalent bond symbol "—", when connecting one or two stereogenic atoms, does not indicate any preferred stereochemistry. Instead, it covers all stereoisomers as well as mixtures thereof. The symbol "∿∿", when drawn perpendicularly across a bond (e.g.,

for methyl) indicates a point of attachment of the group. It is noted that the point of attachment is typically only identified in this manner for larger groups in order to assist the reader in unambiguously identifying a point of attachment. The symbol "◀" means a single bond where the group attached to the thick end of the wedge is "out of the page." The symbol "ıııı|" means a single bond where the group attached to the thick end of the wedge is "into the page". The symbol "∿∿" means a single bond where the geometry around a double bond (e.g., either E or Z) is undefined. Both options, as well as combinations thereof are therefore intended. Any undefined valency on an atom of a structure shown in this application implicitly represents a hydrogen atom bonded to that atom. A bold dot on a carbon atom indicates that the hydrogen attached to that carbon is oriented out of the plane of the paper.

When a variable is depicted as a "floating group" on a ring system, for example, the group "R" in the formula:

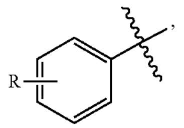

then the variable may replace any hydrogen atom attached to any of the ring atoms, including a depicted, implied, or expressly defined hydrogen, so long as a stable structure is formed. When a variable is depicted as a "floating group" on a fused ring system, as for example the group "R" in the formula:

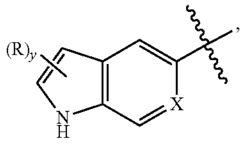

then the variable may replace any hydrogen attached to any of the ring atoms of either of the fused rings unless specified otherwise. Replaceable hydrogens include depicted hydrogens (e.g., the hydrogen attached to the nitrogen in the formula above), implied hydrogens (e.g., a hydrogen of the formula above that is not shown but understood to be present), expressly defined hydrogens, and optional hydrogens whose presence depends on the identity of a ring atom (e.g., a hydrogen attached to group X, when X equals —CH—), so long as a stable structure is formed. In the example depicted, R may reside on either the 5-membered or the 6-membered ring of the fused ring system. In the formula above, the subscript letter "y" immediately following the R enclosed in parentheses, represents a numeric variable. Unless specified otherwise, this variable can be 0, 1, 2, or any integer greater than 2, only limited by the maximum number of replaceable hydrogen atoms of the ring or ring system.

For the chemical groups and compound classes, the number of carbon atoms in the group or class is as indicated as follows: "Cn" or "C=n" defines the exact number (n) of carbon atoms in the group/class. "C≤n" defines the maximum number (n) of carbon atoms that can be in the group/class, with the minimum number as small as possible for the group/class in question. For example, it is understood that the minimum number of carbon atoms in the groups "alkyl$_{(C\leq8)}$", "alkanediyl$_{(C\leq8)}$", "heteroaryl$_{(C\leq8)}$", and "acyl$_{(C\leq8)}$" is one, the minimum number of carbon atoms in the groups "alkenyl$_{(C\leq8)}$", "alkynyl$_{(C\leq8)}$", and "heterocycloalkyl$_{(C\leq8)}$" is two, the minimum number of carbon atoms in the group "cycloalkyl$_{(C\leq8)}$" is three, and the minimum number of carbon atoms in the groups "aryl$_{(C\leq8)}$" and "arenediyl$_{(C\leq8)}$" is six. "Cn-n'" defines both the minimum (n) and maximum number (n') of carbon atoms in the group. Thus, "alkyl$_{(C2-10)}$" designates those alkyl groups having from 2 to 10 carbon atoms. These carbon number indicators may precede or follow the chemical groups or class it modifies and it may or may not be enclosed in parenthesis, without signifying any change in meaning. Thus, the terms "$C_{1-4}$-alkyl", "$C_{1-4}$-alkyl", "alkyl$_{(C1-4)}$", and "alkyl$_{(C\leq4)}$" are all synonymous. Except as noted below, every carbon atom is counted to determine whether the group or compound falls with the specified number of carbon atoms. For example, the group dihexylamino is an example of a dialkylamino$_{(C12)}$ group; however, it is not an example of a dialkylamino$_{(C6)}$ group. Likewise, phenylethyl is an example of an aralkyl$_{(C=8)}$ group. When any of the chemical groups or compound classes defined herein is modified by the term "substituted", any carbon atom in the moiety replacing the hydrogen atom is not counted. Thus methoxyhexyl, which has a total of seven carbon atoms, is an example of a substituted alkyl$_{(C1-6)}$. Unless specified otherwise, any chemical group or compound class listed in a claim set without a carbon atom limit has a carbon atom limit of less than or equal to twelve.

The term "saturated" when used to modify a compound or chemical group means the compound or chemical group has no carbon-carbon double and no carbon-carbon triple bonds, except as noted below. When the term is used to modify an atom, it means that the atom is not part of any double or triple bond. In the case of substituted versions of saturated groups, one or more carbon oxygen double bond or a carbon nitrogen double bond may be present. And when such a bond is present, then carbon-carbon double bonds that may occur as part of keto-enol tautomerism or imine/enamine tautomerism are not precluded. When the term "saturated" is used to modify a solution of a substance, it means that no more of that substance can dissolve in that solution.

The term "aliphatic" signifies that the compound or chemical group so modified is an acyclic or cyclic, but non-aromatic compound or group. In aliphatic compounds/groups, the carbon atoms can be joined together in straight chains, branched chains, or non-aromatic rings (alicyclic). Aliphatic compounds/groups can be saturated, that is joined by single carbon-carbon bonds (alkanes/alkyl), or unsaturated, with one or more carbon-carbon double bonds (alkenes/alkenyl) or with one or more carbon-carbon triple bonds (alkynes/alkynyl).

The term "aromatic" signifies that the compound or chemical group so modified has a planar unsaturated ring of atoms with 4n+2 electrons in a fully conjugated cyclic 71 system. An aromatic compound or chemical group may be depicted as a single resonance structure; however, depiction of one resonance structure is taken to also refer to any other resonance structure. For example:

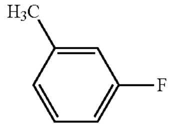

is also taken to refer to

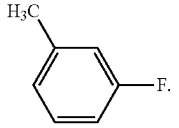

Aromatic compounds may also be depicted using a circle to represent the delocalized nature of the electrons in the fully conjugated cyclic 71 system, two non-limiting examples of which are shown below:

The term "alkyl" refers to a monovalent saturated aliphatic group with a carbon atom as the point of attachment, a linear or branched acyclic structure, and no atoms other than carbon and hydrogen. The groups $-CH_3$ (Me), $-CH_2CH_3$ (Et), $-CH_2CH_2CH_3$ (n-Pr or propyl), $-CH(CH_3)_2$ (i-Pr, $^{i}$Pr or isopropyl), $-CH_2CH_2CH_2CH_3$ (n-Bu), $-CH(CH_3)CH_2CH_3$ (sec-butyl), $-CH_2CH(CH_3)_2$ (isobutyl), $-C(CH_3)_3$ (tert-butyl, t-butyl, t-Bu or $^{t}$Bu), and $-CH_2C(CH_3)_3$ (neo-pentyl) are non-limiting examples of alkyl groups. The term "alkanediyl" refers to a divalent saturated aliphatic group, with one or two saturated carbon atom(s) as the point(s) of attachment, a linear or branched acyclic structure, no carbon-carbon double or triple bonds, and no atoms other than carbon and hydrogen. The groups $-CH_2-$ (methylene), $-CH_2CH_2-$, $-CH_2C(CH_3)_2CH_2-$, and $-CH_2CH_2CH_2-$ are non-limiting examples of alkanediyl groups. The term "alkylidene" refers to the divalent group $=CRR'$ in which R and R' are independently hydrogen or alkyl. Non-limiting examples of alkylidene groups include: $=CH_2$, $=CH(CH_2CH_3)$, and $=C(CH_3)_2$. An "alkane" refers to the class of compounds having the formula H—R, wherein R is alkyl as this term is defined above.

The term "cycloalkyl" refers to a monovalent saturated aliphatic group with a carbon atom as the point of attachment, said carbon atom forming part of one or more non-aromatic ring structures, no carbon-carbon double or triple bonds, and no atoms other than carbon and hydrogen. If more than one ring is present, the rings may be fused, bridged, or spirocyclic. Non-limiting examples include: $-CH(CH_2)_2$ (cyclopropyl), cyclobutyl, cyclopentyl, or cyclohexyl (Cy). As used herein, the term does not preclude the presence of one or more alkyl groups (carbon number limitation permitting) attached to a carbon atom of the non-aromatic ring structure. The term "cycloalkanediyl" refers to a divalent saturated aliphatic group with two carbon atoms as points of attachment, no carbon-carbon double or triple bonds, and no atoms other than carbon and hydrogen. The group

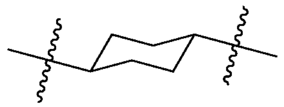 [SMILES: *C1CCC(*)CC1]

is a non-limiting example of cycloalkanediyl group. A "cycloalkane" refers to the class of compounds having the formula H—R, wherein R is cycloalkyl as this term is defined above.

The term "alkenyl" refers to a monovalent unsaturated aliphatic group with a carbon atom as the point of attachment, a linear or branched, acyclic structure, at least one nonaromatic carbon-carbon double bond, no carbon-carbon triple bonds, and no atoms other than carbon and hydrogen. Non-limiting examples include: $-CH=CH_2$ (vinyl), $-CH=CHCH_3$, $-CH=CHCH_2CH_3$, $-CH_2CH=CH_2$ (allyl), $-CH_2CH=CHCH_3$, and $-CH=CHCH=CH_2$. The term "alkenediyl" refers to a divalent unsaturated aliphatic group, with two carbon atoms as points of attachment, a linear or branched acyclic structure, at least one nonaromatic carbon-carbon double bond, no carbon-carbon triple bonds, and no atoms other than carbon and hydrogen. The groups $-CH=CH-$, $-CH=C(CH_3)CH_2-$, $-CH=CHCH_2-$, and $-CH_2CH=CHCH_2-$ are non-limiting examples of alkenediyl groups. It is noted that while the alkenediyl group is aliphatic, once connected at both ends, this group is not precluded from forming part of an aromatic structure. The terms "alkene" and "olefin" are synonymous and refer to the class of compounds having the formula H—R, wherein R is alkenyl as this term is defined above. Similarly, the terms "terminal alkene" and "α-olefin" are synonymous and refer to an alkene having just one carbon-carbon double bond, wherein that bond is part of a vinyl group at an end of the molecule.

The term "alkynyl" refers to a monovalent unsaturated aliphatic group with a carbon atom as the point of attachment, a linear or branched acyclic structure, at least one carbon-carbon triple bond, and no atoms other than carbon and hydrogen. As used herein, the term alkynyl does not preclude the presence of one or more non-aromatic carbon-carbon double bonds. The groups $-C\equiv CH$, $-C\equiv CCH_3$, and $-CH_2C\equiv CCH_3$ are non-limiting examples of alkynyl groups. An "alkyne" refers to the class of compounds having the formula H—R, wherein R is alkynyl.

The term "aryl" refers to a monovalent unsaturated aromatic group with an aromatic carbon atom as the point of attachment, said carbon atom forming part of a one or more aromatic ring structures, each with six ring atoms that are all carbon, and wherein the group consists of no atoms other than carbon and hydrogen. If more than one ring is present, the rings may be fused or unfused. Unfused rings are connected with a covalent bond. As used herein, the term aryl does not preclude the presence of one or more alkyl groups (carbon number limitation permitting) attached to the first aromatic ring or any additional aromatic ring present. Non-limiting examples of aryl groups include phenyl (Ph), methylphenyl, (dimethyl)phenyl, $-C_6H_4CH_2CH_3$ (ethylphenyl), naphthyl, and a monovalent group derived from biphenyl (e.g., 4-phenylphenyl). The term "arenediyl" refers to a divalent aromatic group with two aromatic carbon atoms as points of attachment, said carbon atoms forming part of one or more six-membered aromatic ring structures, each with six ring atoms that are all carbon, and wherein the divalent group consists of no atoms other than carbon and hydrogen. As used herein, the term arenediyl does not preclude the presence of one or more alkyl groups (carbon number limitation permitting) attached to the first aromatic ring or any additional aromatic ring present. If more than one ring is present, the rings may be fused or unfused. Unfused rings are connected with a covalent bond. Non-limiting examples of arenediyl groups include:

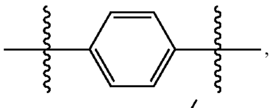,
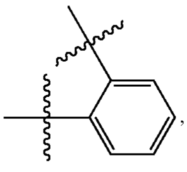,
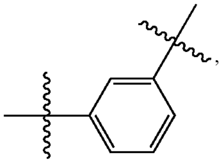,
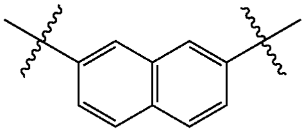
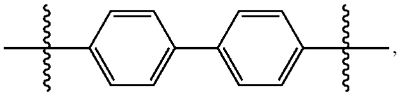, and

-continued

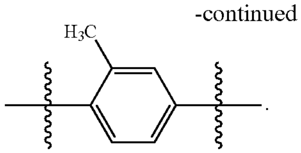

An "arene" refers to the class of compounds having the formula H—R, wherein R is aryl as that term is defined above. Benzene and toluene are non-limiting examples of arenes.

The term "aralkyl" refers to the monovalent group-alkanediyl-aryl, in which the terms alkanediyl and aryl are each used in a manner consistent with the definitions provided above. Non-limiting examples are: phenylmethyl (benzyl, Bn) and 2-phenyl-ethyl.

The term "heteroaryl" refers to a monovalent aromatic group with an aromatic carbon atom or nitrogen atom as the point of attachment, said carbon atom or nitrogen atom forming part of one or more aromatic ring structures, each with three to eight ring atoms, wherein at least one of the ring atoms of the aromatic ring structure(s) is nitrogen, oxygen or sulfur, and wherein the heteroaryl group consists of no atoms other than carbon, hydrogen, aromatic nitrogen, aromatic oxygen and aromatic sulfur. If more than one ring is present, the rings are fused; however, the term heteroaryl does not preclude the presence of one or more alkyl or aryl groups (carbon number limitation permitting) attached to one or more ring atoms. Non-limiting examples of heteroaryl groups include benzoxazolyl, benzimidazolyl, furanyl, imidazolyl (Im), indolyl, indazolyl, isoxazolyl, methylpyridinyl, oxazolyl, oxadiazolyl, phenylpyridinyl, pyridinyl (pyridyl), pyrrolyl, pyrimidinyl, pyrazinyl, quinolyl, quinazolyl, quinoxalinyl, triazinyl, tetrazolyl, thiazolyl, thienyl, and triazolyl. The term "N-heteroaryl" refers to a heteroaryl group with a nitrogen atom as the point of attachment. A "heteroarene" refers to the class of compounds having the formula H—R, wherein R is heteroaryl. Pyridine and quinoline are non-limiting examples of heteroarenes.

The term "heterocycloalkyl" refers to a monovalent non-aromatic group with a carbon atom or nitrogen atom as the point of attachment, said carbon atom or nitrogen atom forming part of one or more non-aromatic ring structures, each with three to eight ring atoms, wherein at least one of the ring atoms of the non-aromatic ring structure(s) is nitrogen, oxygen or sulfur, and wherein the heterocycloalkyl group consists of no atoms other than carbon, hydrogen, nitrogen, oxygen and sulfur. If more than one ring is present, the rings may be fused, bridged, or spirocyclic. As used herein, the term does not preclude the presence of one or more alkyl groups (carbon number limitation permitting) attached to one or more ring atoms. Also, the term does not preclude the presence of one or more double bonds in the ring or ring system, provided that the resulting group remains non-aromatic. Non-limiting examples of heterocycloalkyl groups include aziridinyl, azetidinyl, pyrrolidinyl, piperidinyl, piperazinyl, morpholinyl, thiomorpholinyl, tetrahydrofuranyl, tetrahydrothiofuranyl, tetrahydropyranyl, pyranyl, oxiranyl, and oxetanyl. The term "N-heterocycloalkyl" refers to a heterocycloalkyl group with a nitrogen atom as the point of attachment. N-pyrrolidinyl is an example of such a group.

The term "acyl" refers to the group —C(O)R, in which R is a hydrogen, alkyl, cycloalkyl, or aryl as those terms are defined above. The groups, —CHO, —C(O)$CH_3$ (acetyl, Ac), —C(O)$CH_2CH_3$, —C(O)CH$(CH_3)_2$, —C(O)CH$(CH_2)_2$, —C(O)$C_6H_5$, and —C(O)$C_6H_4CH_3$ are non-limiting examples of acyl groups. A "thioacyl" is defined in an analogous manner, except that the oxygen atom of the group —C(O)R has been replaced with a sulfur atom, —C(S)R. The term "aldehyde" corresponds to an alkyl group, as defined above, attached to a —CHO group.

The term "alkoxy" refers to the group —OR, in which R is an alkyl, as that term is defined above. Non-limiting examples include: —$OCH_3$ (methoxy), —$OCH_2CH_3$ (ethoxy), —$OCH_2CH_2CH_3$, —OCH$(CH_3)_2$ (isopropoxy), or —OC$(CH_3)_3$ (tert-butoxy). The terms "cycloalkoxy", "alkenyloxy", "alkynyloxy", "aryloxy", "aralkoxy", "heteroaryloxy", "heterocycloalkoxy", and "acyloxy", when used without the "substituted" modifier, refers to groups, defined as —OR, in which R is cycloalkyl, alkenyl, alkynyl, aryl, aralkyl, heteroaryl, heterocycloalkyl, and acyl, respectively. The term "alkylthio" and "acylthio" refers to the group —SR, in which R is an alkyl and acyl, respectively. The term "alcohol" corresponds to an alkane, as defined above, wherein at least one of the hydrogen atoms has been replaced with a hydroxy group. The term "ether" corresponds to an alkane, as defined above, wherein at least one of the hydrogen atoms has been replaced with an alkoxy group.

The term "alkylamino" refers to the group —NHR, in which R is an alkyl, as that term is defined above. Non-limiting examples include: —$NHCH_3$ and —$NHCH_2CH_3$. The term "dialkylamino" refers to the group —NRR', in which R and R' can be the same or different alkyl groups. Non-limiting examples of dialkylamino groups include: —N$(CH_3)_2$ and —N$(CH_3)(CH_2CH_3)$. The term "amido" (acylamino), when used without the "substituted" modifier, refers to the group —NHR, in which R is acyl, as that term is defined above. A non-limiting example of an amido group is —NHC(O)$CH_3$.

When a chemical group is used with the "substituted" modifier, one or more hydrogen atom has been replaced, independently at each instance, by —OH, —F, —Cl, —Br, —I, —$NH_2$, —$NO_2$, —$CO_2H$, —$CO_2CH_3$, —$CO_2CH_2CH_3$, —CN, —SH, —$OCH_3$, —$OCH_2CH_3$, —C(O)$CH_3$, —$NHCH_3$, —$NHCH_2CH_3$, —N$(CH_3)_2$, —C(O)$NH_2$, —C(O)$NHCH_3$, —C(O)N$(CH_3)_2$, —OC(O)$CH_3$, —NHC(O)$CH_3$, —S$(O)_2$OH, or —S$(O)_2NH_2$. For example, the following groups are non-limiting examples of substituted alkyl groups: —$CH_2OH$, —$CH_2Cl$, —$CF_3$, —$CH_2CN$, —$CH_2$C(O)OH, —$CH_2$C(O)$OCH_3$, —$CH_2$C(O)$NH_2$, —$CH_2$C(O)$CH_3$, —$CH_2OCH_3$, —$CH_2$OC(O)$CH_3$, —$CH_2NH_2$, —$CH_2$N$(CH_3)_2$, and —$CH_2CH_2Cl$. The term "haloalkyl" is a subset of substituted alkyl, in which the hydrogen atom replacement is limited to halo (i.e. —F, —Cl, —Br, or —I) such that no other atoms aside from carbon, hydrogen and halogen are present. The group, —$CH_2Cl$ is a non-limiting example of a haloalkyl. The term "fluoroalkyl" is a subset of substituted alkyl, in which the hydrogen atom replacement is limited to fluoro such that no other atoms aside from carbon, hydrogen and fluorine are present. The groups —$CH_2F$, —$CF_3$, and —$CH_2CF_3$ are non-limiting examples of fluoroalkyl groups. Non-limiting examples of substituted aralkyls are: (3-chlorophenyl)-methyl, and 2-chloro-2-phenyl-eth-1-yl. The groups, —C(O)$CH_2CF_3$, —$CO_2H$ (carboxyl), —$CO_2CH_3$ (methylcarboxyl), —$CO_2CH_2CH_3$, —C(O)$NH_2$ (carbamoyl), and —CON$(CH_3)_2$, are non-limiting examples of substituted acyl groups. The groups —NHC(O)$OCH_3$ and —NHC(O)$NHCH_3$ are non-limiting examples of substituted amido groups.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects or patients.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "effective," as that term is used in the specification and/or claims, means adequate to accomplish a desired, expected, or intended result.

The term "hydrate" when used as a modifier to a compound means that the compound has less than one (e.g., hemihydrate), one (e.g., monohydrate), or more than one (e.g., dihydrate) water molecules associated with each compound molecule, such as in solid forms of the compound.

An "isomer" of a first compound is a separate compound in which each molecule contains the same constituent atoms as the first compound, but where the configuration of those atoms in three dimensions differs.

A "stereoisomer" or "optical isomer" is an isomer of a given compound in which the same atoms are bonded to the same other atoms, but where the configuration of those atoms in three dimensions differs. "Enantiomers" are stereoisomers of a given compound that are mirror images of each other, like left and right hands. "Diastereomers" are stereoisomers of a given compound that are not enantiomers. Chiral molecules contain a chiral center, also referred to as a stereocenter or stereogenic center, which is any point, though not necessarily an atom, in a molecule bearing groups such that an interchanging of any two groups leads to a stereoisomer. In organic compounds, the chiral center is typically a carbon, phosphorus or sulfur atom, though it is also possible for other atoms to be stereocenters in organic and inorganic compounds. A molecule can have multiple stereocenters, giving it many stereoisomers. In compounds whose stereoisomerism is due to tetrahedral stereogenic centers (e.g., tetrahedral carbon), the total number of hypothetically possible stereoisomers will not exceed $2^n$, where n is the number of tetrahedral stereocenters. Molecules with symmetry frequently have fewer than the maximum possible number of stereoisomers. A 50:50 mixture of enantiomers is referred to as a racemic mixture. Alternatively, a mixture of enantiomers can be enantiomerically enriched so that one enantiomer is present in an amount greater than 50%. Typically, enantiomers and/or diastereomers can be resolved or separated using techniques known in the art. It is contemplated that that for any stereocenter or axis of chirality for which stereochemistry has not been defined, that stereocenter or axis of chirality can be present in its R form, S form, or as a mixture of the R and S forms, including racemic and non-racemic mixtures. As used herein, the phrase "substantially free from other stereoisomers" means that the composition contains ≤15%, more preferably ≤10%, even more preferably ≤5%, or most preferably ≤1% of another stereoisomer(s).

A "repeat unit", also referred to as a "subunit", is the simplest structural entity of certain materials, for example, frameworks and/or polymers, whether organic, inorganic or metal-organic. In the case of a polymer chain, repeat units are linked together successively along the chain, like the beads of a necklace. For example, in polyethylene, $-[-CH_2CH_2-]_n-$, the repeat unit is $-CH_2CH_2-$. The subscript "n" denotes the degree of polymerization, that is, the number of repeat units linked together. When the value for "n" is left undefined or where "n" is absent, it simply designates repetition of the formula within the brackets as well as the polymeric nature of the material. The concept of a repeat unit applies equally to where the connectivity between the repeat units extends three dimensionally, such as in metal organic frameworks, modified polymers, thermosetting polymers, etc.

The above definitions supersede any conflicting definition in any reference that is incorporated by reference herein. The fact that certain terms are defined, however, should not be considered as indicative that any term that is undefined is indefinite. Rather, all terms used are believed to describe the invention in terms such that one of ordinary skill can appreciate the scope and practice the present invention.

C. Polymers Components of Polymer-Calixpyrrole Compounds Described Herein

The present disclosure relates to a strapped calixpyrrole that may be used in conjunction with one or more polymer. The calixpyrrole may be affixed to a polymer backbone. In some embodiments, the strapped calixpyrrole may be affixed to a polymer such as a polystyrene, polyvinyl, polyacrylate, polymethacrylate, polyethylene, polypropylene, polyethylene glycol, polypropylene glycol, or a polylactone. These polymers may be prepared using a monomer of the formula such as those defined below:

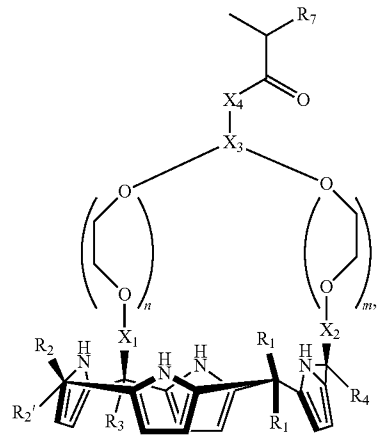

-continued
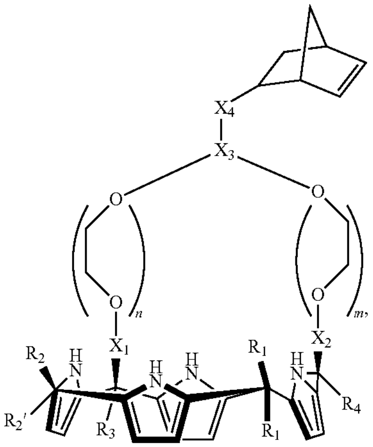
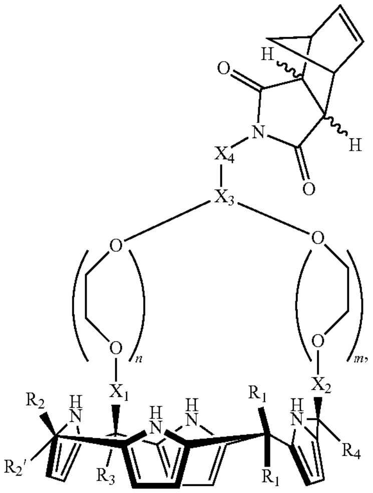
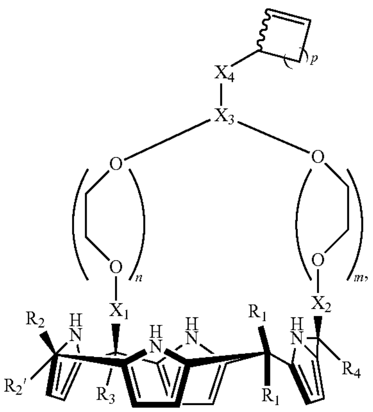
-continued
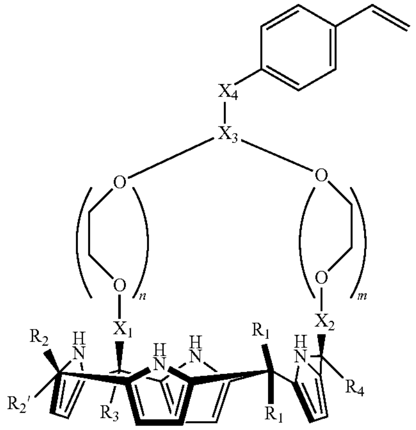
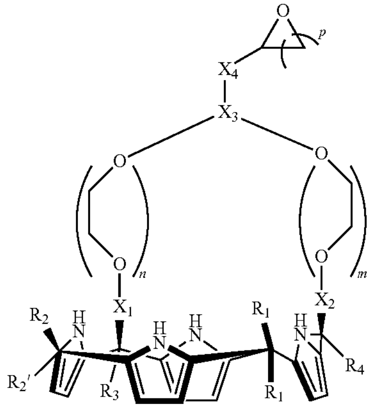
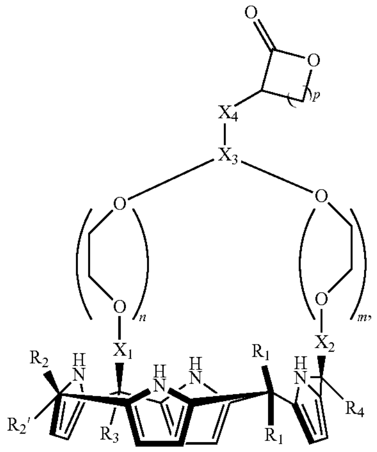
or
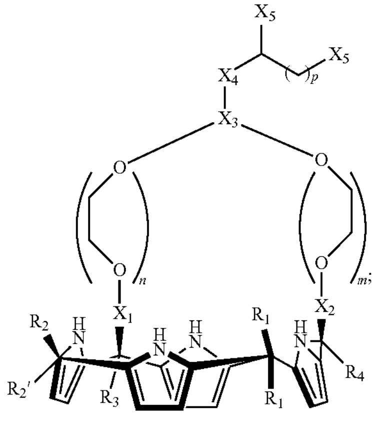

an aliphatic or aromatic tether consisting of carbon, hydrogen, oxygen, or nitrogen atoms. In some embodiments, the tether has between 2 non-hydrogen atoms and 24 non-hydrogen atoms. In some embodiments, the tether has between 3 non-hydrogen atoms and 12 non-hydrogen atoms. The other variables are as defined herein. In particular, $X_5$ may be a linker group such as an amine including an alkylamine or dialkylamine, alcohol, carboxylic acid, isocyanate, or acid halide. In these compounds, p may be an integer between 0 and 12. These compounds will produce a final polymer of the formula:

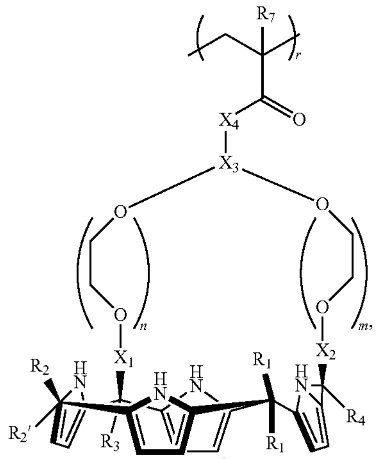

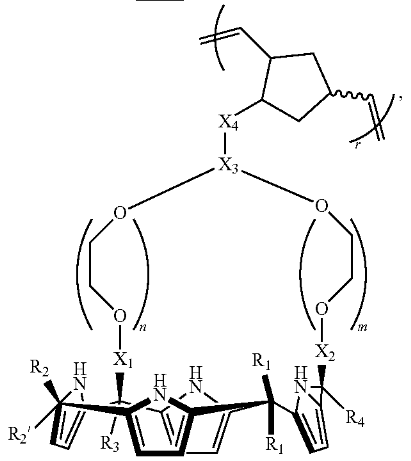

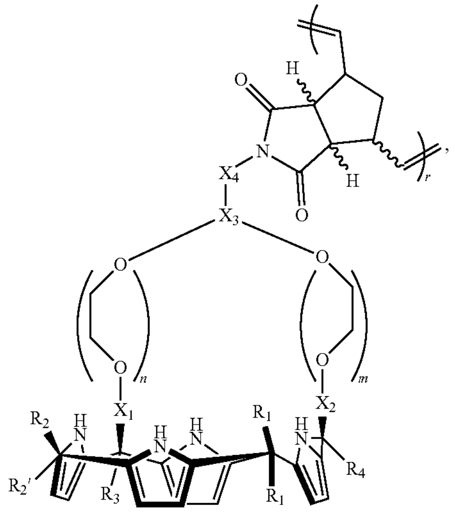

-continued

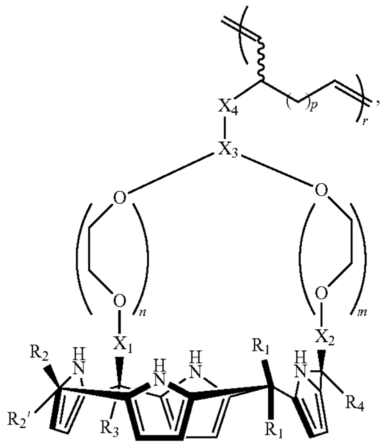

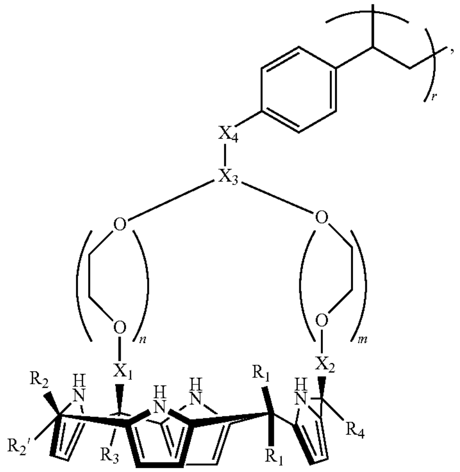

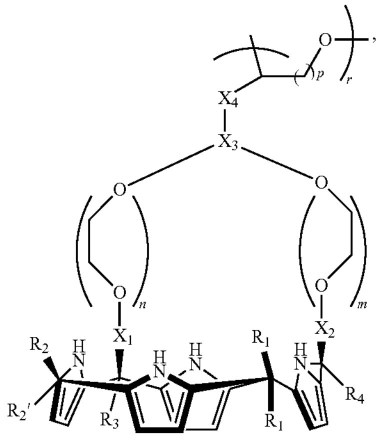

-continued

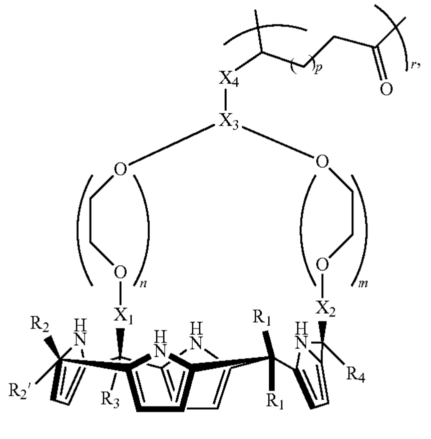

or

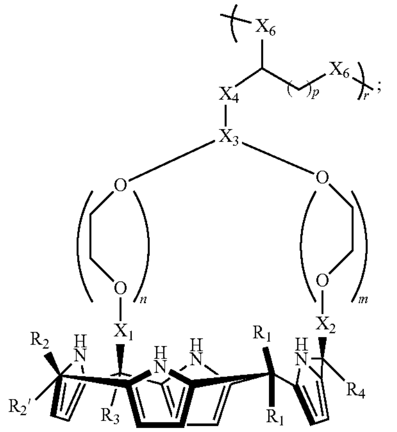

or the corresponding structure as the other isomeric form of the calixpyrrole. $X_4$ is as defined above, while $X_6$ is an ester, an ether, an amide, a carbonate, a carbamate, or a urea group.

D. Calixpyrrole Component of Polymer-Calixpyrrole Compounds Described Herein

In some embodiments, the present compounds may have a strapped calixpyrrole as part of the compounds. These strapped calixpyrrole may form two different regioisomers each having the (IA)

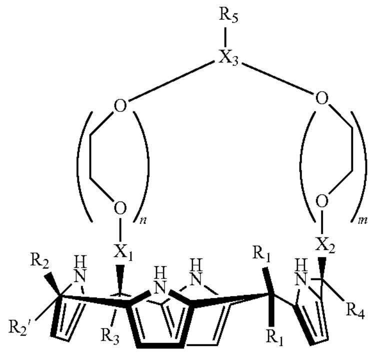

or

-continued (IB)

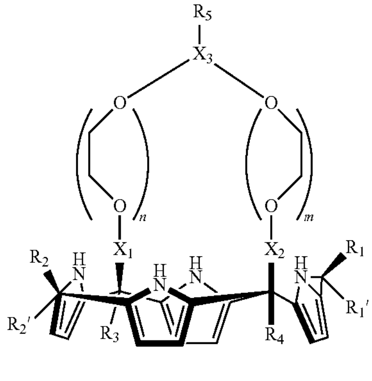

As used herein, when the calixpyrrole component is referred to as including the other regioisomer, then both of the regioisomers shown above are intended regardless of which one is shown by chemical structure.

E. Lithium Extractions

The present disclosure relates to the preparation of one or more new calixpyrroles and polymers comprising these calixpyrroles. These compositions may be used to separate lithium such as lithium chloride from a solution. It is contemplated that the compositions prepared as described herein may be used in either the liquid phase or in the solid phase such as affixed to the polymeric component. Similarly, the lithium may be in either the liquid phase, but the solid phase may also be possible when the calixpyrrole compound is in the solution phase. The lithium may further be in the presence of one or two other cations such as sodium, magnesium, calcium, or potassium. The calixpyrrole is contemplated to have at least a 2 fold, 3 fold, 4 fold, 5 fold, 6 fold, 8 fold, or 10 fold or greater selectivity for the lithium over the other cations present.

EXAMPLES

The following examples are included to demonstrate preferred embodiments of the disclosure. It should be appreciated by those of skill in the art that the techniques disclosed in the examples which follow represent techniques discovered by the inventor to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

Example 1: Strapped Calix[4]Pyrroles for Selective LiCl Extraction

A. Results and Discussion

Calix[4]pyrroles, non-aromatic tetrapyrrolic macrocycles, have attracted attention for their ability to recognize neutral molecules, anions, and ion pairs (Kim and Sessler, 2014; Miyaji et al., 2000; Custelsean et al., 2005. In recent years, calix[4]pyrroles have been explored as potential sensors (Nishiyabu et al., 2006), catalysts (Buranaprasertsuk et al., 2007), extractants (Ji et al., 2019), ion transporters (Park et al., 2012; Ko Park et al., 2014; Kim et al., 2015), and drug carriers (Cafeo et al., 2013). Compared to simple calix[4]pyrroles, so-called strapped calix[4]pyrroles, systems wherein the macrocyclic core is bridged by one or more tethers, typically display enhanced affinities and greater selectivity towards certain ion pair guests (Peng et al., 2020; Miyaji et al., 2005; He et al., 2016; Kim et al., 2012; Thiampanya et al., 2012; Lee et al., 2005; Kim et al., 2009; Kim et al., 2014). For instance, in 2016 a hemispherand-strapped calix[4]pyrrole was reported that exhibits selectivity for lithium salts (He et al., 2018). This receptor was found to form 1:1 ion-pair complexes with LiCl, LiBr, LiI, $LiNO_2$, and $LiNO_3$ in preference over the corresponding sodium and potassium salts under both model solid-liquid extraction (SLE) and liquid-liquid extraction conditions (LLE). Subsequently, a hemispherand-strapped calix[4]pyrrole was reported that could selectively absorb LiCl under SLE conditions (nitrobenzene) (He et al., 2018). A phenanthroline-strapped calix[4]pyrrole was also reported that absorbs LiCl under both model solid-liquid (nitrobenzene) and liquid-liquid extraction ($CHCl_3$/water) conditions. Jang and co-workers synthesized a triazole-bearing strapped calix[4]pyrrole as a lithium selective ion pair receptor (Hong et al., 2020). This receptor proved effective at bringing lithium salts into an organic phase under liquid-liquid ($CH_2Cl_2$/water) extraction conditions. Early on Smith and coworkers created lithium ion pair receptors (Mahoney et al., 2004). This prior work has served to underscore the potential utility of appropriately designed small molecule receptors for extracting LiCl and LiBr from the solid state and bind these salts as water-separated ion pairs. Unfortunately, when functioning as extractants, small molecules can be difficult to remove from solution; this can provide limitations to reuse and recycling. In addition, LLE procedures can be plagued by the formation of so-called third phases. For some time, the use of receptor-functionalized polymers for the targeting of specific guests has been explored. In the context of lithium separations, such putative polymeric materials would be attractive in that they could be separated by physical means (e.g., by lifting out from the medium), and subject to treatments, such as washing with a different solvent or dialysis, that would allow for lithium release following initial capture. In principle, this should facilitate use. Efforts were made to test this promise.

Initially, an effort was made to functionalize previously reported lithium salt receptors such that they could be converted to a polymerizable monomer (e.g., an acrylate ester). Unfortunately, in spite of the expectations, it was found that carboxylate-bearing versions of first generation hemispherand systems proved relatively ineffective as lithium cation receptors. Therefore, a strapped calix[4]pyrrole was designed containing a relatively large crown ether moiety that was expected to wrap around a bound lithium cation while allowing calix[4]pyrrole NH proton-based binding of the $Li^+$ counter anion (e.g., $Cl^-$). In the last step of the ring-forming reaction, two crown ether strapped calix[4]pyrroles were obtained (H1 and H2), characterized by different substitution patterns. The first of these, H1, is linked through the 15α and 20α positions of the calix[4]pyrrole ring, whereas H2 is substituted at the 10α and 20α positions. These two isomers, obtained in 15% and 20% yield, respectively, result presumably from scrambling of the dipyrrolic precursors under the Lewis acid ($BF_3.Et_2O$) catalyzed condensation conditions.

Figures 1A, 1B:
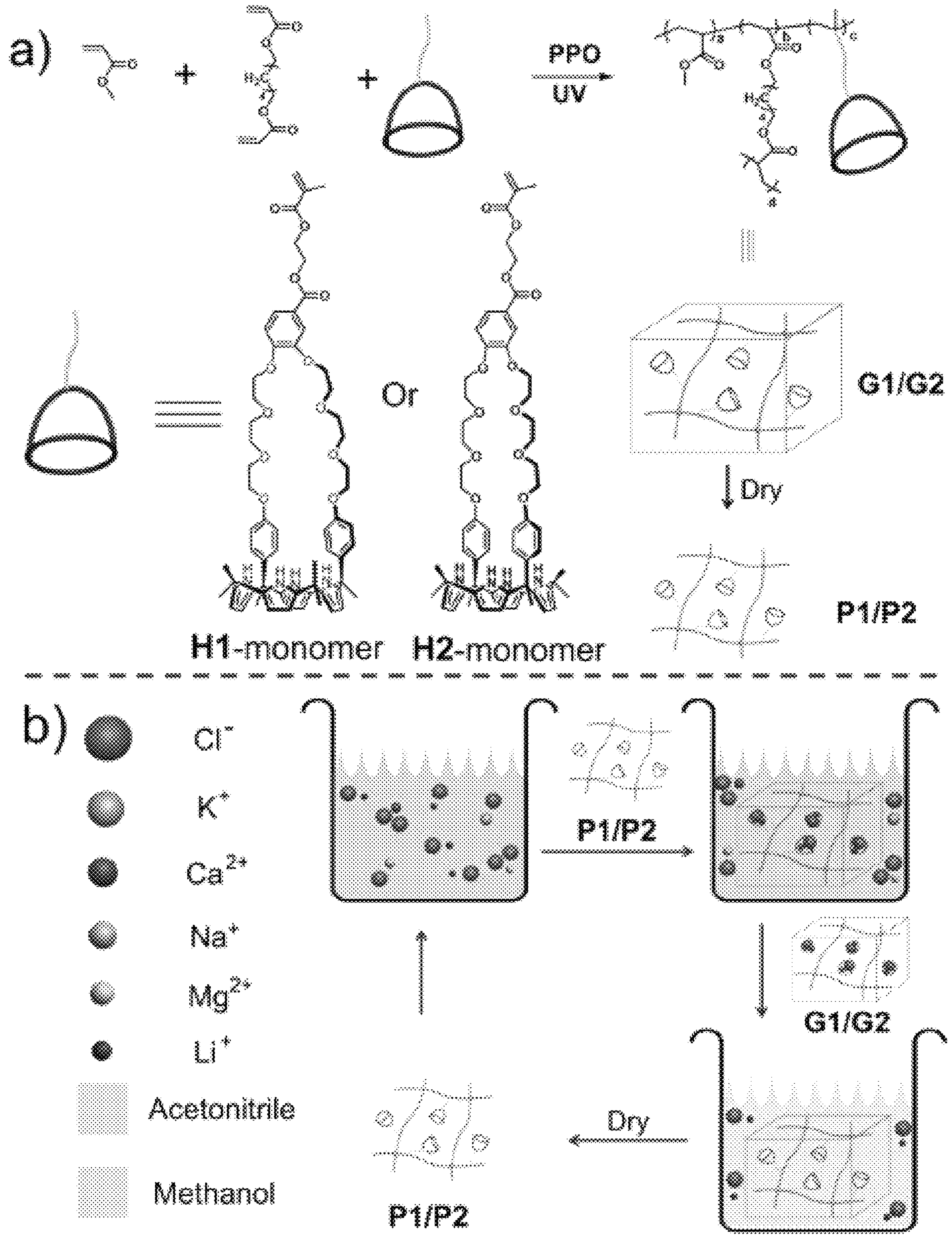
FIGS. 1A & 1B show chemical structures and cartoon representations of the polymeric materials P1/P2 described herein (FIG. 1A); and LiCl removal from acetonitrile by use of a polymeric networks P1/P2 containing receptors H1/H2 (FIG. 1B); and regeneration process for the resulting gels, G1/G2. A control polymer (P) was obtained by carrying out the initial polymerization without either H1-monomer or H2-monomer. This gave gel G upon exposure to acetonitrile.
Figures 2A, 2B:
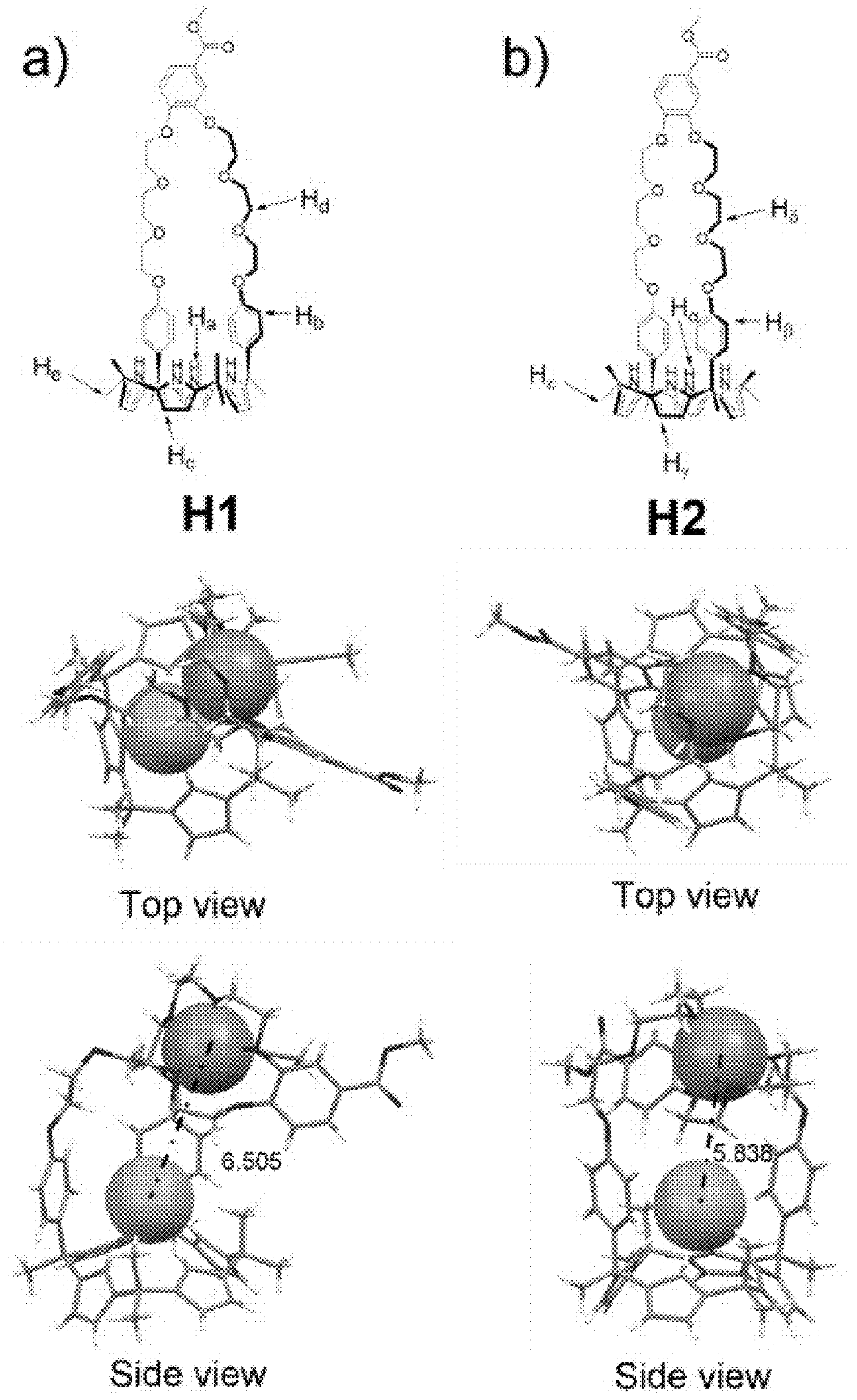
FIGS. 2A &2B show single-crystal structures of the complex H1-LiCl (FIG. 2A) and H2-LiCl (FIG. 2B). The LiCl is shown in space-filling representations. Other anions have been omitted for clarity. Li, dark gray; Cl, light gray.
Figure 3A:
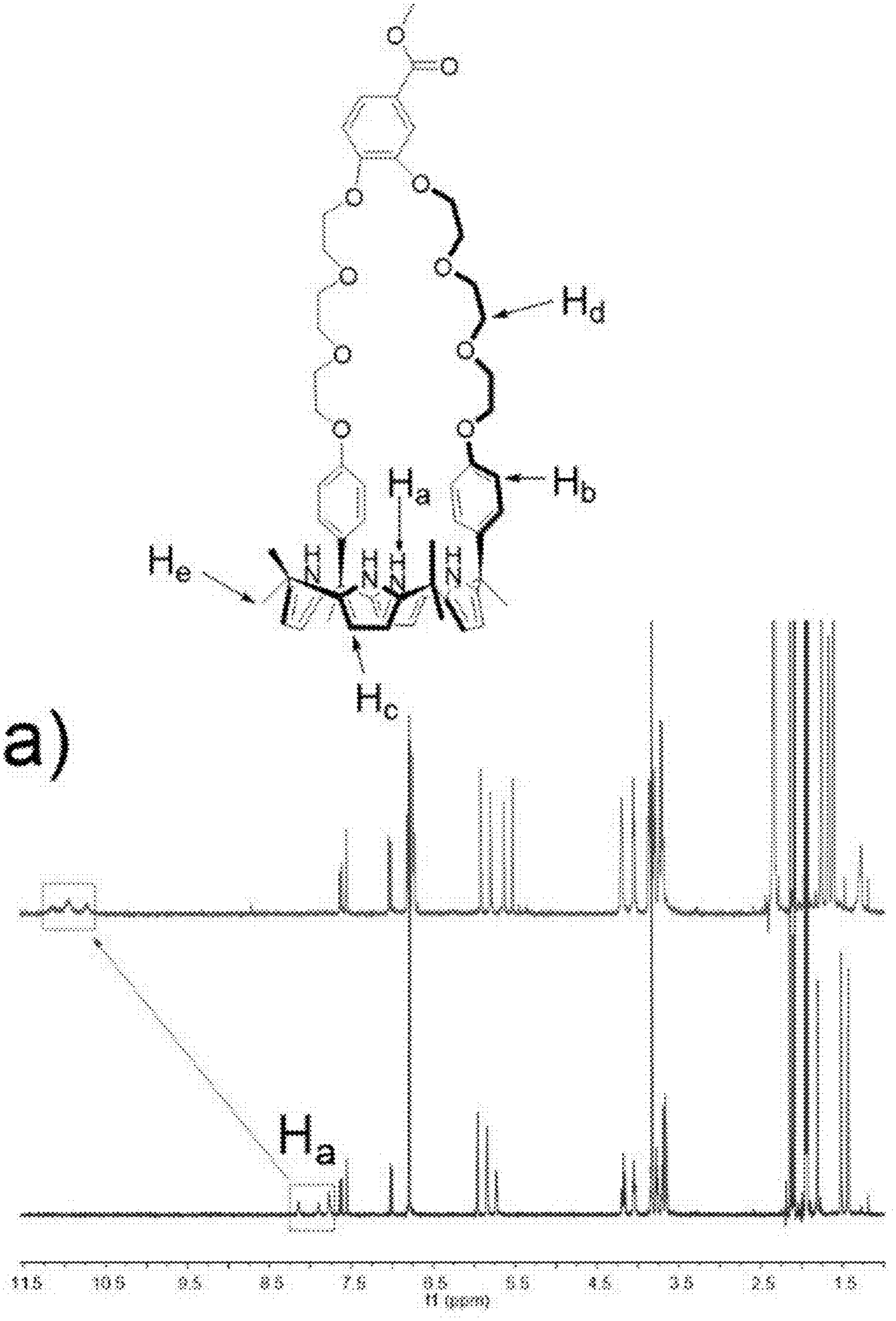
FIGS. 3A-3F show the host-guest interaction of H1 and H2 with LiCl, respectively. $^1$H NMR spectra (400 MHz, $CD_3CN$, 298 K) of 11, H2 and their complexes (1:1) with LiCl.
Figures 3B, 3C:
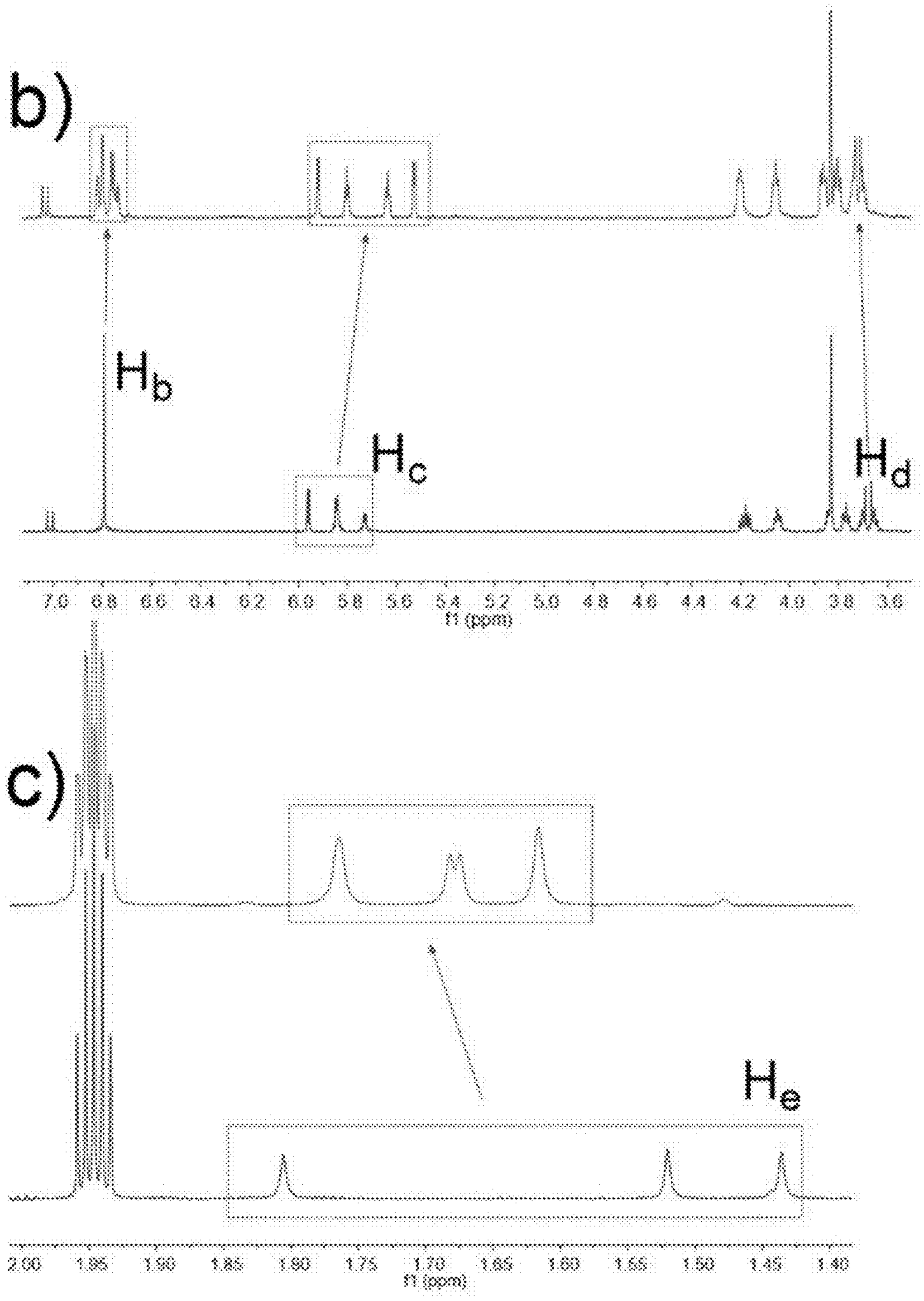
Figure 3D:
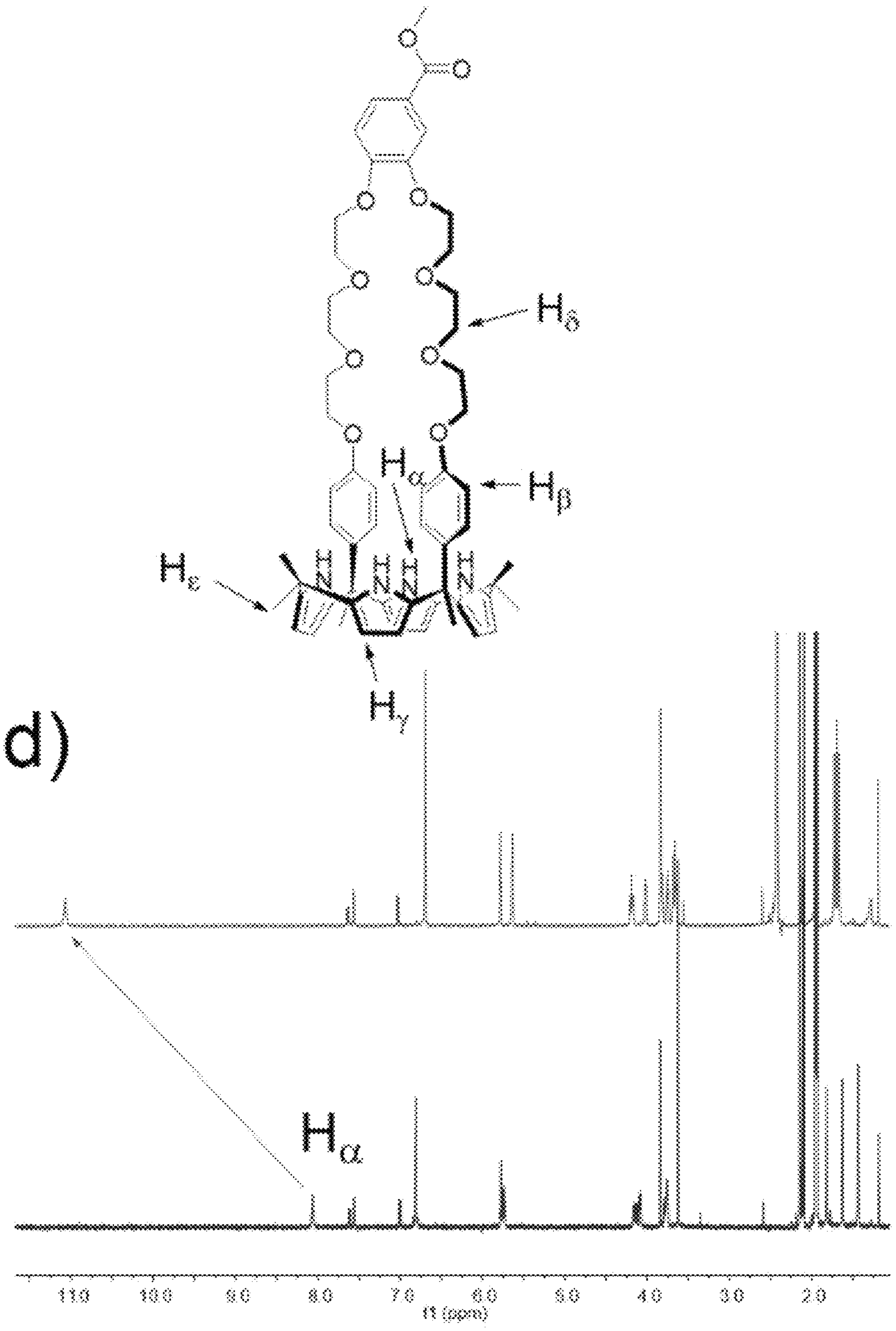
Figures 3E, 3F:
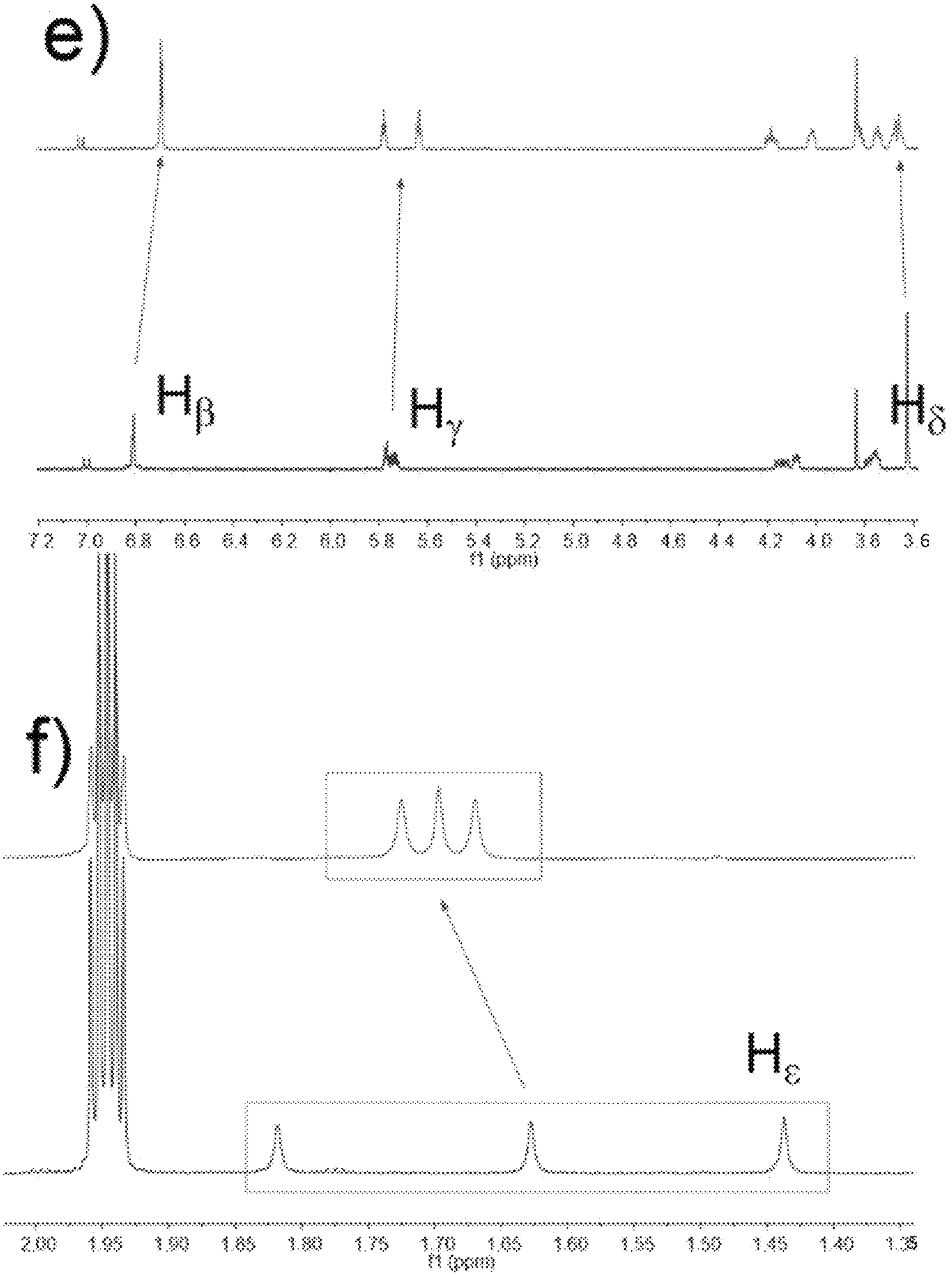

The configurations of H1 and H2 were confirmed via single crystal X-ray diffraction analyses of the respective LiCl host-guest complexes (FIG. 2). Single crystals of H1-LiCl and H2-LiCl were obtained by allowing isopropyl ether to diffuse slowly into acetonitrile solutions of H1+LiCl or H2+LiCl, respectively. The resulting structures served not only to establish the connectivity patterns for H1 and H2, but also their ability to complex lithium chloride as co-bound ion pairs in the solid state. In the case of H1-LiCl, the $Li^+$ cation forms six coordination bonds with five oxygen atoms and an acetonitrile molecule as inferred from the metric parameters. As a result, the crown ether strap is twisted. As typical for calix[4]anion complexes, the $Cl^-$ anion in H1-LiCl is stabilized via four hydrogen bonding interactions with the pyrrolic NH protons. The $Li^+$ cation and $Cl^-$ anion are separated, and the Li $Cl^-$ distance is 6.505 Å. In H2-LiCl, the $Li^+$ cation is bound to five oxygen atoms with no participation of solvent. The crown ether strap is again twisted and the $Li^+$ cation is complexed within the upper region of the receptor, while the $Cl^-$ anion forms four hydrogen bonds with the calix[4]pyrrole NH protons. The $Li^+$ . . . $Cl^-$ distance is 5.838 Å. It is to be noted that in both complexes the two oxygen atoms closest to the pyrrole ring do not participate in the coordination of the bound $Li^+$ cation. This may reflect the fact that the benzene ring connected to the pyrrole ring cannot adopt a conformation suitable for cation complexation. Without wishing to be bound by any theory, the maximum number of oxygen atoms available for cation recognition would be only 6, leading to the surprising and unexpected postulate that H1 and H2 would be selective for LiCl over other common halide salts.

Efforts were thus made to test the ability of H1 and H2 to recognize selectively LiCl under conditions relevant to their proposed use as solid-liquid extractants.

Figure 71:
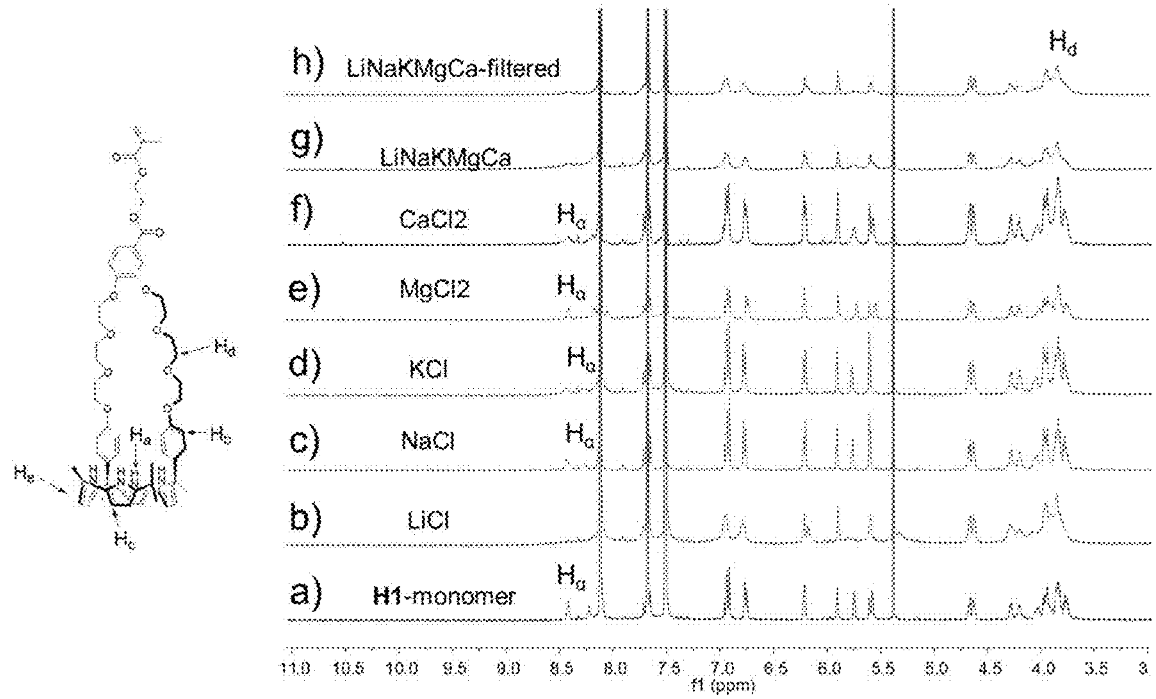

In previous work, it was confirmed that LiCl is considerably less soluble in nitrobenzene than either NaCl or KCl (He et al., 2018, Table S5). Specifically, the normalized concentrations of LiCl, NaCl, and KCl were found to be 1:1755:101 as determined by ICP-MS. Nitrobenzene was thus selected as an initial solvent with which to test whether H1 or H2 would function as an extractant under SLE conditions. Because most of H1 and H2 have been converted into H1-monomer and H2-monomer. So here, we choose H1-monomer and H2-monomer as the research objects to explore their selectivity in nitrobenzene. Accordingly, 5.00 mM solutions of H1 and H2 were made up in nitrobenzene-$d_5$ and contacted with 10 times excess LiCl, NaCl, KCl, $MgCl_2$, and $CaCl_2$) alone and in combination for one week. For H1-monomer (cf. FIG. 71), the pyrrole NH signals $H_a$ disappeared and the peak of protons $H_d$ on the crown ether part became broad after adding LiCl. But $H_a$ and $H_d$ have no change after adding other metal salts NaCl, KCl, $MgCl_2$ and $CaCl_2$). There are a few changes of He after adding $MgCl_2$ and $CaCl_2$). In the mixture of five metal salts, the $^1H$ NMR spectrum keep the same to LiCl. Therefore, H1-monomer have very strong complexation for LiCl and very weak complexation for $MgCl_2$ and $CaCl_2$). But there is no interaction between H1-monomer and NaCl or KCl. Similarly, for H2-monomer (cf. FIG. 72), the pyrrole NH signals H disappeared and appreciable downfield shifts in the pyrrole NH signals (by ca. 3.25 ppm) were seen after adding LiCl. the pyrrole NH signals $H_a$ disappeared and appreciable downfield shifts in the pyrrole NH signals (by ca. 2.02 ppm) were seen after adding $MgCl_2$. the peak of protons $H_d$ on the crown ether part became broad after adding LiCl. But there is no change after adding other metal salts NaCl, KCl and $CaCl_2$). Therefore, H2-monomer has a very strong complexation for LiCl and very weak complexation for $MgCl_2$. But there is no interaction between H1-monomer and NaCl, KCl or $CaCl_2$). On this basis, it is concluded that under these conditions, H1 and H2 are selective for LiCl over other common salts. More quantitative analyses were performed using ICP-MS; again, evidence of lithium extraction in preference over NaCl and KCl was seen (cf. FIG. 73). In SLE, the concentration of Na, K, and Ca decreased after adding H1-monomer and H2-monomer compared to no receptor. While the concentration of Li and Mg increases. But the ratio of the increase in the concentration of Li is higher than that of Mg (cf. FIG. 73*b*).

The greater volatility of acetonitrile (b.p. 82° C.) compared to nitrobenzene (b.p. 210.9° C.) prompted consideration that it would be a more practical medium for use in studies where removal of solvent is important. Literature values of 25.9, 0.04, 0.25, 0.014 and 2.30 mM, respectively, for the solubility of LiCl and NaCl in acetonitrile have been reported (Xie et al., 2000; Li et al., 2010; Burgess et al., 1978). The inherent solubility of LiCl was expected to abet the use of H1 and H2 as SLE extractants, albeit complicating analyses of selectivity.

Figures 4A, 4B, 4C, 4D:
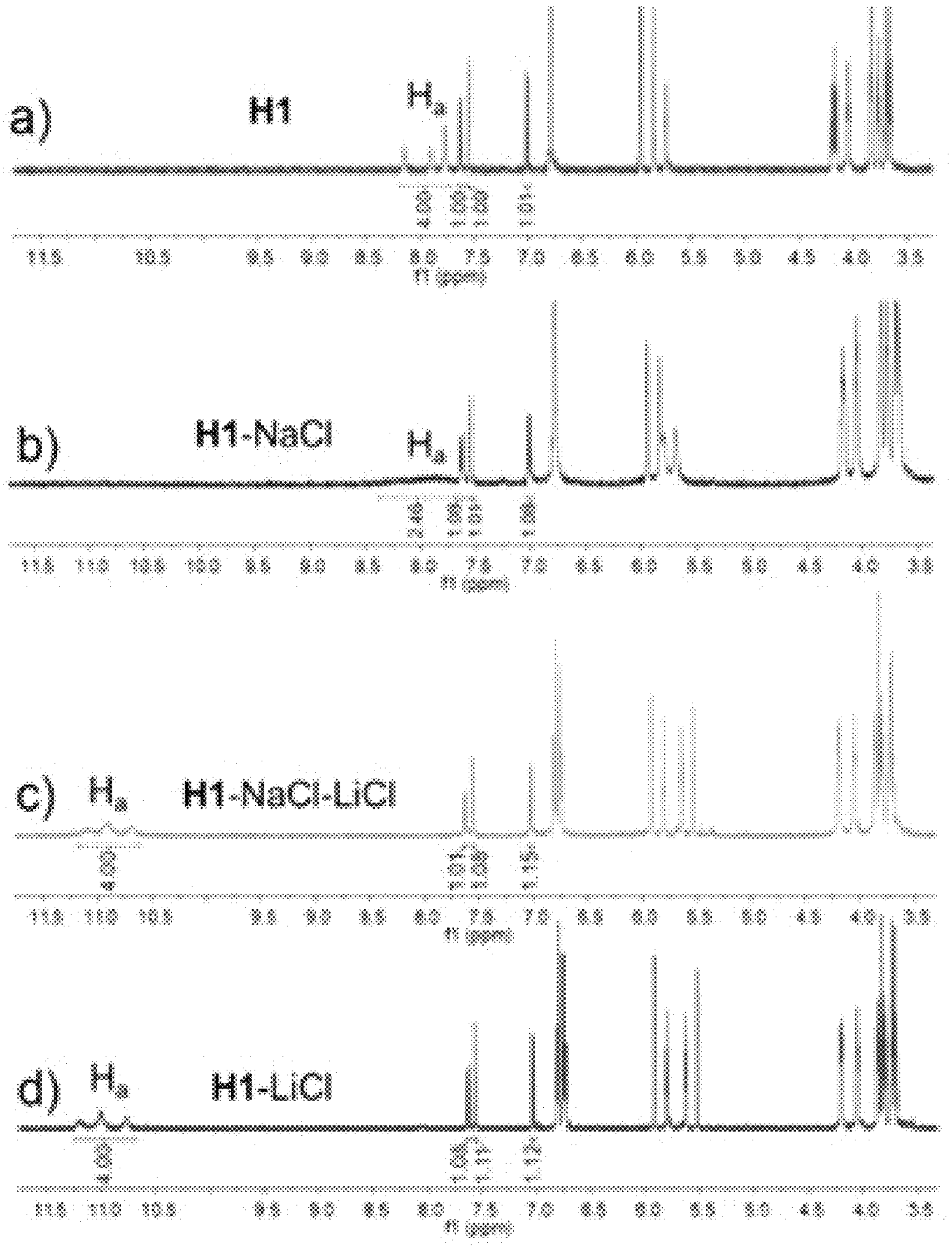
FIGS. 4A-4F show $^1$H NMR spectra (400 MHz, $CD_3CN$, 298 K) of H1 (FIG. 4A); solution of H1 (5.00 mM) and in contact with NaCl (1:1 on a per mole basis) after mixing for 5 days and then filtering (FIG. 4B); after adding 1 equivalent of LiCl (5.00 mM) (FIG. 4C); solution of H1 and LiCl (5.00 mM, 1:1) after mixing for 1 min (FIG. 4D); the ratio of H1 involved in ion pair complexation after adding the indicated salts (5.00 mM in H1; 1:1 molar ratio of salt) (FIG. 4E); and the ratio of H2 involved in the complexation after adding salts (5.00 mM in 112; 1:1 molar ratio of salt) (FIG. 4F).
Figures 4E, 4F:
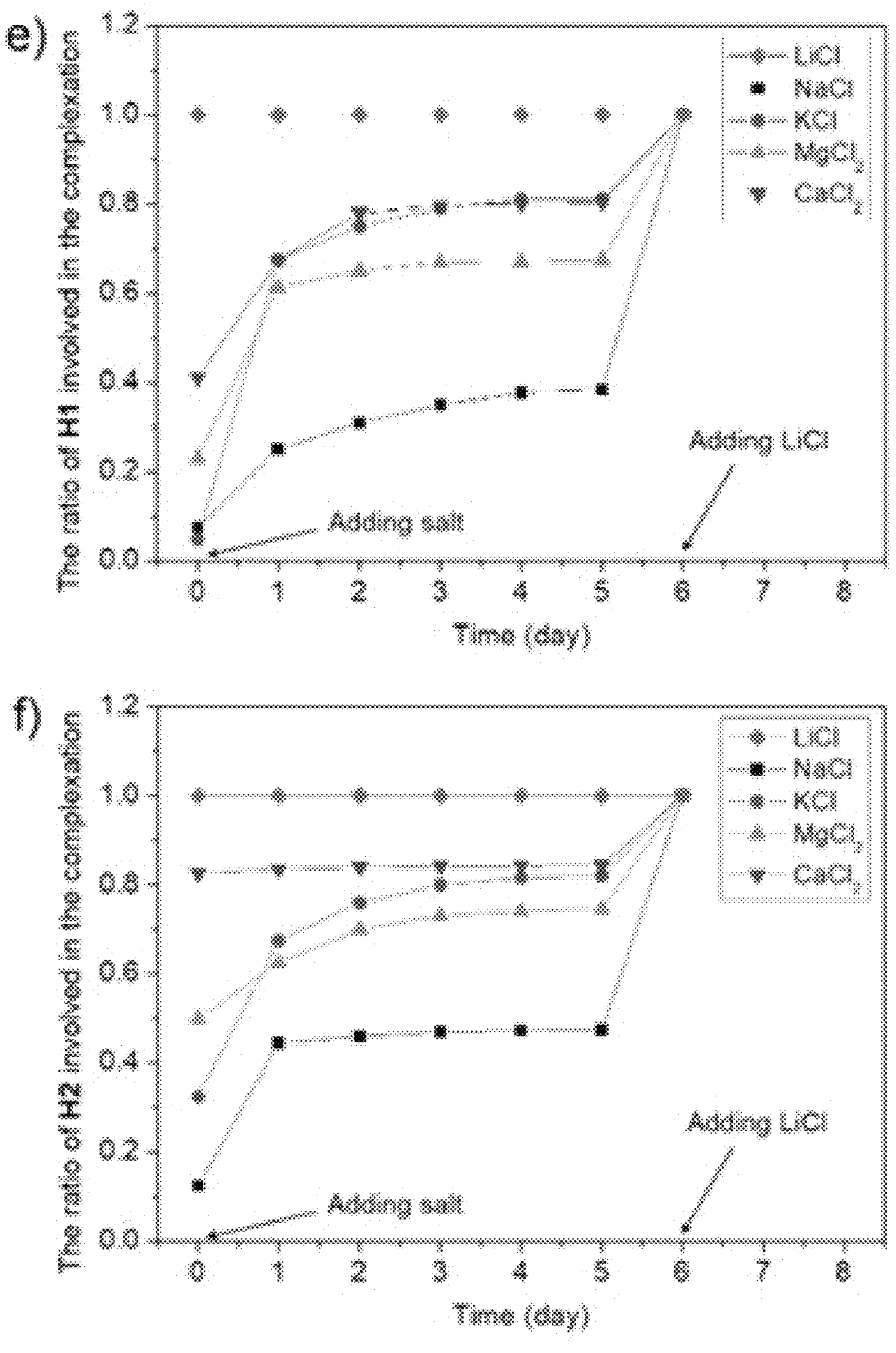
Figure 5:
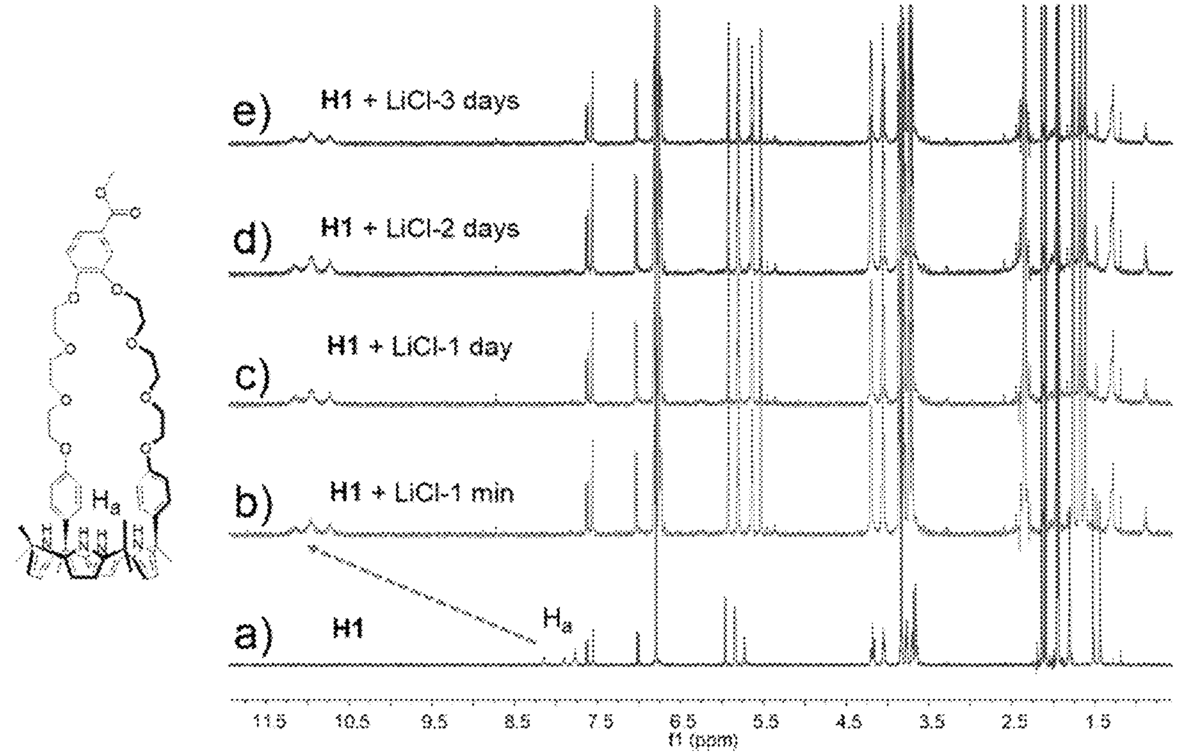
FIG. 5 shows changes in the complexation of H1 and LiCl over time. $^1$H NMR spectra (400 MHz, $CD_3CN$, 298 K) of a) H1; b) solution of H1 and LiCl (5.00 mM, 1:1) after mixing for 1 min; c) solution of H1 and LiCl (5.00 mM, 1:1) after mixing for 1 day; d) solution of H1 and LiCl (5.00 mM, 1:1) after mixing for 2 days; e) solution of H1 and LiCl (5.00 mM, 1:1) after mixing for 3 days.
Figure 6:
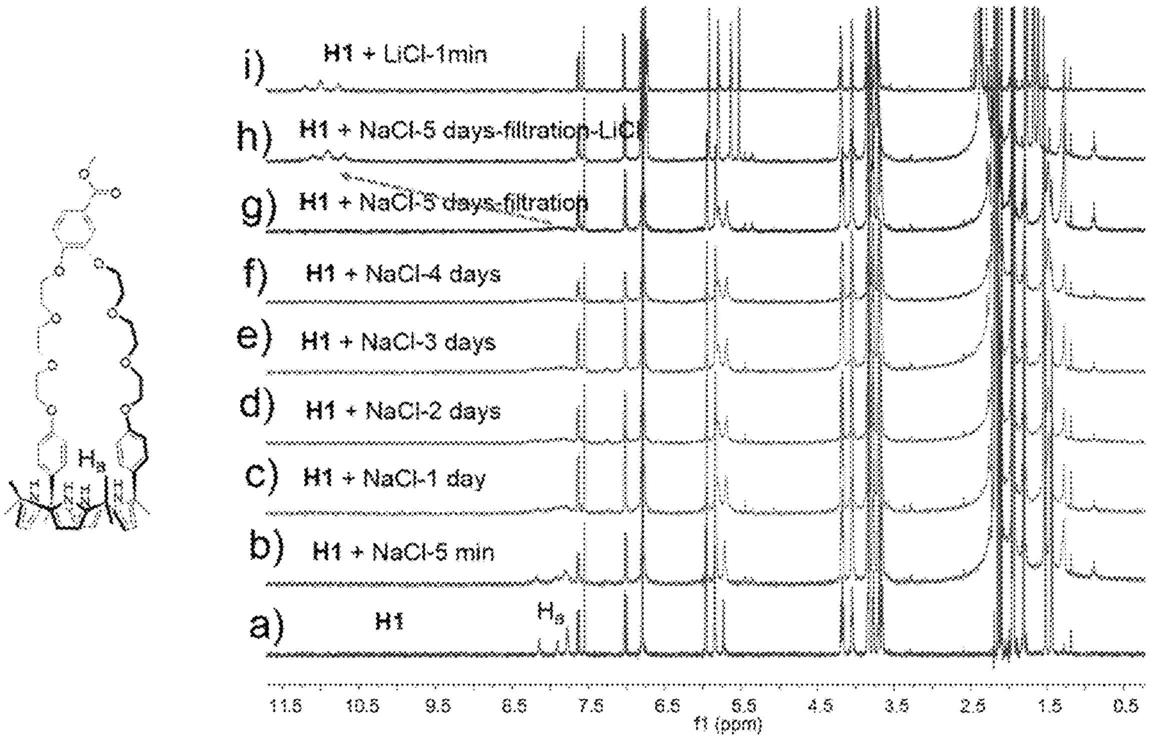
FIG. 6 shows competition between H1$\supset$LiCl and H1$\supset$NaCl. $^1$H NMR spectra (400 MHz, $CD_3CN$, 298 K) of a) H1; b) solution of H1 and NaCl (5.00 mM, 1:1) after mixing for 1 min; c) solution of H1 and NaCl (5.00 mM, 1:1) after mixing for 1 day; d) solution of H1 and NaCl (5.00 mM, 1:1) after mixing for 2 days; e) solution of H1 and NaCl (5.00 mM, 1:1) after mixing for 3 days; f) solution of H1 and NaCl (5.00 mM, 1:1) after mixing for 4 days; g) filtered solution of H1 and NaCl (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 7:
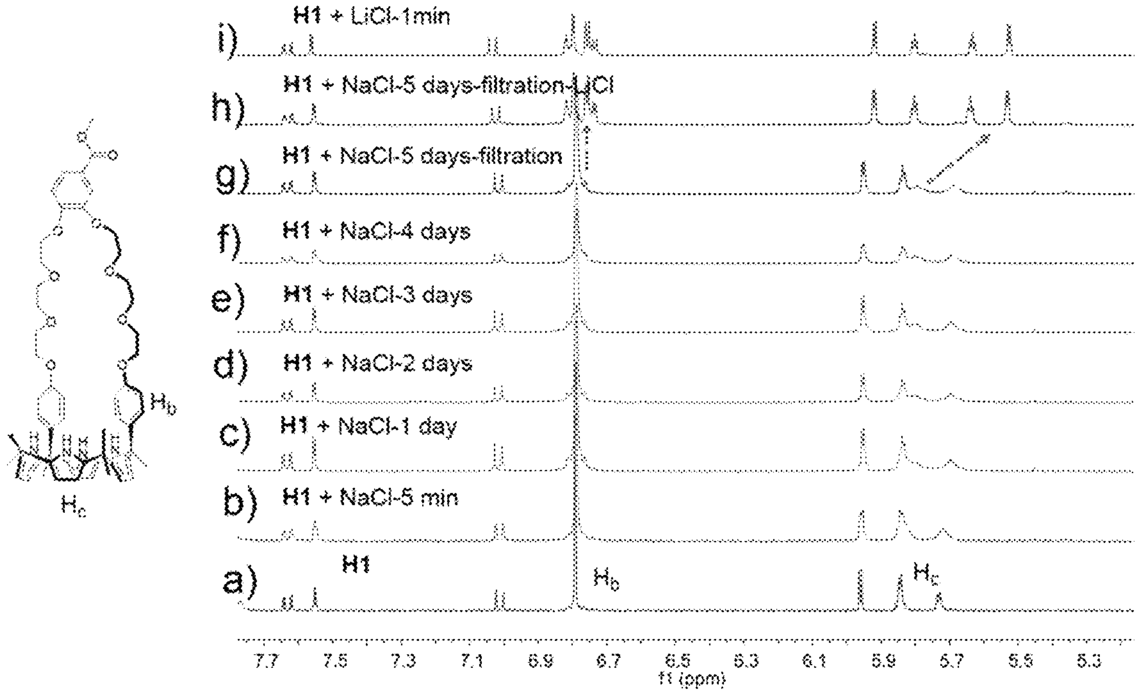
FIG. 7 shows partial $^1$H NMR spectra (5.3-7.7) (400 MHz, $CD_3CN$, 298 K) of a) H1; b) solution of H1 and NaCl (5.00 mM, 1:1) after mixing for 1 min; c) solution of H1 and NaCl (5.00 mM, 1:1) after mixing for 1 day; d) solution of H1 and NaCl (5.00 mM, 1:1) after mixing for 2 days; e) solution of H1 and NaCl (5.00 mM, 1:1) after mixing for 3 days; f) solution of H1 and NaCl (5.00 mM, 1:1) after mixing for 4 days; g) filtered solution of H1 and NaCl (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 8:
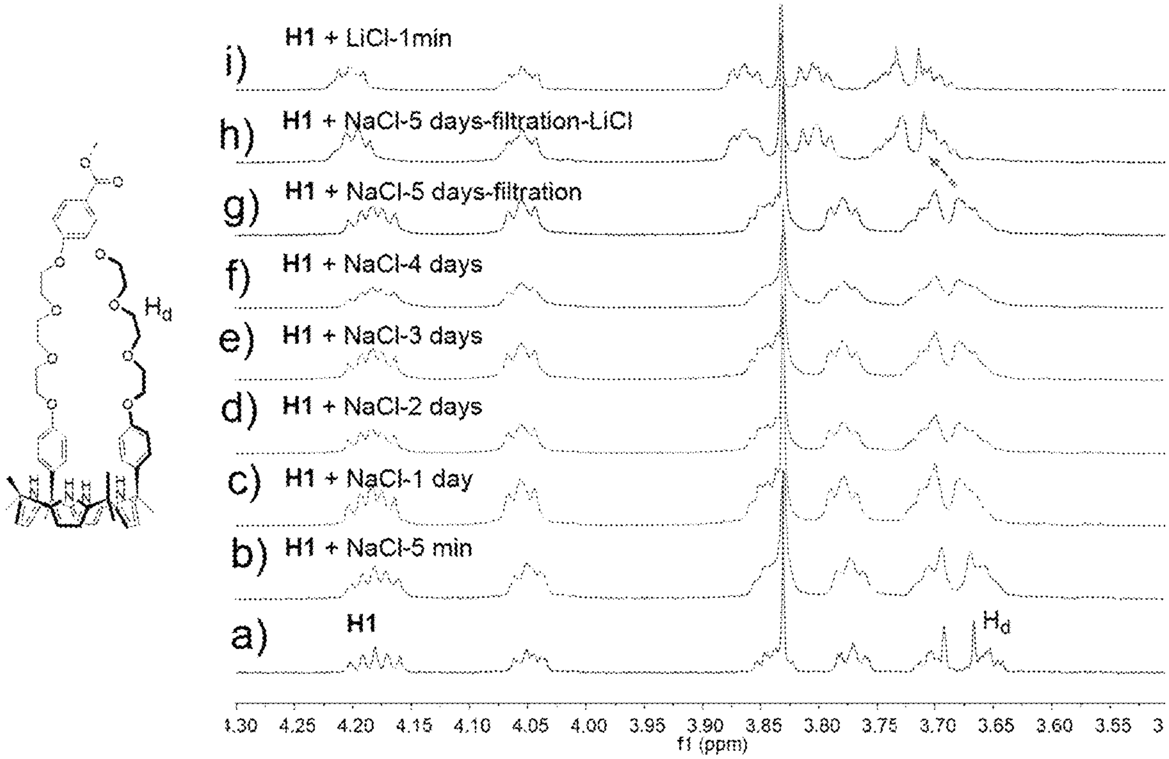
FIG. 8 shows partial $^1$H NMR spectra (3.5-4.3) (400 MHz, $CD_3CN$, 298 K) of a) H1; b) solution of H1 and NaCl (5.00 mM, 1:1) after mixing for 1 min; c) solution of H1 and NaCl (5.00 mM, 1:1) after mixing for 1 day; d) solution of H1 and NaCl (5.00 mM, 1:1) after mixing for 2 days; e) solution of H1 and NaCl (5.00 mM, 1:1) after mixing for 3 days; f) solution of H1 and NaCl (5.00 mM, 1:1) after mixing for 4 days; g) filtered solution of H1 and NaCl (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 9:
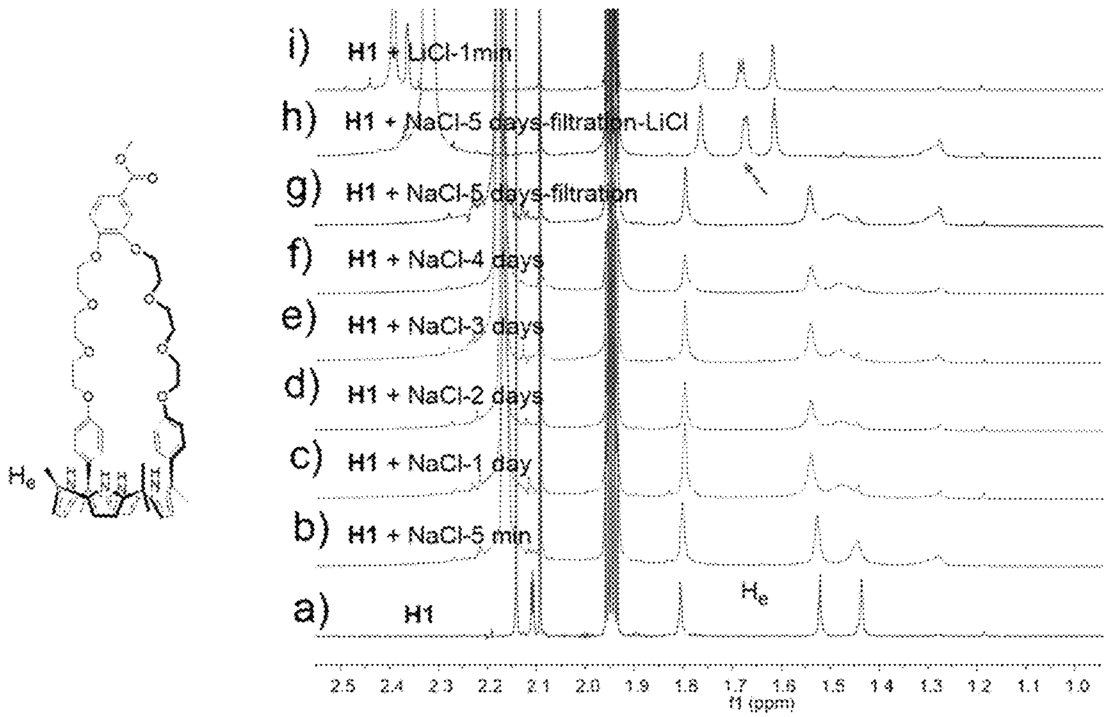
FIG. 9 shows partial $^1$H NMR spectra (1.0-2.5) (400 MHz, $CD_3CN$, 298 K) of a) H1; b) solution of H1 and NaCl (5.00 mM, 1:1) after mixing for 1 min; c) solution of H1 and NaCl (5.00 mM, 1:1) after mixing for 1 day; d) solution of H1 and NaCl (5.00 mM, 1:1) after mixing for 2 days; e) solution of H1 and NaCl (5.00 mM, 1:1) after mixing for 3 days; f) solution of H1 and NaCl (5.00 mM, 1:1) after mixing for 4 days; g) filtered solution of H1 and NaCl (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 10:
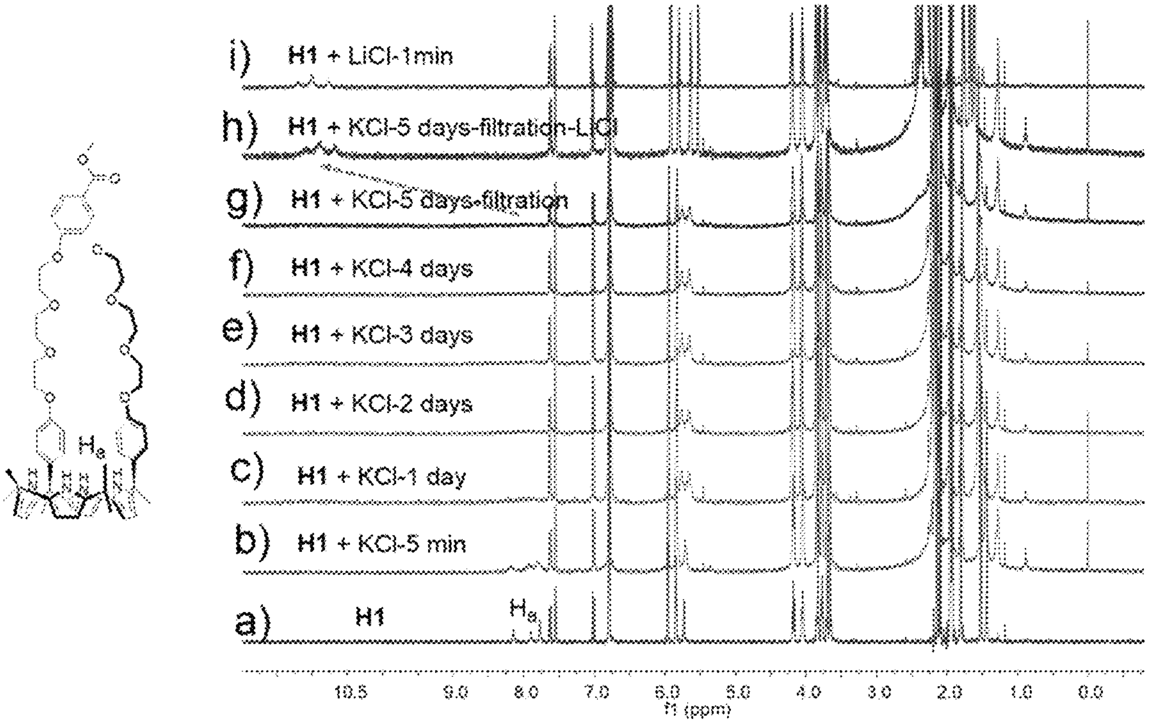
FIG. 10 shows $^1$H NMR spectra (400 MHz, $CD_3CN$, 298 K) of a) H1; b) solution of H1 and KCl (5.00 mM, 1:1) after mixing for 1 min; c) solution of H1 and KCl (5.00 mM, 1:1) after mixing for 1 day; d) solution of H1 and KCl (5.00 mM, 1:1) after mixing for 2 days; e) solution of H1 and KCl (5.00 mM, 1:1) after mixing for 3 days; f) solution of H1 and KCl (5.00 mM, 1:1) after mixing for 4 days; g) filtered solution of H1 and KCl (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 11:
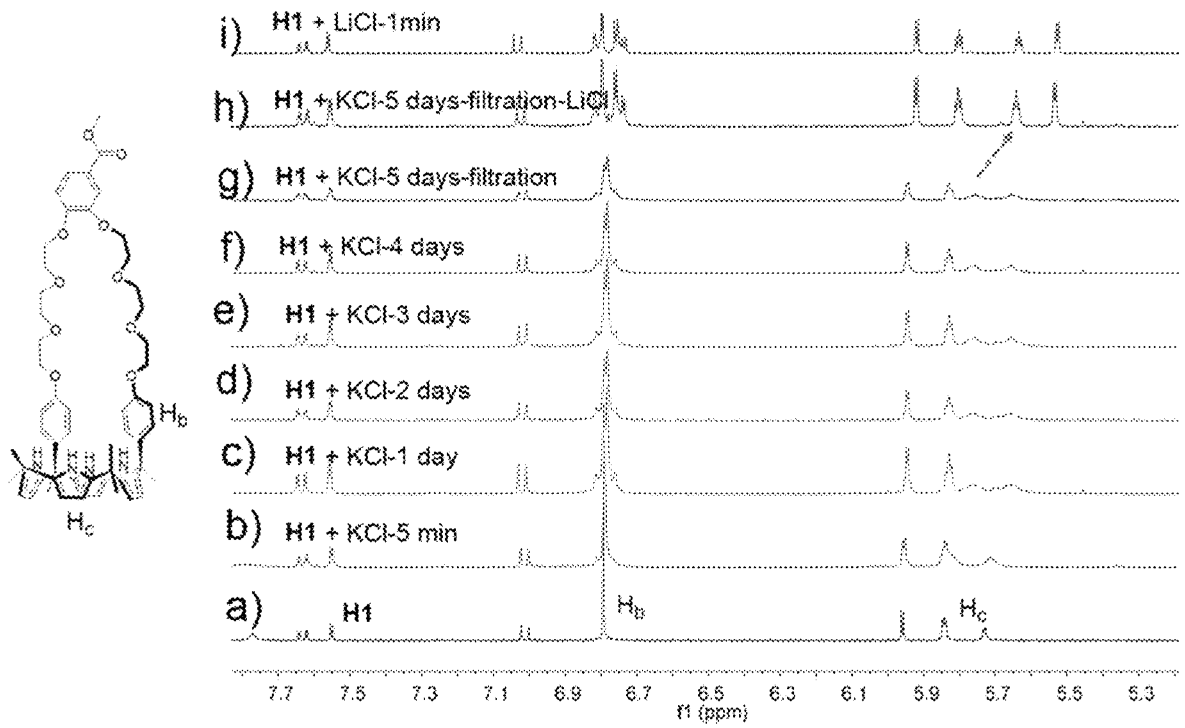
FIG. 11 shows partial $^1$H NMR spectra (5.3-7.7) (400 MHz, $CD_3CN$, 298 K) of a) H1; b) solution of H1 and KCl (5.00 mM, 1:1) after mixing for 1 min; c) solution of H1 and KCl (5.00 mM, 1:1) after mixing for 1 day; d) solution of H1 and KCl (5.00 mM, 1:1) after mixing for 2 days; e) solution of H1 and KCl (5.00 mM, 1:1) after mixing for 3 days; f) solution of H1 and KCl (5.00 mM, 1:1) after mixing for 4 days; g) filtered solution of H1 and KCl (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 12:
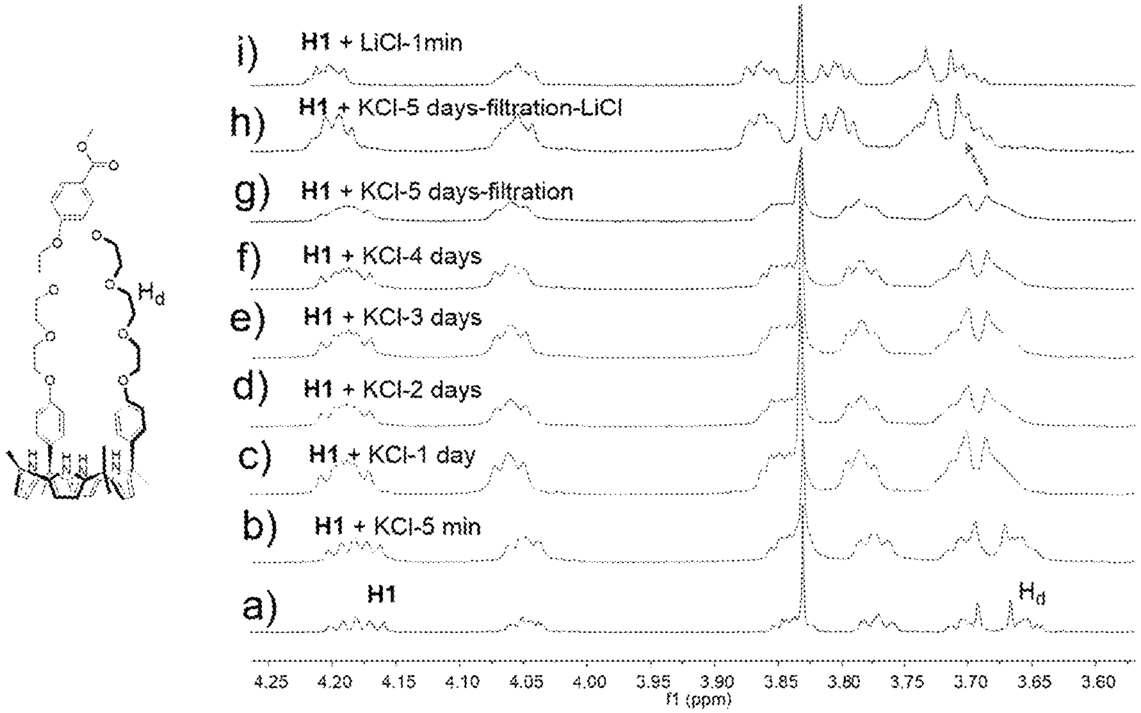
FIG. 12 shows partial $^1$H NMR spectra (3.5-4.3) (400 MHz, $CD_3CN$, 298 K) of a) H1; b) solution of H1 and KCl (5.00 mM, 1:1) after mixing for 1 min; c) solution of H1 and KCl (5.00 mM, 1:1) after mixing for 1 day; d) solution of H1 and KCl (5.00 mM, 1:1) after mixing for 2 days; e) solution of H1 and KCl (5.00 mM, 1:1) after mixing for 3 days; f) solution of H1 and KCl (5.00 mM, 1:1) after mixing for 4 days; g) filtered solution of H1 and KCl (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 13:
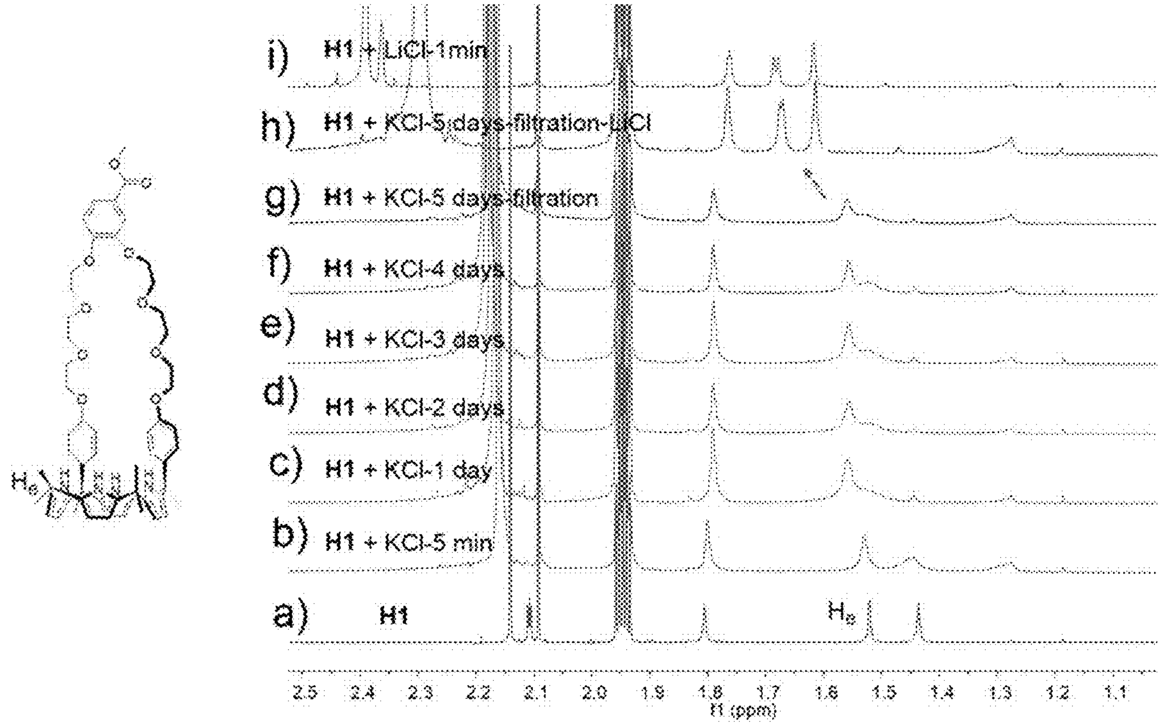
FIG. 13 shows partial $^1$H NMR spectra (1.0-2.5) (400 MHz, $CD_3CN$, 298 K) of a) H1; b) solution of H1 and KCl (5.00 mM, 1:1) after mixing for 1 min; c) solution of H1 and KCl (5.00 mM, 1:1) after mixing for 1 day; d) solution of H1 and KCl (5.00 mM, 1:1) after mixing for 2 days; e) solution of H1 and KCl (5.00 mM, 1:1) after mixing for 3 days; f) solution of H1 and KCl (5.00 mM, 1:1) after mixing for 4 days; g) filtered solution of H1 and KCl (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 14:
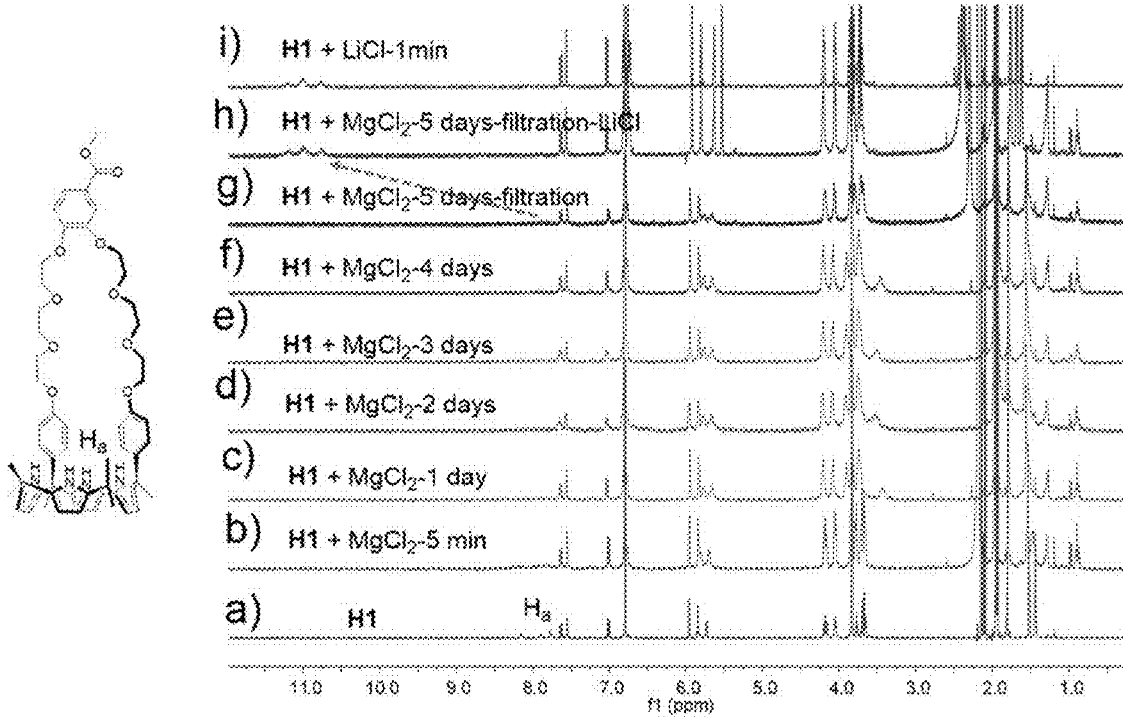
FIG. 14 shows competition between H1⊃LiCl and H1⊃$MgCl_2$. $^1$H NMR spectra (400 MHz, $CD_3CN$, 298 K) of a) H1; b) solution of H1 and $MgCl_2$ (5.00 mM, 1:1) after mixing for 1 min; c) solution of H1 and $MgCl_2$ (5.00 mM, 1:1) after mixing for 1 day; d) solution of H1 and $MgCl_2$ (5.00 mM, 1:1) after mixing for 2 days; e) solution of H1 and $MgCl_2$ (5.00 mM, 1:1) after mixing for 3 days; f) solution of H1 and $MgCl_2$ (5.00 mM, 1:1) after mixing for 4 days; g) filtered solution of H1 and $MgCl_2$ (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 15:
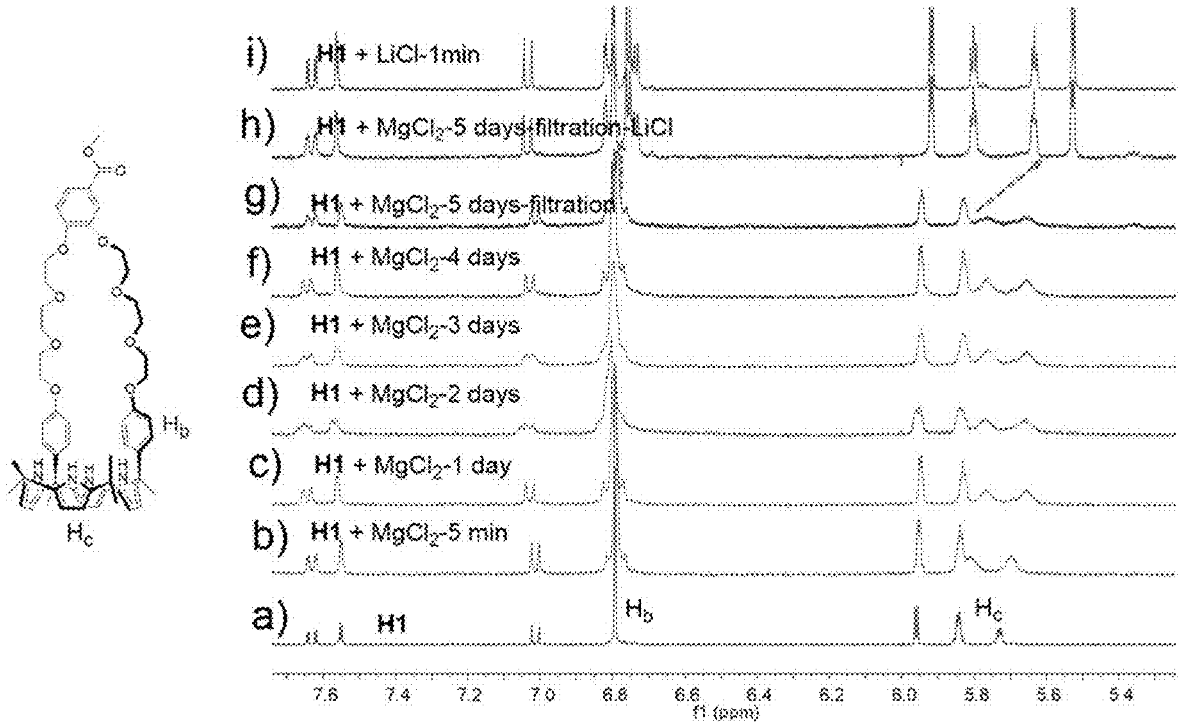
FIG. 15 shows partial $^1$H NMR spectra (5.3-7.7) (400 MHz, $CD_3CN$, 298 K) of a) H1; b) solution of H1 and $MgCl_2$ (5.00 mM, 1:1) after mixing for 1 min; c) solution of H1 and $MgCl_2$ (5.00 mM, 1:1) after mixing for 1 day; d) solution of H1 and $MgCl_2$ (5.00 mM, 1:1) after mixing for 2 days; e) solution of H1 and $MgCl_2$ (5.00 mM, 1:1) after mixing for 3 days; f) solution of H1 and $MgCl_2$ (5.00 mM, 1:1) after mixing for 4 days; g) filtered solution of H1 and $MgCl_2$ (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 16:
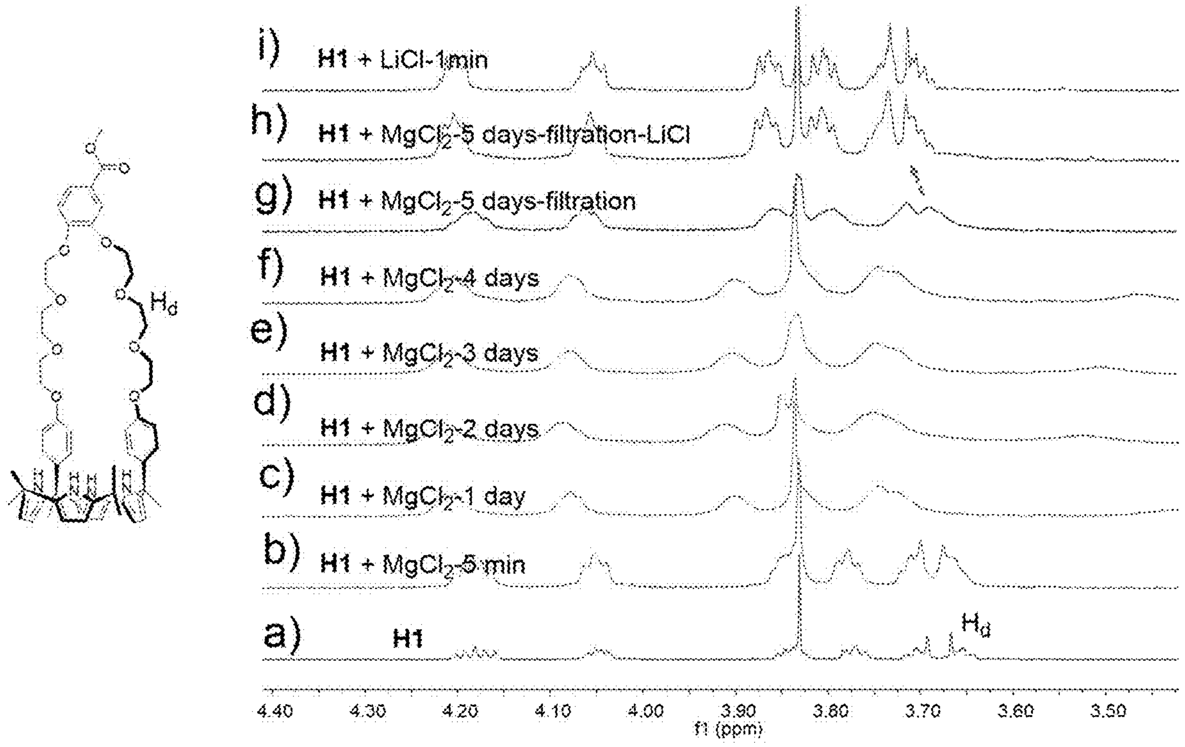
FIG. 16 shows partial $^1$H NMR spectra (3.5-4.3) (400 MHz, $CD_3CN$, 298 K) of a) H1; b) solution of H1 and $MgCl_2$ (5.00 mM, 1:1) after mixing for 1 min; c) solution of H1 and $MgCl_2$ (5.00 mM, 1:1) after mixing for 1 day; d) solution of H1 and $MgCl_2$ (5.00 mM, 1:1) after mixing for 2 days; e) solution of H1 and $MgCl_2$ (5.00 mM, 1:1) after mixing for 3 days; f) solution of H1 and $MgCl_2$ (5.00 mM, 1:1) after mixing for 4 days; g) filtered solution of H1 and $MgCl_2$ (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 17:
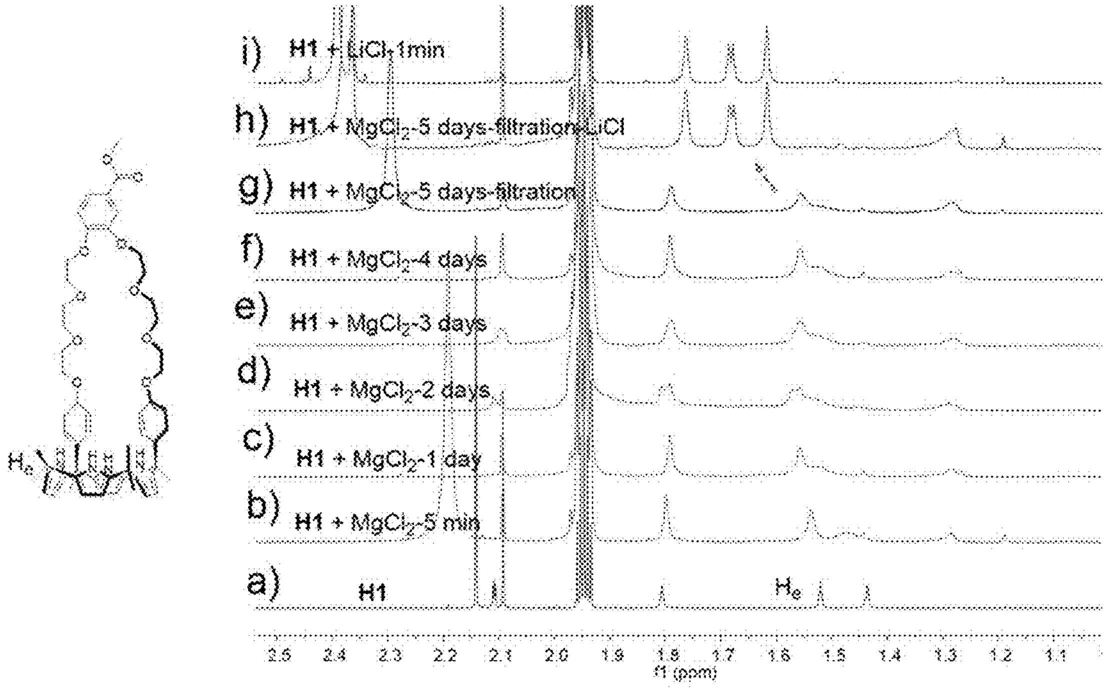
FIG. 17 shows partial $^1$H NMR spectra (1.0-2.5) (400 MHz, $CD_3CN$, 298 K) of a) H1; b) solution of H1 and $MgCl_2$ (5.00 mM, 1:1) after mixing for 1 min; c) solution of H1 and $MgCl_2$ (5.00 mM, 1:1) after mixing for 1 day; d) solution of H1 and $MgCl_2$ (5.00 mM, 1:1) after mixing for 2 days; e) solution of H1 and $MgCl_2$ (5.00 mM, 1:1) after mixing for 3 days; f) solution of H1 and $MgCl_2$ (5.00 mM, 1:1) after mixing for 4 days; g) filtered solution of H1 and $MgCl_2$ (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 18:
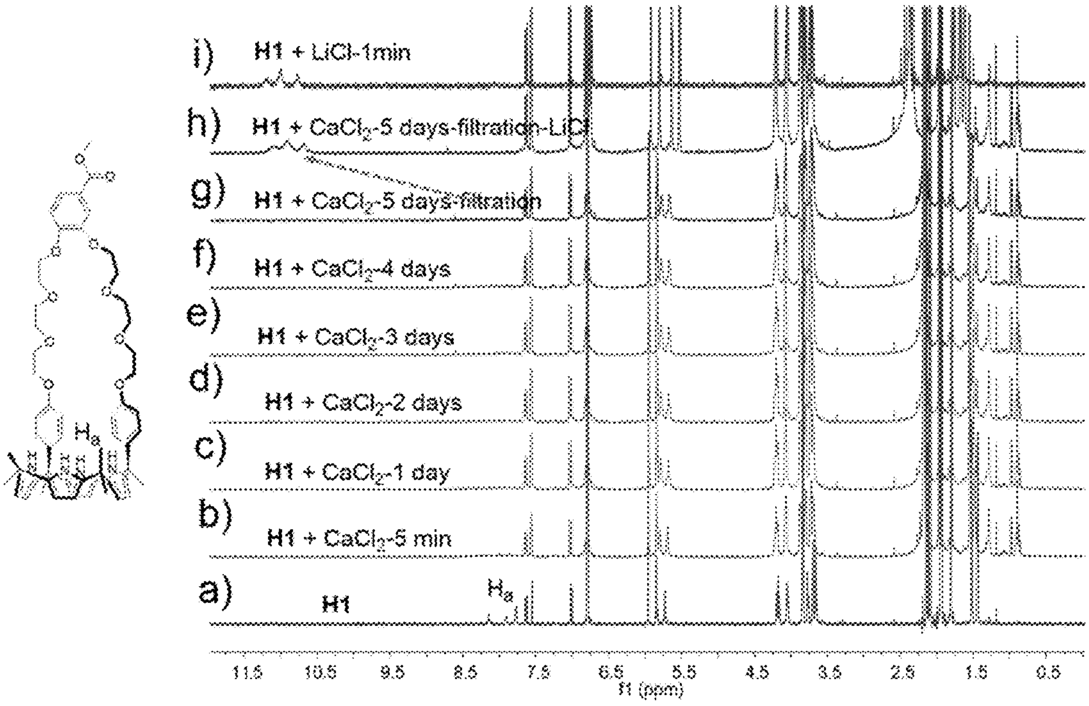
FIG. 18 shows competition between H1⊃LiCl and H1⊃$CaCl_2$. $^1$H NMR spectra (400 MHz, $CD_3CN$, 298 K) of a) H1; b) solution of H1 and $CaCl_2$) (5.00 mM, 1:1) after mixing for 1 min; c) solution of H1 and $CaCl_2$) (5.00 mM, 1:1) after mixing for 1 day; d) solution of H1 and $CaCl_2$) (5.00 mM, 1:1) after mixing for 2 days; e) solution of H1 and $CaCl_2$) (5.00 mM, 1:1) after mixing for 3 days; f) solution of H1 and $CaCl_2$) (5.00 mM, 1:1) after mixing for 4 days; g) filtered solution of H1 and $CaCl_2$) (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 19:
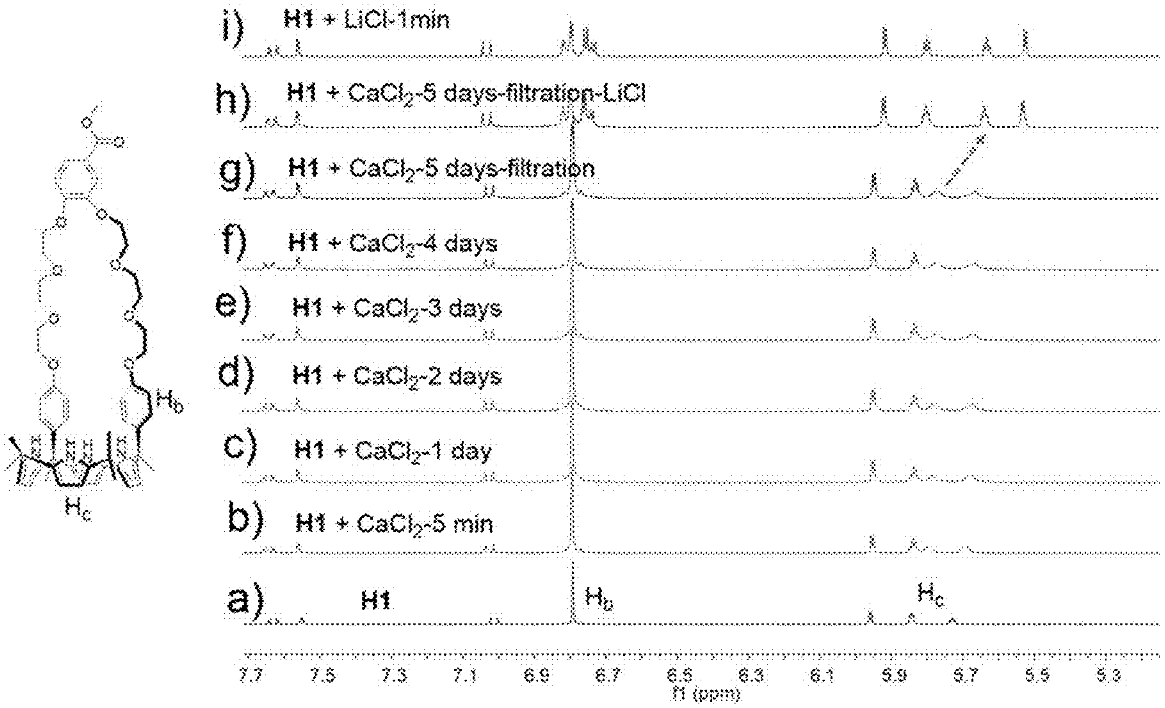
FIG. 19 shows partial $^1$H NMR spectra (5.3-7.7) (400 MHz, $CD_3CN$, 298 K) of a) H1; b) solution of H1 and $CaCl_2$) (5.00 mM, 1:1) after mixing for 1 min; c) solution of H1 and $CaCl_2$) (5.00 mM, 1:1) after mixing for 1 day; d) solution of H1 and $CaCl_2$) (5.00 mM, 1:1) after mixing for 2 days; e) solution of H1 and $CaCl_2$) (5.00 mM, 1:1) after mixing for 3 days; f) solution of H1 and $CaCl_2$) (5.00 mM, 1:1) after mixing for 4 days; g) filtered solution of H1 and $CaCl_2$) (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 20:
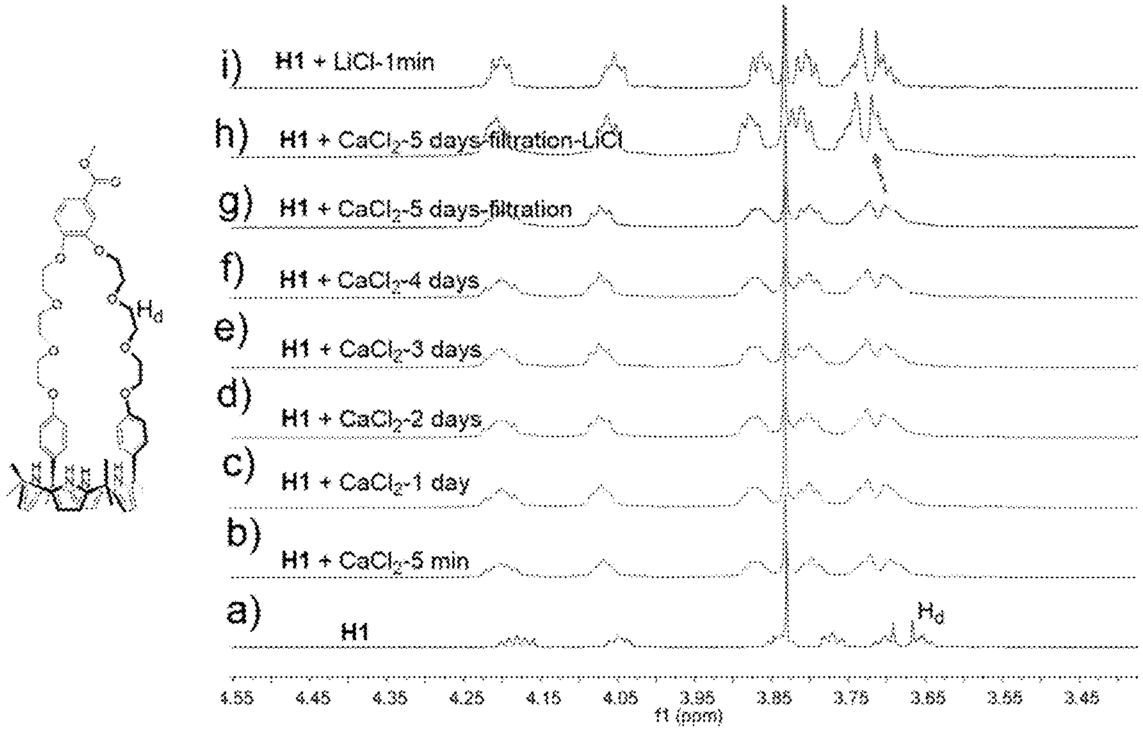
FIG. 20 shows partial $^1$H NMR spectra (3.5-4.3) (400 MHz, $CD_3CN$, 298 K) of a) H1; b) solution of H1 and $CaCl_2$) (5.00 mM, 1:1) after mixing for 1 min; c) solution of H1 and $CaCl_2$) (5.00 mM, 1:1) after mixing for 1 day; d) solution of H1 and $CaCl_2$) (5.00 mM, 1:1) after mixing for 2 days; e) solution of H1 and $CaCl_2$) (5.00 mM, 1:1) after mixing for 3 days; f) solution of H1 and $CaCl_2$) (5.00 mM, 1:1) after mixing for 4 days; g) filtered solution of H1 and $CaCl_2$) (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 21:
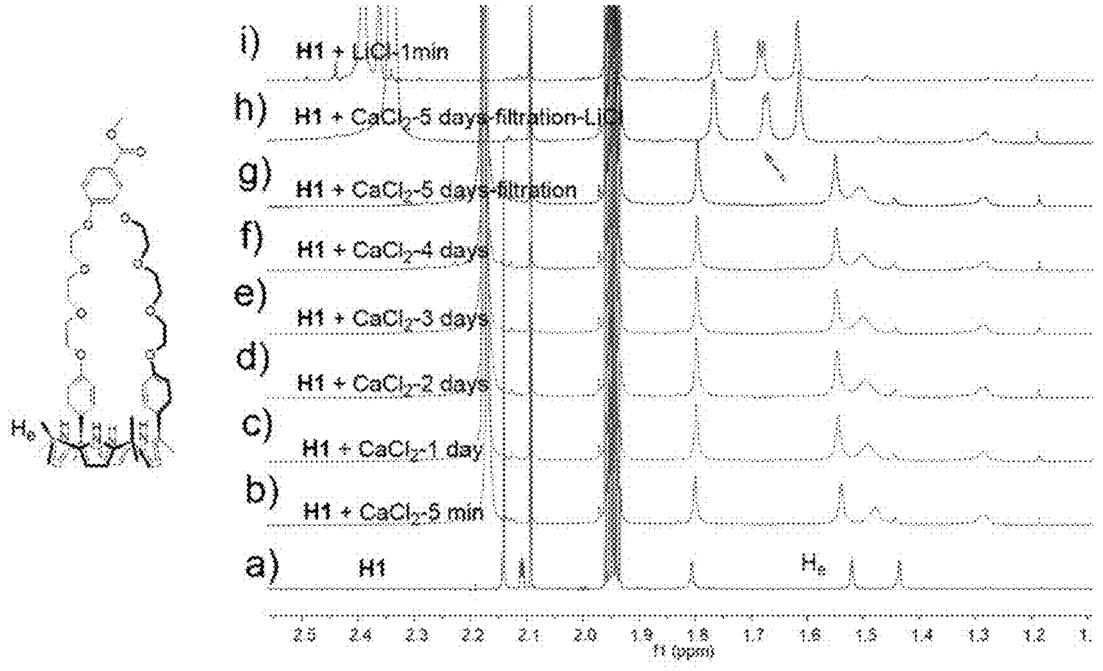
FIG. 21 shows partial $^1$H NMR spectra (1.0-2.5) (400 MHz, $CD_3CN$, 298 K) of a) H1; b) solution of H1 and $CaCl_2$) (5.00 mM, 1:1) after mixing for 1 min; c) solution of H1 and $CaCl_2$) (5.00 mM, 1:1) after mixing for 1 day; d) solution of H1 and $CaCl_2$) (5.00 mM, 1:1) after mixing for 2 days; e) solution of H1 and $CaCl_2$) (5.00 mM, 1:1) after mixing for 3 days; f) solution of H1 and $CaCl_2$) (5.00 mM, 1:1) after mixing for 4 days; g) filtered solution of H1 and $CaCl_2$) (5.00 mM, 1:1) after mixing for 5 days; h) g after adding 1 equivalent of LiCl (5.00 mM); i) solution of H1 and LiCl (5.00 mM, 1:1) after mixing for 1 min.
Figure 22:
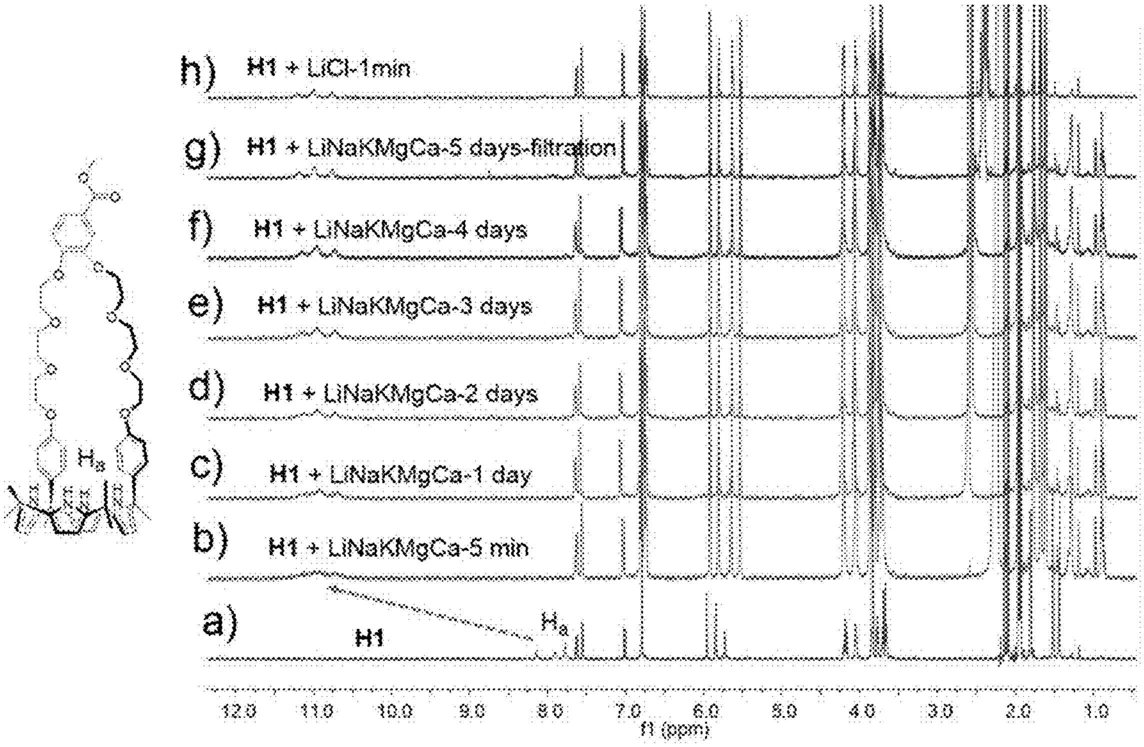
FIG. 22 shows complexation between H1 and mixture of LiCl, NaCl, KCl, $MgCl_2$ and $CaCl_2$). $^1$H NMR spectra (400 MHz, $CD_3CN$, 298 K) of a) H1; b) solution of H1 and five salts (LiCl, NaCl, KCl, $MgCl_2$ and $CaCl_2$)) (5.00 mM, 1:1:1:1:1:1) after mixing for 1 min; c) solution of H1 and five salts (LiCl, NaCl, KCl, $MgCl_2$ and $CaCl_2$)) (5.00 mM, 1:1:1:1:1:1) after mixing for 1 day; d) solution of H1 and five salts (LiCl, NaCl, KCl, $MgCl_2$ and $CaCl_2$)) (5.00 mM, 1:1:1:1:1:1) after mixing for 2 days; e) solution of H1 and five salts (LiCl, NaCl, KCl, $MgCl_2$ and $CaCl_2$)) (5.00 mM, 1:1:1:1:1:1) after mixing for 3 days; f) solution of H1 and five salts (LiCl, NaCl, KCl, $MgCl_2$ and $CaCl_2$)) (5.00 mM, 1:1:1:1:1:1) after mixing for 4 days; g) filtered solution of H1 and five salts (LiCl, NaCl, KCl, $MgCl_2$ and $CaCl_2$)) (5.00 mM, 1:1:1:1:1:1) after mixing for 5 days; h) solution of H1 and LiCl (5.00 mM, 1:1) after mixing for 1 min.
Figure 23:
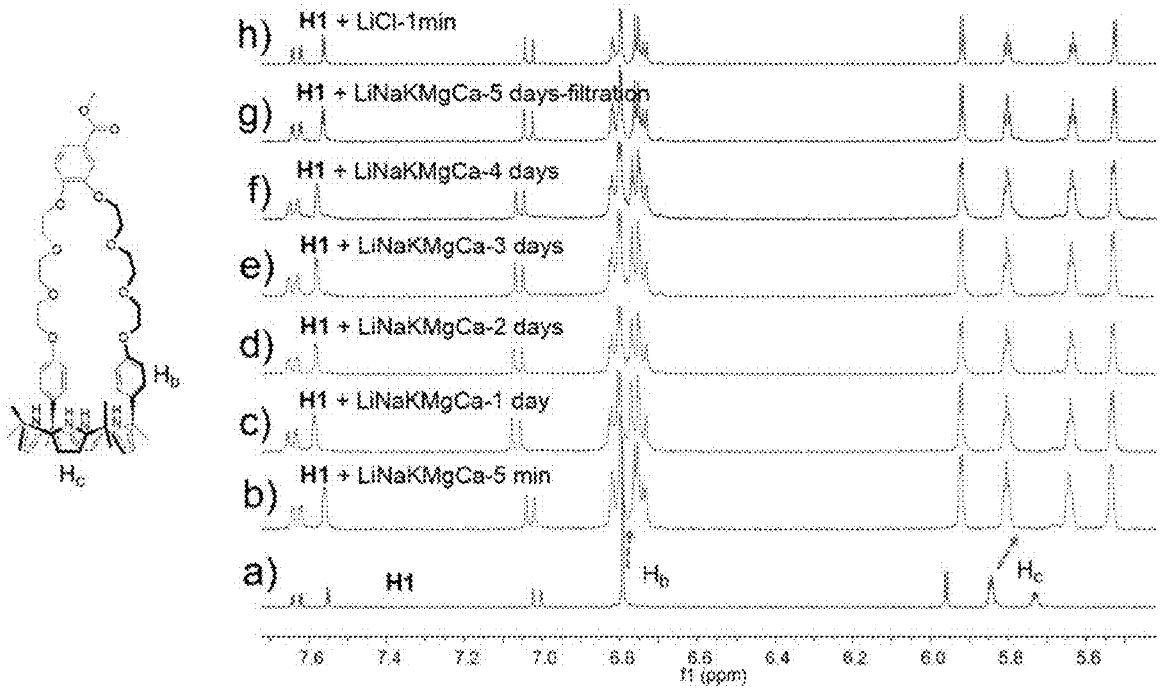
FIG. 23 shows partial $^1$H NMR spectra (5.3-7.7) (400 MHz, $CD_3CN$, 298 K) of a) H1; b) solution of H1 and five salts (LiCl, NaCl, KCl, $MgCl_2$ and $CaCl_2$)) (5.00 mM, 1:1:1:1:1:1) after mixing for 1 min; c) solution of H1 and five salts (LiCl, NaCl, KCl, $MgCl_2$ and $CaCl_2$)) (5.00 mM, 1:1:1:1:1:1) after mixing for 1 day; d) solution of H1 and five salts (LiCl, NaCl, KCl, $MgCl_2$ and $CaCl_2$)) (5.00 mM, 1:1:1:1:1:1) after mixing for 2 days; e) solution of H1 and five salts (LiCl, NaCl, KCl, $MgCl_2$ and $CaCl_2$)) (5.00 mM, 1:1:1:1:1:1) after mixing for 3 days; f) solution of H1 and five salts (LiCl, NaCl, KCl, $MgCl_2$ and $CaCl_2$)) (5.00 mM, 1:1:1:1:1:1) after mixing for 4 days; g) filtered solution of H1 and five salts (LiCl, NaCl, KCl, $MgCl_2$ and $CaCl_2$)) (5.00 mM, 1:1:1:1:1:1) after mixing for 5 days; h) solution of H1 and LiCl (5.00 mM, 1:1) after mixing for 1 min.
Figure 24:
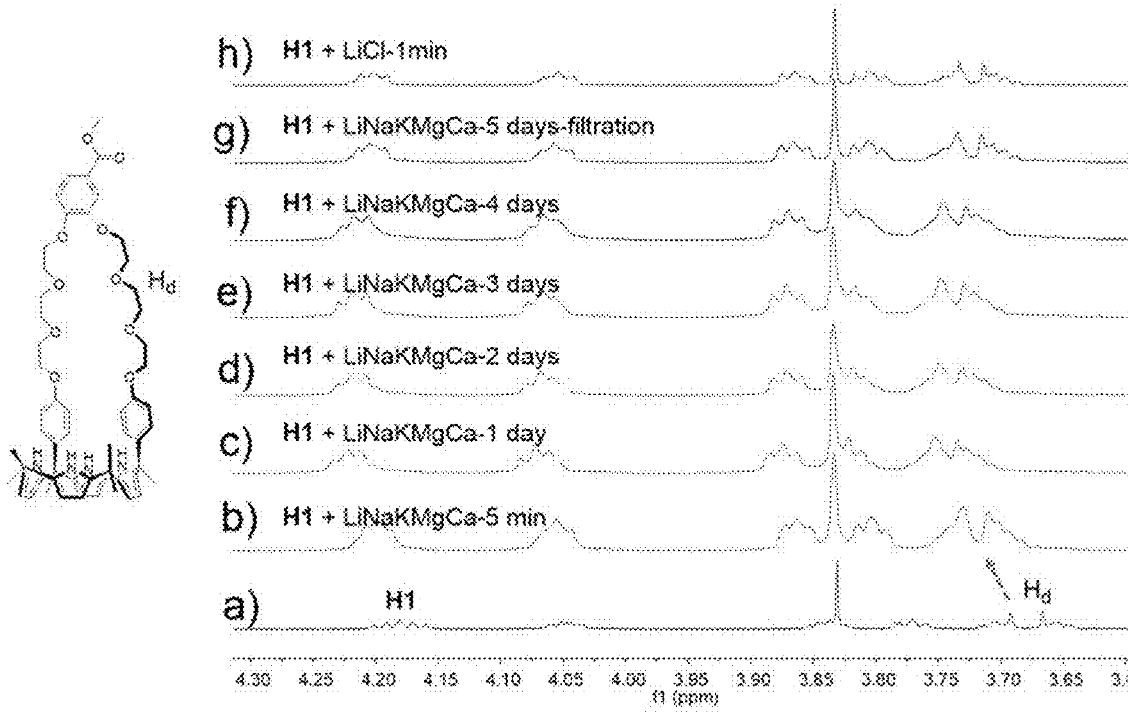
FIG. 24 shows partial $^1$H NMR spectra (3.5-4.3) (400 MHz, $CD_3CN$, 298 K) of a) H1; b) solution of H1 and five salts (LiCl, NaCl, KCl, $MgCl_2$ and $CaCl_2$)) (5.00 mM, 1:1:1:1:1:1) after mixing for 1 min; c) solution of H1 and five salts (LiCl, NaCl, KCl, $MgCl_2$ and $CaCl_2$)) (5.00 mM, 1:1:1:1:1:1) after mixing for 1 day; d) solution of H1 and five salts (LiCl, NaCl, KCl, $MgCl_2$ and $CaCl_2$)) (5.00 mM, 1:1:1:1:1:1) after mixing for 2 days; e) solution of H1 and five salts (LiCl, NaCl, KCl, $MgCl_2$ and $CaCl_2$)) (5.00 mM, 1:1:1:1:1:1) after mixing for 3 days; f) solution of H1 and five salts (LiCl, NaCl, KCl, $MgCl_2$ and $CaCl_2$)) (5.00 mM, 1:1:1:1:1:1) after mixing for 4 days; g) filtered solution of H1 and five salts (LiCl, NaCl, KCl, $MgCl_2$ and $CaCl_2$)) (5.00 mM, 1:1:1:1:1:1) after mixing for 5 days; h) solution of H1 and LiCl (5.00 mM, 1:1) after mixing for 1 min.
Figure 25:
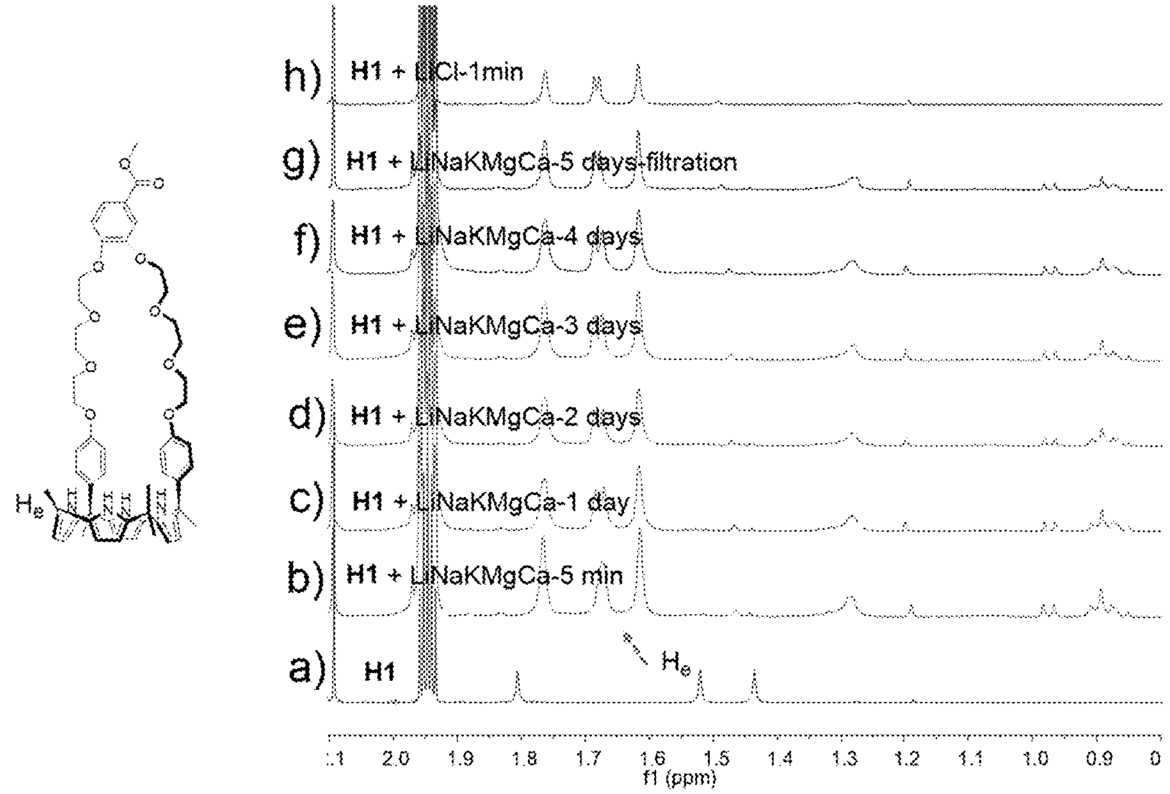
FIG. 25 shows partial $^1$H NMR spectra (1.0-2.5) (400 MHz, $CD_3CN$, 298 K) of a) H1; b) solution of H1 and five salts (LiCl, NaCl, KCl, $MgCl_2$ and $CaCl_2$)) (5.00 mM, 1:1:1:1:1:1) after mixing for 1 min; c) solution of H1 and five salts (LiCl, NaCl, KCl, $MgCl_2$ and $CaCl_2$)) (5.00 mM, 1:1:1:1:1:1) after mixing for 1 day; d) solution of H1 and five salts (LiCl, NaCl, KCl, $MgCl_2$ and $CaCl_2$)) (5.00 mM, 1:1:1:1:1:1) after mixing for 2 days; e) solution of H1 and five salts (LiCl, NaCl, KCl, $MgCl_2$ and $CaCl_2$)) (5.00 mM, 1:1:1:1:1:1) after mixing for 3 days; f) solution of H1 and five salts (LiCl, NaCl, KCl, $MgCl_2$ and $CaCl_2$)) (5.00 mM, 1:1:1:1:1:1) after mixing for 4 days; g) filtered solution of H1 and five salts (LiCl, NaCl, KCl, $MgCl_2$ and $CaCl_2$)) (5.00 mM, 1:1:1:1:1:1) after mixing for 5 days; h) solution of H1 and LiCl (5.00 mM, 1:1) after mixing for 1 min.
Figure 26:
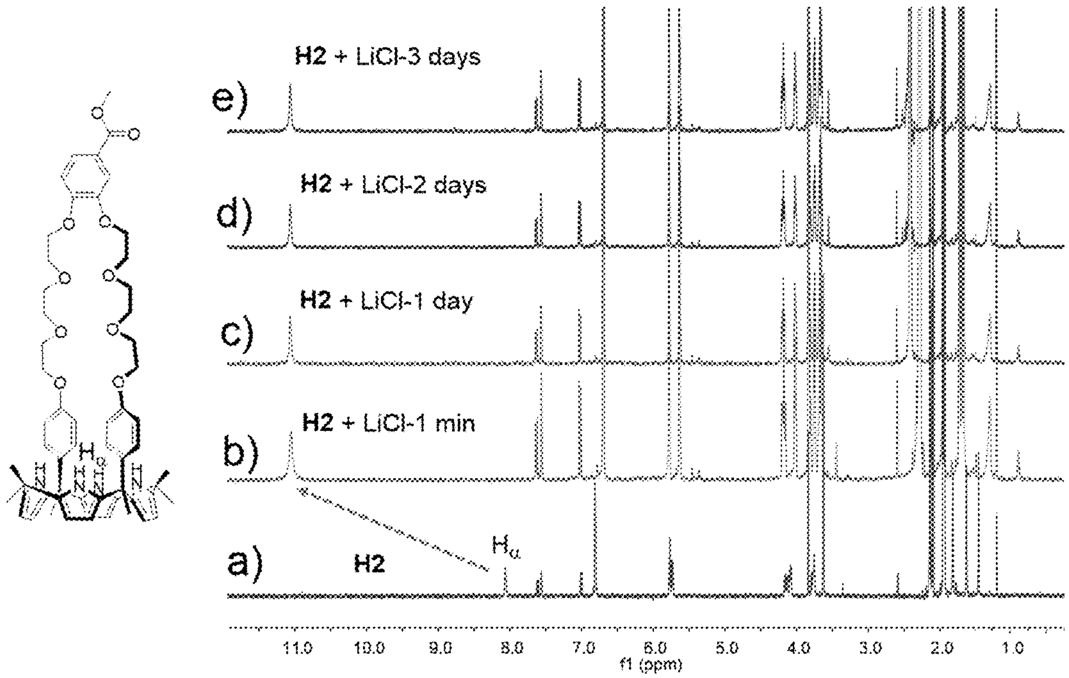
FIG. 26 shows changes in the complexation of H2 and LiCl over time. $^1$H NMR spectra (400 MHz, $CD_3CN$, 298 K) of a) 112; b) solution of H2 and LiCl (5.00 mM, 1:1) after mixing for 1 min; c) solution of H2 and LiCl (5.00 mM, 1:1) after mixing for 1 day; d) solution of H2 and LiCl (5.00 mM, 1:1) after mixing for 2 days; e) solution of H2 and LiCl (5.00 mM, 1:1) after mixing for 3 days.
Figure 27:
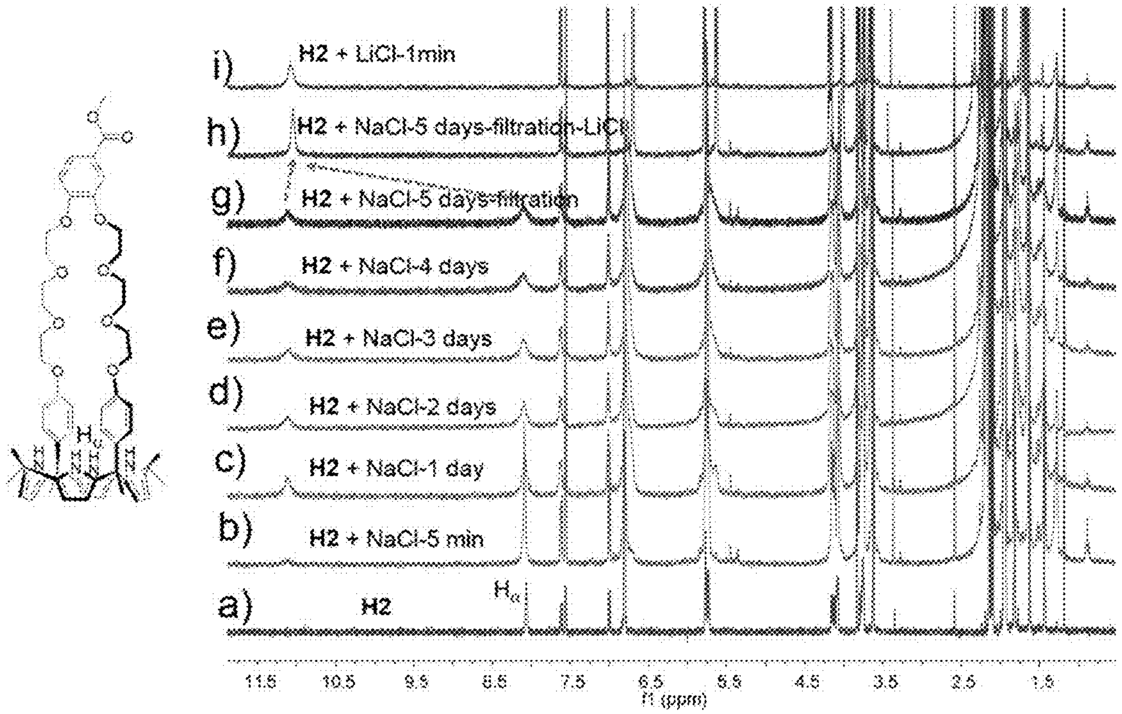
FIG. 27 shows competition between H2⊃LiCl and H2⊃NaCl. $^1$H NMR spectra (400 MHz, $CD_3CN$, 298 K) of a) 112; b) solution of H2 and NaCl (5.00 mM, 1:1) after mixing for 1 min; c) solution of H2 and NaCl (5.00 mM, 1:1) after mixing for 1 day; d) solution of H2 and NaCl (5.00 mM, 1:1) after mixing for 2 days; e) solution of H2 and NaCl (5.00 mM, 1:1) after mixing for 3 days; f) solution of H2 and NaCl (5.00 mM, 1:1) after mixing for 4 days; g) filtered solution of H2 and NaCl (5.00 mM, 1:1) after mixing for 5 days; h) g after adding 1 equivalent of LiCl (5.00 mM); i) solution of H2 and LiCl (5.00 mM, 1:1) after mixing for 1 min.
Figure 28:
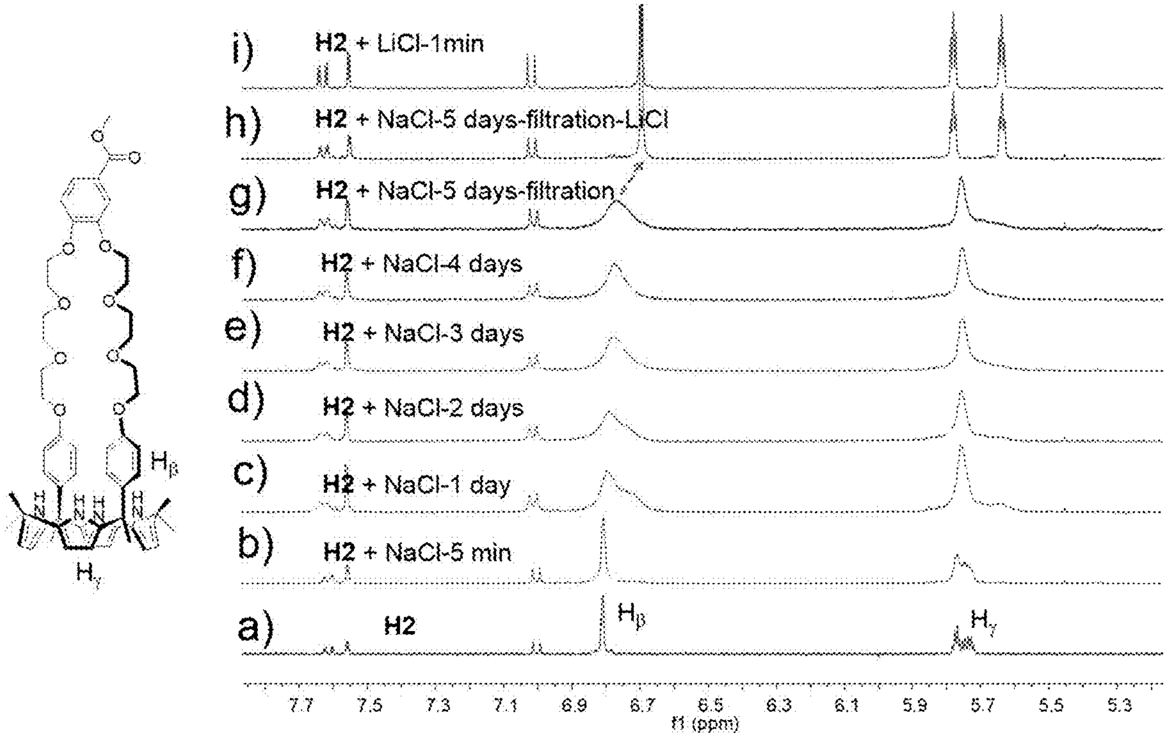
FIG. 28 shows partial $^1$H NMR spectra (5.3-7.7) (400 MHz, $CD_3CN$, 298 K) of a) 112; b) solution of H2 and NaCl (5.00 mM, 1:1) after mixing for 1 min; c) solution of H2 and NaCl (5.00 mM, 1:1) after mixing for 1 day; d) solution of H2 and NaCl (5.00 mM, 1:1) after mixing for 2 days; e) solution of H2 and NaCl (5.00 mM, 1:1) after mixing for 3 days; f) solution of H2 and NaCl (5.00 mM, 1:1) after mixing for 4 days; g) filtered solution of H2 and NaCl (5.00 mM, 1:1) after mixing for 5 days; h) g after adding 1 equivalent of LiCl (5.00 mM); i) solution of H2 and LiCl (5.00 mM, 1:1) after mixing for 1 min.
Figure 29:
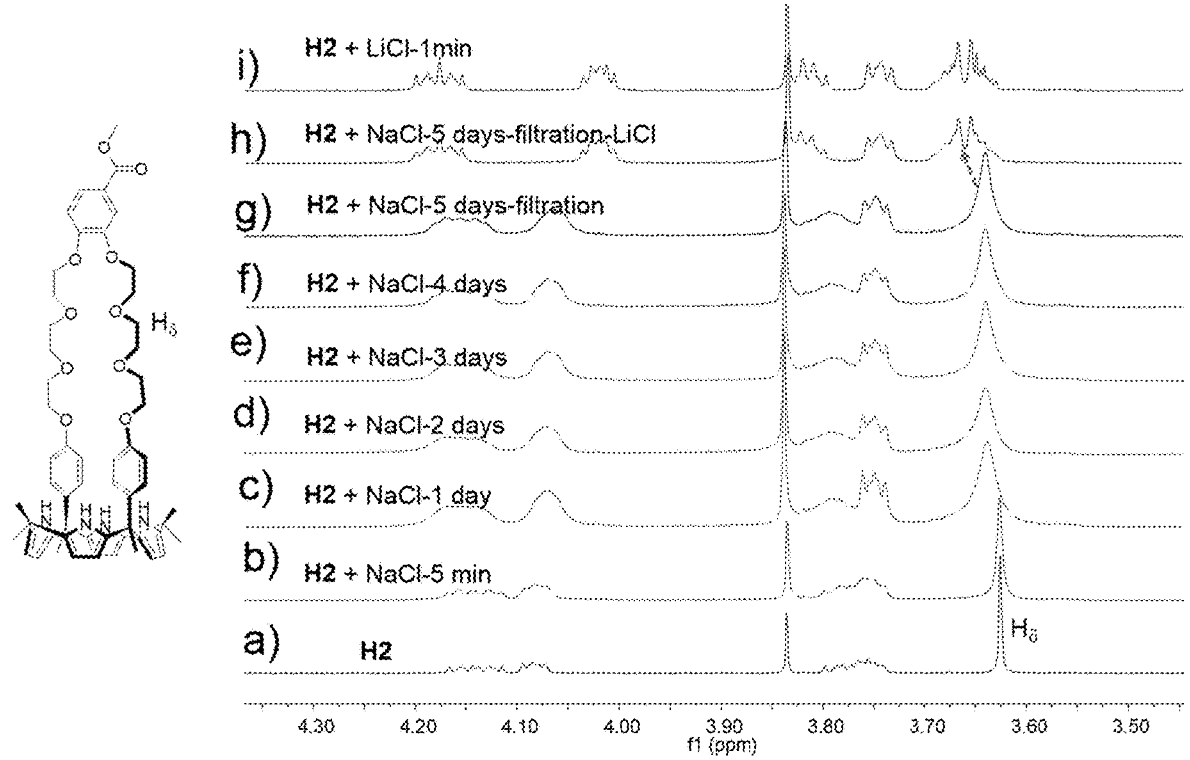
FIG. 29 shows partial $^1$H NMR spectra (3.5-4.3) (400 MHz, $CD_3CN$, 298 K) of a) 112; b) solution of H2 and NaCl (5.00 mM, 1:1) after mixing for 1 min; c) solution of H2 and NaCl (5.00 mM, 1:1) after mixing for 1 day; d) solution of H2 and NaCl (5.00 mM, 1:1) after mixing for 2 days; e) solution of H2 and NaCl (5.00 mM, 1:1) after mixing for 3 days; f) solution of H2 and NaCl (5.00 mM, 1:1) after mixing for 4 days; g) filtered solution of H2 and NaCl (5.00 mM, 1:1) after mixing for 5 days; h) g after adding 1 equivalent of LiCl (5.00 mM); i) solution of H2 and LiCl (5.00 mM, 1:1) after mixing for 1 min.
Figure 30:
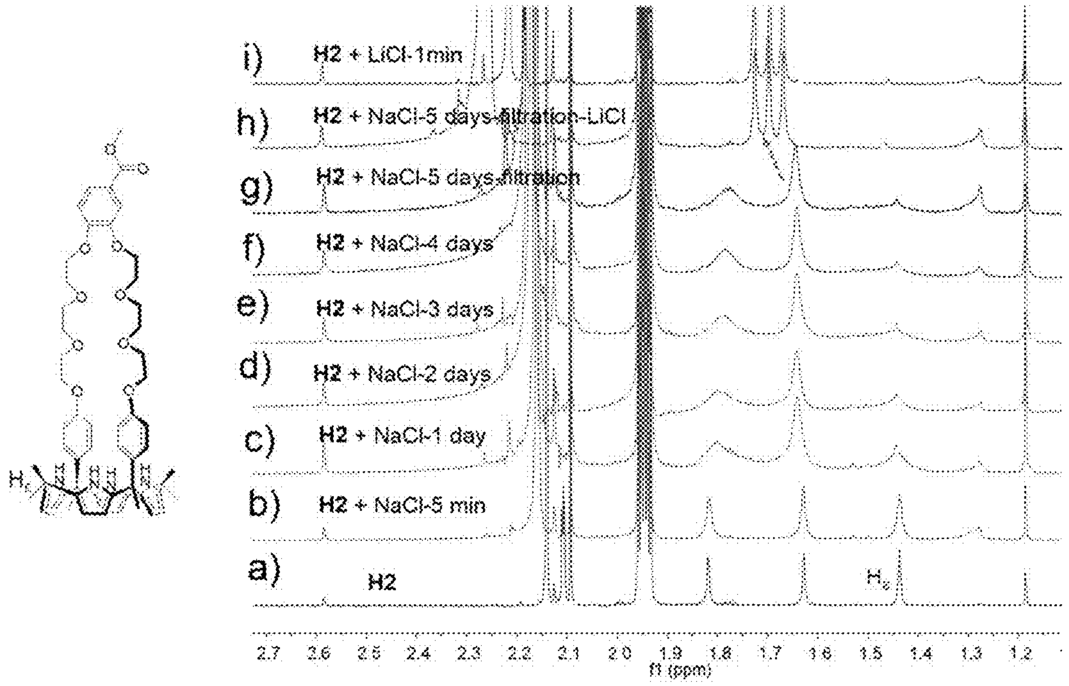
FIG. 30 shows partial $^1$H NMR spectra (1.0-2.5) (400 MHz, $CD_3CN$, 298 K) of a) 112; b) solution of H2 and NaCl (5.00 mM, 1:1) after mixing for 1 min; c) solution of H2 and NaCl (5.00 mM, 1:1) after mixing for 1 day; d) solution of H2 and NaCl (5.00 mM, 1:1) after mixing for 2 days; e) solution of H2 and NaCl (5.00 mM, 1:1) after mixing for 3 days; f) solution of H2 and NaCl (5.00 mM, 1:1) after mixing for 4 days; g) filtered solution of H2 and NaCl (5.00 mM, 1:1) after mixing for 5 days; h) g after adding 1 equivalent of LiCl (5.00 mM); i) solution of H2 and LiCl (5.00 mM, 1:1) after mixing for 1 min.
Figure 31:
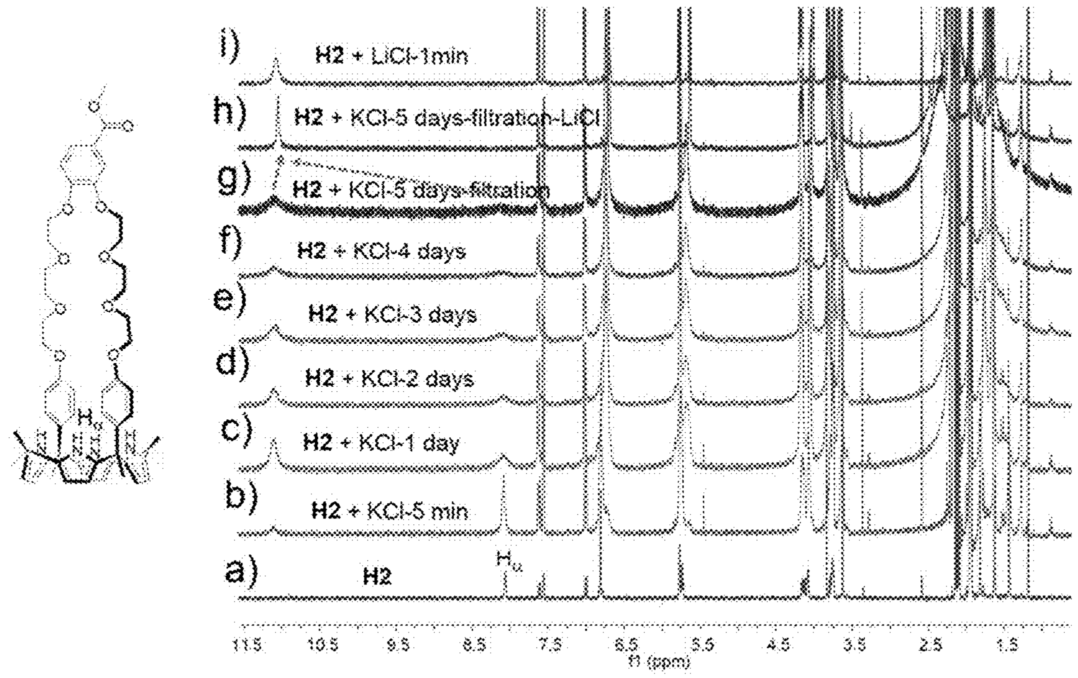
FIG. 31 shows competition between H2⊃LiCl and H2⊃KCl. $^1$H NMR spectra (400 MHz, $CD_3CN$, 298 K) of a) 112; b) solution of H2 and KCl (5.00 mM, 1:1) after mixing for 1 min; c) solution of H2 and KCl (5.00 mM, 1:1) after mixing for 1 day; d) solution of H2 and KCl (5.00 mM, 1:1) after mixing for 2 days; e) solution of H2 and KCl (5.00 mM, 1:1) after mixing for 3 days; f) solution of H2 and KCl (5.00 mM, 1:1) after mixing for 4 days; g) filtered solution of H2 and KCl (5.00 mM, 1:1) after mixing for 5 days; h) g after adding 1 equivalent of LiCl (5.00 mM); i) solution of H2 and LiCl (5.00 mM, 1:1) after mixing for 1 min.
Figure 32:
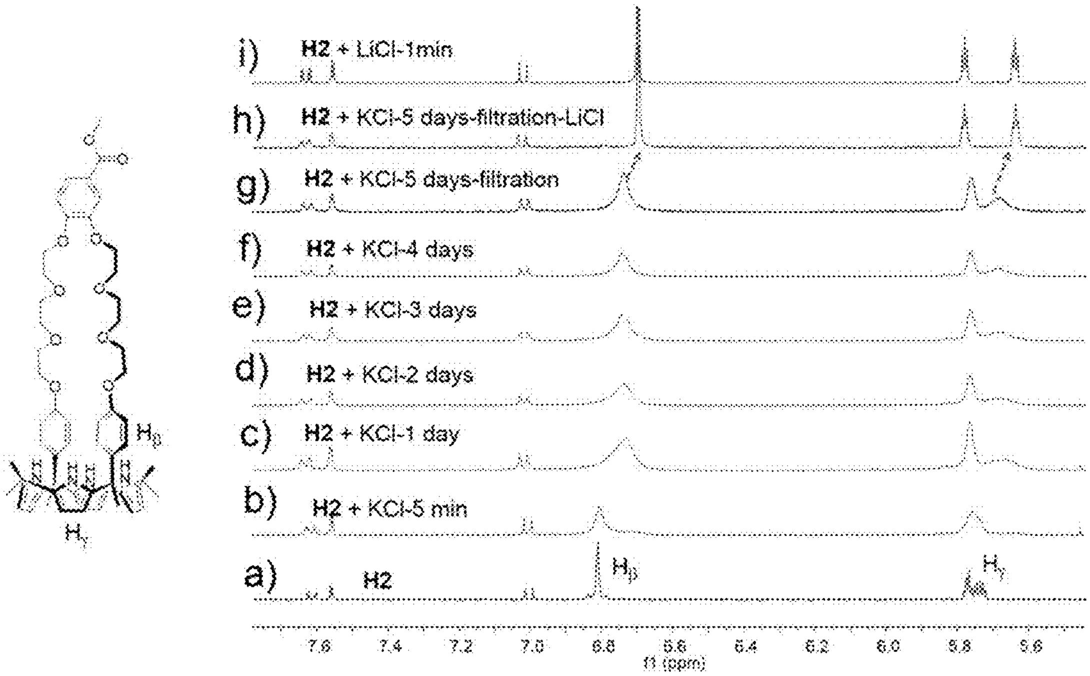
FIG. 32 shows partial $^1$H NMR spectra (5.3-7.7) (400 MHz, $CD_3CN$, 298 K) of a) 112; b) solution of H2 and KCl (5.00 mM, 1:1) after mixing for 1 min; c) solution of H2 and KCl (5.00 mM, 1:1) after mixing for 1 day; d) solution of H2 and KCl (5.00 mM, 1:1) after mixing for 2 days; e) solution of H2 and KCl (5.00 mM, 1:1) after mixing for 3 days; f) solution of H2 and KCl (5.00 mM, 1:1) after mixing for 4 days; g) filtered solution of H2 and KCl (5.00 mM, 1:1) after mixing for 5 days; h) g after adding 1 equivalent of LiCl (5.00 mM); i) solution of H2 and LiCl (5.00 mM, 1:1) after mixing for 1 min.

By carrying out $^1$H NMR spectroscopic measurements analogous to those performed in nitrobenzene-$d_5$, it was found that H1 and H2 bind LiCl (cf FIG. 3) in $CD_3CN$ and display a preference for LiCl over NaCl, KCl, $MgCl_2$, and $CaCl_2$). However, the selectivity demarcation was less clean than in the case of nitrobenzene. This is illustrated by a competitive study involving receptor H1 and NaCl and LiCl (FIG. 4A-4D). When H1 as a 5.00 mM solution in 0.5 ml of $CD_3CN$ was contacted with 0.1 mg solid NaCl (corresponding to a 1:1 molar ratio were it fully dissolved) and stirred for 5 days and filtered, the three peaks corresponding to $H_a$ on H1 were seen to broaden, while the number of integrated protons in this spectral region decreased from 4 to 2.46. These changes are ascribed to the partial complexation of NaCl by H1, which causes the chemical shift of the $H_a$ signal in the complex to move to lower field under conditions of apparent slow exchange. However, the effect is modest. In contrast, when 1 equiv of LiCl was added to the mixed (and filtered) solution of H1 and NaCl generated after 5 days of mixing, the proton signals of $H_a$ were seen to shift to 11.06 ppm with three distinct peaks, integrating to 4 protons, being observed. The resulting spectrum proved concordant with the NMR spectrum of a 1:1 mixture of H1 and LiCl. On this basis, it is inferred that H1 has a higher affinity for LiCl over NaCl. The results of other competitive complex studies involving H1 and H2 and the five test metal salts considered in support of the present invention (i.e., LiCl, NaCl, KCl, $MgCl_2$, and $CaCl_2$) are provided in FIGS. 5-54. In all $^1$H NMR spectroscopic studies carried out in $CD_3CN$, the interactions of LiCl with H1 or H2 were found to be subject to fast exchange, whereas slow exchange on the NMR time scale was seen for NaCl, KCl, $MgCl_2$, and $CaCl_2$. According to the integration of the proton peaks, the ratio of H1 or H2 involved in the complexation with various metal salts could be calculated as a function of time (FIGS. 4E & 4F). The relative affinity of H1 and H2 for LiCl could also be ascertained, at least qualitatively, from the $^1$H NMR spectral studies. For instance, in a mixed $CD_3CN$ solution consisting of H1, H2, and LiCl (5.00 mM in each), the chemical shift of $H_a$ in H2 is seen move to lower field (FIG. 55). In contrast, the chemical shift of the signal corresponding to $H_a$ of H1 remains unchanged. On this basis, it is concluded that H2 has a higher affinity for LiCl than its congener H1. This qualitative assessment matches what was predicted. In contrast to what was inferred in the case of the chloride anion salts, when corresponding qualitative analyses were carried out using $LiPF_6$ and $NaPF_6$ in conjunction with H1-monomer, relative selectivity for the sodium salt was observed (cf. FIG. 76). It can be seen from the 1H NMR spectrum that H1-monomer has no complexation with $LiPF_6$, but has a very strong complexing ability for $NaPF_6$. Thus, both crown ether-driven cation recognition and calix[4]pyrrole-based anion binding contribute to the ion pair selectivity of H1 and H2.

The complexation of anions by calix[4]pyrrole is driven by NH-anion hydrogen bonding interactions. It was thus expected that in polar protic solvents no appreciable interaction between H1 or H2 and any of the test salts would be seen. In fact, no evidence of LiCl (or NaCl, KCl, $MgCl_2$, and $CaCl_2$) complexation was seen in methanol-$d_4$ (cf. FIG. 79). It was thus considered likely that methanol could be used to release LiCl from polymers containing H1 or H2.

As noted above, it was postulated that the use of a polymer system containing lithium cation selective receptors might have advantages in terms of, e.g., initial ease of use and recyclability. In this context gels appeared attractive since they can be made stable due to their internal cross-linked network structure, while still allowing good solvent accessibility. To test this hypothesis, H1-monomer and H2-monomer were synthesized from H1 and H2 by reacting with 2-hydroxyethyl methacrylate. These two monomers were then used to prepare two organic gels (G1 and G2) cross-linked by the chemical cross-linking agent 1,6-hexanediol diacrylate. The internal solvents present in G1 and G2 were then removed in vacuo to obtain the cross-linked networks P1 and P2. A control polymer, P, that does not contain either host, was prepared in an analogous manner. The rheological experimental results showed that both storage modulus, G', and loss modulus, G", increase with frequency, and G' is always larger than G" in the range of 0.1-1000 rad/s, indicating that the sample is in the gel state with predominantly elastic property (FIGS. 74A and 75B). This highly viscoelastic gel can keep the shape over time. As shown in FIGS. 74A and 74B, compression test was used to evaluate the mechanical strength of G1 and G2. The fracture stress and strain were determined from the first peak of the compression curve. The fracture normal stress of G1 and G2 are respectively 3952 Pa and 3358 Pa. And the fracture strain of G1 and G2 are respectively 0.633 and 0.656. Therefore, it can be calculated that the fracture compressive modulus of G1 and G2 are 6243 Pa and 5118 Pa respectively. The control gel G has similar mechanical property (cf. FIG. 74). Importantly, SEM measurements confirmed all three polymers as being porous materials likely to swell in acetonitrile.

The polymer networks P1 and P2 containing receptors H1 and H2, respectively, were then used for adsorption and release experiments. Comparable tests were carried out using the receptor-free control polymer P (cf. FIG. 59). In a first study, P1, P2, and P were added to acetonitrile that had been pre-saturated with NaCl and LiCl by storing over a mixture of the two salts. The conductivities of the three acetonitrile solutions in question were then monitored as a function of time (FIG. 57A). In the case of P1 and P2, but not P, a ca. 12.6% and 14% decrease respectively in the conductivity was seen after 24 h. The resulting gel materials (formed from P1, P2, and P upon absorption of the acetonitrile) were then physically removed from the acetonitrile medium by simply lifting out from the reaction vessel. All three gels were then soaked in methanol. The conductivity of the resulting methanol liquors was likewise monitored as a function of time and found to increase monotonically (FIG. 57B). Similar results were obtained when a mixture of all five test salts, namely LiCl, NaCl, KCl, $MgCl_2$ and $CaCl_2$), were used (FIGS. 57C & 57D). The decrease in the initial acetonitrile solution conductivity and the increase in that of the methanol wash seen in the case of P1/G1 and P2/G2, but not P/G, is ascribed to the uptake and subsequent release of the salts by the receptor functionalized soft materials. Left undetermined by these studies is the relative contribution of lithium capture vs. that of the other cations (viz. $Na^+$ or $Na^+$, $K^+$, $Ca^{2+}$, or $Mg^{2+}$ depending on the study in question).

Inductively coupled plasma mass spectrometry (ICP-MS) was thus used to quantify the metal levels in the above experiments. This was done before treatment with P1 and P2 and after soaking the resulting gels in methanol to effect salt release. In order to facilitate comparisons, the metal concentrations were normalized to the Li concentration (set as 1.0). The primary data are provided in Table 2. For the polymer-based extraction and release experiments involving binary mixtures of LiCl and NaCl, the results are shown in FIG. 57E.

Before extraction, the normalized concentration of Na was 0.247. After release, the normalized concentrations of Na were 0.059 (G1) and 0.068 (G2). These results are taken as evidence that P1/P2 is a more effective extractant for LiCl than NaCl. For the mixed acetonitrile saturated solutions of the five test salts used to support the present disclosure (viz. LiCl, NaCl, KCl, $MgCl_2$, and $CaCl_2$)), the normalized metal concentrations proved to be 0.708 (Na), 0.153 (K), 2.031 (Mg) and 0.162 (Ca) prior to polymer-based extraction. The normalized concentration of the five metals in the methanol solution after washing and presumed salt release were 0.061 (Na), 0.013 (K), 0.17 (Mg) and 0.093 (Ca) in the case of G1. The corresponding values for G2 were 0.080 (Na), 0.047 (K), 0.23 (Mg) and 0.125 (Ca), respectively. On the basis of these results, it is concluded that P1 and P2 are selective extractants for LiCl and that this selectivity holds in the presence of potential interferents, either NaCl or a mixture of NaCl KCl, $MgCl_2$ and $CaCl_2$). In addition, based on the data summarized in FIGS. 57E & 57F, it is concluded that although the extraction capacity of P2 is higher than that of P1, the selectivity of P1 for Li is greater than that of P2 (see also FIG. 58). This conclusion is consistent with the theoretical analyses of the monomers upon which these two polymers are based. As a comparison, H1-monomer and H2-monomer are used in SLE. From the result of ICP-MS result (cf. FIG. 75), the concentration of Li, Na, K, Mg and Ca increases. But the ratio of the increase in the concentration of Li is highest (cf. FIG. 76). It can be seen that H1-monomer and H2-monomer also has obvious selectivity to LiCl in SLE.

To summarize the above findings, the structures of the two strapped calix[4]pyrroles H1 and H2 that constitute representative embodiments of the present disclosure were confirmed by single crystal X-ray diffraction analysis. Both systems were tested for their ability to coordinate five test metal chloride salts, namely LiCl, NaCl, KCl, $MgCl_2$ and $CaCl_2$). High selectivity for LiCl was inferred from $^1H$ NMR spectral studies carried out in deuterated nitrobenzene and $CD_3CN$. No appreciable binding was seen in methanol. Receptors H1 and H2 were then used to prepare two organic gels, G1 and G2. The mechanical properties and microstructure of the gel were characterized by rheology, compression tests, and SEM analyses. A porous network structure was inferred, which suggested that these gels would retain their integrity in the presence of organic solvents thereby facilitating their recycling under conditions of use. Tests of gel-based extraction and release efficacy were carried out in acetonitrile and methanol, respectively by monitoring the solution conductivity as a function of time. ICP-MS analyses, carried out before contacting salt-saturated acetonitrile solutions with P1 and P2 and after release of material from the resulting gels, G1 and G2, revealed selectivity for LiCl. Although the effect is modest, it appears that both H1 and G1 possess a higher selectivity for LiCl as compared to H2 and G2.

Perceived advantages of the present approach include that the polymers retain their integrity and are thus easy to move from a medium (acetonitrile) that favors LiCl complexation to a solvent (methanol) that leads to its release. Following methanol treatment, the polymers may be dried allowing for their reuse (cf. FIG. 74). A further potential benefit is that this lithium separation system as a whole operates in purely organic media obviating the need to overcome the high hydration energy of lithium salts and reducing the chances that free standing receptors become sources of secondary environmental contamination. The present approach will be useful in lithium recovery and recycling applications.

B. Synthesis and Characterization Data

Materials and Methods. All reagents and starting materials were obtained from commercial suppliers and used without further purification unless otherwise noted. Compounds 1 (Harada et al., 2017) was prepared according to published procedures. One-dimensional nuclear magnetic resonance (NMR) spectra were recorded on Agilent MR 400 and Varian Inova 500 instruments. ESI mass spectra were obtained on an Agilent Technologies 6530 Accurate-Mass Q-TOF LC/MS or a Thermo Scientific TSQ Quantum GC/MS. Melting points were determined using a MEL-TEMP capillary melting point apparatus. The Fourier transform infrared (FTIR) spectrum of the hydrogels were recorded by using an FTIR spectrometer (Thermo Mattson, Infinity Gold FTIR) equipped with a liquid nitrogen cooled narrow band MCT detector. An attenuated total reflection cell equipped with a Ge crystal was employed. Scanning electron microscopy (SEM) investigations were carried out on a HITACHI S-5500 SEM/STEM instrument. The conductivity of aqueous anion salt solutions was determined on a DDS-307 instrument. UV-vis spectra were measured on a Varian Cary 5000 spectrophotometer. Rheological experiments were performed using a rheometer (AR 2000EX, TA instrument) with a Peltier plate in the frequency sweep mode (25° C.). Tensile tests were performed using a tensile Hounsfield machine equipped with a 5-N load cell. The experiments were performed at room temperature using a deformation rate of 100 mm $min^{-1}$.

Synthetic Route of Compound H1 and H2

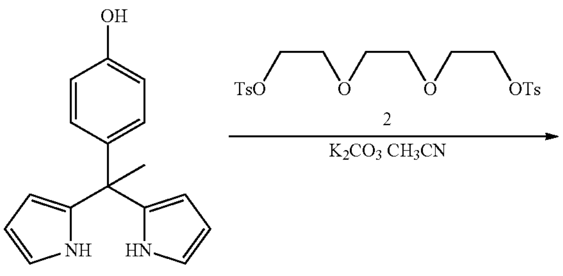

1

-continued
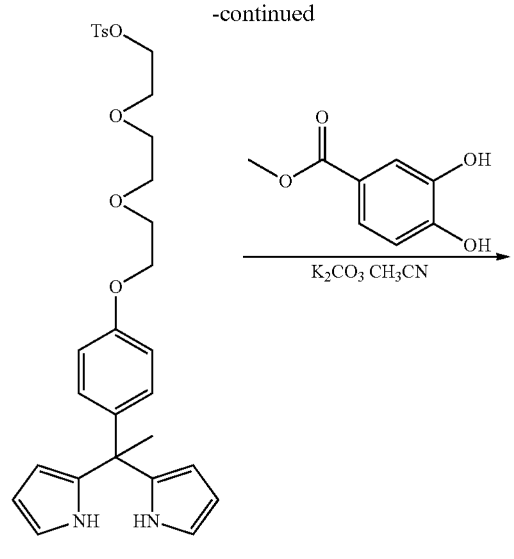
3
-continued
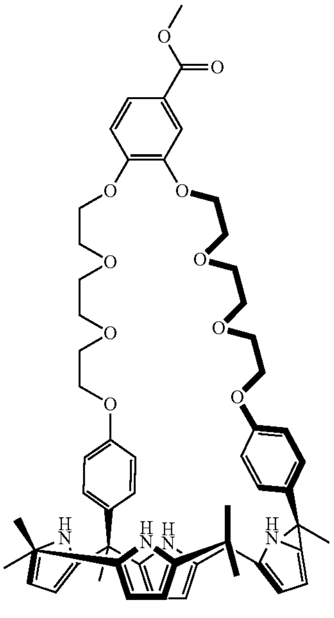
H1
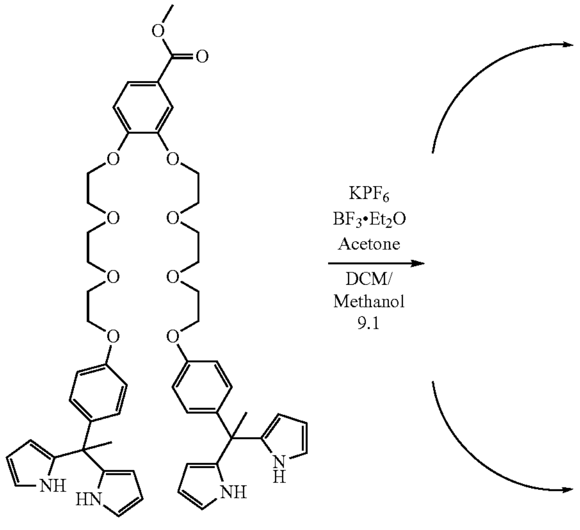
4
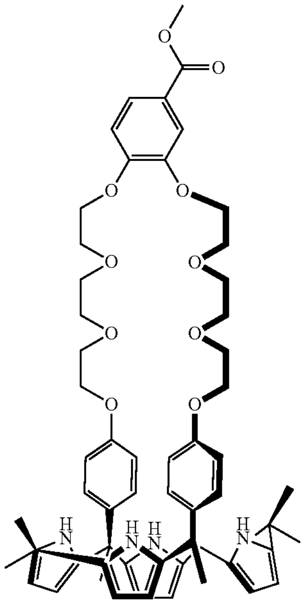
H2

Synthesis of Compound 3

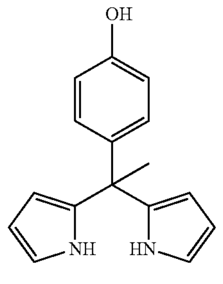

1

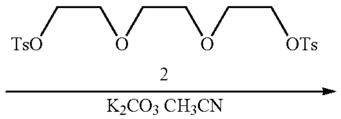

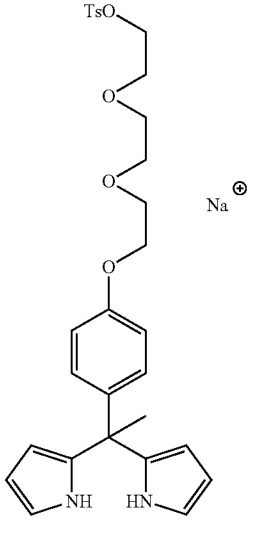

3

In a 500 mL round-bottomed flask equipped with condenser and magnetic stirrer, compound 1 (30.0 g, 119 mmol), compound 2 (164 g, 357 mmol) and $K_2CO_3$ (49.3 g, 357 mmol) was added to $CH_3CN$ (250 mL). The flask was evacuated and then nitrogen was introduced. After this process had been carried out three times, the mixture was then stirred for 24 hours in an oil bath at 85° C. under vigorous stirring. After cooling down to room temperature, the mixture was then filtered and the filtrate was concentrated. The residue was purified by flash column chromatography (ethyl acetate/hexanes 1:3) to give 3 (24.1 g, 30.1%) as a yellow oil. $^1H$ NMR (400 MHz, DMSO-$d_6$, 298 K) δ (ppm): 10.26 (d, 2.0 Hz, 2H), 7.77-7.71 (m, 2H), 7.43 (d, 8.0 Hz, 2H), 6.81 (s, 2H), 6.77 (s, 2H), 6.59 (dd, 4.3, 2.6 Hz, 2H), 5.84 (m, 2H), 5.49 (m, 2H), 4.10-4.05 (m, 2H), 4.01-3.95 (m, 3H), 3.65 (m, 2H), 3.56-3.52 (m, 2H), 3.49-3.45 (m, 2H), 3.45-3.41 (m, 3H), 2.36 (s, 3H), 1.88 (s, 3H). $^{13}C$ NMR (400 MHz, DMSO-$d_6$, 298 K) δ (ppm): 138.35, 130.56, 128.55, 128.04, 125.90, 117.48, 113.87, 106.59, 106.21, 70.42, 70.14, 69.37, 67.40, 43.98, 40.46, 40.25, 40.04, 39.83, 39.63, 39.42, 39.21. m/z calcd for $[M+H]^+$ $[C_{29}H_{34}N_2O_6S+H]^+$, 539.2210; found 539.2220; error −1.74 ppm.

Synthesis of Compound 4

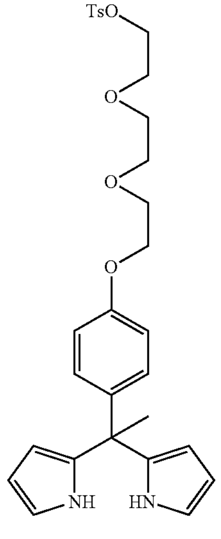

3

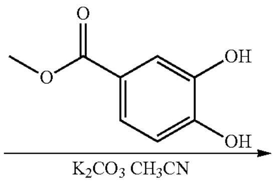

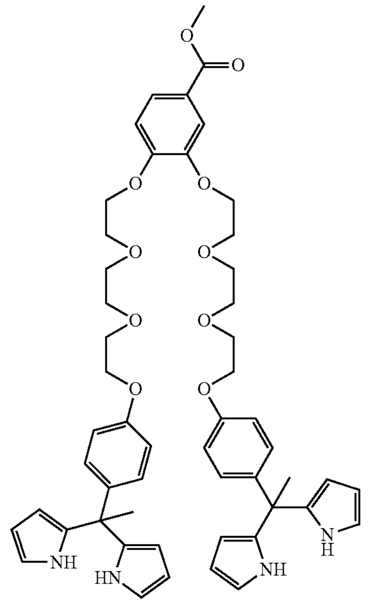

4

In a 500 mL round-bottomed flask equipped with condenser and magnetic stirrer, compound 3 (24.0 g, 44.6 mmol), methyl 3,4-dihydroxybenzoate (3.75 g, 22.3 mmol) and $K_2CO_3$ (18.5 g, 134 mmol) was added to $CH_3CN$ (250 mL). The flask was evacuated and then nitrogen was introduced. After this process had been carried out three times, the mixture was then stirred for 24 hours in an oil bath at 85° C. under vigorous stirring. After cooling down to room temperature, the mixture was then filtered, and the filtrate was concentrated. The residue was purified by flash column chromatography (ethyl acetate/hexanes 1:2) to give 4 (18.1 g, 45.0%) as a yellow oil. $^1H$ NMR (400 MHz, DMSO-$d_6$, 298 K) δ (ppm): 10.26 (d, 2.1 Hz, 4H), 7.52 (m, 1H), 7.44 (d, 2.0 Hz, 1H), 7.05 (d, 8.5 Hz, 0H), 6.83-6.79 (m, 1H), 6.76 (t, 7.3 Hz, 1H), 6.58 (m, 1H), 5.83 (m, 1H), 5.48 (m, 1H), 4.15-4.06 (m, 1H), 3.98 (d, 7.0 Hz, 1H), 3.76 (s, 1H), 3.71

(m, 1H), 3.69-3.65 (m, 1H), 3.60-3.57 (m, 1H), 3.55 (d, 4.7 Hz, 1H), 1.87 (s, 2H). $^{13}C$ NMR (400 MHz, DMSO-$d_6$, 298 K) δ (ppm): 157.01, 154.16, 148.75, 141.26, 138.31, 129.85, 128.50, 117.42, 113.86, 106.21, 70.36, 69.24, 68.63, 67.43, 43.97, 28.68. m/z calcd for $[M+Na]^+$ $[C_{52}H_{60}N_4O_{10}+Na]^+$, 923.4202; found 923.4195; error 0.74 ppm.

Synthesis of Compound H1 and H2

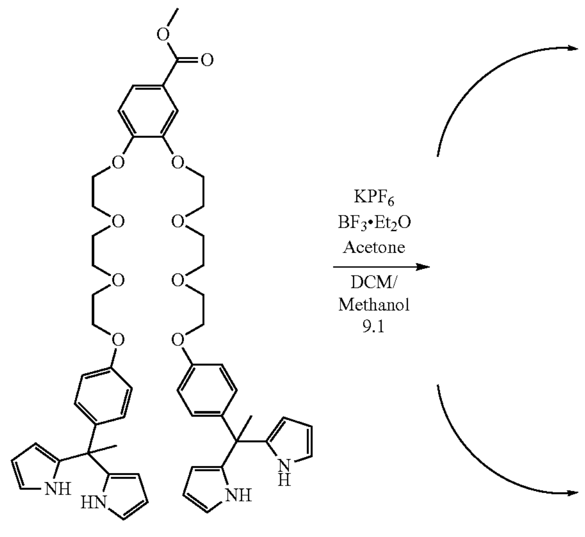

4

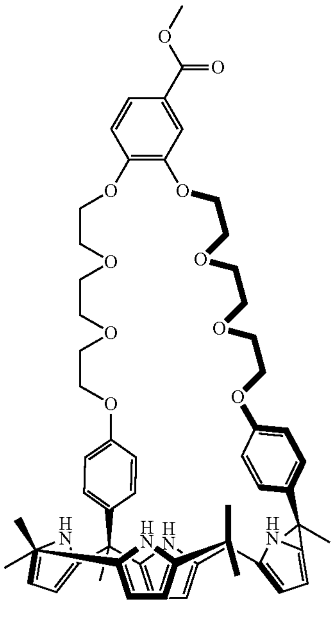

H1

-continued

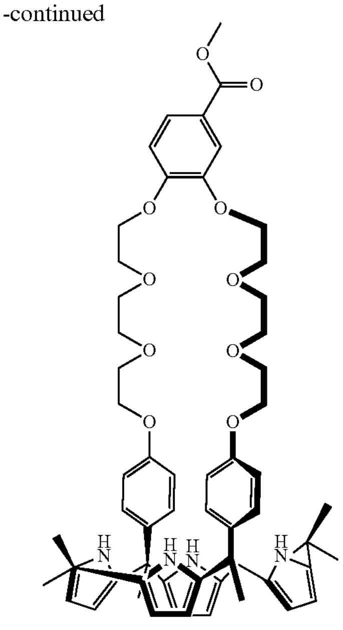

H2

In a 500 m round-bottomed as equipped with condenser an magnetic stirrer, compound 4 (18.0 g, 20.0 mmol), $KPF_6$ (7.36 g, 40.0 mmol), boron trifluoride ethyl etherate (3.0 ml) and acetone (20 ml) was added to the 4 L mixed solvent DCM/methanol (9:1). The mixture was then stirred for 48 hours at room temperature. Then the mixture was concentrated. The residue was purified by flash column chromatography (ethyl acetate/hexanes 1:1) to give H1 (2.94 g, 15.0%) and H2 (3.92 g, 20.0%) as a yellow oil. For H1: $^1H$ NMR (400 MHz, $CD_3CN$, 298 K) δ (ppm): 8.15 (s, 1H), 7.90 (s, 1H), 7.77 (s, 2H), 7.63 (m, 1H), 7.55 (d, 2.0 Hz, 1H), 7.01 (d, 8.5 Hz, 1H), 6.79 (s, 8H), 5.96 (d, 2.7 Hz, 2H), 5.85 (d, 2.7 Hz, 4H), 5.73 (m, 2H), 4.20-4.16 (m, 5H), 4.05 (t, 4.6 Hz, 4H), 3.83 (s, 7H), 3.77 (m, 4H), 3.69 (s, 4H), 3.67 (s, 4H), 1.81 (s, 6H), 1.52 (s, 6H), 1.44 (s, 6H). $^{13}C$ NMR (400 MHz, $CD_3CN$, 298 K) δ (ppm): 166.38, 157.10, 152.79, 148.19, 141.38, 139.83, 138.08, 136.26, 128.69, 123.57, 114.00, 113.50, 112.40, 105.00, 103.79, 103.37, 102.37-102.17, 70.49, 69.22, 68.78, 67.38, 51.53, 43.80, 35.10, 30.32, 29.14, 27.50. m/z calcd for $[M+Na]^+$ $C_{58}H_{68}N_4O_{10}^+$, 1003.4828; found 1003.4826; error 0.13 ppm. For H2: $^1H$ NMR (400 MHz, $CD_3CN$, 298 K) δ (ppm): 8.06 (s, 4H), 7.61 (m, 1H), 7.56 (d, 2.0 Hz, 1H), 7.00 (d, 8.3 Hz, 0H), 6.81 (d, 2.3 Hz, 2H), 5.79-5.72 (m, 2H), 4.17-4.11 (m, 1H), 4.10-4.07 (m, 1H), 3.84 (s, 1H), 3.77 (m, 2H), 3.63 (s, 2H), 1.82 (s, 2H), 1.63 (s, 2H), 1.44 (s, 2H). $^{13}C$ NMR (400 MHz, $CD_3CN$, 298 K) δ (ppm): 157.15, 140.83, 139.01, 137.33, 128.54, 123.62, 113.55, 112.78, 104.79, 70.37, 69.44-69.00, 68.53, 68.30, 67.30, 43.84, 34.63, 29.96, 28.65, 26.59. m/z calcd for $[M+Na]^+$ $C_{58}H_{68}N_4O_{10}^+$, 1003.4828; found 1003.4833; error −0.52 ppm.

Preparation of Monomer H1-Monomer, H2-Monomer, Gel G1, Gel G2 and G-Control

Synthesis of Monomer H1-Monomer

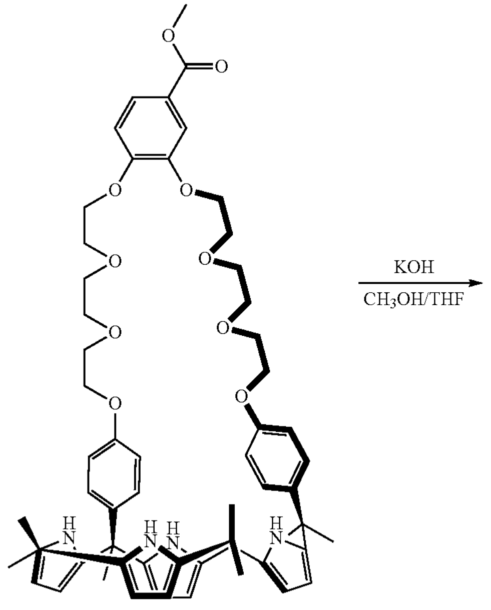

H1

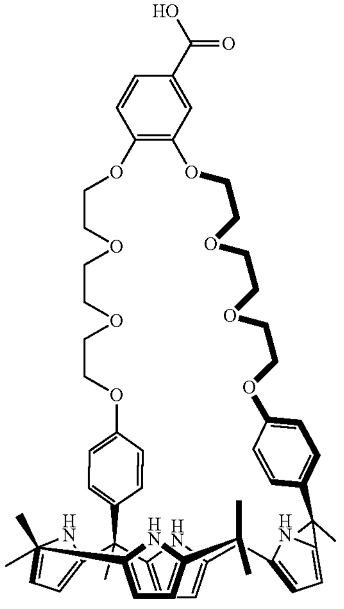

5

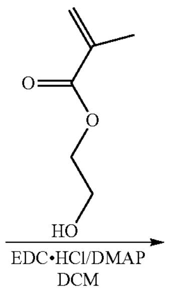

-continued

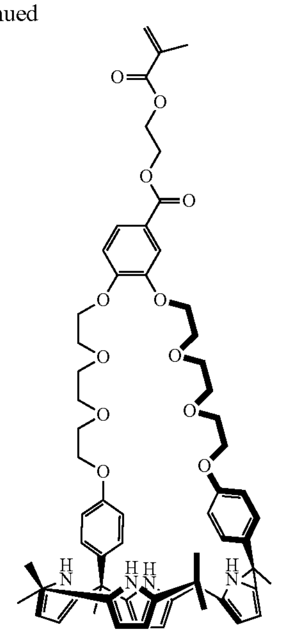

H1-monomer

In a 500 mL round-bottomed flask equipped with condenser and magnetic stirrer, compound H1 (1.00 g, 1.02 mmol) and KOH (1.12 g, 20.0 mmol) was added to the 100 mL mixed solvent methanol/tetrahydrofuran (1:1). The mixture was stirred for 24 hours. When the reaction was complete, HCl was added to adjust the solution to pH=1. The solvent was removed with a rotary evaporator. The mixture was dissolved in 200 ml water, which was extracted with DCM (200 mL 3). The organic phase was combined, dried with anhydrous $Na_2SO_4$, and concentrated. to give the residue 5, which was used in the next step without further purification. The residue 5 (1.90 g), 2-hydroxyethyl methacrylate (0.290 g, 5.27 mmol), DMAP (0.270 g, 2.19 mmol) and EDC HCl (0.840 g, 4.39 mmol) in 200 mL of DCM was stirred at room temperature for 1 day. DCM was removed with a rotary evaporator, and then the residue was purified by silica gel flash column chromatography (dichloromethane/methanol, 60:1 v/v) to provide H1-monomer as a white solid (1.30 g, 65%). $^1$H NMR (400 MHz, DMSO-$d_6$, 298 K) δ (ppm): 10.17 (s, 1H), 9.80 (s, 1H), 8.94 (s, 2H), 7.53 (s, 1H), 7.42 (s, 1H), 7.07 (d, 8.4 Hz, 1H), 6.84 (s, 4H), 6.71 (d, 8.8 Hz, 4H), 5.99 (s, 1H), 5.83 (s, 4H), 5.72 (s, 2H), 5.64 (s, 1H), 5.50 (d, 19.0 Hz, 2H), 4.42 (d, 9.0 Hz, 4H), 4.06 (s, 4H), 4.02 (s, 4H), 3.75 (s, 4H), 3.67 (s, 4H), 3.62 (s, 4H), 3.54 (s, 4H), 1.82 (s, 3H), 1.68 (s, 6H), 1.45 (s, 6H), 1.32 (d, 6.6 Hz, 6H). $^{13}$C NMR (400 MHz, $CD_3CN$, 298 K) δ (ppm): 157.12, 152.98, 148.19, 141.46, 139.83, 138.05, 136.31, 128.70, 125.28, 123.67, 114.07, 113.48, 105.07, 103.73, 103.38-103.19, 102.16, 70.49, 69.19, 68.78, 67.38, 43.80, 35.09, 30.34, 29.18-28.98, 27.48, 17.44. m/z calcd for $[M+Na]^+$ $C_{63}H_{74}N_4O_{12}^+$, 1101.5195; found 1101.5206; error −0.95 ppm.

Synthesis of Monomer H2-Monomer

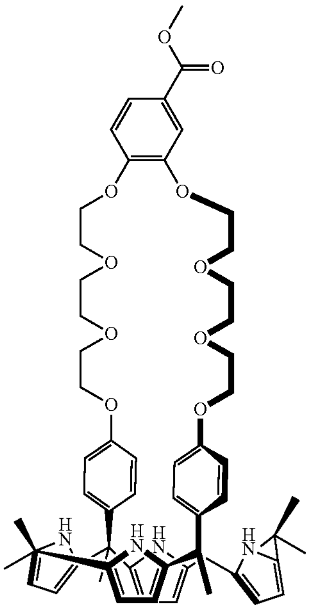

H2

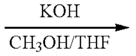

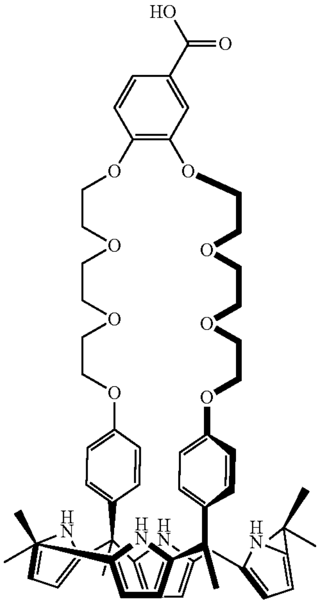

6

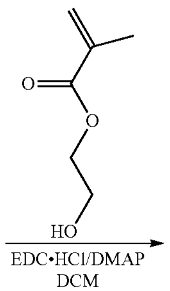

-continued

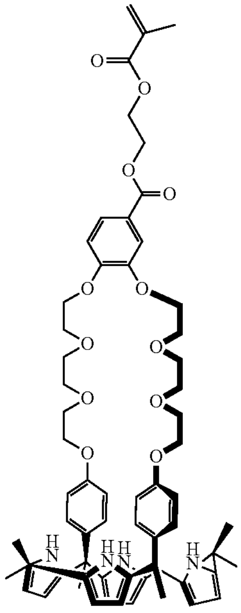

H2-monomer

In a 500 mL round-bottomed flask equipped with condenser and magnetic stirrer, compound H2 (1.00 g, 20.0 mmol) and KOH (7.36 g, 40.0 mmol) was added to the 100 mL mixed solvent methanol/tetrahydrofuran (1:1). The mixture was stirred for 24 hours. The solvent was removed with a rotary evaporator to give the residue 5, which was used in the next step without further purification. The residue 5 (1.90 g, 4.39 mmol), 2-hydroxyethyl methacrylate (0.290 g, 5.27 mmol), DMAP (0.270 g, 2.19 mmol) and EDC HCl (0.840 g, 4.39 mmol) in 200 mL of DCM was stirred at room temperature for 1 day. DCM was removed with a rotary evaporator, and then the residue was purified by silica gel flash column chromatography (dichloromethane/methanol, 60:1 v/v) to provide H2-monomer as a white solid (1.30 g, 65%). $^{1}$H NMR (400 MHz, DMSO-$d_6$, 298 K) δ (ppm): 9.45 (s, 4H), 7.53 (m, 1H), 7.44 (d, 2.0 Hz, 1H), 7.08 (d, 1H), 6.79 (s, 4H), 6.67 (m, 4H), 6.01 (s, 1H), 5.63 (d, 2.8 Hz, 8H), 5.59 (d, 2H), 4.48-4.44 (m, 2H), 4.42 (d, Hz, 2H), 4.13-4.09 (m, 2H), 4.04 (d, 5.0 Hz, 6H), 3.69 (d, 10.6 Hz, 8H), 3.55 (s, 8H), 1.87-1.83 (m, 3H), 1.71 (s, 6H), 1.60 (s, 6H), 1.40 (s, 6H). $^{13}$C NMR (400 MHz, $CD_3CN$, 298 K) δ (ppm): 165.71-165.51, 157.15, 138.95, 137.24, 128.60, 114.45, 113.56, 112.78, 104.90, 102.31, 70.35, 69.44-68.95, 68.39, 67.29, 62.45, 43.84, 34.64, 29.91, 28.43, 26.59, 17.46. m/z calcd for $[M+Na]^+$ $C_{63}H_{74}N_4O_{12}^+$, 1101.5195; found 1101.5204; error −0.75 ppm.

Preparation of Gel G1 and G2
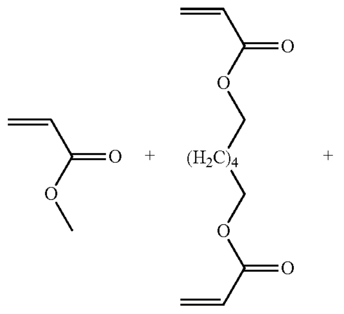
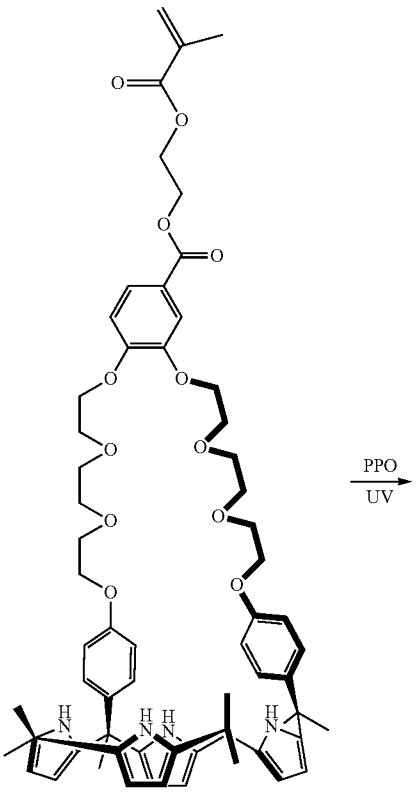
H1-monomer
-continued
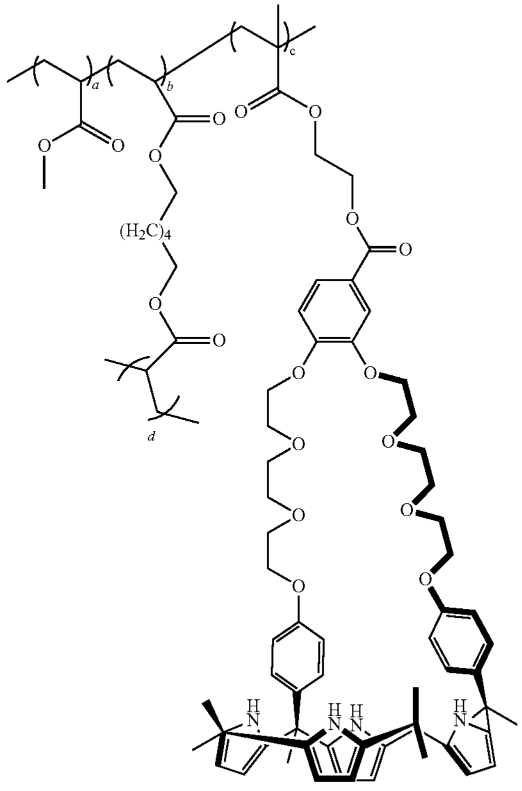
G1
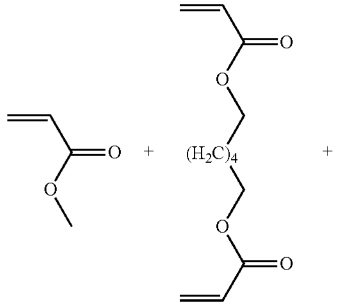

-continued

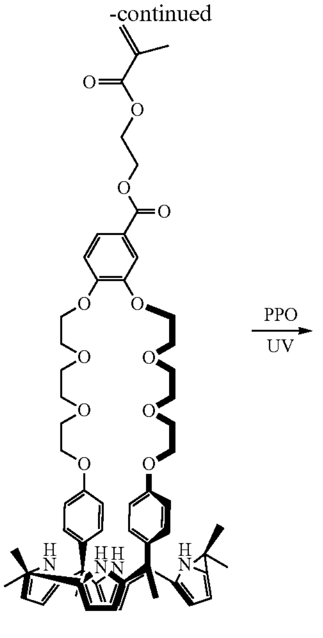

H2-monomer

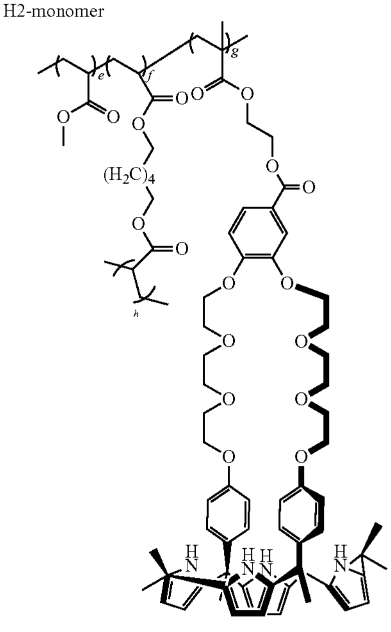

G2

H1-monomer/H2-monomer (25 mg, 0.2 mmol), cross-linking agent (1,6-hexanediol diacrylate) (2.26 mg, 0.01 mmol), methyl acrylate (860 mg, 10 mmol) and photoinitiator phenylbis(2,4,6-trimethylbenzoyl)phosphine oxide (41.8 mg, 0.1 mmol) were dissolved in 5 ml DMSO and stirred for 10 min. The precursor solution was injected into a reaction cell consisting of a pair of glass substrates separated with 0.45 cm thick silicone rubber spacer, which was kept under 365 nm UV light for one hour to complete the polymerization and form organic gel. Then, the organic gel was soaked in acetonitrile for 3 days to get organic gel G1/G2.

Preparation of G-control and P-control (FIG. 59). Cross-linking agent (1,6-hexanediol diacrylate) (2.26 mg, 0.01 mmol), methyl acrylate (860 mg, 10 mmol) and photoinitiator phenylbis(2,4,6-trimethylbenzoyl)phosphine oxide (41.8 mg, 0.1 mmol) were dissolved in 5 ml DMSO and stirred for 10 min. The precursor solution was injected into a reaction cell consisting of a pair of glass substrates separated with 0.45 cm thick silicone rubber spacer, which was kept under 365 nm UV light for one hour to complete the polymerization and form organic gel. Then, the organic gel was soaked in acetonitrile for 3 days to get organic gel G-control. Then, P-control was obtained after drying G-control.

Determination of the association constants of H1⊃LiCl and H2⊃LiCl. To determine the stoichiometry and association constant corresponding to the presumed interaction between Host H1/H2 and Guest molecules, $^1$H NMR spectroscopic titrations were carried out using solutions that had a constant concentration of Host (5.00 mM) and varying concentrations of Guest. Using a non-linear curve-fitting method, the association constant corresponding to the interaction between guest Guest and Host was calculated. From a mole ratio plot, evidence for a 1:1 stoichiometry was obtained.

The non-linear curve-fitting was based on the following equation (CrysAlisPro., 2019):

$$\Delta\delta=(\Delta\delta_\infty/[G]_0)(0.5[H]_0+0.5([G]_0+1/K_a)-(0.5([H]_0^2+(2[H]_0(1/K_a-[G]_0))+(1/K_a+[G]_0)^2)^{0.5})) \quad \text{(Eq. S1)}$$

Where $\Delta\delta$ is the chemical shift change of $H_f/H_\xi$ on Host at $[G]_0$, $\Delta\delta_\infty$ is the chemical shift change of $H_f/H_\xi$ when the host is completely complexed, $[H]_0$ is the fixed initial concentration of Host, and $[G]_0$ is the varying concentration of Guest.

The Ratio of H1/H2 Involved in the Complexation after Reaching the Complexation Balance

TABLE 1

The ratio of H1/H2 involved in the complexation after reaching the complexation balance.

| | LiCl | NaCl | KCl | $MgCl_2$ | $CaCl_2$ |
|---|---|---|---|---|---|
| H1 | 100% | 38.5% | 81.2% | 67.5% | 80.3% |
| H2 | 100% | 47.5% | 82.0% | 74.5% | 84.3% |

IR spectra of H1-monomer, H1-monomer, G-control, G1 and G2. Infrared spectroscopy (IR) was used to obtain insights into the chemical structures of G1 and G2. As shown in FIG. 65, characteristic peaks associated with the monomers H1 and H2 were found in G1 and G2. This was taken as initial evidence for the formation of G1 and G2. As shown in FIG. 54C and FIG. 64C, the peak at around 3300-3500 $cm^{-1}$ comes from the N—H stretching in pyrrole (Ibrahim et al., 2013). The peak at around 1600 $cm^{-1}$ was due to C═C stretching of pyrrole. The peak at around 1100 $cm^{-1}$ comes from the C—N stretching in pyrrole (Haken et al., 1971). The peak at around 2900 $cm^{-1}$ comes from the (O)$CH_3$ stretching in polymethyl acrylate. And the peak at around 1700 $cm^{-1}$ comes from the C═O stretching in polymethyl acrylate.

Correlation Between Conductivity and Concentration for Various Metal Salt Solutions in Acetonitrile and Methanol (FIG. 56 and FIG. 66).

ICP-MS Result:

TABLE 2

The ICP-MS result before extracting in acetonitrile and after releasing in methanol.

| Extractants | Mixture salts | Metals | Metal concentration before extracting in acetonitrile (ppb) | Normalized concentration before extracting | Metal concentration after releasing in methanol (ppb) | Normalized concentration after releasing |
|---|---|---|---|---|---|---|
| P1 | Mixed saturated solution of LiCl and NaCl | Li | 290.629 | 1 | 190.656 | 1 |
| | | Na | 71.840 | 0.247 | 11.30 | 0.059 |
| P2 | Mixed saturated solution of LiCl and NaCl | Li | 290.629 | 1 | 197.656 | 1 |
| | | Na | 71.840 | 0.247 | 13.40 | 0.068 |
| P1 | Mixed saturated solution of LiCl, NaCl, KCl, $MgCl_2$ and $CaCl_2$ | Li | 218.049 | 1 | 170.256 | 1 |
| | | Na | 154.494 | 0.708 | 10.41 | 0.061 |
| | | K | 33.287 | 0.153 | 2.147 | 0.013 |
| | | Mg | 442.929 | 2.031 | 29 | 0.17 |
| | | Ca | 35.334 | 0.162 | 15.82 | 0.093 |
| P2 | Mixed saturated solution of LiCl, NaCl, KCl, $MgCl_2$ and $CaCl_2$ | Li | 218.049 | 1 | 175.556 | 1 |
| | | Na | 154.494 | 0.708 | 14.04 | 0.080 |
| | | K | 33.287 | 0.153 | 8.235 | 0.047 |
| | | Mg | 442.929 | 2.031 | 40.7 | 0.23 |
| | | Ca | 35.334 | 0.162 | 21.94 | 0.125 |

ICP-MS Quantification Studies Before Extracting in Acetonitrile:

1 ml saturated solution of excess solid salts (LiCl, NaCl, KCl, $MgCl_2$, and $CaCl_2$) or (LiCl and NaCl) were passed through 450-nm filters. The solvent was removed under reduced pressure. Then 5 ml of 0.2 M sulfuric acid was added into the vials to dissolve all the solids. Then, 5 µl solution were removed and diluted to 5 ml with 2% $HNO_3$ prior to analysis by ICP-MS. Control experiments were carried out in parallel using the solvent alone. All experiments were carried out in duplicate.

ICP-MS Quantification Studies after Releasing in Methanol:

1 ml methanol solution after gel release were passed through 450-nm filters. The solvent was removed under reduced pressure. Then 1 ml of 0.2 M sulfuric acid was added into the vials to dissolve all the solids. Then, 5 µl solution were removed and diluted to 5 ml with 2% $HNO_3$ prior to analysis by ICP-MS. Control experiments were carried out in parallel using the solvent alone. All experiments were carried out in duplicate.

X-Ray Experimental:

X-ray experimental for the complex H1 LiCl. Crystals grew as clusters of colorless prisms by vapor diffusion of diisopropyl ether into acetonitrile. The data crystal was cut from a cluster of crystals and had approximate dimensions; 0.22×0.18×0.11 mm. The data were collected on an Agilent Technologies SuperNova Dual Source diffractometer using a µ-focus Cu $K_\alpha$, radiation source (k=1.5418 Å) with collimating mirror monochromators. A total of 1001 frames of data were collected using ω-scans with a scan range of 1° and a counting time of 3 seconds per frame for frames collected with a detector offset of +/−41.7° and 12.5 seconds per frame with frames collected with a detector offset of 107.1°. The data were collected at 100 K using an Oxford Cryostream low temperature device. Details of crystal data, data collection and structure refinement are listed in Table 3. Data collection, unit cell refinement and data reduction were performed using Rigaku Oxford Diffraction's CrysAlisPro V 1.171.41.70a (CrysAlisPro, 2019).

The structure was solved by direct methods using SHELXT (SHELXT, 2015) and refined by full-matrix least-squares on $F^2$ with anisotropic displacement parameters for the non-H atoms using SHELXL-2016/6 (Sheldrick, 2015). Structure analysis was aided by use of the programs PLATON (Spek, 2009), OLEX2 (OLEX2, 2009), and WinGX (WinGX 1.64, 1999). The hydrogen atoms on the carbon atoms were calculated in ideal positions with isotropic displacement parameters set to 1.2×Ueq of the attached atom (1.5×Ueq for methyl hydrogen atoms). The hydrogen atoms bound to the pyrrole group nitrogen atoms were located in a ΔF map and refined with isotropic displacement parameters. The phenyl acetyl group was disordered over two orientations. The disorder impacted a partially occupied molecule of acetonitrile that was correlated with that disorder. The disorder was modeled with features available in OLEX2.

The function, $\Sigma w(|F_O|^2-|F_C|^2)^2$, was minimized, where $w=1/[(\sigma(F_O))^2+(0.097*P)^2+(1.5896*P)]$ and $P=(|F_O|^2+2|F_C|^2)/3$. $R_W(F^2)$ refined to 0.181, with R(F) equal to 0.0602 and a goodness of fit, S,=1.14. Definitions used for calculating R(F), $R_W(F^2)$ and the goodness of fit, S, are given below.

$$R_W(F^2)=\{\Sigma w(|F_O|^2-|F_C|^2)^2/\Sigma w(|F_O|)^4\}^{1/2}$$ where $w$ is the weight given each reflection.

$$R(F)=\Sigma(|F_O|-|F_C|)/\Sigma|F_O|\}$$ for reflections with $F_O>4(\sigma(F_O))$.

$S=[\Sigma w(|F_O|^2-|F_C|^2)^2/(n-p)]^{1/2}$, where $n$ is the number of reflections and $p$ is the number of refined parameters.

The data were checked for secondary extinction effects but no correction was necessary. Neutral atom scattering factors and values used to calculate the linear absorption coefficient are from the International Tables for X-ray Crystallography (1992) (International Tables for X-ray Crystallography, 1992). All figures were generated using SHELXTL/PC (Sheldrick, 1994). Tables of positional and thermal parameters, bond lengths and angles, torsion angles and figures are found elsewhere.

TABLE 3

Crystal data and structure refinement for H1•LiCl (see also FIG. 68 and FIG. 69).

| | | |
|---|---|---|
| Empirical formula | C61.06 H72.58 Cl Li N5.53 O10 | |
| Formula weight | 1086.22 | |
| Temperature | 100.01(11) K | |
| Wavelength | 1.54184 Å | |
| Crystal system | triclinic | |
| Space group | P −1 | |
| Unit cell dimensions | a = 10.9218(4) Å | α = 91.337(3)°. |
| | b = 14.0151(5) Å | β = 94.946(3)°. |
| | c = 20.4697(5) Å | γ = 110.901(4)°. |
| Volume | 2911.30(18) $Å^3$ | |
| Z | 2 | |
| Density (calculated) | 1.239 $Mg/m^3$ | |
| Absorption coefficient | 1.084 $mm^{-1}$ | |
| F(000) | 1155 | |
| Crystal size | 0.225 × 0.185 × 0.112 $mm^3$ | |
| Theta range for data collection | 3.381 to 73.348°. | |
| Index ranges | −13 <= h <= 13, −17 <= k <= 16, −25 <= l <= 17 | |
| Reflections collected | 17926 | |
| Independent reflections | 11193 [R(int) = 0.0232] | |
| Completeness to theta = 67.684° | 98.8% | |
| Absorption correction | Gaussian | |
| Max. and min. transmission | 1.000 and 0.793 | |
| Refinement method | Full-matrix least-squares on $F^2$ | |
| Data/restraints/parameters | 11193/104/835 | |
| Goodness-of-fit on $F^2$ | 1.134 | |
| Final R indices [I > 2sigma(I)] | R1 = 0.0602, wR2 = 0.1740 | |
| R indices (all data) | R1 = 0.0678, wR2 = 0.1813 | |
| Extinction coefficient | n/a | |
| Largest diff. peak and hole | 0.913 and −0.444 e · $A^{-3}$ | |
| CCDC deposition number | 2107227 | |

X-Ray Experimental for the Complex H2·LiCl:

Crystals grew as clusters of colorless prisms by vapor diffusion of diisopropyl ether into acetonitrile. The data crystal was separated from a cluster of crystals and had approximate dimensions; 0.14×0.10×0.07 mm. The data were collected on an Agilent Technologies SuperNova Dual Source diffractometer using a μ-focus Cu $K_a$, radiation source (2, =1.5418 Å) with collimating mirror monochromators. A total of 979 frames of data were collected using to ω-scans with a scan range of 1° and a counting time of 10.5 seconds per frame for frames collected with a detector offset of +/−41.7° and 37 seconds per frame with frames collected with a detector offset of 107.1°. The data were collected at 100 K using an Oxford Cryostream low temperature device. Details of crystal data, data collection and structure refinement are listed in Table 4. Data collection, unit cell refinement and data reduction were performed using Rigaku Oxford Diffraction's CrysAlisPro V 1.171.41.70a (CrysAlisPro, 2019). The structure was solved by direct methods using SHELXT (SHELXT, 2015) and refined by full-matrix least-squares on $F^2$ with anisotropic displacement parameters for the non-H atoms using SHELXL-2018/3 (Sheldrick, 2015). Structure analysis was aided by use of the programs PLATON (Spek, 2009) and OLEX2 (OLEX2, 2009). The hydrogen atoms were calculated in ideal positions with isotropic displacement parameters set to 1.2×Ueq of the attached atom (1.5×Ueq for methyl hydrogen atoms). As is typical of these complexes, the methyl-phenyl benzoate group and a portion of the crown ether were disordered. There was a partial acetonitrile molecule in the area where this disorder occurred. The site occupancy for the acetonitrile was tied to that of the minor component of the methyl-phenyl benzoate group.

The function, $\Sigma w(|F_O|^2-|F_C|^2)^2$, was minimized, where $w=1/[(\sigma(F_O))^2+(0.0968*P)^2+(5.3601*P)]$ and $P=(|F_O|^2+2|F_C|^2)/3$. $R_W(F^2)$ refined to 0.200, with R(F) equal to 0.0697 and a goodness of fit, S,=1.04. Definitions used for calculating R(F), $R_W(F^2)$ and the goodness of fit, S, are given below. The data were checked for secondary extinction effects, but no correction was necessary. Neutral atom scattering factors and values used to calculate the linear absorption coefficient are from the International Tables for X-ray Crystallography (1992). All figures were generated using SHELXTL/PC (Sheldrick, 1994). Tables of positional and thermal parameters, bond lengths and angles, torsion angles and figures are found elsewhere.

TABLE 4

Crystal data and structure refinement for H2•LiCl (see also FIG. 58 and FIG. 70).

| | | |
|---|---|---|
| Identification code | licl_calix | |
| Empirical formula | C58.73 H68.73 Cl Li N4.36 O10 | |
| Formula weight | 1038.10 | |
| Temperature | 99.97(19) K | |
| Wavelength | 1.54184 Å | |
| Crystal system | monoclinic | |
| Space group | P 1 21/n 1 | |
| Unit cell dimensions | a = 14.3795(6) Å | α = 90°. |
| | b = 19.2240(7) Å | β = 101.150(4)°. |
| | c = 20.1723(8) Å | γ = 90°. |
| Volume | 5471.0(4) $Å^3$ | |
| Z | 4 | |
| Density (calculated) | 1.260 $Mg/m^3$ | |
| Absorption coefficient | 1.123 $mm^{-1}$ | |
| F(000) | 2207 | |
| Crystal size | 0.144 × 0.098 × 0.071 $mm^3$ | |
| Theta range for data collection | 3.205 to 73.525°. | |
| Index ranges | −13 <= h <= 17, −23 <= k <= 20, −23 <= l <= 24 | |
| Reflections collected | 29173 | |
| Independent reflections | 10744 [R(int) = 0.0443] | |
| Completeness to theta = 67.684° | 99.9% | |
| Absorption correction | Gaussian and multi-scan | |
| Max. and min. transmission | 1.000 and 0.818 | |
| Refinement method | Full-matrix least-squares on $F^2$ | |
| Data/restraints/parameters | 10744/626/896 | |
| Goodness-of-fit on $F^2$ | 1.027 | |
| Final R indices [I > 2sigma(I)] | R1 = 0.0697, wR2 = 0.1847 | |
| R indices (all data) | R1 = 0.0846, wR2 = 0.2005 | |
| Extinction coefficient | n/a | |
| Largest diff peak and hole | 0.836 and −0.386 e ·$A^{-3}$ | |
| CCDC deposition number | 2107218 | |

REFERENCES

The following references, to the extent that they provide exemplary procedural or other details supplementary to those set forth herein, are specifically incorporated herein by reference.

Anderson, *Practical Process Research & Development—A Guide for Organic Chemists*, $2^{nd}$ ed., Academic Press, New York, 2012.

Armand and Tarascon, Nature 2008, 451, 652-657.
Brooks, Geology Today 2020, 36, 192-197.
Buranaprasertsuk et al., Catal. Commun. 2007, 8, 310-314.
Cafeo et al., J. Am. Chem. Soc. 2013, 135, 2544-2551.
Choubey et al., Miner. Eng. 2016, 89, 119-137.
CrysAlisPro. Rigaku Oxford Diffraction (2019). CrysAlicPro Software System, 1.171.41.70a.
Custelcean et al., Angew. Chem., Int. Ed. 2005, 44, 2537-2542.
Goodenough et al., J. Am. Chem. Soc. 2013, 135, 1167-1176.
Grosjean et al., Renewable Sustainable Energy Rev. 2012, 16, 1735-1744.
Haken and Werner, Br. Polym. J. 1971, 3, 263-265.
*Handbook of Pharmaceutical Salts: Properties, and Use*, Stahl and Wermuth Eds., Verlag Helvetica Chimica Acta, 2002.
Harada et al., J. Am. Chem. Soc. 2017, 139, 9124-9127.
He et al., J. Am. Chem. Soc. 2016, 138, 9779-9782.
He et al., J. Am. Chem. Soc. 2016, 138 (31), 9779-9782.
He et al., Angew. Chem., Int. Ed. 2018, 57, 11924-11928.
Hong et al., Chem. Commun. 2020, 56, 10541-10544.
Ibrahim et al., International Journal of Scientific & Engineering Research 2013, 4, 1-12.
International Tables for X-ray Crystallography (1992). Vol. C, Tables 4.2.6.8 and 6.1.1.4, A. J. C. Wilson, editor, Boston: Kluwer Academic Press.
Ji et al., Acc. Chem. Res. 2019, 52, 1915-1927.
Karrech et al., Miner. Eng. 2020, 145, 106085.
Kavanagh et al., Resources 2018, 7, 57.
Kim and Sessler, Acc. Chem. Res. 2014, 47, 2525-2536.
Kim et al., J. Am. Chem. Soc. 2012, 134 (51), 20837-20843.
Kim et al., Org. Lett. 2009, 11, 3626-3629.
Kim et al., J. Am. Chem. Soc. 2014, 136, 15079-15085.
Krause et al., J. Electrochem. Soc. 2021, 168, 040504.
Lee et al., J. Org. Chem. 2005, 70, 2067-2074.
Meng et al., Miner. Process Extr. Metall. Rev. 2021, 42, 123-141.
Miyaji et al., Angew. Chem., Int. Ed. 2000, 39, 1777-1780.
Miyaji et al., J. Am. Chem. Soc. 2005, 127, 12510-12512.
Nishiyabu et al., J. Am. Chem. Soc. 2006, 128, 11496-11504.
OLEX2. Dolomanov et al., J. Appl. Cryst. 42, 339-341.
Peng et al., Chem. Soc. Rev. 2020, 49, 865-907.
Reagan-Shaw et al., *FASEB J.,* 22(3):659-661, 2008.
Sheldrick, 2015. SHELXL-2016/6. Acta Cryst., C71, 3-8.
Sheldrick, 1994. SHELXTL/PC (Version 5.03). Siemens Analytical X-ray Instruments, Inc., Madison, Wis., USA.
SHELXT, 2015. G. M. SheldrickActa Cryst. A71, 3-8.
Shi et al., Sep. Purif Technol. 2019, 211, 303-309.
Smith, *March's Advanced Organic Chemistry: Reactions, Mechanisms, and Structure,* 7th Ed., Wiley, 2013.
Spek, A. L. (2009). PLATON, Acta Cryst. D65, 148-155.
Thiampanya et al., Org. Lett. 2012, 14, 4050-4053.
Wang et al., Nucl. Fusion 2021, 61, 046040.
WinGX 1.64, 1999. Farrugia, J. Appl. Cryst. 32. 837-838.
Xu et al., J Mater Sci 2021, 56, 16-63.
Yang et al., Mater. Res. Lett. 2021, 9, 255-262.
Park et al., Chem. Eur. J. 2012, 18, 2514-2523
Mahoney et al., Inorg. Chem. 2004, 43, 24, 7617-7621
Ko et al., Nat. Chem. 2014, 6, pages 885-892
Nishiyabu et al., Org. Lett. 2006, 8, 3, 359-362
Xie et al., J. Electrochem. Soc. 2000, 147, 4247-4251
Li et al., Ind. Eng. Chem. Res. 2010, 49, 4981-4988
Burgess et al., Metal ions in solution. Ellis Horwood, 1978

What is claimed is:

1. A polymer comprising a subunit of the formula:

(VIIA)

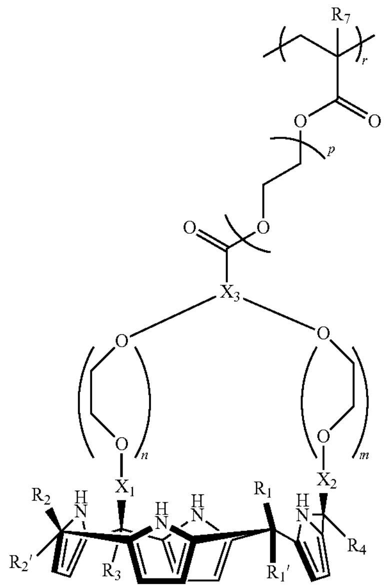

or (VIIB)

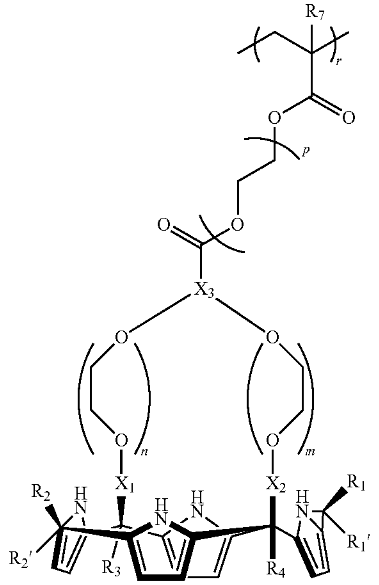

wherein:

$R_1$, $R_1'$, $R_2$, $R_2'$, $R_3$, and $R_4$ are each independently hydrogen, alkyl$_{(C\leq 6)}$, or substituted alkyl$_{(C\leq 6)}$;

m and n are each independently 2, 3, 4, or 5;

p is 1, 2, or 3;

r is 1-50;

$X_1$, $X_2$, and $X_3$ are each independently arenediyl$_{(C\leq 12)}$ or substituted arenediyl$_{(C\leq 12)}$; and $R_7$ is hydrogen, alkyl$_{(C\leq 6)}$, or substituted alkyl$_{(C\leq 6)}$;

or a salt thereof.

2. The polymer of claim 1, wherein the subunit is further defined as:

(VIIIA)

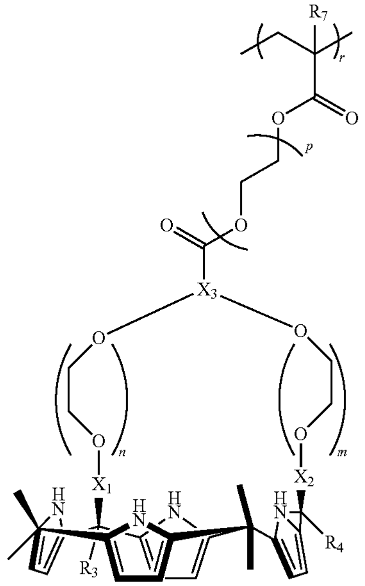

or (VIIIB)

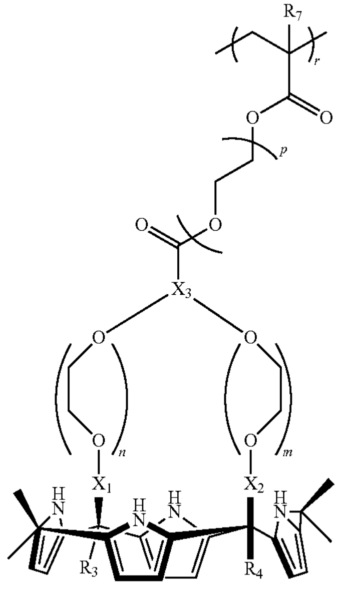

wherein:

$R_3$ and $R_4$ are each independently hydrogen, alkyl$_{(C\leq6)}$, or substituted alkyl$_{(C\leq6)}$;

m and n are each independently 2, 3, 4, or 5;

p is 1, 2, or 3;

r is 1-50;

$X_1$, $X_2$, and $X_3$ are each independently arenediyl$_{(C\leq12)}$ or substituted arenediyl$_{(C\leq12)}$; and $R_7$ is hydrogen, alkyl$_{(C\leq6)}$, or substituted alkyl$_{(C\leq6)}$;

or a salt thereof.

3. The compound of claim 1, wherein the subunit is further defined as:

(IXA)

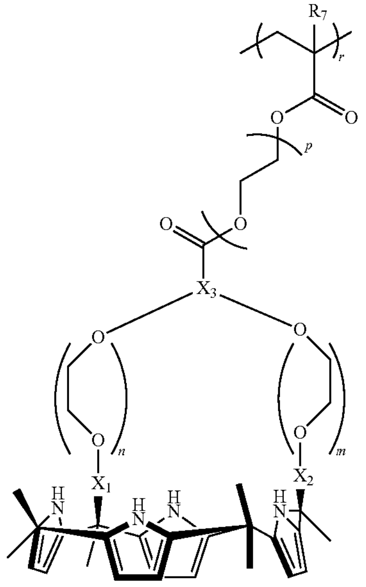

or (IXB)

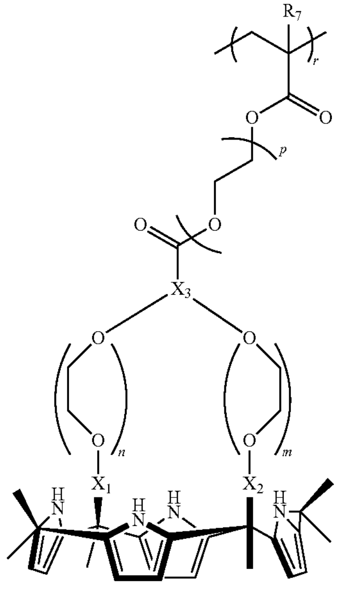

wherein:

m and n are each independently 2, 3, 4, or 5;

p is 2, 3, 4, or 5;

r is 1-50;

$X_1$, $X_2$, and $X_3$ are each independently arenediyl$_{(C\leq12)}$ or substituted arenediyl$_{(C\leq12)}$; and $R_7$ is hydrogen, alkyl$_{(C\leq6)}$, or substituted alkyl$_{(C\leq6)}$;

or a salt thereof.

4. The polymer of claim 1, wherein $R_1$, $R_1'$, $R_2$, $R_2'$, $R_3$, and/or $R_4$ are alkyl$_{(C\leq6)}$.

5. The polymer of claim 1, wherein m and/or n are 2, 3, or 4.

6. The polymer of claim 1, wherein $X_1$, $X_2$ and/or $X_3$ are benzenediyl.

7. The polymer of claim 1, wherein p is 1 or 2.

8. The polymer of claim 1, wherein $R_7$ is alkyl$_{(C\leq6)}$ or substituted alkyl$_{(C\leq6)}$.

9. The polymer of claim 1, wherein the subunit is further defined as:

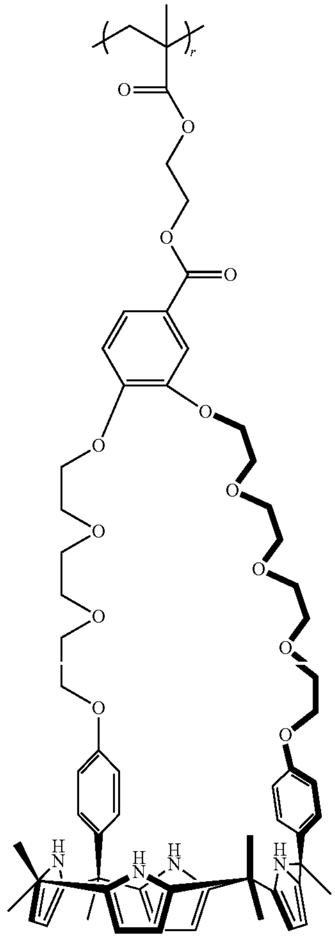

or

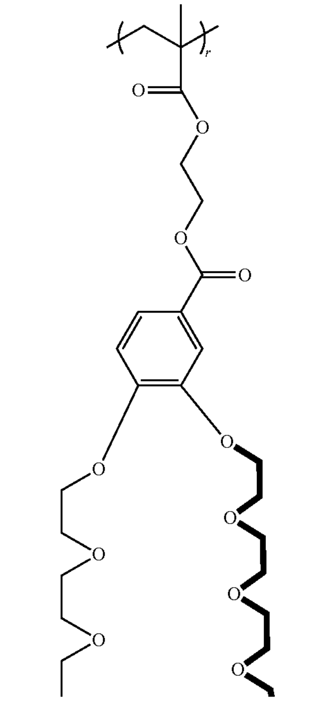

-continued

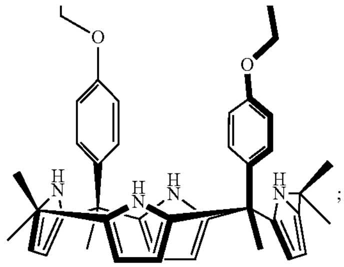

;

or a salt thereof.

10. The polymer of claim 1, wherein the polymer further comprises one or more monomers of the formula:

(X)

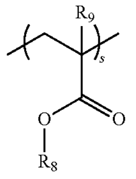

wherein:

s is 1-750;

$R_8$ and $R_9$ are each independently hydrogen, $alkyl_{(C\leq8)}$, or substituted $alkyl_{(C\leq8)}$.

11. The polymer of claim 1, wherein the polymer further comprises one or more crosslinking agents.

12. The polymer of claim 11, wherein the crosslinking agent is further defined as:

(XI)

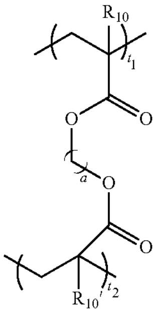

wherein:

$R_{10}$ and $R_{10}'$ are each independently hydrogen, $alkyl_{(C\leq8)}$, or substituted $alkyl_{(C\leq8)}$;

a is 1, 2, 3, 4, 5, 6, 7, or 8; and $t_1$ and $t_2$ are 1-50.

13. The polymer of claim 11, wherein the polymer comprises from about 0.01% to about 2.5% cross linking.

14. A method of separating a salt from a mixture comprising exposing the mixture to the polymer of claim 1.

* * * * *